(12) United States Patent
Yamashita

(10) Patent No.: US 11,044,439 B2
(45) Date of Patent: Jun. 22, 2021

(54) SIGNAL PROCESSING APPARATUS, SIGNAL PROCESSING METHOD, PROGRAM, AND SIGNAL TRANSMISSION SYSTEM

(71) Applicant: SONY CORPORATION, Tokyo (JP)

(72) Inventor: Shigeyuki Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 131 days.

(21) Appl. No.: 15/574,195

(22) PCT Filed: May 30, 2016

(86) PCT No.: PCT/JP2016/065864
§ 371 (c)(1),
(2) Date: Nov. 15, 2017

(87) PCT Pub. No.: WO2016/199606
PCT Pub. Date: Dec. 15, 2016

(65) Prior Publication Data
US 2018/0295319 A1 Oct. 11, 2018

(30) Foreign Application Priority Data
Jun. 12, 2015 (JP) .............................. JP2015-119628

(51) Int. Cl.
*H04N 7/015* (2006.01)
*H04N 21/2383* (2011.01)
(Continued)

(52) U.S. Cl.
CPC ........... *H04N 7/015* (2013.01); *H04L 49/352* (2013.01); *H04N 5/0675* (2013.01);
(Continued)

(58) Field of Classification Search
CPC .... H04N 7/16; H04N 21/236; H04N 21/2389; H04N 21/23602; H04N 21/23895;
(Continued)

(56) References Cited

U.S. PATENT DOCUMENTS 4,679,235 A * 7/1987 Okada ................... H04N 7/1675
348/E7.056
7,269,778 B1 * 9/2007 Feng ....................... H03M 5/145
341/59

(Continued)

FOREIGN PATENT DOCUMENTS

| JP | 2013-236211 A | 11/2013 |
| JP | 2015-19182 A | 1/2015 |
| JP | 2015-76704 A | 4/2015 |

OTHER PUBLICATIONS

International Search Report dated Aug. 30, 2016 in PCT/JP2016/065864 filed May 30, 2016.

*Primary Examiner* — Ngoc K Vu
(74) *Attorney, Agent, or Firm* — Oblon, McClelland, Maier & Neustadt, L.L.P.

(57) ABSTRACT

A signal processing apparatus, signal processing method, program, and signal transmission system can transmit 8K or 4K video signals stably through a device of 100 Gbps. A signal processor includes a mapping unit configured to map an 8K or 4K video signal onto first data streams, prescribed by a predetermined format, of plural channels, and a multiplexer configured to generate plural first data blocks by scrambling the first data streams of either odd-numbered or even-numbered channels, first bits by first bits, invert the polarity of data blocks which are part of the first data blocks, generate plural second data blocks by 8B/10B-converting the first data streams of the other channels, second bits by second bits, and generate serial second data streams of plural lanes by multiplexing the first data blocks and the second data blocks. The processor is applicable to a broadcasting camera, for example.

19 Claims, 75 Drawing Sheets

(51) Int. Cl.
  *H04N 21/2389*  (2011.01)
  *H04N 21/236*  (2011.01)
  *H04L 12/931*  (2013.01)
  *H04N 5/067*  (2006.01)

(52) U.S. Cl.
  CPC ....... *H04N 21/236* (2013.01); *H04N 21/2383* (2013.01); *H04N 21/23897* (2013.01)

(58) Field of Classification Search
  CPC .... H04N 7/015; H04N 5/067; H04N 21/2383; H04N 21/23897; H04N 5/0675; H04N 5/6075; H04L 12/931; H04L 49/352
  See application file for complete search history.

(56) References Cited

U.S. PATENT DOCUMENTS

| | | | |
|---|---|---|---|
| 9,875,709 B2 * | 1/2018 | Li | G09G 3/36 |
| 2009/0213265 A1 * | 8/2009 | Yamashita | H04N 5/08 |
| | | | 348/500 |
| 2012/0293710 A1 * | 11/2012 | Yamashita | H04N 7/015 |
| | | | 348/445 |
| 2013/0010187 A1 * | 1/2013 | Yamashita | H04N 21/23602 |
| | | | 348/441 |
| 2013/0301648 A1 | 11/2013 | Yamashita | |
| 2014/0146830 A1 * | 5/2014 | Kusachi | H04L 1/1819 |
| | | | 370/412 |
| 2015/0016538 A1 | 1/2015 | Yamashita | |
| 2015/0101002 A1 | 4/2015 | Yamashita | |

\* cited by examiner

| SYSTEM CATEGORY | SYSTEM NAME | LUMINANCE OR NUMBER OF R'G'B' SAMPLES PER EFFECTIVE LINE | NUMBER OF EFFECTIVE LINES PER FRAME | FRAME RATE (Hz) |
|---|---|---|---|---|
| UHDTV1 | 3840×2160/23.98/P | 3840 | 2160 | 24/1.001 |
| | 3840×2160/24/P | 3840 | 2160 | 24 |
| | 3840×2160/25/P | 3840 | 2160 | 25 |
| | 3840×2160/29.97/P | 3840 | 2160 | 30/1.001 |
| | 3840×2160/30/P | 3840 | 2160 | 30 |
| | 3840×2160/50/P | 3840 | 2160 | 50 |
| | 3840×2160/59.94/P | 3840 | 2160 | 60/1.001 |
| | 3840×2160/60/P | 3840 | 2160 | 60 |
| UHDTV2 | 7680×4320/23.98/P | 7680 | 4320 | 24/1.001 |
| | 7680×4320/24/P | 7680 | 4320 | 24 |
| | 7680×4320/25/P | 7680 | 4320 | 25 |
| | 7680×4320/29.97/P | 7680 | 4320 | 30/1.001 |
| | 7680×4320/30/P | 7680 | 4320 | 30 |
| | 7680×4320/50/P | 7680 | 4320 | 50 |
| | 7680×4320/59.94/P | 7680 | 4320 | 60/1.001 |
| | 7680×4320/60/P | 7680 | 4320 | 60 |

F I G . 1

FIG.3
A R'G'B' OR Y'C_B'C_R' 4:4:4 SYSTEM
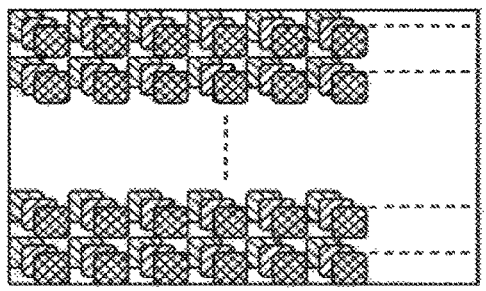
- R' OR C_R' COMPONENT
- G' OR Y' COMPONENT
- B' OR C_B' COMPONENT
B Y'C_B'C_R' 4:2:2 SYSTEM
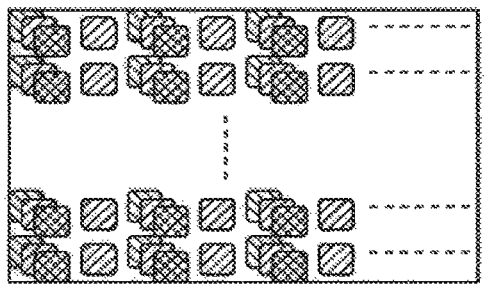
C Y'C_B'C_R' 4:2:0 SYSTEM
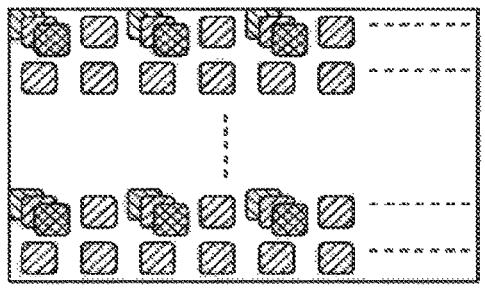

| 160 BITS 1ST SAMPLE | | | | 160 BITS 2ND SAMPLE | | | | 160 BITS 3RD SAMPLE | | | | 160 BITS 4TH SAMPLE | | | |
|---|---|---|---|---|---|---|---|---|---|---|---|---|---|---|---|
| 1-1 | 1-11 | 1-21 | 1-31 | 5-1 | 5-11 | 5-21 | 5-31 | 9-1 | 9-11 | 9-21 | 9-31 | 13-1 | 13-11 | 13-21 | 13-31 |
| 1-2 | 1-12 | 1-22 | 1-32 | 5-2 | 5-12 | 5-22 | 5-32 | 9-2 | 9-12 | 9-22 | 9-32 | 13-2 | 13-12 | 13-22 | 13-32 |
| 1-3 | 1-13 | 1-23 | 1-33 | 5-3 | 5-13 | 5-23 | 5-33 | 9-3 | 9-13 | 9-23 | 9-33 | 13-3 | 13-13 | 13-23 | 13-33 |
| 1-4 | 1-14 | 1-24 | 1-34 | 5-4 | 5-14 | 5-24 | 5-34 | 9-4 | 9-14 | 9-24 | 9-34 | 13-4 | 13-14 | 13-24 | 13-34 |
| 1-5 | 1-15 | 1-25 | 1-35 | 5-5 | 5-15 | 5-25 | 5-35 | 9-5 | 9-15 | 9-25 | 9-35 | 13-5 | 13-15 | 13-25 | 13-35 |
| 1-6 | 1-16 | 1-26 | 1-36 | 5-6 | 5-16 | 5-26 | 5-36 | 9-6 | 9-16 | 9-26 | 9-36 | 13-6 | 13-16 | 13-26 | 13-36 |
| 1-7 | 1-17 | 1-27 | 1-37 | 5-7 | 5-17 | 5-27 | 5-37 | 9-7 | 9-17 | 9-27 | 9-37 | 13-7 | 13-17 | 13-27 | 13-37 |
| 1-8 | 1-18 | 1-28 | 1-38 | 5-8 | 5-18 | 5-28 | 5-38 | 9-8 | 9-18 | 9-28 | 9-38 | 13-8 | 13-18 | 13-28 | 13-38 |
| 1-9 | 1-19 | 1-29 | 1-39 | 5-9 | 5-19 | 5-29 | 5-39 | 9-9 | 9-19 | 9-29 | 9-39 | 13-9 | 13-19 | 13-29 | 13-39 |
| 1-10 | 1-20 | 1-30 | 1-40 | 5-10 | 5-20 | 5-30 | 5-40 | 9-10 | 9-20 | 9-30 | 9-40 | 13-10 | 13-20 | 13-30 | 13-40 |
| 2-1 | 2-11 | 2-21 | 2-31 | 6-1 | 6-11 | 6-21 | 6-31 | 10-1 | 10-11 | 10-21 | 10-31 | 14-1 | 14-11 | 14-21 | 14-31 |
| 2-2 | 2-12 | 2-22 | 2-32 | 6-2 | 6-12 | 6-22 | 6-32 | 10-2 | 10-12 | 10-22 | 10-32 | 14-2 | 14-12 | 14-22 | 14-32 |
| 2-3 | 2-13 | 2-23 | 2-33 | 6-3 | 6-13 | 6-23 | 6-33 | 10-3 | 10-13 | 10-23 | 10-33 | 14-3 | 14-13 | 14-23 | 14-33 |
| 2-4 | 2-14 | 2-24 | 2-34 | 6-4 | 6-14 | 6-24 | 6-34 | 10-4 | 10-14 | 10-24 | 10-34 | 14-4 | 14-14 | 14-24 | 14-34 |
| 2-5 | 2-15 | 2-25 | 2-35 | 6-5 | 6-15 | 6-25 | 6-35 | 10-5 | 10-15 | 10-25 | 10-35 | 14-5 | 14-15 | 14-25 | 14-35 |
| 2-6 | 2-16 | 2-26 | 2-36 | 6-6 | 6-16 | 6-26 | 6-36 | 10-6 | 10-16 | 10-26 | 10-36 | 14-6 | 14-16 | 14-26 | 14-36 |
| 2-7 | 2-17 | 2-27 | 2-37 | 6-7 | 6-17 | 6-27 | 6-37 | 10-7 | 10-17 | 10-27 | 10-37 | 14-7 | 14-17 | 14-27 | 14-37 |
| 2-8 | 2-18 | 2-28 | 2-38 | 6-8 | 6-18 | 6-28 | 6-38 | 10-8 | 10-18 | 10-28 | 10-38 | 14-8 | 14-18 | 14-28 | 14-38 |
| 2-9 | 2-19 | 2-29 | 2-39 | 6-9 | 6-19 | 6-29 | 6-39 | 10-9 | 10-19 | 10-29 | 10-39 | 14-9 | 14-19 | 14-29 | 14-39 |
| 2-10 | 2-20 | 2-30 | 2-40 | 6-10 | 6-20 | 6-30 | 6-40 | 10-10 | 10-20 | 10-30 | 10-40 | 14-10 | 14-20 | 14-30 | 14-40 |
| 3-1 | 3-11 | 3-21 | 3-31 | 7-1 | 7-11 | 7-21 | 7-31 | 11-1 | 11-11 | 11-21 | 11-31 | 15-1 | 15-11 | 15-21 | 15-31 |
| 3-2 | 3-12 | 3-22 | 3-32 | 7-2 | 7-12 | 7-22 | 7-32 | 11-2 | 11-12 | 11-22 | 11-32 | 15-2 | 15-12 | 15-22 | 15-32 |
| 3-3 | 3-13 | 3-23 | 3-33 | 7-3 | 7-13 | 7-23 | 7-33 | 11-3 | 11-13 | 11-23 | 11-33 | 15-3 | 15-13 | 15-23 | 15-33 |
| 3-4 | 3-14 | 3-24 | 3-34 | 7-4 | 7-14 | 7-24 | 7-34 | 11-4 | 11-14 | 11-24 | 11-34 | 15-4 | 15-14 | 15-24 | 15-34 |
| 3-5 | 3-15 | 3-25 | 3-35 | 7-5 | 7-15 | 7-25 | 7-35 | 11-5 | 11-15 | 11-25 | 11-35 | 15-5 | 15-15 | 15-25 | 15-35 |
| 3-6 | 3-16 | 3-26 | 3-36 | 7-6 | 7-16 | 7-26 | 7-36 | 11-6 | 11-16 | 11-26 | 11-36 | 15-6 | 15-16 | 15-26 | 15-36 |
| 3-7 | 3-17 | 3-27 | 3-37 | 7-7 | 7-17 | 7-27 | 7-37 | 11-7 | 11-17 | 11-27 | 11-37 | 15-7 | 15-17 | 15-27 | 15-37 |
| 3-8 | 3-18 | 3-28 | 3-38 | 7-8 | 7-18 | 7-28 | 7-38 | 11-8 | 11-18 | 11-28 | 11-38 | 15-8 | 15-18 | 15-28 | 15-38 |
| 3-9 | 3-19 | 3-29 | 3-39 | 7-9 | 7-19 | 7-29 | 7-39 | 11-9 | 11-19 | 11-29 | 11-39 | 15-9 | 15-19 | 15-29 | 15-39 |
| 3-10 | 3-20 | 3-30 | 3-40 | 7-10 | 7-20 | 7-30 | 7-40 | 11-10 | 11-20 | 11-30 | 11-40 | 15-10 | 15-20 | 15-30 | 15-40 |
| 4-1 | 4-11 | 4-21 | 4-31 | 8-1 | 8-11 | 8-21 | 8-31 | 12-1 | 12-11 | 12-21 | 12-31 | 16-1 | 16-11 | 16-21 | 16-31 |
| 4-2 | 4-12 | 4-22 | 4-32 | 8-2 | 8-12 | 8-22 | 8-32 | 12-2 | 12-12 | 12-22 | 12-32 | 16-2 | 16-12 | 16-22 | 16-32 |
| 4-3 | 4-13 | 4-23 | 4-33 | 8-3 | 8-13 | 8-23 | 8-33 | 12-3 | 12-13 | 12-23 | 12-33 | 16-3 | 16-13 | 16-23 | 16-33 |
| 4-4 | 4-14 | 4-24 | 4-34 | 8-4 | 8-14 | 8-24 | 8-34 | 12-4 | 12-14 | 12-24 | 12-34 | 16-4 | 16-14 | 16-24 | 16-34 |
| 4-5 | 4-15 | 4-25 | 4-35 | 8-5 | 8-15 | 8-25 | 8-35 | 12-5 | 12-15 | 12-25 | 12-35 | 16-5 | 16-15 | 16-25 | 16-35 |
| 4-6 | 4-16 | 4-26 | 4-36 | 8-6 | 8-16 | 8-26 | 8-36 | 12-6 | 12-16 | 12-26 | 12-36 | 16-6 | 16-16 | 16-26 | 16-36 |
| 4-7 | 4-17 | 4-27 | 4-37 | 8-7 | 8-17 | 8-27 | 8-37 | 12-7 | 12-17 | 12-27 | 12-37 | 16-7 | 16-17 | 16-27 | 16-37 |
| 4-8 | 4-18 | 4-28 | 4-38 | 8-8 | 8-18 | 8-28 | 8-38 | 12-8 | 12-18 | 12-28 | 12-38 | 16-8 | 16-18 | 16-28 | 16-38 |
| 4-9 | 4-19 | 4-29 | 4-39 | 8-9 | 8-19 | 8-29 | 8-39 | 12-9 | 12-19 | 12-29 | 12-39 | 16-9 | 16-19 | 16-29 | 16-39 |
| 4-10 | 4-20 | 4-30 | 4-40 | 8-10 | 8-20 | 8-30 | 8-40 | 12-10 | 12-20 | 12-30 | 12-40 | 16-10 | 16-20 | 16-30 | 16-40 |

FIG. 21

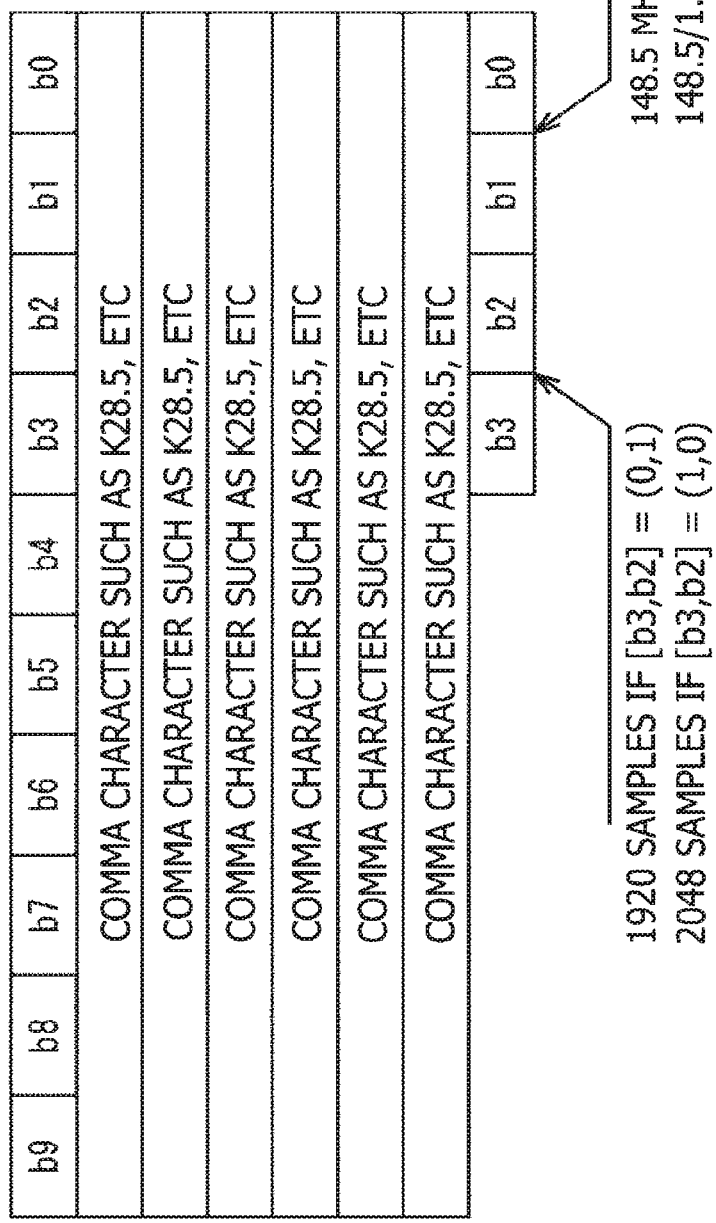
F I G. 2 3

F I G . 5 3
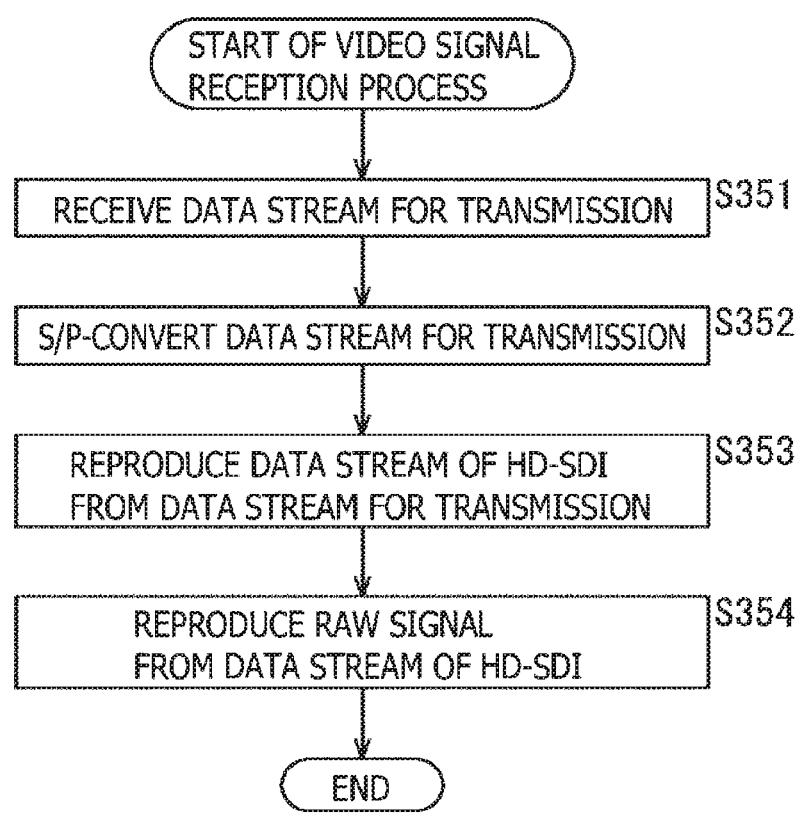

SIGNAL PROCESSING APPARATUS, SIGNAL PROCESSING METHOD, PROGRAM, AND SIGNAL TRANSMISSION SYSTEM

TECHNICAL FIELD

The present technology relates to a signal processing apparatus, a signal processing method, a program, and a signal transmission system, and more particularly to a signal processing apparatus, a signal processing method, a program, and a signal transmission system suitable for use in transmitting 8K or 4K video signals, for example, through a device for 100-Gigabit Ethernet (Ethernet is a registered trademark).

BACKGROUND ART

In recent years, the development has been in progress of image receiving systems and image capturing systems for ultra-high definition video signals such as 8K or 4K video signals that surpass current HD (High Definition) video signals that have 1920 samples×1080 lines per frame. Further, of video standards for 8K and 4K video signals, the video standards standardized by ITU (International Telecommunication Union) are called LSDI (Large Screen Digital Imagery), and the video standards proposed for SMPTE (Society of Motion Picture and Television Engineers) are called UHDTV. Video signals depicted in FIG. 1 of the accompanying drawings are prescribed for UHDTV, for example.

Further, heretofore, there has been disclosed a technology for transmitting 8K or 4K video signals with a device for Ethernet (100 GbE) at a maximum transmission rate of 100 Gbits/second (100 Gbps) (see, for example, PTL 1).

CITATION LIST

Patent Literature

[PTL 1]
JP 2015-76704A

SUMMARY

Technical Problem

According to the technology disclosed in PTL 1, part of data to be transmitted are scrambled. Further, the scrambling process regulated by SMPTE 292-1, for example, is used to scramble the data.

However, according to the scrambling process regulated by SMPTE 292-1, when certain input data are scrambled, a pattern including a bit of 1 (High) followed by a succession of 19 bits of 0 or an inverted pattern thereof sometimes appears frequently in the scrambled data. This pattern is a kind of pathological pattern. If this pattern appears frequently, the mark ratio of the signal deviates largely from 1/2. Further, in order to transmit a signal whose mark ratio deviates largely from 1/2, an AC-coupled circuit may require a special DC reproducing circuit.

The present technology has been developed under these circumstances, and is aimed at stably transmitting 8K or 4K video signals stably through a device for 100 GbE.

Solution to Problem

A signal processing apparatus according to a first aspect of the present technology includes a mapping unit configured to map an 8K or 4K video signal onto first data streams, prescribed by a predetermined format, of a plurality of channels, and a multiplexer configured to generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and generate serial second data streams of a plurality of lanes by multiplexing the first data blocks and the second data blocks.

The multiplexer may include as many multiplexers as the number of lanes of the second data streams, and each of the multiplexers may include a plurality of first signal processors configured to generate the first data blocks by scrambling the respective first data streams input thereto, the first bits by the first bits, and invert the polarity of data blocks which are part of the first data blocks, a plurality of second signal processors configured to generate the second data blocks by 8B/10B-converting the respective first data streams input thereto, the second bits by the second bits, a data stream generator configured to generate parallel third data streams having a predetermined word length by multiplexing the first data blocks and the second data blocks in a predetermined sequence, and a parallel/serial converter configured to generate the second data streams by parallel/serial-converting the third data streams.

The first signal processors may invert the polarity of data blocks which are approximately one half of the first data blocks of one line of the first data streams.

The first signal processors may invert the polarity of every other block of the first data blocks generated from the first data streams.

The first signal processors and the second signal processors may perform their processing sequences in synchronism with a clock signal of 148.5 MHz or 148.5/1.001 MHz, and output data of a total of 640 bits per every four clock pulses, and the data stream generator may operate in synchronism with a clock signal of x MHz, and outputs parallel data of 180 bits×148.5 MHz÷x MHz (bits) or 180 bits×148.5/1.001 MHz÷(x/1.001) MHz (bits) per clock pulse.

The data stream generator may multiplex a predetermined synchronizing signal into the beginning of each line of the second data streams.

The first data streams may include data streams stipulated by a predetermined SDI (Serial Digital Interface) format.

The mapping unit may map an 8K video signal of 48P-60P/4:2:2/10 bits onto fourth data streams of 32 channels which are the first data streams prescribed by an HD-SDI format or fifth data streams of 16 channels which are the first data streams prescribed by a 3G-SDI format, and the multiplexer may generate the first data blocks by scrambling the fourth data streams or the fifth data streams of either odd-numbered or even-numbered channels, 40 bits by 40 bits, inverting the polarity of data blocks which are part of the first data blocks, generating the second data blocks by 8B/10B-converting the fourth data streams or the fifth data streams of the other channels, 40 bits by 40 bits, and generating the second data streams of two lanes by multiplexing the first data blocks and the second data blocks.

The mapping unit may map an 8K video signal of 48P-60P/4:4:4/10 bits, 12 bits or 48P-60P/4:2:2/12 bits onto fourth data streams of 64 channels which are the first data streams prescribed by an HD-SDI format or fifth data streams of 32 channels which are the first data streams prescribed by a 3G-SDI format, and the multiplexer may generate the first data blocks by scrambling the fourth data streams or the fifth data streams of either odd-numbered or even-numbered channels, 40 bits by 40 bits, inverting the polarity of data blocks which are part of the first data blocks, extracting data of 32 bits from the fourth data streams or the fifth data streams of the other channels, 40 bits by 40 bits, generating the second data blocks by 8B/10B-converting the extracted data, and generating the second data streams of four lanes by multiplexing the first data blocks and the second data blocks.

The mapping unit may map an 8K or 4K video signal of 96P-120P two frames by two frames onto the first data streams of the plurality of channels.

The signal processing apparatus may further include a transmission controller configured to wavelength-multiplex the second data streams of the plurality of lanes and send the wavelength-multiplexed second data streams through an Ethernet device of 100 Gbps.

The bit rate of the second data streams may be in a range from 25 to 28.3 Gbps.

A signal processing method according to the first aspect of the present technology includes the steps of mapping an 8K or 4K video signal onto first data streams, prescribed by a predetermined format, of a plurality of channels, and generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and generating serial second data streams of a plurality of lanes by multiplexing the first data blocks and the second data blocks.

A program according to the first aspect of the present technology causes a computer to execute a processing sequence including the steps of mapping an 8K or 4K video signal onto first data streams, prescribed by a predetermined format, of a plurality of channels, and generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and generating serial second data streams of a plurality of lanes by multiplexing the first data blocks and the second data blocks.

A signal processing apparatus according to a second aspect of the present technology includes a data stream reproducer configured to map an 8K or 4K video signal onto first data streams, prescribed by a predetermined format, of a plurality of channels, generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and reproduce the first data streams of the plurality of channels from serial second data streams of a plurality of lanes which are generated by multiplexing the first data blocks and the second data blocks, and a video reproducer configured to reproduce the 8K or 4K video signal from the first data streams of the plurality of channels.

A signal processing method according to the second aspect of the present technology includes the steps of mapping an 8K or 4K video signal onto first data streams, prescribed by a predetermined format, of a plurality of channels, generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and reproducing the first data streams of the plurality of channels from serial second data streams of a plurality of lanes which are generated by multiplexing the first data blocks and the second data blocks, and reproducing the 8K or 4K video signal from the first data streams of the plurality of channels.

A program according to the second aspect of the present technology causes a computer to execute a processing sequence including the steps of mapping an 8K or 4K video signal onto first data streams, prescribed by a predetermined format, of a plurality of channels, generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and reproducing the first data streams of the plurality of channels from serial second data streams of a plurality of lanes which are generated by multiplexing the first data blocks and the second data blocks, and reproducing the 8K or 4K video signal from the first data streams of the plurality of channels.

A signal transmission system according to a third aspect of the present technology includes a signal sending apparatus and a signal receiving apparatus. The signal sending apparatus includes a mapping unit configured to map an 8K or 4K video signal onto first data streams, prescribed by a predetermined format, of a plurality of channels, a multiplexer configured to generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and generate serial second data streams of a plurality of lanes by multiplexing the first data blocks and the second data blocks, and a transmission controller configured to control the transmission of the second data streams of the plurality of lanes. The signal receiving apparatus includes a reception controller configured to control the reception of the second data streams of the plurality of lanes, a data stream reproducer configured to reproduce the first data streams of the plurality of channels from the second data streams of the plurality of lanes, and a video reproducer configured to reproduce the 8K or 4K video signal from the first data streams of the plurality of channels.

In the first aspect of the present technology, an 8K or 4K video signal is mapped onto first data streams, prescribed by a predetermined format, of a plurality of channels, a plurality of first data blocks are generated by scrambling the first data streams of either odd-numbered or even-numbered channels, first bits by first bits, the polarity of data blocks which are part of the first data blocks is inverted, a plurality of second data blocks are generated by 8B/10B-converting the first data streams of the other channels, second bits by second bits, and serial second data streams of a plurality of lanes are generated by multiplexing the first data blocks and the second data blocks.

In the second aspect of the present technology, an 8K or 4K video signal is mapped onto first data streams of a plurality of channels, which are data streams prescribed by a predetermined SDI (Serial Digital Interface) format, a plurality of first data blocks are generated by scrambling the first data streams of either odd-numbered or even-numbered channels, first bits by first bits, the polarity of data blocks which are part of the first data blocks is inverted, a plurality of second data blocks are generated by 8B/10B-converting the first data streams of the other channels, second bits by second bits, the first data streams of the plurality of channels are reproduced from serial second data streams of a plurality of lanes which are generated by multiplexing the first data blocks and the second data blocks, and the 8K or 4K video signal is reproduced from the first data streams of the plurality of channels.

In the third aspect of the present technology, an 8K or 4K video signal is mapped onto first data streams of a plurality of channels, which are data streams prescribed by a predetermined SDI (Serial Digital Interface) format, a plurality of first data blocks are generated by scrambling the first data streams of either odd-numbered or even-numbered channels, first bits by first bits, the polarity of data blocks which are part of the first data blocks is inverted, a plurality of second data blocks are generated by 8B/10B-converting the first data streams of the other channels, second bits by second bits, serial second data streams of a plurality of lanes are generated by multiplexing the first data blocks and the second data blocks, the transmission of the second data streams of the plurality of lanes is controlled, the reception of the second data streams of the plurality of lanes is controlled, the first data streams of the plurality of channels are reproduced from the second data streams of the plurality of lanes, and the 8K or 4K video signal is reproduced from the first data streams of the plurality of channels.

Advantageous Effect of Invention

According to the first through third aspects of the present technology, an 8K or 4K video signal can stably be transmitted through a device for 100-Gbps Ethernet.

It should be noted that the advantages described herein are not necessarily restrictive, but may be any advantages described in the present disclosure.

BRIEF DESCRIPTION OF DRAWINGS

FIG. 1 is a table depicting standards for video signals relative to UHDTV.

FIG. 3 is a diagram depicting an example of sample structures of video signals according to the UHDTV standards.

Figure 19:
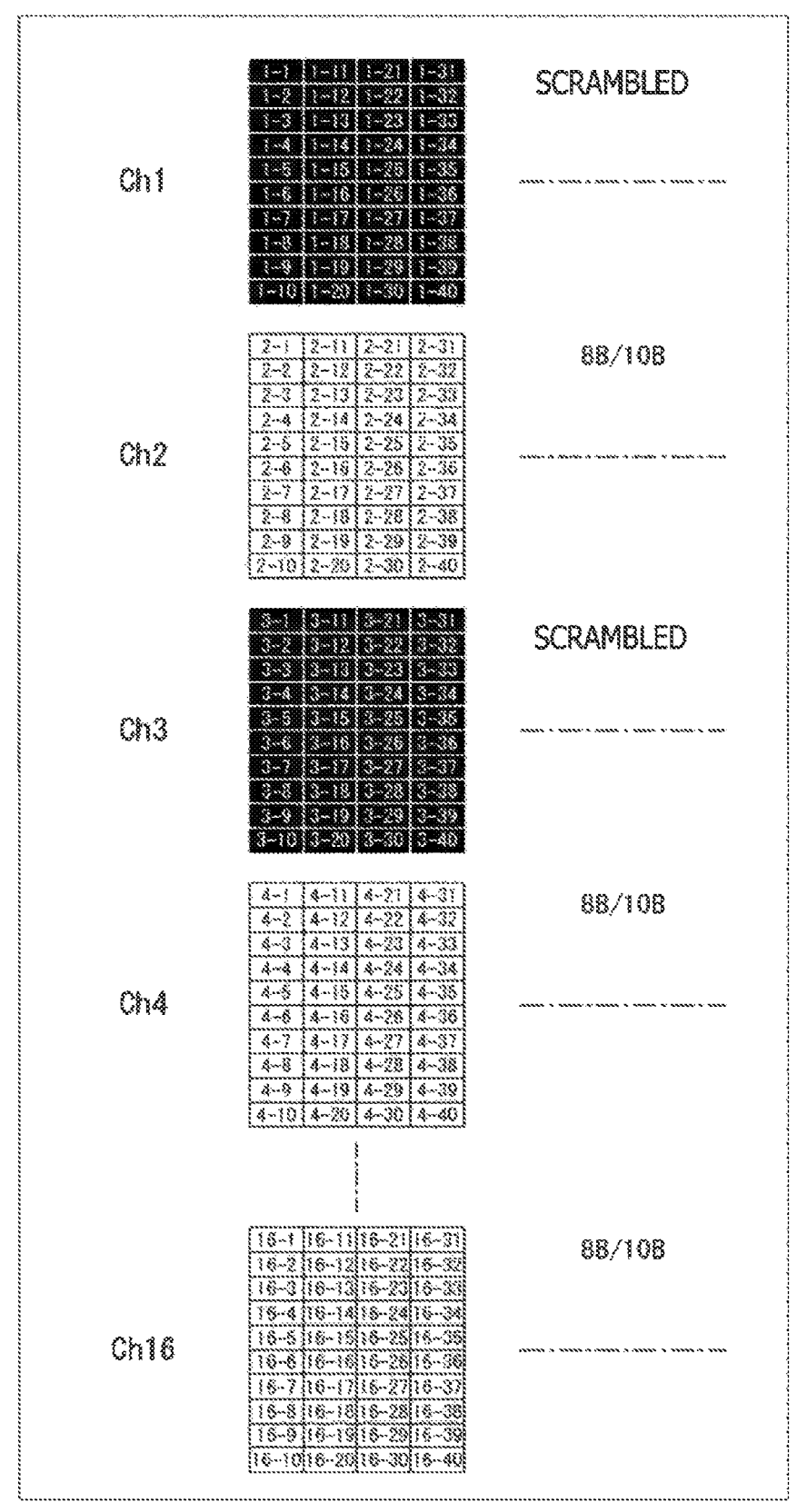

FIG. 19 is a diagram depicting an example of data blocks generated from HD-SDI in the video signal sending process according to the first embodiment.

FIG. 20 is a diagram depicting an example of data blocks generated from HD-SDI in the video signal sending process according to the first embodiment.

FIG. 21 is a diagram depicting an example of data blocks generated from one line of HD-SDI.

FIG. 23 is a diagram depicting an example of a data configuration of a word synchronization signal.

Figure 31:
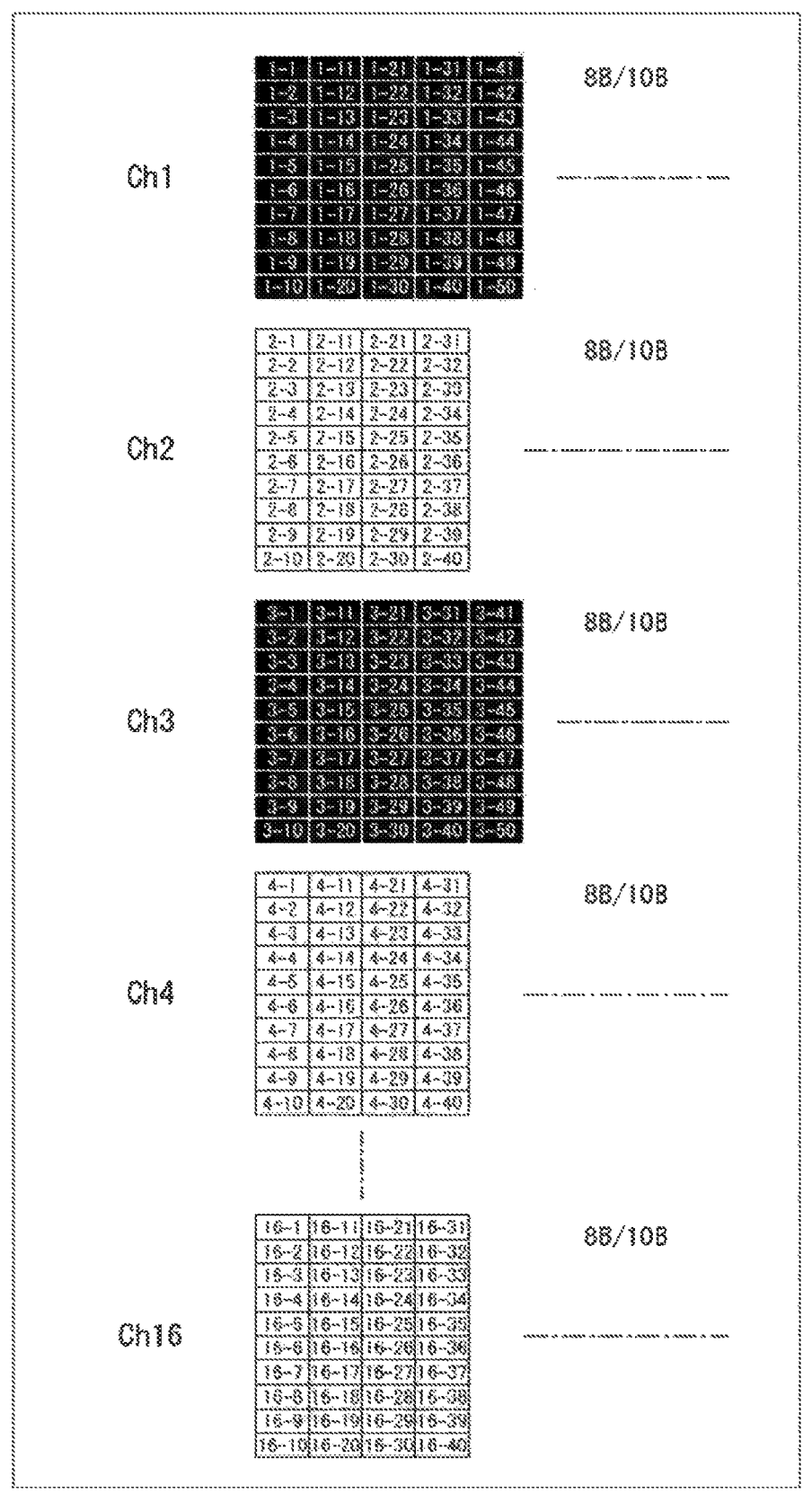

FIG. 31 is a diagram depicting an example of data blocks generated from HD-SDI in the video signal sending process according to the second embodiment.

Figure 32:
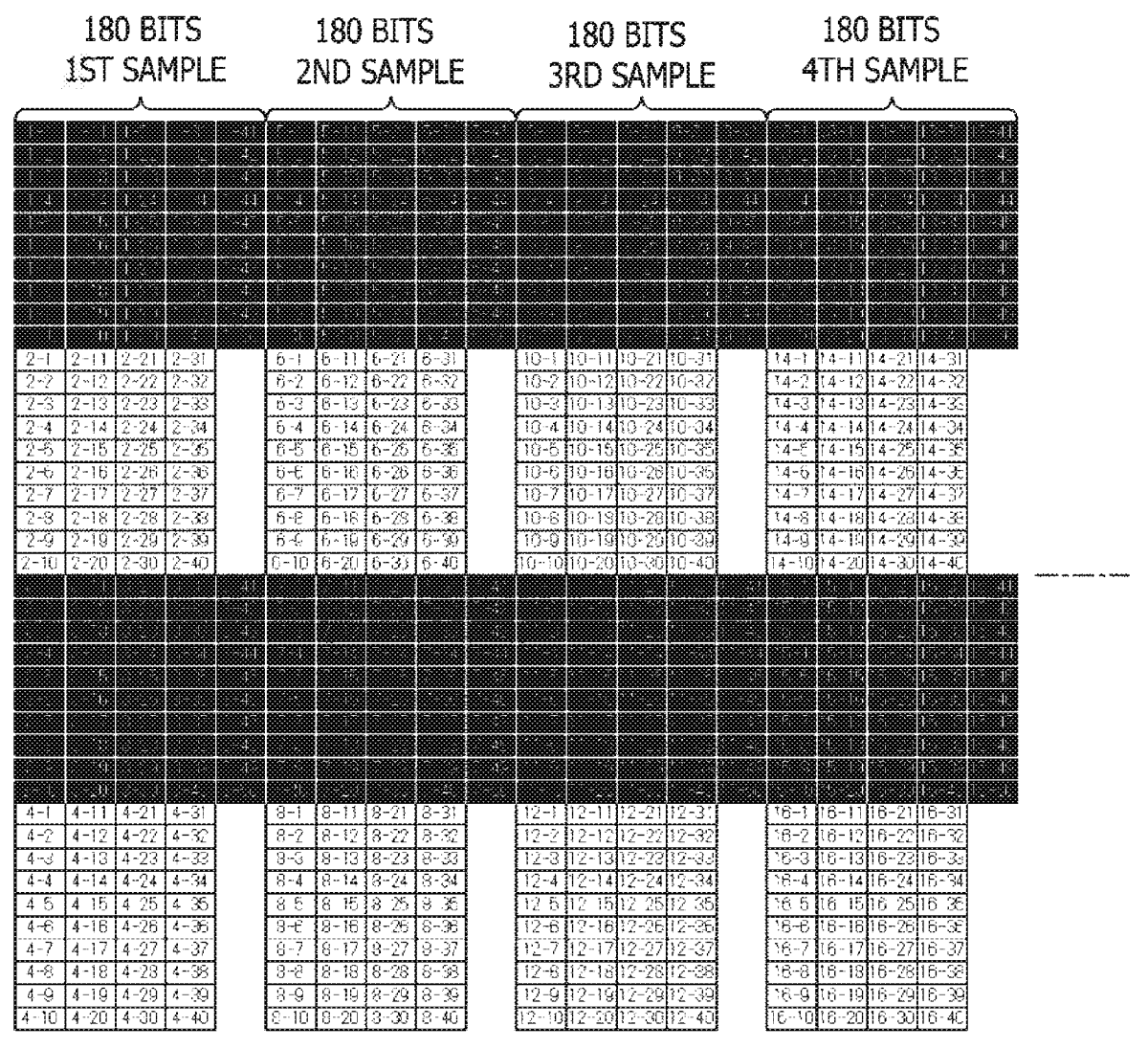

FIG. 32 is a diagram depicting an example of data blocks generated from HD-SDI in the video signal sending process according to the second embodiment.

Figure 40:
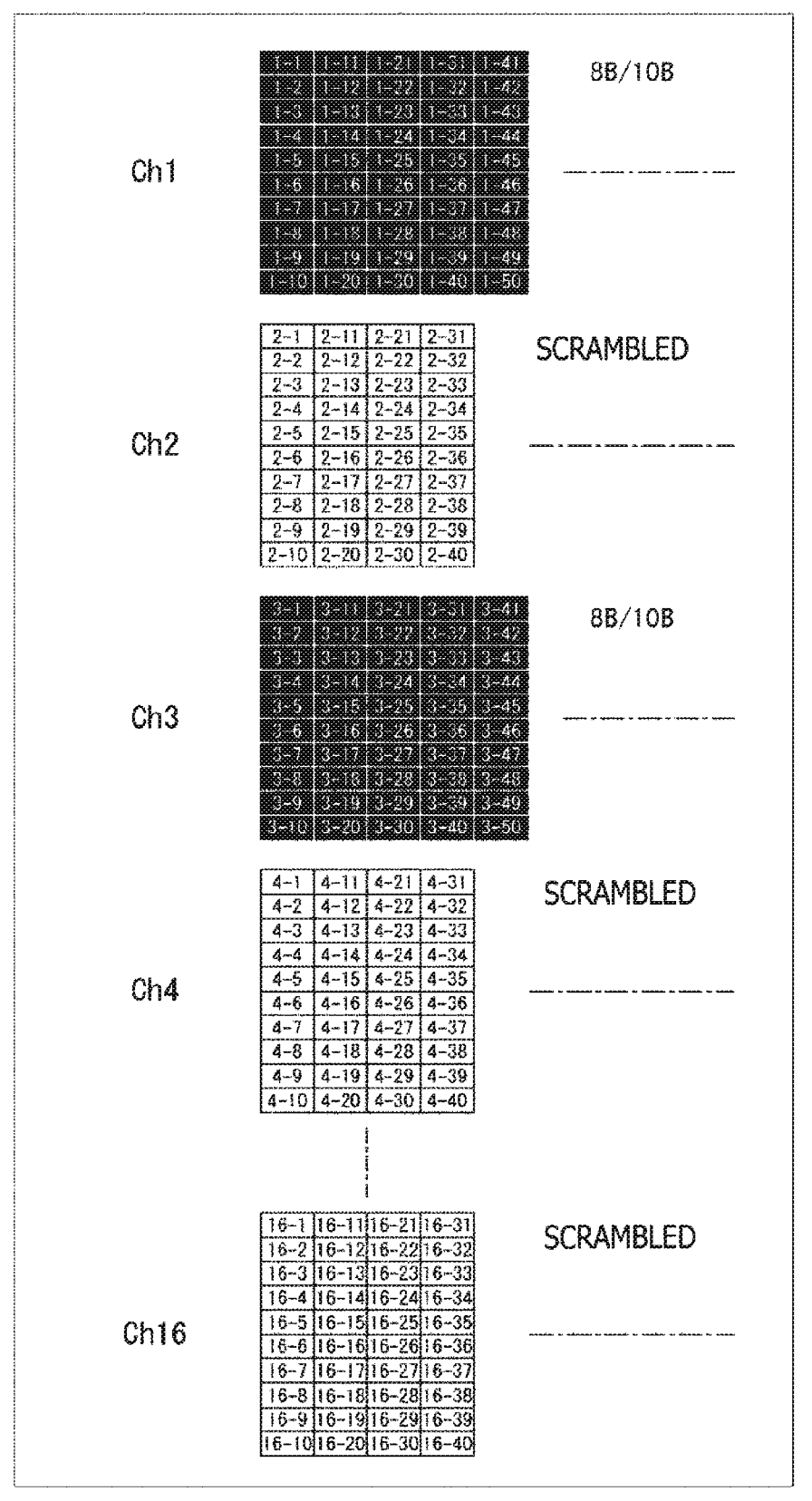

FIG. 40 is a diagram depicting an example of data blocks generated from HD-SDI in the video signal sending process according to the third embodiment.

FIG. 42 is a diagram depicting an example of data blocks generated from one line of HD-SDI.

FIG. 53 is a flowchart illustrative of a video signal receiving process according to the fifth embodiment.

Figure 60:
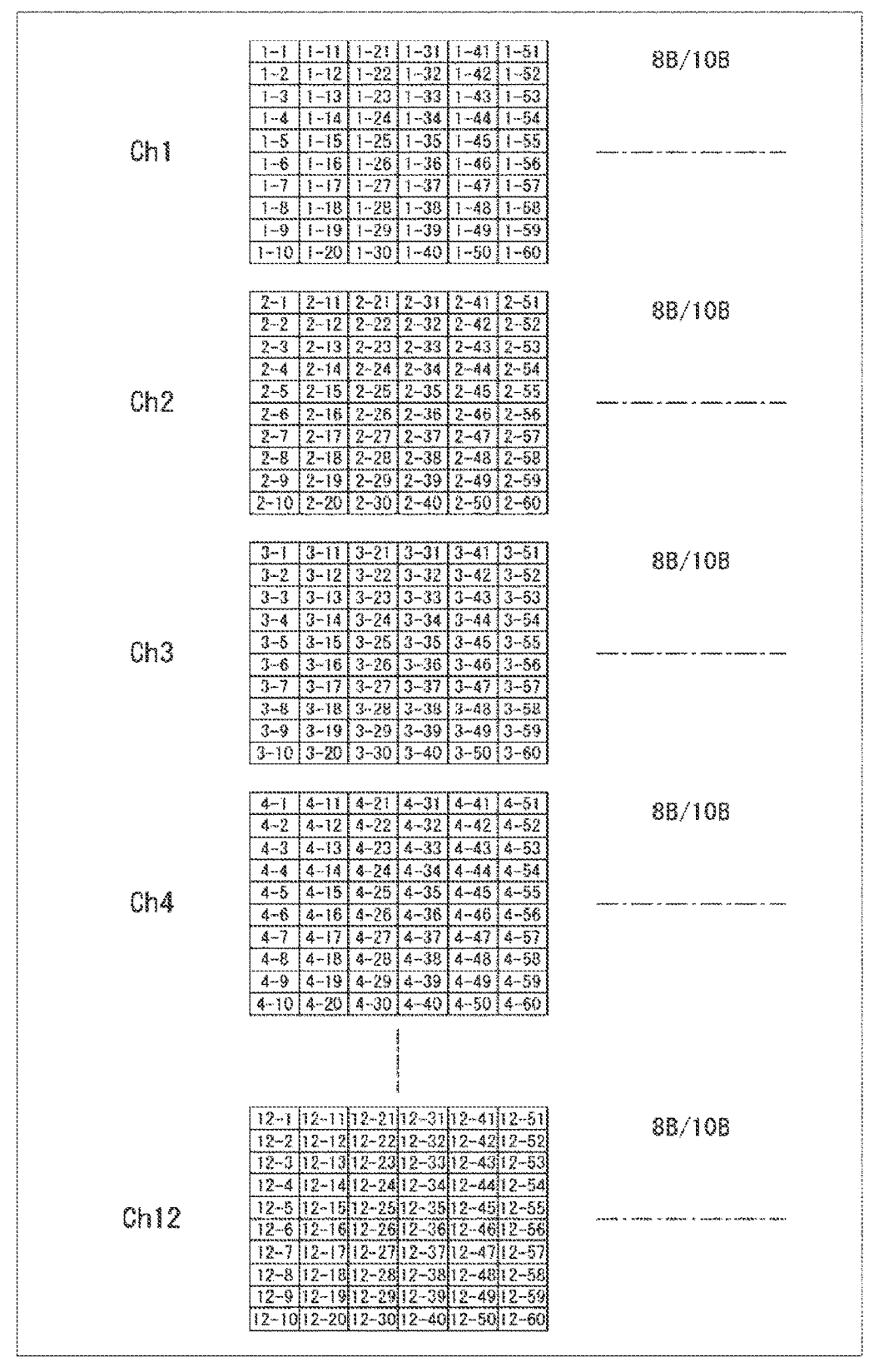

FIG. 60 is a diagram depicting an example of data blocks generated from a basic stream in the video signal sending process according to the seventh embodiment.

Figure 61:
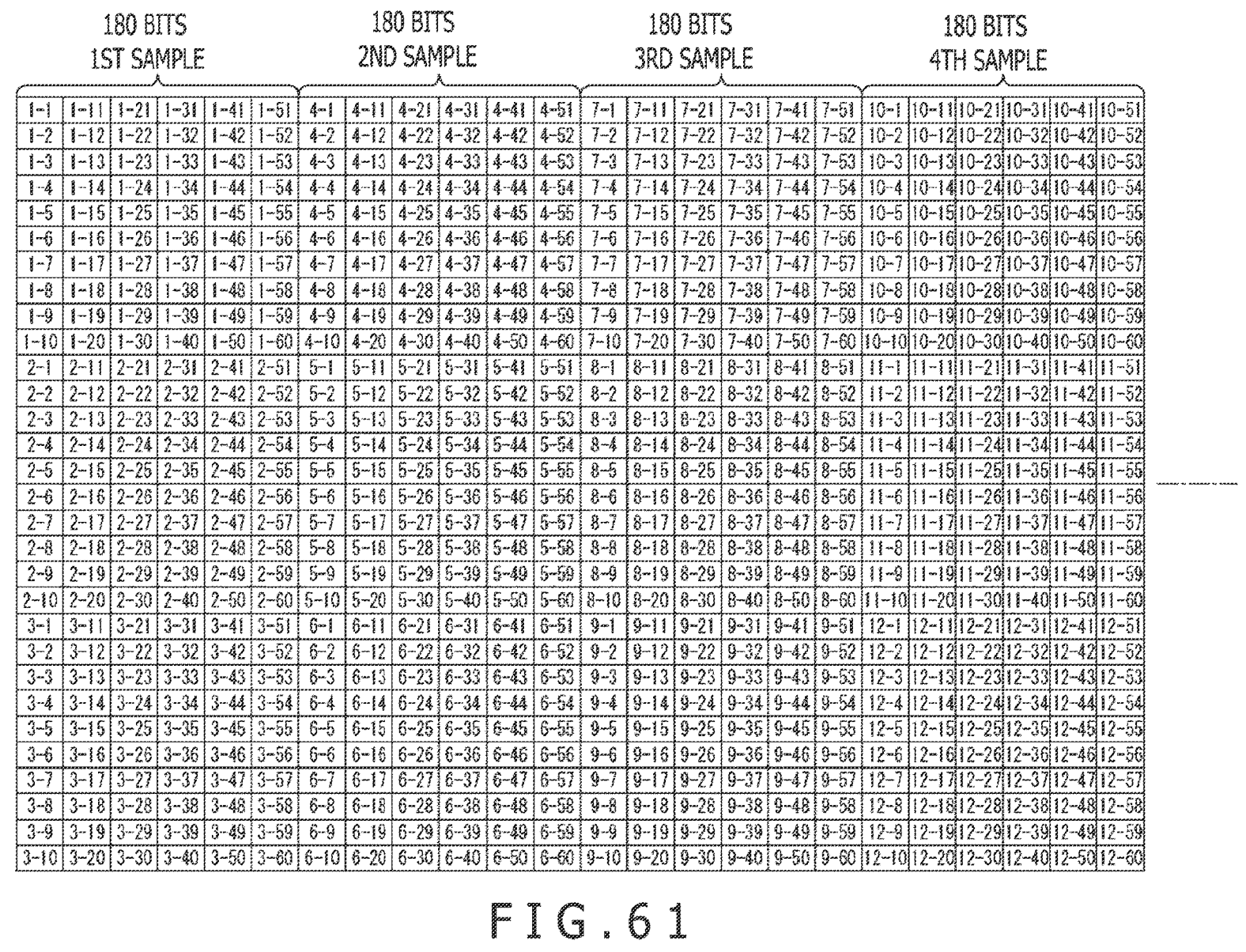

FIG. 61 is a diagram depicting an example of data blocks generated from a basic stream in the video signal sending process according to the seventh embodiment.

FIG. 69 is a diagram depicting an example of data blocks generated from a basic stream in the video signal sending process according to the eighth embodiment.

FIG. 70 is a diagram depicting an example of data blocks generated from a basic stream in the video signal sending process according to the eighth embodiment.

FIG. 72 is a diagram depicting a modification of data blocks generated from one line of HD-SDI.

FIG. 73 is a diagram depicting a modification of data blocks generated from one line of HD-SDI.

FIG. 74 is a diagram depicting a modification of data blocks generated from one line of HD-SDI.

DESCRIPTION OF EMBODIMENTS

Best modes (hereinafter referred to as "embodiments") for carrying out the present technology will be described below. It should be noted that the description will be given in the following order:

1. Examples of video signals transmitted according to the present technology;

2. Configurational example of a signal transmission system;

3. First embodiment (first example for transmitting 8K 48P-60P video signals);

4. Second embodiment (second example for transmitting 8K 48P-60P video signals);

5. Third embodiment (third example for transmitting 8K 48P-60P video signals);

6. Fourth embodiment (example for transmitting 8K 96P-120P video signals);

7. Fifth embodiment (fifth example for transmitting 4K 48P-60P RAW signals);

8. Sixth embodiment (example for transmitting 4K 96P-120P RAW signals);

9. Seventh embodiment (example for transmitting 8K 50P-60P video signals);

10. Eighth embodiment (example for transmitting 8K 100P-120P video signals); and 11. Modifications.

1. Examples of Video Signals Transmitted According to the Present Technology Prior to the description of embodiments of the present technology, examples of video signals transmitted according to the present technology will be described below.

According to the present technology, 8K video signals whose number of samples in horizontal directions is approximately 8000 samples and whose number of lines in vertical directions is approximately 4000 lines, such as those having an effective pixel area is represented by 7680 samples×4320 lines (UHDTV2) or 8192 samples×4320 lines, etc., for example, are transmitted. Furthermore, 4K video signals whose number of samples in horizontal directions is approximately 4000 samples and whose number of lines in vertical directions is approximately 2000 lines, such as those having an effective pixel area is represented by 3840 samples×2160 lines (UHDTV1) or 4096 samples×2160 lines, etc., for example, are transmitted.

It should be noted that, hereinafter, 8K video signals will also be referred to as 8K signals, and 4K video signals will also be referred to as 4K signals.

Figure 2:
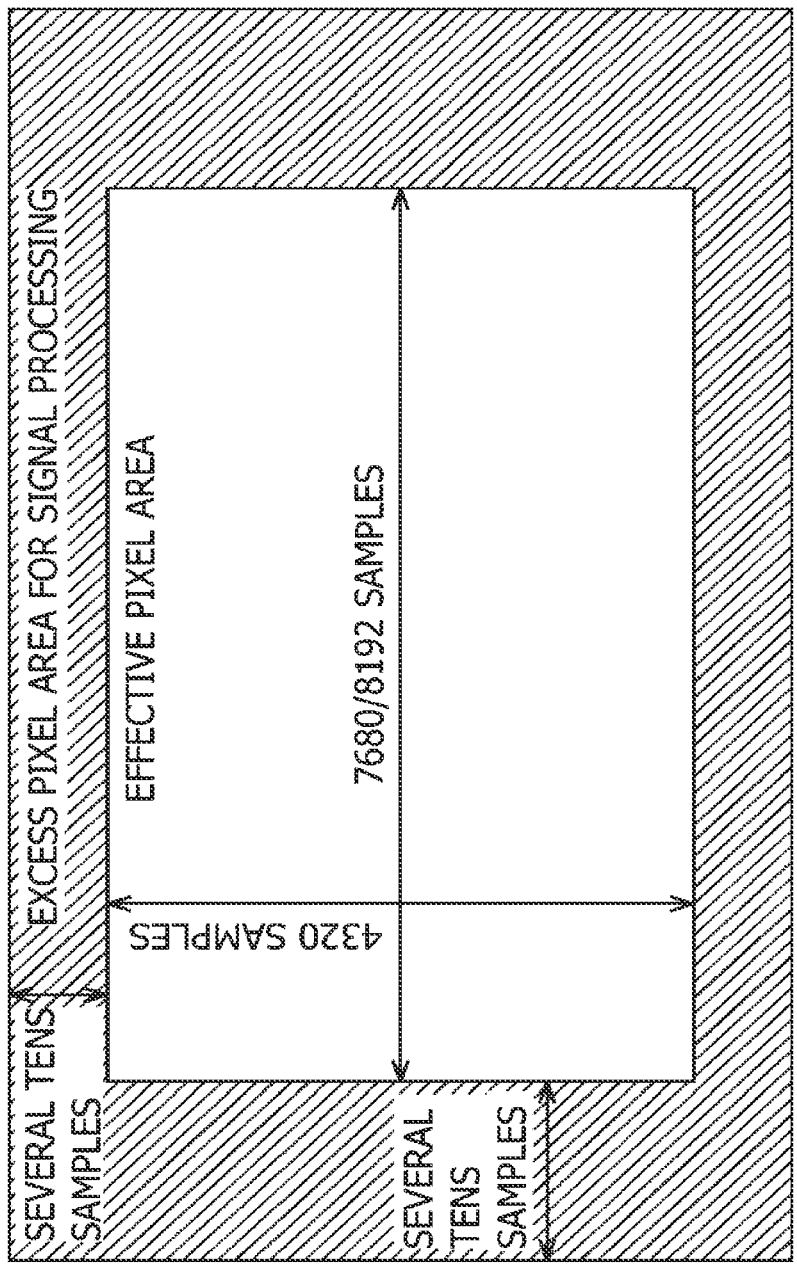
FIG. 2 is a diagram depicting a configurational example of the pixels of one frame of an 8K video signal.

FIG. 2 is a diagram depicting a configurational example of the pixels of one frame of an 8K signal. The video signal includes an extra pixel area for signal processing, which is made up of several to several tens samples in horizontal and vertical directions, around a central effective pixel area. The pixel samples of the extra pixel area for signal processing are used for correcting defects in the effective pixel area, etc. for example.

It should be noted that, hereinafter, extra pixels for signal processing will also be simply referred to as extra pixels, and the extra pixel area for signal processing will also be simply referred to as an extra pixel area.

FIG. 3 depicts an example of sample structures of an 8K signal or a 4K signal. There are three kinds, described below, of sample structures of an 8K signal or a 4K signal, for example. Moreover, signals with a prime "'" such as R', G', B' mean signals that have been processed by gamma correction or the like.

A in FIG. 3 represents an example of an R'G'B', Y'Cb'Cr' 4:4:4 system. In this system, all samples include RGB or YCbCr components.

B in FIG. 3 represents an example of a Y'Cb'Cr' 4:2:2 system. In this system, even-numbered samples include YCbCr components, and odd-numbered samples include a Y component.

C in FIG. 3 represents an example of a Y'Cb'Cr' 4:2:0 system. In this system, even-numbered samples on even-numbered lines include YCbCr components, and odd-numbered samples on even-numbered lines and all samples on odd-numbered lines include a Y component.

Furthermore, a format of a video signal will hereinafter be expressed as m×n/a-b/r:g:b/10 bits, 12 bits where m×n represents the number of samples (the number of pixels) in horizontal lines and the number of lines in vertical lines in the effective pixel area, a-b represents the number of frames per second (frame rate), and r:g:b represents a signal ratio in a predetermined signal transmission method that is involved. For example, if a primary color signal transmission method is involved, then r:g:b represents a ratio of red signal R: green signal G: blue signal B, and if a color difference signal transmission method is involved, then r:g:b represents a ratio of luminance signal Y: first color difference signal Cb: second color difference signal Cr. It should be noted that, hereafter, a format of a video signal may be abbreviated as an m×n/a-b signal or the like.

Furthermore, 50P, 59.94P and 60P that represent frame rates of progressive signals will hereinafter be abbreviated as "50P-60P," and 47.95P, 48P, 50P, 59.94P and 60P as "48P-60P." Moreover, 100P, 119.88P and 120P will be abbreviated as "100P-120P," and 95.9P, 96P, 100P, 119.88P and 120P as "96P-120P." In addition, 50I, 59.94I and 60I that represent frame rates of interlaced signals will be abbreviated as "50I-60I," and 47.95I, 48I, 50I, 59.94I and 60I as "48I-60I."

Furthermore, hereinafter, a data stream according to an HD-SDI format may be abbreviated as a data stream of HD-SDI or simply HD-SDI. Moreover, hereinafter, a data stream according to a 3G-SDI format may be abbreviated as a data stream of 3G-SDI or simply 3G-SDI.

2. Configurational Example of a Signal Transmission System

A configurational example of a signal transmission system 1 that is commonly used in first through eighth embodiments, to be described later, of the present technology will be described below with reference to FIG. 4.

The signal transmission system 1 is arranged to include n broadcasting cameras 11-1 through 11-*n* and a CCU (Camera Control Unit) 12. The broadcasting cameras 11-1 through 11-*n* are connected to the CCU 12 by respective optical fiber cables 13-1 through 13-*n*.

Incidentally, in case the broadcasting cameras 11-1 through 11-*n* do not need to be individually distinguished hereinbelow, they are simply referred to as a broadcasting camera 11. Furthermore, in case the optical fiber cables 13-1 through 13-*n* do not need to be individually distinguished hereinbelow, they are simply referred to as an optical fiber cable 13.

The broadcasting camera 11 is used as a signal sending apparatus to which a signal sending method that sends video signals through a 100-GbE device (e.g., an optical module or the like) is applied. Further, the CCU 12 is used as a signal receiving apparatus to which a signal receiving method that receives video signals through a 100-GbE device is applied. Moreover, the signal transmission system 1 that includes the broadcasting cameras 11 and the CCU 12 combined with each other is used as a signal transmission system for sending and receiving video signals with 100-GbE devices.

Each of the broadcasting cameras 11 sends a video signal obtained as a result of an image capturing process through the optical fiber cables 13 to the CCU 12.

The CCU 12 controls each of the broadcasting cameras 11, receives video signals from each of the broadcasting cameras 11, and sends video signals (return video) to each of the broadcasting cameras 11 for displaying video images being captured by the other broadcasting cameras 11.

3. First Embodiment

A first embodiment of the present technology will next be described with reference to FIGS. 5 through 24.

According to the first embodiment, 8K signals of 48P-60P are transmitted using a 100-GbE device. The 8K signals of 48P-60P include video signals of 7680×4320/50P-60P/4:4:4/10 bits, 12 bits, 7680×4320/50P-60P/4:2:2:/12 bits, 8192×4320/48P-60P/4:4:4/10 bits, 12 bits, and 8192×4320/48P-60P/4:2:2/12 bits.

Configurational Example of Broadcasting Camera 11a

Figure 5:
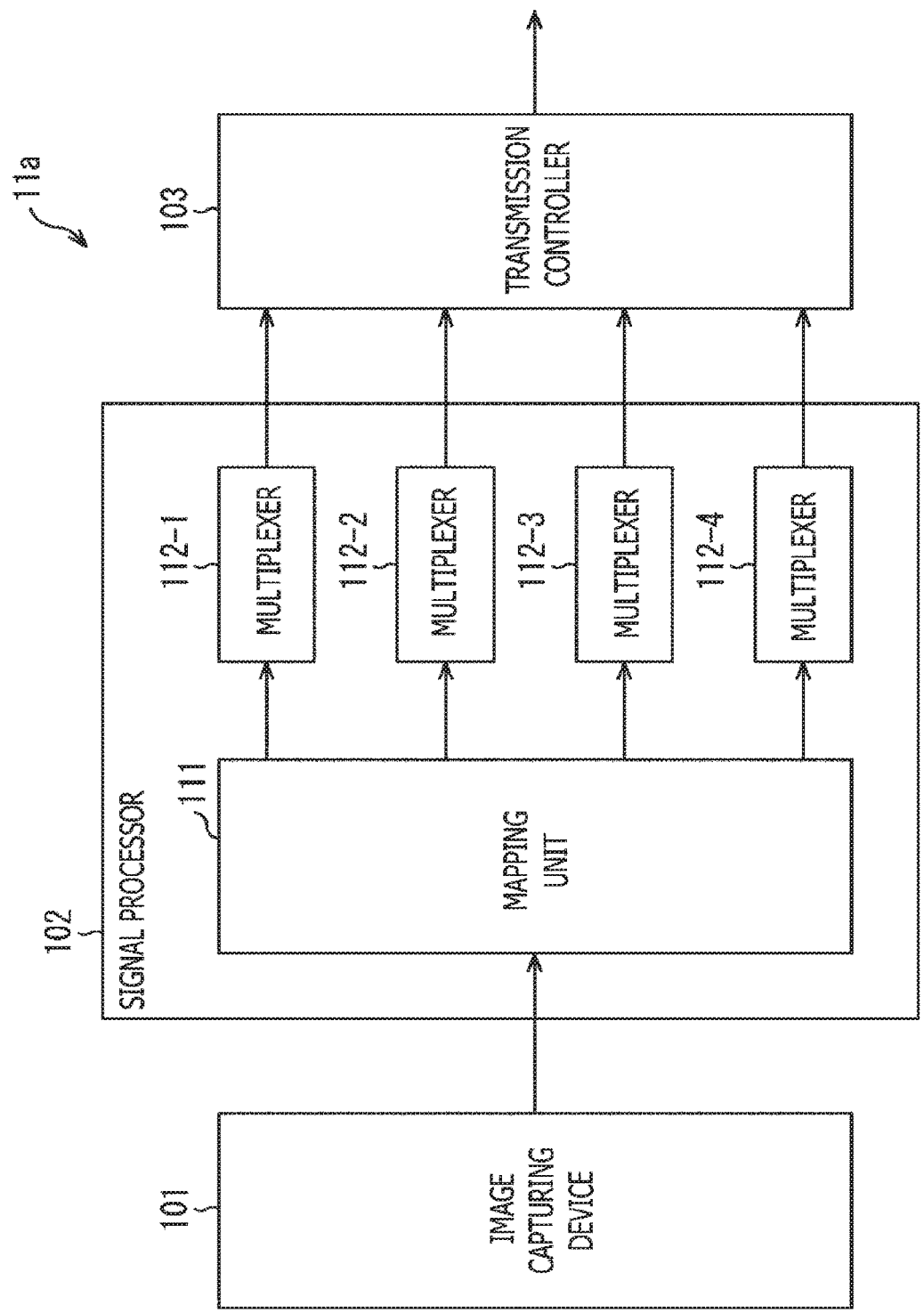
FIG. 5 is a block diagram depicting a configurational example of the functions of a broadcasting camera according to a first embodiment.

FIG. 5 is a block diagram depicting a configurational example of the functions of a broadcasting camera 11a as a form in which the broadcasting camera 11 according to the first embodiment is reduced to practice. The broadcasting camera 11a is arranged to include an image capturing device 101, a signal processor 102, and a transmission controller 103.

The image capturing device 101 includes a CMOS image sensor, a CCD image sensor, or the like, for example. The image capturing device 101 supplies a mapping unit 111 of the signal processor 102 with a video signal obtained as a result of an image capturing process. The video signal includes a video signal of 7680×4320/50P-60P/4:4:4/10 bits, 12 bits, 7680×4320/50P-60P/4:2:2:/12 bits, 8192×4320/48P-60P/4:4:4/10 bits, 12 bits, or 8192×4320/48P-60P/4:2:2/12 bits, for example.

The signal processor 102 multiplexes the video signal supplied from the image capturing device 101 into a data stream that can be transmitted through the 100-GbE device, and supplies the generated data stream to the transmission controller 103. The signal processor 102 is arranged to include the mapping unit 111 and multiplexers 112-1 through 112-4.

The mapping unit 111 generates HD-SDI of 64 channels onto which the video signal supplied from the image capturing device 101 has been mapped, as described later. Then, the mapping unit 111 supplies the HD-SDI of channels 1 through 16 to the multiplexer 112-1 and supplies the HD-SDI of channels 17 through 32 to the multiplexer 112-2. Moreover, the mapping unit 111 supplies the HD-SDI of channels 33 through 48 to the multiplexer 112-3 and supplies the HD-SDI of channels 49 through 64 to the multiplexer 112-4.

The multiplexers 112-1 through 112-4 perform channel coding (e.g., signal processing such as scrambling or 8B/10B conversion, etc.) on the HD-SDI of 16 channels each supplied from the mapping unit 111 thereto, thereby multiplexing them. In this manner, data streams (hereinafter referred to as data streams for transmission) whose bit rates that match the provisions of electric interface standards CAUI-4 or OIF (Optical Internetworking Forum) CEI-28G are in the range from 25 to 28.3 Gbps are generated. The multiplexers 112-1 through 112-4 supply the generated respective data streams for transmission to the transmission controller 103.

Incidentally, in case the multiplexers 112-1 through 112-4 do not need to be individually distinguished hereinbelow, they are simply referred to as a multiplexer 112.

The transmission controller 103 controls the transmission of the data streams for data transmission to a CCU 12a.

Configurational Example of Multiplexer 112

Figure 6:
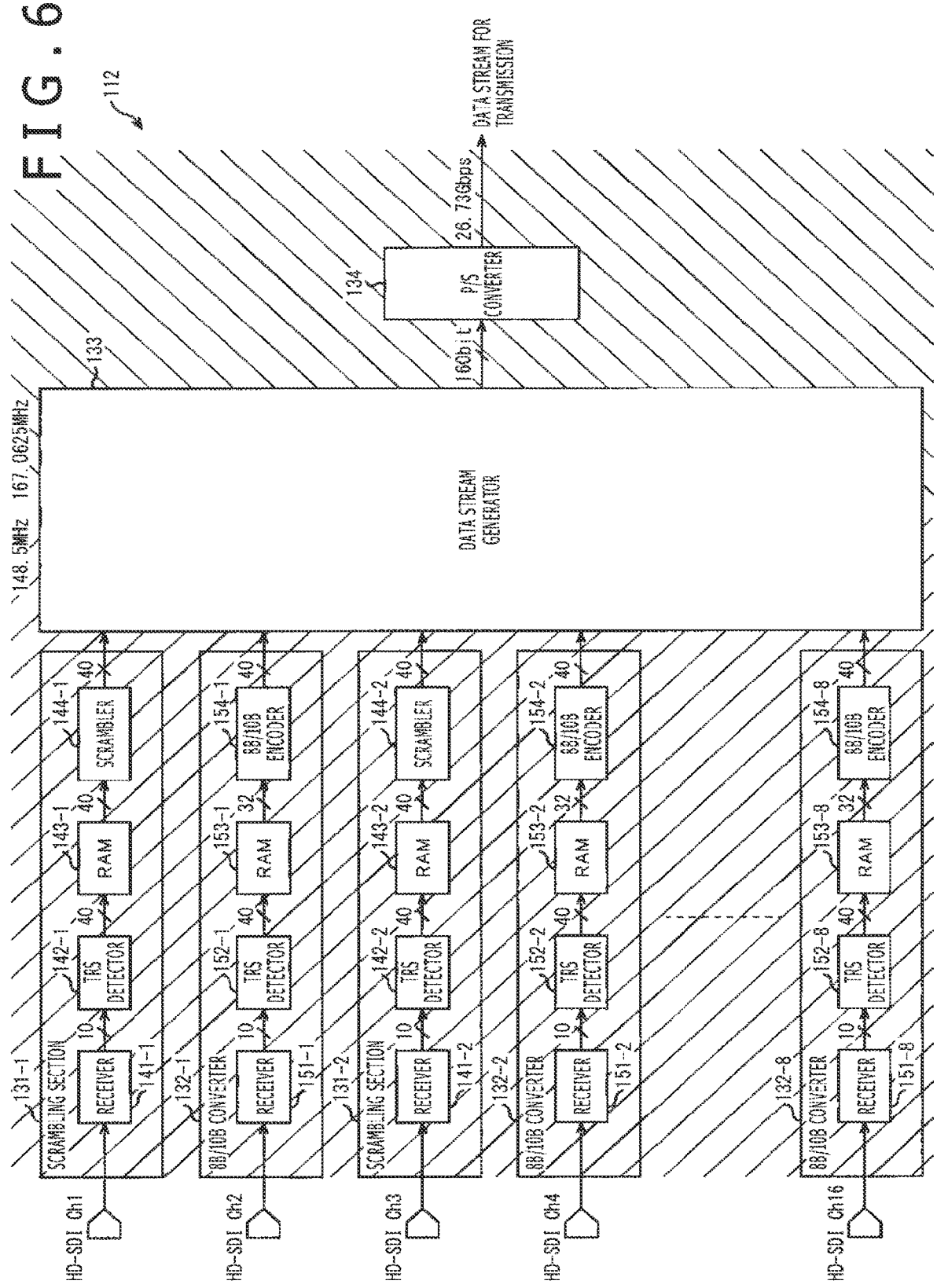
FIG. 6 is a block diagram depicting a configurational example of the functions of a multiplexer of the broadcasting camera according to the first embodiment.

FIG. 6 is a block diagram depicting a configurational example of the functions of the multiplexer 112.

The multiplexer 112 is arranged to include scrambling units 131-1 through 131-8, 8B/10B converters 132-1 through 132-8, a data stream generator 133, and a parallel/serial (P/S) converter 134. Each of the scrambling units 131-$i$ ($i$=1 through 8) includes a receiver 141-$i$, a TRS detector 142-$i$, a RAM 143-$i$, and a scrambler 144-$i$. Each of the 8B/10B converters 132-$i$ ($i$=1 through 8) includes a receiver 151-$i$, a TRS detector 152-$i$, a RAM 153-$i$, and an 8B/10B encoder 154-$i$.

Of the HD-SDI of 16 channels that are input to the multiplexer 112, the HD-SDI of odd-numbered channels are input to the respective scrambling units 131-1 through 131-8, and the HD-SDI of even-numbered channels are input to the respective 8B/10B converters 132-1 through 132-8.

Then, the receiver 141-1 of the scrambling unit 131-1 S/P-converts and descrambles the input HD-SDI, and supplies the processed HD-SDI to the TRS detector 142-1. Further, the receiver 141-1 also reproduces a clock signal superposed on the HD-SDI, and supplies the reproduced clock signal to various parts of the scrambling unit 131-1.

The TRS detector 142-1 detects SAV (Start of Active Video) and EAV (End of Active Video) included in the HD-SDI and acquires word synchronization of the HD-SDI. The TRS detector 142-1 then extracts data in every predetermined bits (e.g., 40 bits) successively from the beginning of the SAV of the HD-SDI, and has them stored in the RAM 143-1.

The scrambler 144-1 reads data block by block of predetermined bits (e.g., 40 bits) from the RAM 143-1, scrambles the read data, and inverts the polarity of the data blocks of part of the scrambled data. The scrambler 144-1 then supplies the scrambled data blocks to the data stream generator 133.

The scrambling units 131-2 through 131-8 also perform the similar process as the scrambling unit 131-1 on the HD-SDI input respectively thereto.

Further, as with the receiver 141-1, the receiver 151-1 of the 8B/10B converter 132-1 S/P-converts and descrambles the input HD-SDI, and supplies the processed HD-SDI to the TRS detector 152-1. Further, the receiver 151-1 also reproduces a clock signal superposed on the HD-SDI, and supplies the reproduced clock signal to various parts of the 8B/10B converter 132-1.

The TRS detector 152-1 detects SAV and EAV included in the HD-SDI to acquire word synchronization of the HD-SDI. The TRS detector 152-1 then extracts data every predetermined bits (e.g., 40 bits) successively from the beginning of the SAV of the HD-SDI, and has them stored in the RAM 153-1.

The 8B/10B encoder 154-1 reads data block by block of predetermined bits (e.g., 32 bits) from the RAM 153-1, and 8B/10B-converts the read data. The 8B/10B encoder 154-1 supplies the 8B/10B-converted data blocks to the data stream generator 133.

The 8B/10B converters 132-2 through 132-8 also perform the similar process as the 8B/10B converter 132-1 on the HD-SDIs input thereto.

Incidentally, in case the scrambling units 131-1 through 131-8 and the 8B/10B converters 132-1 through 132-8 do not need to be individually distinguished hereinbelow, they are simply referred to as a scrambling unit 131 and an 8B/10B converter 132, respectively. Furthermore, in case the receivers 141-1 through 141-8, the TRS detectors 142-1 through 142-8, the RAMs 143-1 through 143-8, and the scramblers 144-1 through 144-8 do not need to be individually distinguished hereinbelow, they are simply referred to as a receiver 141, a TRS detector 142, a RAM 143, and a scrambler 144, respectively. In addition, in case the receivers 151-1 through 151-8, the TRS detectors 152-1 through 152-8, the RAMs 153-1 through 153-8, and the 8B/10B encoders 154-1 through 154-8 do not need to be individually distinguished hereinbelow, they are simply referred to as a receiver 151, a TRS detector 152, a RAM 153, and an 8B/10B encoder 154, respectively.

The data stream generator 133 generates parallel data streams for transmission, which have a predetermined word length, by multiplexing the data blocks supplied from the scramblers 144 and the 8B/10B encoders 154 in a predetermined order. The data stream generator 133 supplies the generated data streams for transmission to the P/S converter 134.

The P/S converter 134 performs parallel/serial conversion (P/S conversion) on the data stream for transmission supplied from the data stream generator 133, and supplies the converted serial data stream for transmission to the transmission controller 103.

Incidentally, the scrambling unit 131 and the 8B/10B converter 132 carry out their processing operation in synchronism with a clock signal of 148.5 MHz. On the other hand, the data stream generator 133 and the P/S converter 134 carry out their processing operation in synchronism with a clock signal of 167.0625 MHz.

Configurational Example of Data Stream Generator 133

Figure 7:
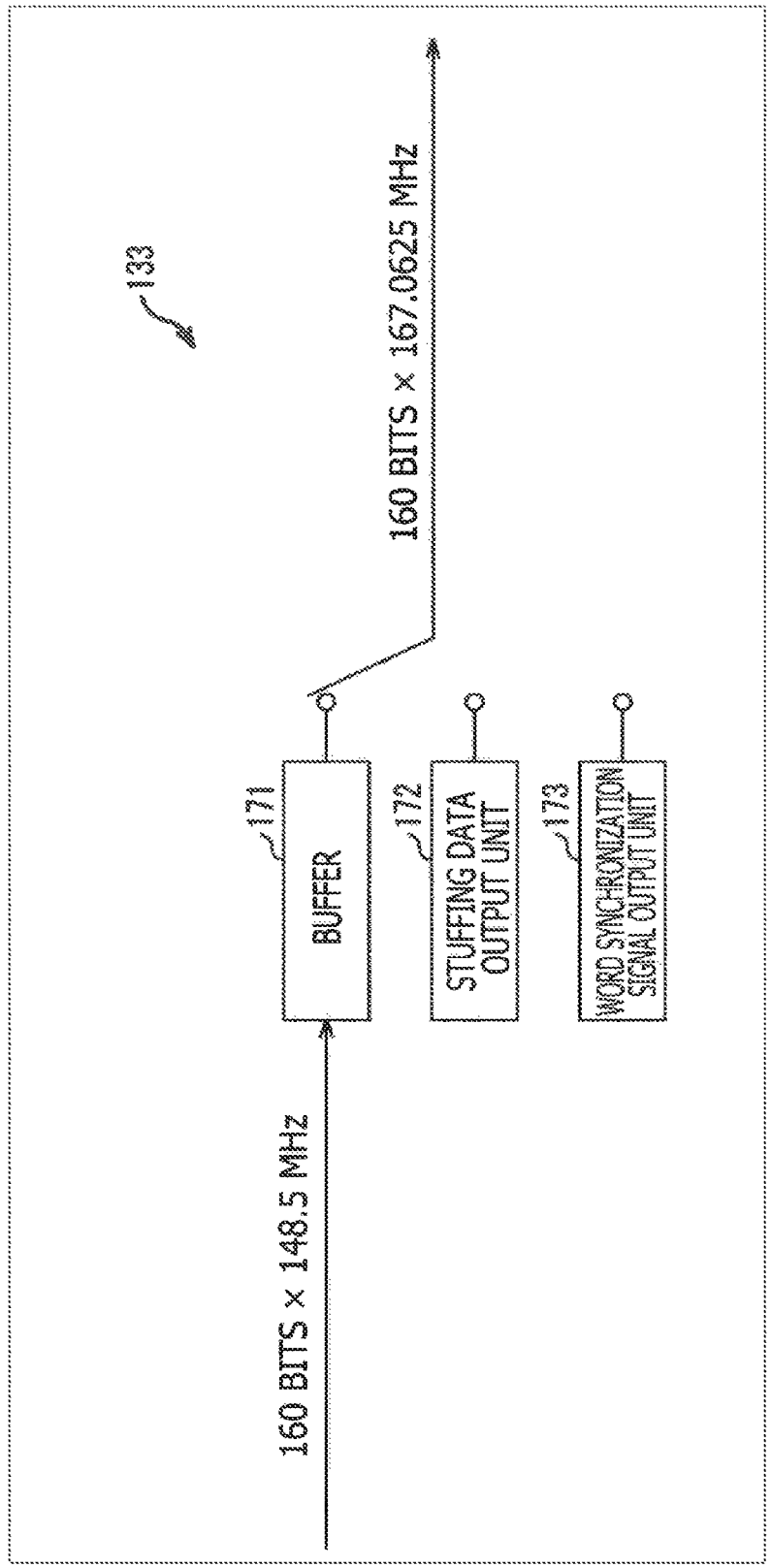
FIG. 7 is a block diagram depicting a configurational example of the functions of a data stream generator.

FIG. 7 is a block diagram depicting a configurational example of the functions of the data stream generator 133.

The data stream generator 133 is arranged to include a buffer 171, a stuffing data output unit 172, and a word synchronization signal output unit 173.

The buffer 171 generates parallel data having a predetermined word length from the data blocks supplied from the scrambler 144 and the 8B/10B encoder 154, and outputs the generated parallel data to the P/S converter 134.

The stuffing data output unit 172 generates stuffing data for adjusting the bit rate of the data stream for transmission, and outputs the generated stuffing data to the P/S converter 134.

The word synchronization signal output unit 173 generates a word synchronization signal used to synchronize the data stream for transmission, and outputs the generated word synchronization signal to the P/S converter 134.

Incidentally, as described later, (the buffer 171 of) the data stream generator 133 is supplied with a data stream that substantially has a bit rate of 160 bits×148.5 MHz. The data stream generator 133 then converts the supplied data stream into a data stream having a bit rate of 160 bits×167.0625 MHz.

Configurational Example of CCU 12a

Figure 8:
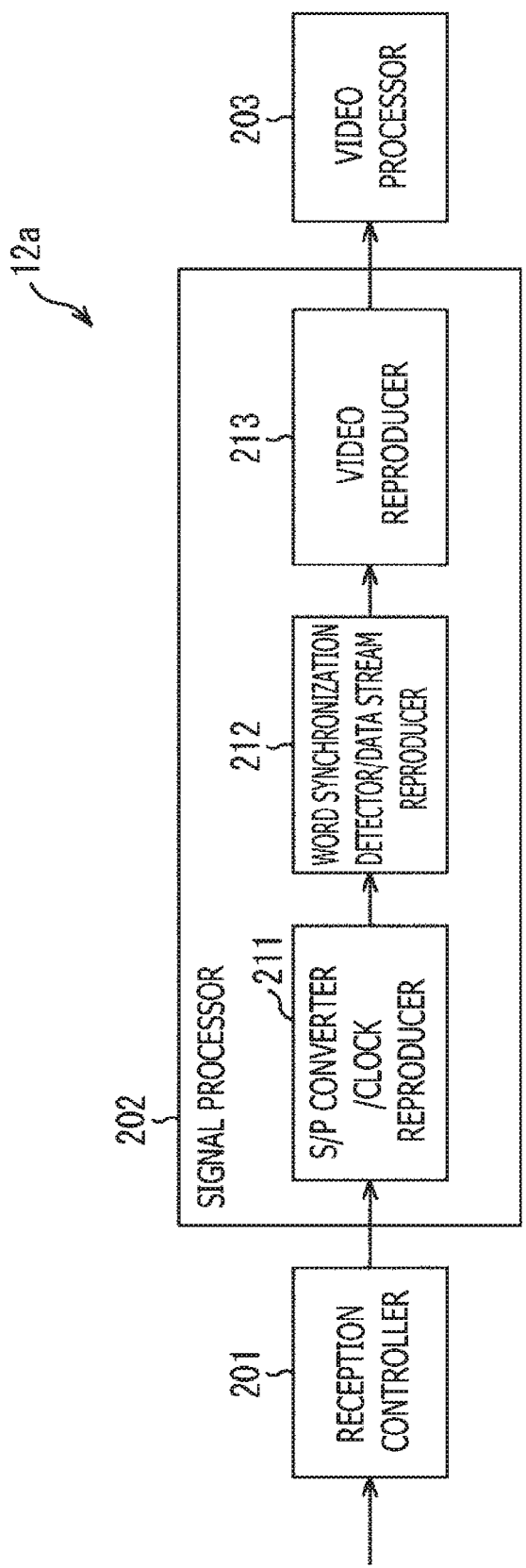
FIG. 8 is a block diagram depicting a configurational example of the functions of a CCU according to the first embodiment.

FIG. 8 is a block diagram depicting a configurational example of the functions of the CCU 12a as a form in which the CCU 12 according to the first embodiment is reduced to practice.

The CCU 12a is arranged to include a reception controller 201, a signal processor 202, and a video processor 203. Further, the signal processor 202 is arranged to include an S/P converter/clock reproducer 211, a word synchronization detector/data stream reproducer 212, and a video reproducer 213.

The reception controller 201 controls the reception of the data stream for transmission from each broadcasting camera 11. The reception controller 201 supplies the received data stream for transmission to the S/P converter/clock reproducer 211 of the signal processor 202.

The S/P converter/clock reproducer 211 performs serial/parallel conversion (S/P conversion) on the data stream for transmission and supplies the converted data stream for transmission to the word synchronization detector/data stream reproducer 212. Furthermore, the S/P converter/clock reproducer 211 reproduces a clock signal superposed on the data stream for transmission and supplies the reproduced clock signal to various parts of the signal processor 202.

The word synchronization detector/data stream reproducer 212 detects a word synchronization signal from the S/P-converted data stream for transmission and acquires word synchronization of the data stream for transmission. Moreover, the word synchronization detector/data stream reproducer 212 reproduces data streams of HD-SDI of 64 channels from the data stream for transmission according to a process that is a reversal of the process of the multiplexer 112 of the broadcasting camera 11a, and supplies the reproduced data streams of HD-SDI to the video reproducer 213.

The video reproducer 213 reproduces the original 8K signal from the HD-SDI of 64 channels according to a process that is a reversal of the process of the mapping unit 111 of the broadcasting camera 11a, and supplies the reproduced 8K signal to the video processor 203.

The video processor 203 includes devices for performing various processing operations on video signals and processes the video signal (8K signal) supplied from the video reproducer 213. For example, the video processor 203 includes a display for displaying video images based on video signals, and a storage device for storing video signals, etc.

Specific Configurational Example Between the Transmission Controller 103 of the Broadcasting Camera 11 and the Reception Controller 201 of the CCU 12

Figure 9:
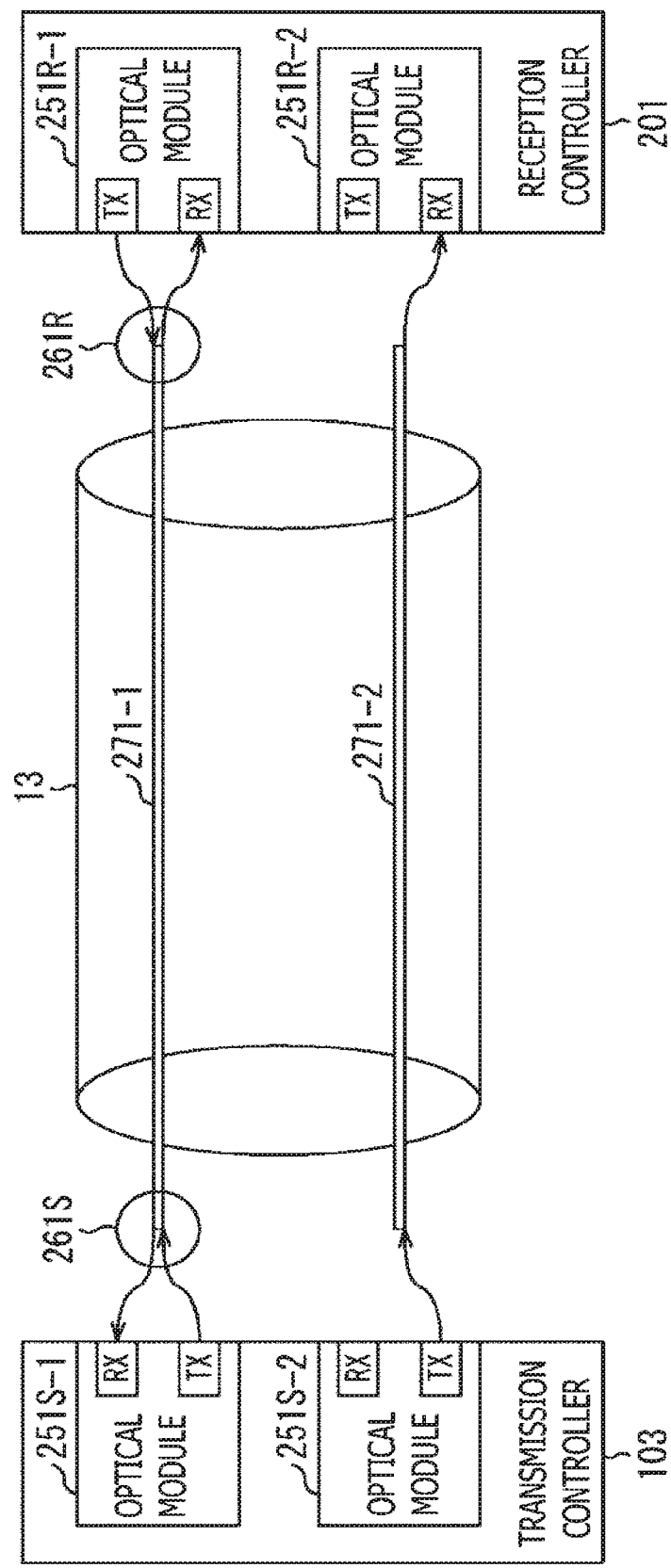
FIG. 9 is a diagram depicting a specific configurational example between a transmission controller of the broadcasting camera and a reception controller of the CCU.

FIG. 9 is a diagram depicting a specific configurational example between the transmission controller 103 of the broadcasting camera 11 and the reception controller 201 of the CCU 12.

The transmission controller 103 is provided with optical modules 251S-1 and 251S-2. Further, the reception controller 201 is provided with optical modules 251R-1 and 251R-2. Optical modules according to the specifications of CFP-2 or CFP-4, for example, are used as the optical modules 251S-1 through 251R-2. Further, an optical cable according to SMPTE 311, for example, is used as the optical fiber cable 13. Two optical fibers 271-1 and 271-2 are provided in the optical fiber cable 13.

Now, an optical transmission terminal (TX) of the optical module 251S-1 and an optical reception terminal (RX) of the optical module 251R-1 are connected to each other by an optical circulator 261S, the optical fiber 271-1, and an optical circulator 261R. An optical reception terminal (RX) of the optical module 251S-1 and an optical transmission terminal (TX) of the optical module 251R-1 are connected to each other by the optical circulator 261S, the optical fiber 271-1, and the optical circulator 261R. An optical transmission terminal (TX) of the optical module 251S-2 and an optical reception terminal (RX) of the optical module 251R-2 are connected to each other by the optical fiber 271-2.

The optical fiber 271-1 and the optical fiber 271-2 are capable of multiplexing and transmitting four signals having wavelengths in a 1.3 µm band according to the provision of IEEE802.3ba-2010. In other words, the optical fiber 271-1 and the optical fiber 271-2 are capable of multiplexing and transmitting video signals in four lanes at the same time.

Furthermore, the optical circulators 261S and 261R connected to the respective ends of the optical fiber 271-1 make it possible to transmit bidirectional signals from the broadcasting camera 11 to the CCU 12 and from the CCU 12 to the broadcasting camera 11 through the single optical fiber 271-1. This makes it possible for the broadcasting camera 11, for example, to optically transmit a large volume of video signals by operating while locking on a return signal from the CCU 12.

Incidentally, since the volume of the return signal transmitted from the CCU 12 is generally small, only the optical fiber 271-1 is sufficient as the transmission channel from the CCU 12 to the broadcasting camera 11. Therefore, the optical fiber 271-2 is not connected to optical circulators, but is used only for the transmission of signals from the broadcasting camera 11 to the CCU 12.

Video Signal Sending Process According to the First Embodiment

Next, a video signal sending process that is carried out by the broadcasting camera 11a in the first embodiment will be described with reference to a flowchart depicted in FIG. 10.

In step S1, the mapping unit 111 of the signal processor 102 maps a video signal onto data streams of HD-SDI. Specifically, the mapping unit 111 maps an 8K signal onto HD-SDI of 64 channels. A specific example of a process of mapping an 8K signal onto HD-SDI of 64 channels will hereinafter be described.

Figure 4:
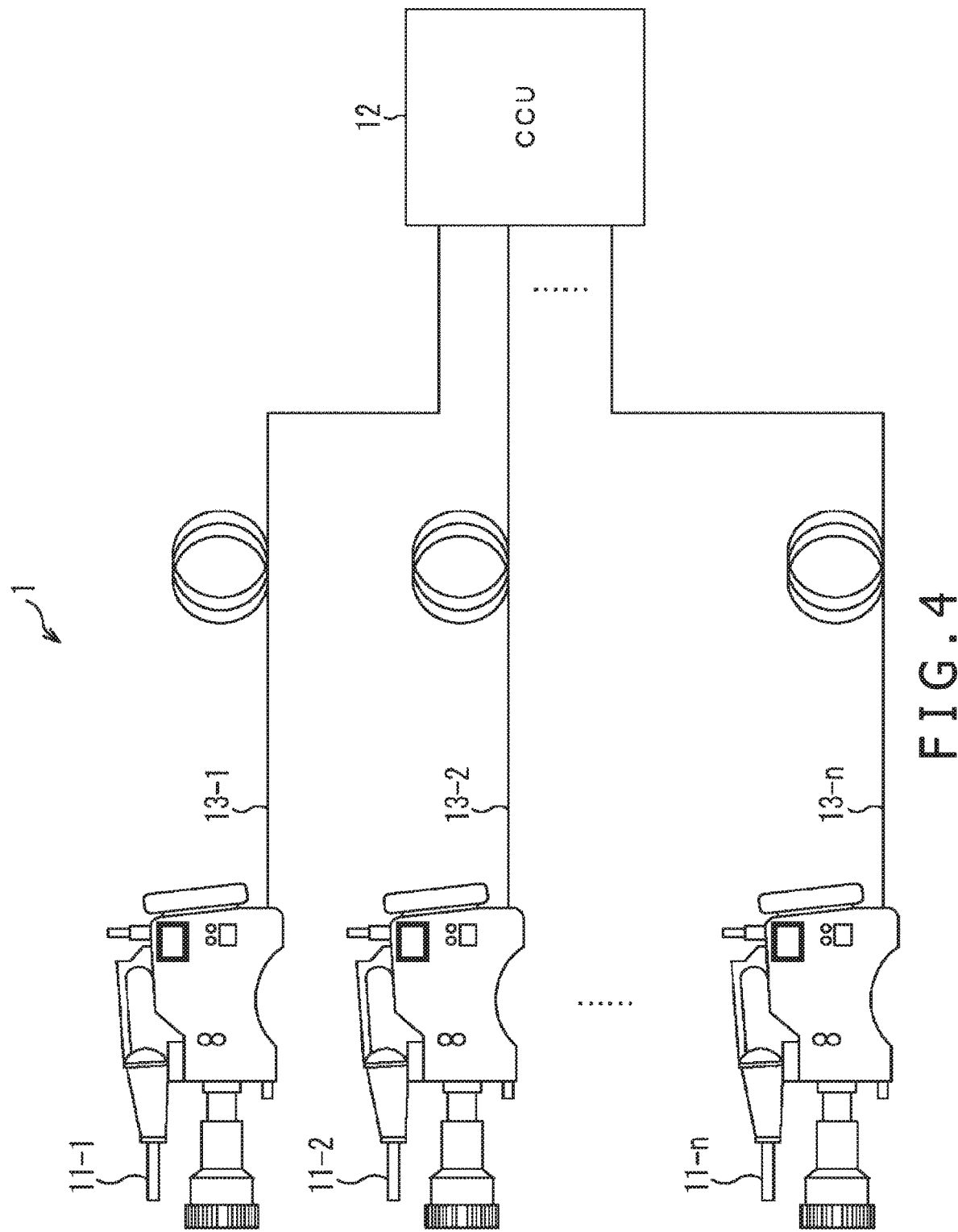
FIG. 4 is a view depicting an overall configuration of a signal transmission system according to an embodiment of the present technology.
Figure 11:
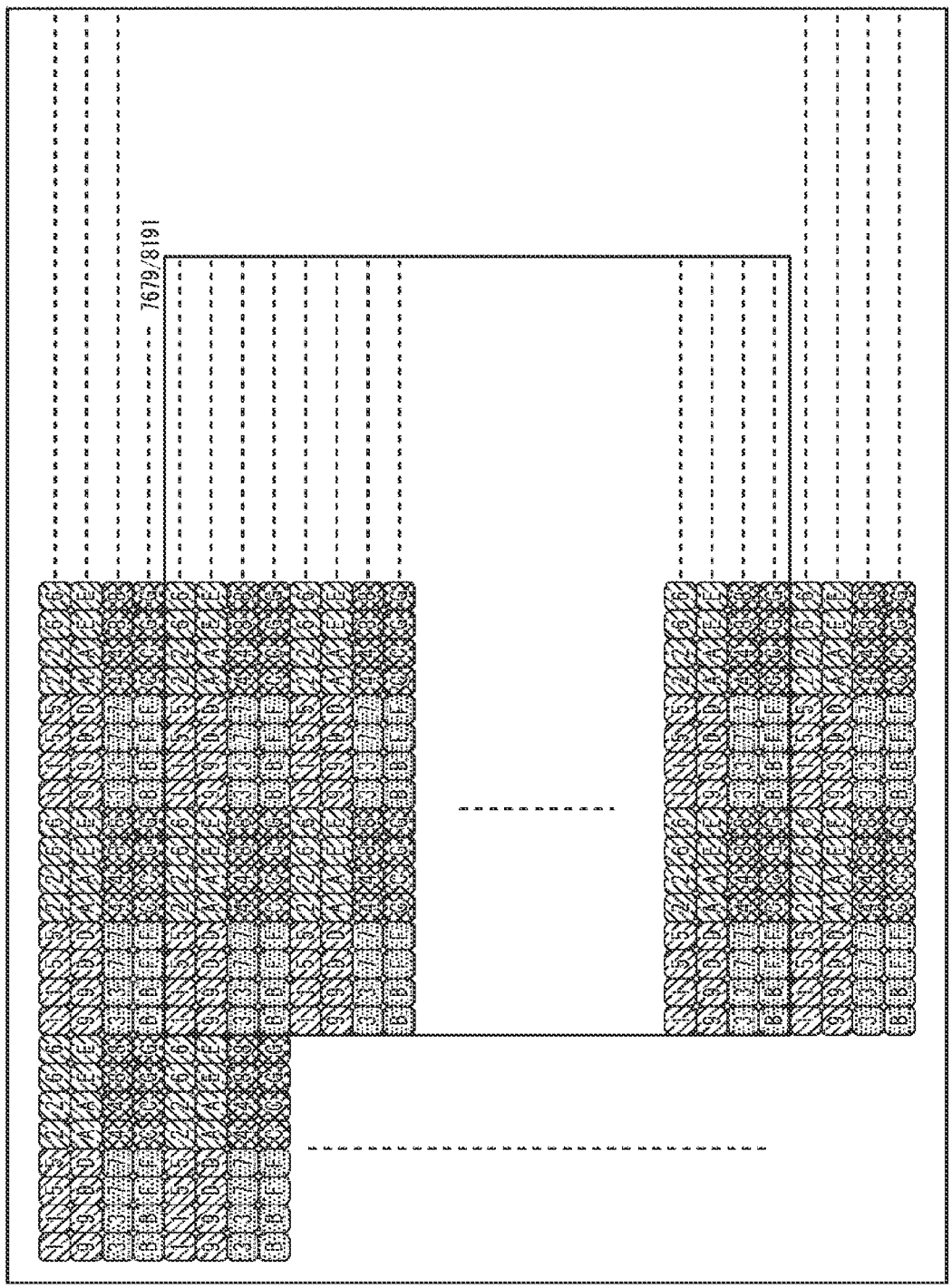
FIG. 11 is a diagram illustrative of a process of mapping an 8K video signal onto a 4K video signal.
Figure 12:
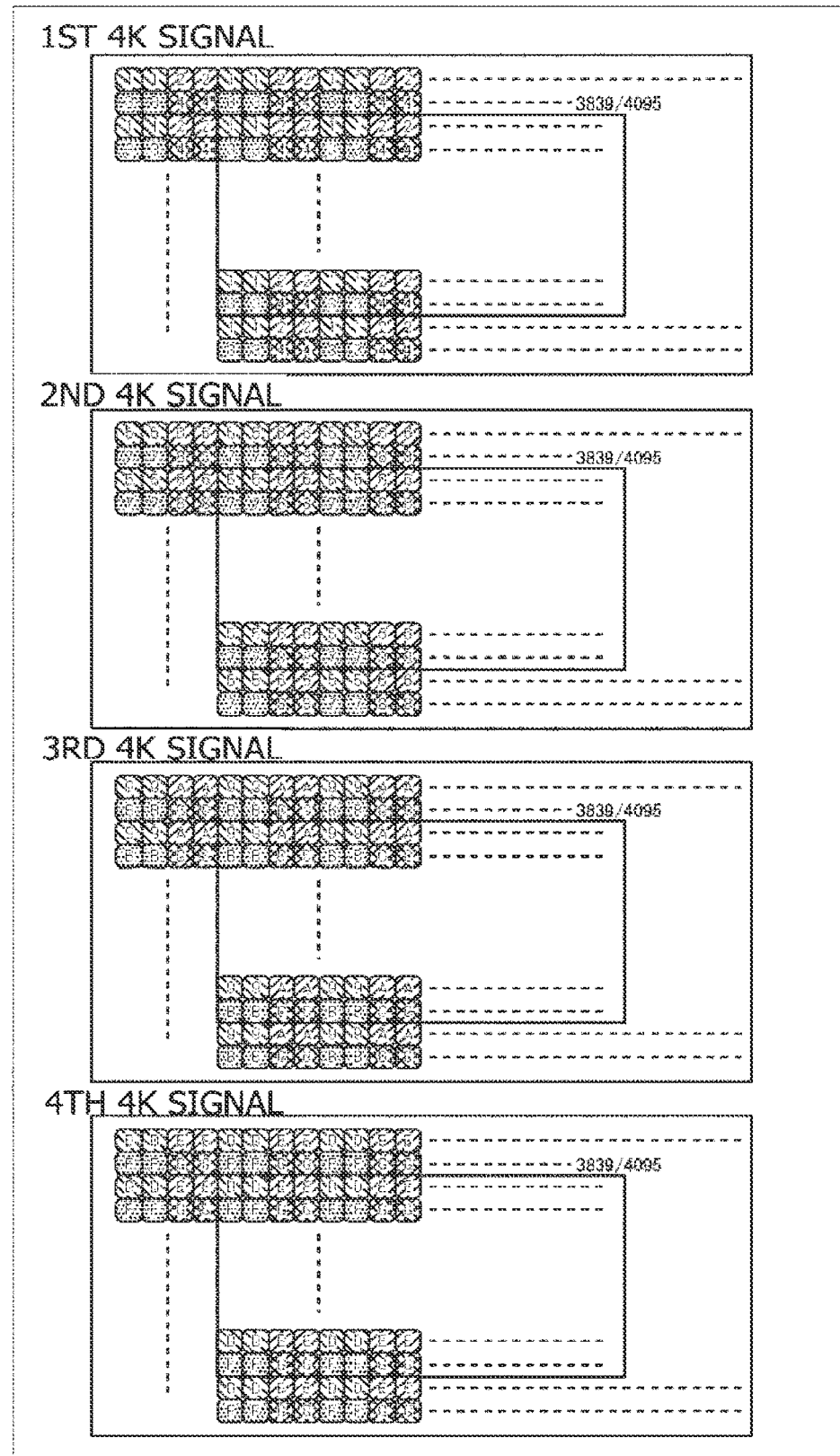
FIG. 12 is a diagram illustrative of the process of mapping an 8K video signal onto a 4K video signal

First, the mapping unit 111 maps pixel samples of an 8K signal onto first through fourth 4K signals according to the provisions of FIG. 4, etc. of SMPTE 2036-3. Specifically, as depicted in FIGS. 11 and 12, the mapping unit 111 decimates every other pair of two adjacent pixel samples on each of every other line from the 8K signal including in the extra pixel area, and maps the extracted pixel samples onto the first through fourth 4K signals.

Incidentally, the sample number and the line number of the effective pixel areas of an 8K signal and a 4K signal shall start from 0. Therefore, the effective pixel area of an 8K signal contains a total of 4320 lines from line 0 to line 4319, each including a total of 7680 samples from sample 0 to sample 7679 or a total of 8192 samples from sample 0 to sample 8191. Likewise, the effective pixel area of a 4K signal contains a total of 2160 lines from line 0 to line 2159, each including a total of 3840 samples from sample 0 to sample 3839 or a total of 4096 samples from sample 0 to sample 4095.

Furthermore, the 0th line, the second line, the fourth line, . . . of an 8K signal and a 4K signal will hereinafter be referred to as even-numbered lines, and the first line, the third line, the fifth line, . . . as odd-numbered lines.

Now, if the effective pixel area of the 8K signal has 7680 samples thereacross, for example, then the 4jth sample and the (4j+1)th sample (j=0 through 1919) on the 2ith line (i=0 through 2159) which is an even-numbered line in the effective pixel area of the 8K signal are mapped onto the 2jth sample and the (2j+1)th sample on the ith line in the effective pixel area of the first 4K signal. Consequently, the effective pixel area of the first 4K signal represents a video signal generated by decimating the pixel samples of the 4jth sample and the (4j+1)th sample on the even-numbered lines in the effective pixel area of the 8K signal and arranging the decimated pixel samples in the original order.

The (4j+2)th sample and the (4j+3)th sample (j=0 through 1919) on the 2ith line (i=0 through 2159) which is an even-numbered line in the effective pixel area of the 8K signal are mapped onto the 2jth sample and the (2j+1)th sample on the ith line in the effective pixel area of the second 4K signal. Consequently, the effective pixel area of the second 4K signal represents a video signal generated by decimating the pixel samples of the (4j+2)th sample and the (4j+3)th sample on the even-numbered lines in the effective pixel area of the 8K signal and arranging the decimated pixel samples in the original order.

The 4jth sample and the (4j+1)th sample (j=0 through 1919) on the (2i+1)th line (i=0 through 2159) which is an odd-numbered line in the effective pixel area of the 8K signal are mapped onto the 2jth sample and the (2j+1)th sample on the ith line in the effective pixel area of the third 4K signal. Consequently, the effective pixel area of the third 4K signal represents a video signal generated by decimating the pixel samples of the 4jth sample and the (4j+1)th sample on the odd-numbered lines in the effective pixel area of the 8K signal and arranging the decimated pixel samples in the original order.

The (4j+2)th sample and the (4j+3)th sample (j=0 through 1919) on the (2i+1)th line (i=0 through 2159) which is an odd-numbered line in the effective pixel area of the 8K signal are mapped onto the 2jth sample and the (2j+1)th sample on the ith line in the effective pixel area of the fourth 4K signal. Consequently, the effective pixel area of the fourth 4K signal represents a video signal generated by decimating the pixel samples of the (4j+2)th sample and the (4j+3)th sample on the odd-numbered lines in the effective pixel area of the 8K signal and arranging the decimated pixel samples in the original order.

Moreover, if the effective pixel area of the 8K signal has 8192 samples thereacross, for example, then the pixel samples in the effective pixel area of the 8K signal are mapped onto the first through fourth 4K signal by the similar process.

In addition, the extra pixel area of the 8K signal is also mapped onto the extra pixel areas of the first through fourth 4K signal in the similar process as with the effective pixel area thereof. Consequently, extra pixel areas for signal processing, each of which is made up of several to several tens samples in horizontal and vertical pixel directions, are provided around the effective pixel areas of the first through fourth 4K signal, as in the case with the 8K signal.

Figure 13:
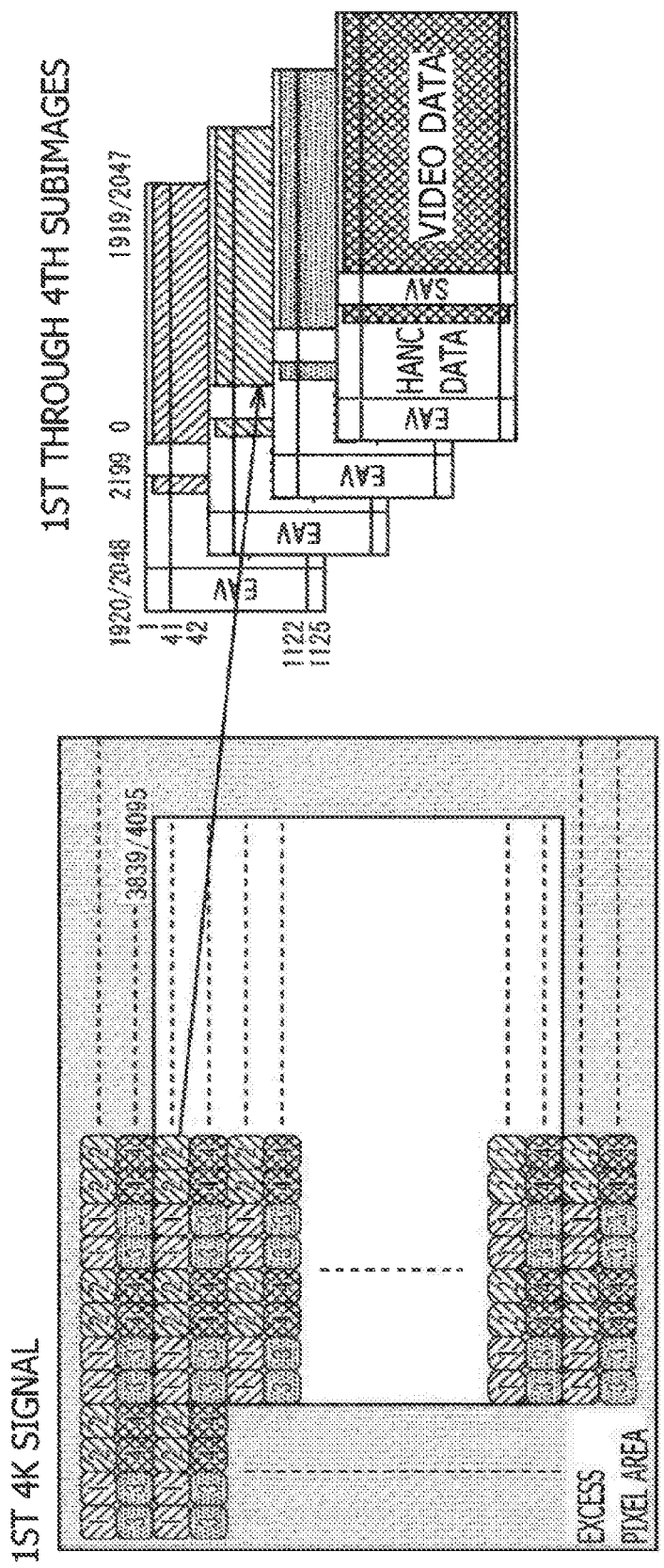
FIG. 13 is a diagram illustrative of a first process of mapping a 4K video signal onto subimages.

Then, the mapping unit 111 maps the first through fourth 4K signals onto first through fourth subimages, respectively. For example, as depicted in FIG. 13, the mapping unit 111 decimates the first 4K signal by way of two-sample interleave to generate a four-channel 2K signal according to the process regulated in FIG. 1, etc. of SMPTE 2036-3. Stated otherwise, the mapping unit 111 decimates every other pair of two adjacent pixel samples on each line at the intervals of two lines from the pixel samples of the first 4K signal, and maps the extracted pixel samples onto the first through fourth subimages.

If the effective pixel area of the first 4K signal has 3840 samples thereacross, for example, then pixel samples of the 4jth sample and the (4j+1)th sample (j=0 through 959) on the 2ith line (i=0 through 1079) in the effective pixel area of the first 4K signal on the first through fourth subimages are mapped onto the jth sample and the (j+1)th sample on the (i+42)th line in the video data area of the first subimage.

Pixel samples of the (4j+2)th sample and the (4j+3)th sample (j=0 through 959) on the 2ith line (i=0 through 1079) in the effective pixel area of the first 4K signal are mapped onto the jth sample and the (j+1)th sample on the (i+42)th line in the video data area of the second subimage.

Pixel samples of the 4jth sample and the (4j+1)th sample (j=0 through 959) on the (2i+1)th line (i=0 through 1079) in the effective pixel area of the first 4K signal are mapped onto the jth sample and the (j+1)th sample on the (i+42)th line in the video data area of the third subimage.

Pixel samples of the (4j+2)th sample and the (4j+3)th sample (j=0 through 959) on the (2i+1)th line (i=0 through 1079) in the effective pixel area of the first 4K signal are mapped onto the jth sample and the (j+1)th sample on the (i+42)th line in the video data area of the fourth subimage.

Furthermore, an EAV area is placed in an area of a predetermined number of samples from the 1920th sample in a horizontal direction of the first through fourth subimages. In the case of a 60P signal, for example, a HANC data area (hereinafter also referred to as a horizontal auxiliary data area or horizontal blanking period) is placed in an area up to the 2199th sample subsequent to the EAV area in the horizontal direction of the first through fourth subimages. An SAV area is placed in an area of a predetermined number of samples from the 2196th samples in the horizontal direction of the first through fourth subimages.

Then, as with the pixel samples in the effective pixel area, the pixel samples in the extra pixel area of the first 4K signal are mapped onto the first through fourth subimages. At this time, of the extra pixel area of the first 4K signal, the pixel samples horizontally in the range (in the range from the 0th sample to the 3839th sample) of the effective pixel area are mapped onto areas (i.e., vertical blanking areas) in the ranges from the 1st line to the 41st line and from the 1122th line to the 1125th line in the video data areas of the first through fourth subimages. In addition, of the extra pixel area of the first 4K signal, the pixel samples horizontally outside the effective pixel area are mapped onto horizontal auxiliary data areas of the first through fourth subimages.

As with the first subimage, the second through fourth 4K signals are also mapped onto the respective first through fourth subimages.

Moreover, if the effective pixel areas of the first through fourth 4K signal have 4096 samples thereacross, for example, then the pixel samples of the first through fourth 4K signals are mapped respectively onto the first through fourth subimages by the similar process.

Incidentally, if the effective pixel areas of the first through fourth 4K signal have 4096 samples thereacross, the video data areas of the first through fourth subimages are in the range from the 0th sample to the 2047th sample. Then, an EAV area, a horizontal auxiliary data area, and an SAV area are placed subsequently to the 2048th sample.

Figure 14:
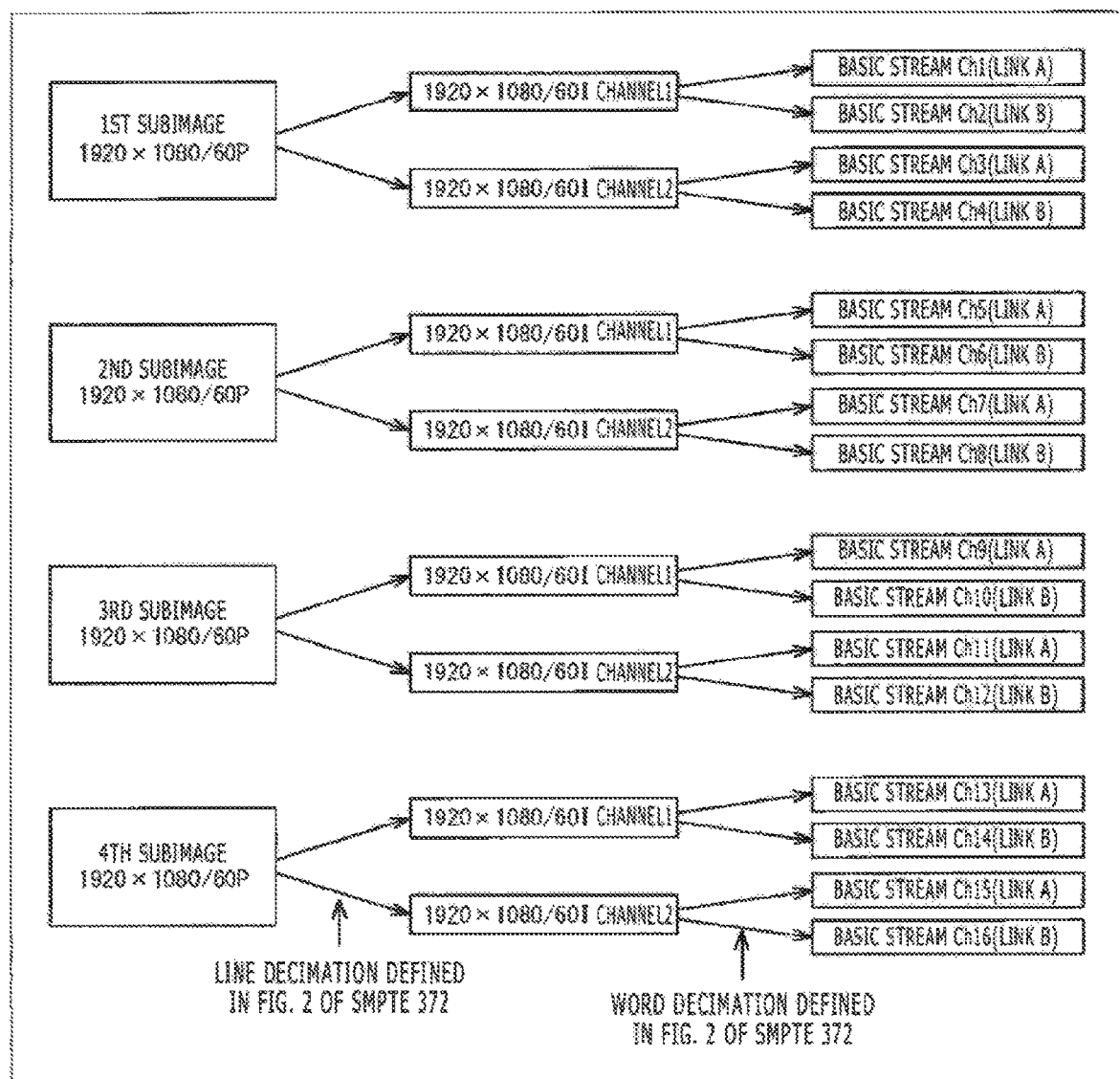
FIG. 14 is a diagram illustrative of a process of mapping subimages onto HD-SDI.

Next, as depicted in FIG. 14, the mapping unit 111 performs line decimation and word decimation on the first through fourth subimages.

For example, the mapping unit 111 first decimates every other line from the first through fourth subimages according to the process regulated in FIG. 2, etc. of SMPTE 372. In this manner, each of the subimages which represents a progressive 48P-60P video signal is converted into 48I-60I interlaced video signals of two channels including channel 1 and channel 2. As depicted in FIG. 14, for example, if the first through fourth subimages represent 1920×1080/60P video signals, then each of them is converted into 1920×1080/60I video signals of channel 1 and channel 2.

Next, the mapping unit 111 decimates each word from each of the generated interlaced video signals according to the process regulated in FIG. 4, etc. of SMPTE 372. For example, the mapping unit 111 performs word decimation according to the same process as regulated in FIGS. 3, 5, 7, 8 and 9 of SMPTE 372. In this manner, each interlaced video signal is mapped onto HD-SDI of two channels of link A and link B (referred to as a basic stream in FIG. 14).

Figure 15:
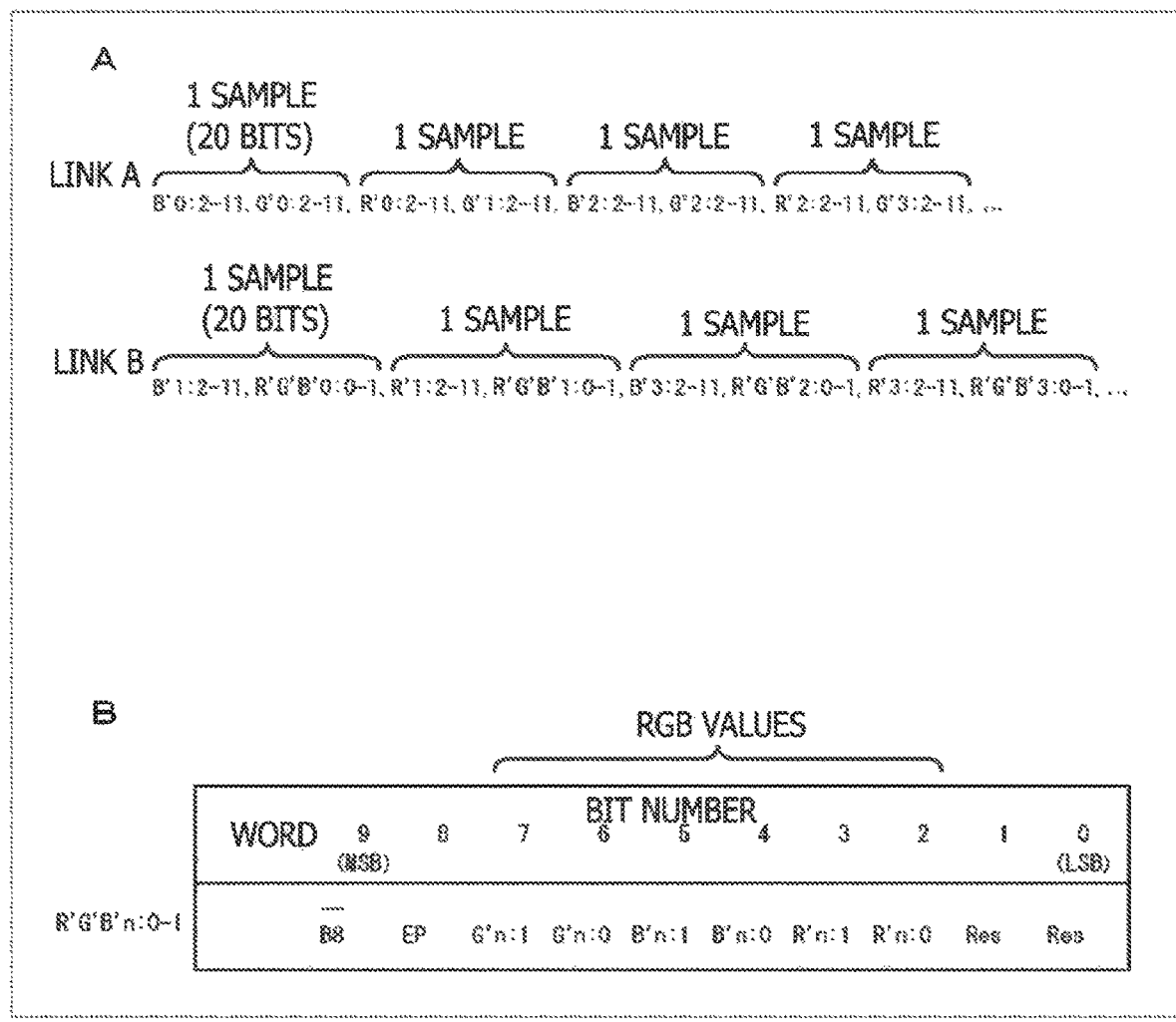
FIG. 15 is a diagram illustrative of an example of a data structure of link A and link B according to SMPTE 372.

FIG. 15 depicts an example of a data structure of link A and link B.

As depicted at A in FIG. 15, the data stream of link A has samples each made up of 20 bits, and all the bits represent RGB values.

On the other hand, the data stream of link B also has samples each made up of 20 bits, but of R'G'B' n:0-1 of 10 bits, only 6 bits indicated by bit numbers 2 through 7 represent RGB values. Therefore, the number of bits that represent RGB values in one sample is 16. Incidentally, if an interlaced video signal generated by line decimation is a 4:4:4 or 4:2:3 10-bit signal, then the 6 bits indicated by bit numbers 2 through 7 are set to optional values such as 0.

As described above, first through fourth 4K signals are generated from a 48P-60P 8K signal, and video streams of HD-SDI of 16 channels are generated from each of the first through fourth 4K signals. Consequently, HD-SDI of a total of 64 channels is generated from a 48P-60P 8K signal.

At this time, the mapping unit 111 multiplexes auxiliary data and (horizontally) left and right extra pixels of the video signal into a horizontal auxiliary data area of HD-SDI of each channel.

Specifically, one large volume of data among auxiliary data transmitted for 8K signals is an audio signal. For example, SMPTE 2036-2 prescribes the multiplexing of 96 kHz-sampled audio signals of 24 channels (22.2 channels) into a video signal of UHDTV2 and the transmission of the multiplex signal. Moreover, SMPTE 428-2 prescribes the multiplexing of 96 kHz-sampled audio signals of a maximum of 16 channels for cinema applications.

Furthermore, SMPTE 299-1 prescribes a format for audio data packets for HD-SDI. The audio data packet prescribed in SMPTE 299-1 has a minimum unit of 31 bytes. Moreover, it is possible to multiplex 32 kHz-, 44.1 kHz-, and 48 kHz-sampled audio signals of a maximum of 4 channels and 96 kHz-sampled audio signals of a maximum of 2 channels into one audio data packet. Furthermore, SMPTE 299-1 prescribes the multiplexing of a maximum of 8 packets (=4 packets×2 times) 31-byte audio data packets into the horizontal auxiliary data area of HD-SDI and the transmission of the multiplexed data.

Auxiliary data including the 31-byte audio data then packets and extra pixels of the 8K signal are multiplexed into the horizontal auxiliary data area of HD-SDI of each channel.

Specific examples of processes of multiplexing auxiliary data and extra pixels will hereinafter be described below with reference to FIGS. 16 and 17.

(First Process of Multiplexing Auxiliary Data and Extra Pixels)

Figure 16:
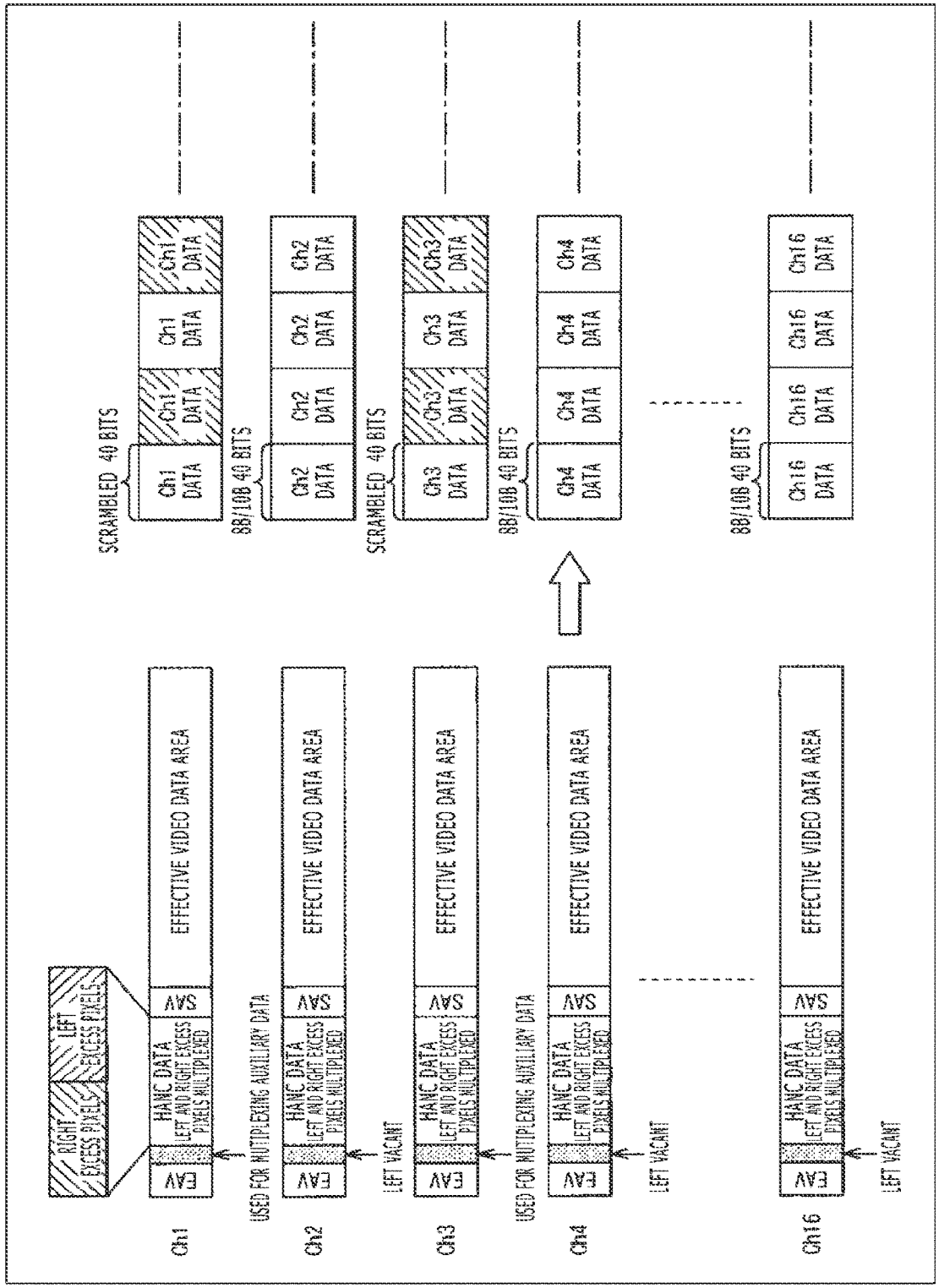
FIG. 16 is a diagram illustrative of a first example of a process of multiplexing auxiliary data and excess pixels and a process of generating data blocks in the video signal sending process according to the first embodiment.

A figure on the left side of FIG. 16 depicts a first process of multiplexing auxiliary data and extra pixels. It should be noted that, although FIG. 16 depicts only HD-SDI of channels 1 through 16 supplied from the mapping unit 111 to the multiplexer 112-1, auxiliary data and extra pixels are multiplexed into HD-SDI of remaining channels 17 through 64 by the similar process.

Specifically, areas of predetermined sizes each for multiplexing auxiliary data (hereinafter referred to as auxiliary data multiplexing areas) are kept in an area for a C channel and an area for a Y channel in the horizontal auxiliary data area of HD-SDI of each channel. For example, an auxiliary data area (hereinafter referred to as auxiliary data multiplexing area C) of 31 bytes or more is kept in the area for the C channel. Moreover, for example, an auxiliary data multiplexing area (hereinafter referred to as auxiliary data multiplexing area Y) of bytes equal to or more than an audio control signal or a time code is kept in the area for the Y channel.

Then, audio data packets conforming to the provisions of SMPTE 299-1 are multiplexed into the auxiliary data multiplexing area C of HD-SDI of odd-numbered channels. Furthermore, audio control packets conforming to the provisions of SMPTE 299-1 are multiplexed into the auxiliary data multiplexing area Y on predetermined lines (e.g., the 9th line and the 571th line in FIG. 12 of SMPTE 299-1) of HD-SDI of odd-numbered channels. Moreover, auxiliary data such as time codes, etc. are multiplexed into the auxiliary data multiplexing area Y on predetermined lines of HD-SDI of odd-numbered channels.

Incidentally, as described later, when a data stream for transmission is generated, bits of part of respective words of HD-SDI of even-numbered channels are extracted and 8B/10B-converted. Therefore, if auxiliary data are multiplexed into HD-SDI of the even-numbered channels, then the auxiliary data cannot be reproduced when the video signal is reproduced. Therefore, the auxiliary data multiplexing areas of HD-SDI of even-numbered channels remain vacant and are not in use.

In this fashion, a maximum of 32 audio data packets can be multiplexed into HD-SDI of 64 channels.

Now, for example, a 48 kHz-sampled audio signal is sampled approximately 1.71 times (=48 kHz (50 Hz÷2)÷1125 lines) on average per line with respect to HD-SDI of 1920×1125/50I. Moreover, for example, a 48 kHz-sampled audio signal is sampled approximately 1.42 times (=48 kHz (60 Hz÷2)÷1125 lines) on average per line with respect to HD-SDI of 1920×1125/60I. In other words, a 48 kHz-sampled audio signal is sampled once or twice per line with respect to HD-SDI of 1920×1125/50I, 60I.

Therefore, for multiplexing a 48 kHz-sampled audio signal into HD-SDI of 1920×1125/50I, 60I and transmitting the multiplexed data, it is necessary to multiplex a maximum of two samples of the audio signal of each channel into one line. Further, Since 32 audio data packets can be multiplexed as described above, a 48 kHz-sampled audio signal can be multiplexed and transmitted in a maximum of 64 channels (=4 channels×32÷2).

Furthermore, 32 kHz- and 44.1 kHz-sampled audio signals can also be similarly transmitted in a maximum of 64 channels. On the other hand, a 96 kHz-sampled audio signal can be transmitted in a maximum of 32 channels, one half of the 64 channels.

Moreover, the data of pixel samples in the left and right extra pixel areas of an 8K signal are multiplexed into an area (hereinafter referred to as extra pixel multiplexing area), exclusive of the auxiliary data multiplexing area, in the horizontal auxiliary data area of HD-SDI of each channel.

Further, if the auxiliary data multiplexing area is of 31 bytes, for example, then the ratio of the extra pixel multiplexing area to the effective video data area (hereinafter referred to as an extra pixel multiplexing area relative ratio) is of values indicated by the equations (1) through (5) below. Incidentally, the equation (1) represents a ratio in case a video signal of 7680×4320/60P is transmitted, and the equation (2) represents a ratio in case a video signal of 7680×4320/50P is transmitted. The equation (3) represents a ratio in case a video signal of 8192×4320/60P is transmitted, the equation (4) represents a ratio in case a video signal of 8192×4320/50P is transmitted, and the equation (5) represents a ratio in case a video signal of 8192×4320/48P is transmitted.

$$(2200-1920-12-31)\div 1920=0.123=12.3\% \quad (1)$$

$$(2640-1920-12-31)\div 1920=0.353=35.3\% \quad (2)$$

$$(2200-2048-12-31)\div 2048=0.053=5.3\% \quad (3)$$

$$(2640-2048-12-31)\div 2048=0.268=26.8\% \quad (4)$$

$$(2750-2048-12-31)\div 2048=0.322=32.2\% \quad (5)$$

For transmitting a video signal of 7680×4320/60P, for example, the area for the C channel (or the Y channel) of HD-SDI is of 2200 samples, and the effective video data area thereof is of 1920 samples. Further, the areas of SAV and EAV (including a line number LN and an error detecting code CRC) are of 12 samples. Therefore, the extra pixel multiplexing area is of 237 samples (=2200−1920−12−31), and the extra pixel multiplexing area relative ratio becomes 12.3% by dividing the extra pixel multiplexing area of 237 samples by the 1920 samples of the effective video data area.

In this manner, a sufficient extra pixel multiplexing area can be kept with respect to an effective video data area, making it possible to multiplex all the data of pixel samples in the left and right extra pixel area of an 8K signal and transmit the multiplexed data.

Incidentally, as described above, the data of pixel samples in the (vertically) upper and lower extra pixel areas of an 8K signal are multiplexed into the vertical blanking areas of each subimage. The vertical blanking areas include 45 lines, which provide a sufficient volume for multiplexing the data of pixel samples in the upper and lower extra pixel areas of an 8K signal. Therefore, it is possible to multiplex and transmit all the data of pixel samples in the upper and lower extra pixel area of an 8K signal.

(Second Process of Multiplexing Auxiliary Data and Extra Pixels)

Figure 17:
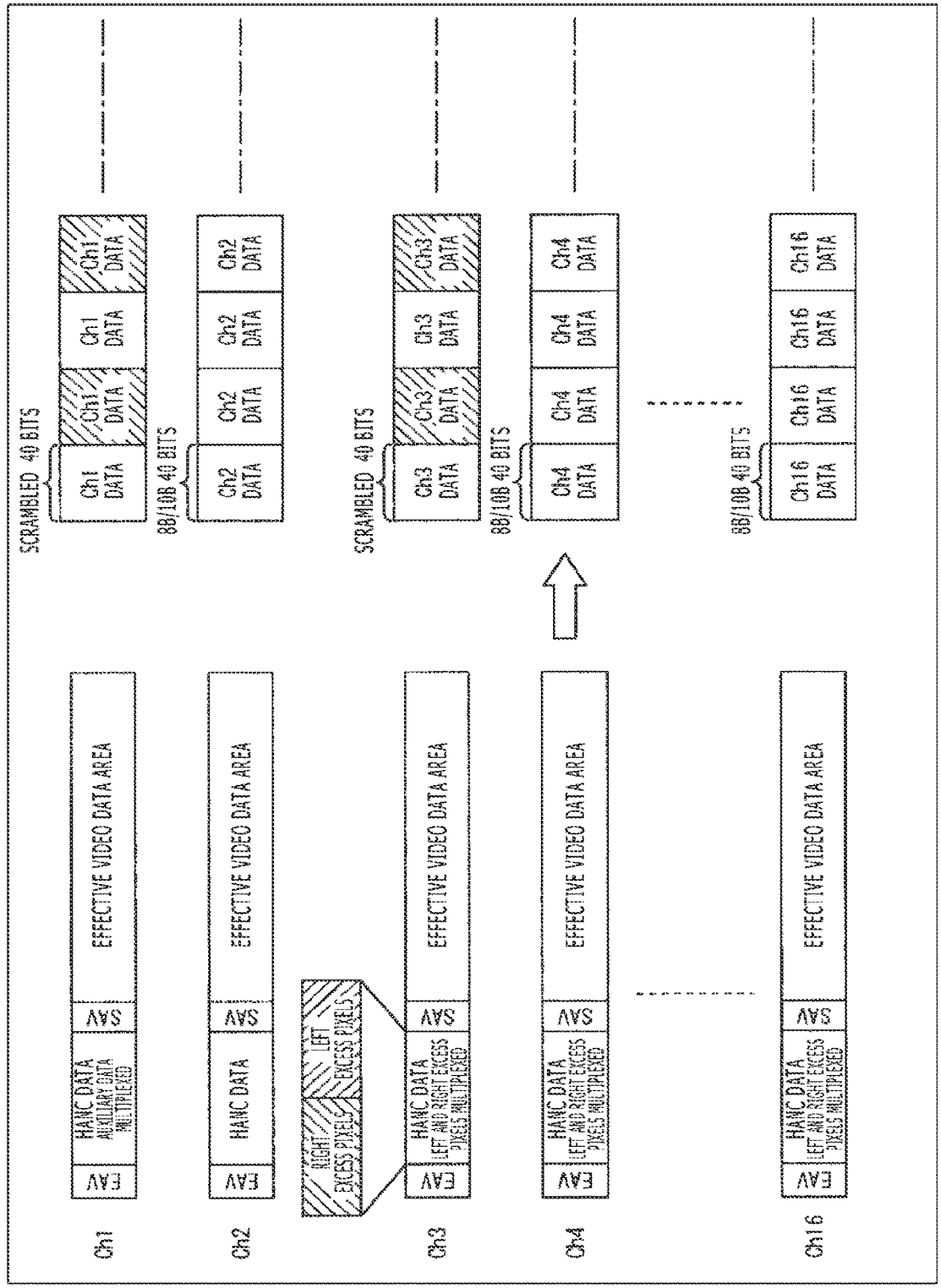
FIG. 17 is a diagram illustrative of a second example of a process of multiplexing auxiliary data and excess pixels and a process of generating data blocks in the video signal sending process according to the first embodiment.

A figure on the left side of FIG. 17 depicts a second process of multiplexing auxiliary data and extra pixels. The second multiplexing process is used when the multiplexing of audio signals is prioritized or when it is not necessary to multiplex the data of pixel samples in the left and right extra pixel areas, for example.

Incidentally, although FIG. 17 depicts only HD-SDI of channels 1 through 16 supplied from the mapping unit 111 to the multiplexer 112-1, auxiliary data and extra pixels are multiplexed into HD-SDI of remaining channels 17 through 64 by the similar process.

Specifically, auxiliary data such as audio data packets, audio control packets, and time codes, etc. are multiplexed into the horizontal auxiliary data areas of HD-SDI of channels 1, 17, 33 and 49.

At this time, according to the provisions of SMPTE 299-1, a maximum of four audio data packets are multiplexed twice into each of the horizontal auxiliary data areas of HD-SDI of channels 1, 17, 33 and 49. Thus, a maximum of 32 audio data packets can be multiplexed into HD-SDI of 64 channels.

Therefore, as with the first multiplexing process, 32 kHz-, 44.1 kHz-, or 48 kHz-sampled audio signals of a maximum of 64 channels can be multiplexed and transmitted. In addition, 96 kHz-sampled audio signals of a maximum of 32 channels can be multiplexed and transmitted.

Incidentally, if the effective video data area of HD-SDI is of 2048 samples, then the number of audio data packets that can be multiplexed into the horizontal auxiliary data area is 4 (=4 packets×1 time), one half of the number of audio data packets in case the effective video data area is of 1920 samples. Therefore, if the effective video data area of HD-SDI is of 2048 samples, then 32 kHz-, 44.1 kHz-, or 48 kHz-sampled audio signals of a maximum of 32 channels can be multiplexed and transmitted. In addition, 96 kHz-sampled audio signals of a maximum of 16 channels can be multiplexed and transmitted.

In addition, the overall horizontal auxiliary data areas of HD-SDI of 56 channels excluding channels 1, 17, 33 and 49 into which auxiliary data are multiplexed and channels 2, 18, 34 and 50 paired with those channels are assigned as extra pixel multiplexing areas. Pairs of HD-SDI used herein refer to, for example, pairs of HD-SDI of link A and link B at the right end of FIG. 14.

Further, extra pixel multiplexing area relative ratios are of values indicated by the equations (6) through (10) below. Incidentally, the equation (6) represents a ratio in case a video signal of 7680×4320/60P is transmitted, and the equation (7) represents a ratio in case a video signal of 7680×4320/50P is transmitted. The equation (8) represents a ratio in case a video signal of 8192×4320/60P is transmitted, the equation (9) represents a ratio in case a video signal of 8192×4320/50P is transmitted, and the equation (10) represents a ratio in case a video signal of 8192×4320/48P is transmitted.

$$(2200-1920-12) \times 56 \div 64 \div 1920 = 0.122 = 12.2\% \quad (6)$$

$$(2640-1920-12) \times 56 \div 64 \div 1920 = 0.323 = 32.3\% \quad (7)$$

$$(2200-2048-12) \times 56 \div 64 \div 2048 = 0.059 = 5.9\% \quad (8)$$

$$(2640-2048-12) \times 56 \div 64 \div 2048 = 0.248 = 24.8\% \quad (9)$$

$$(2750-2048-12) \times 56 \div 64 \div 2048 = 0.295 = 29.5\% \quad (10)$$

For transmitting a video signal of 7680×4320/60P, for example, the area for the C channel (or the Y channel) of HD-SDI is of 2200 samples, and the effective video data area thereof is of 1920 samples. Further, the areas of SAV and EAV (including a line number LN and an error detecting code CRC) are of 12 samples. Therefore, the extra pixel multiplexing area per channel is of 268 samples (=2200−1920−12). Moreover, since extra pixel multiplexing areas are provided in 56 out of the 64 channels, the extra pixel multiplexing area relative ratio becomes 12.2% by multiplying 268 samples by 56/64 and dividing the product by the 1920 samples of the effective video data area.

In this manner, according to the second multiplexing process, a sufficient extra pixel multiplexing area can also be kept with respect to an effective video data area, making it possible to multiplex all the data of pixel samples in the left and right extra pixel area of an 8K signal and transmit the multiplexed data.

Incidentally, as with the first multiplexing process, the data of pixel samples in the upper and lower extra pixel areas of an 8K signal can be transmitted in their entirety by being multiplexed into the vertical blanking areas of each subimage.

An 8K signal is mapped onto HD-SDI of 64 channels in the manner described above. Incidentally, the processes of mapping an 8K signal, as described above, are illustrated by way of example, and an 8K signal may be mapped onto HD-SDI of 64 channels according to other processes.

Then, the mapping unit 111 supplies HD-SDI of channels 1 through 16 to the multiplexer 112-1 and supplies HD-SDI of channels 17 through 32 to the multiplexer 112-2. Furthermore, the mapping unit 111 supplies HD-SDI of channels 33 through 48 to the multiplexer 112-3 and supplies HD-SDI of channels 49 through 64 to the multiplexer 112-4.

Referring back to FIG. 10, in step S2, the multiplexer 112 scrambles or 8B/10B-converts the data streams of HD-SDI block by block, and inverts the polarity of the data blocks of part of the scrambled data stream.

Specifically, HD-SDI of channel 1 is input to the receiver 141-1 of the scrambling unit 131-1 of the multiplexer 112-1. The receiver 141-1 S/P-converts and descrambles the input HD-SDI, extracts data word by word (10 bits) in synchronism with a clock signal of 148.5 MHz, and supplies the extracted data to the TRS detector 142-1.

The TRS detector 142-1 detects SAV and EAV included in the HD-SDI and acquires word synchronization of the HD-SDI. Then, the TRS detector 142-1 extracts data 40 bits by 40 bits (10 bits×4 clock pulses) successively from the beginning of the SAV of the HD-SDI per every four clock pulses of the clock signal of 148.5 MHz, and has the extracted data stored in the RAM 143-1.

The scrambler 144-1 reads data blocks of 40 bits from the RAM 143-1 per every four clock pulses of the clock signal of 148.5 MHz, and scrambles the read data blocks.

Moreover, the scrambler 144-1 inverts the polarity of the data blocks of part of the scrambled data blocks of 40 bits. Here, inverting the polarity of the data blocks means inverting the polarity of data in the data blocks.

For example, the scrambler 144-1 inverts the polarity of every other block of the data blocks. FIGS. 16 and 17 depict in upper sections on the right sides thereof an array of scrambled data blocks of channel 1. Blank data blocks are data blocks whose polarity is not inverted, and hatched data blocks are data blocks whose polarity is inverted. The polarity of every other block of the scrambled data blocks is inverted such that the data blocks whose polarity is not inverted and the data blocks whose polarity is inverted are thus alternately arrayed.

The scrambler 144-1 supplies the scrambled data blocks (part of which are data blocks whose polarity is inverted after being scrambled) to the data stream generator 133.

It should be noted that, as depicted on the right sides of FIGS. 16 and 17, HD-SDI of other odd-numbered channels input to the multiplexer 112-1 is similarly scrambled block by block of 40 bits successively from the beginning of the SAV, and the polarity of part of the scrambled data blocks is inverted. Then, the scrambled data blocks of 40 bits (part of which are data blocks whose polarity is inverted after being scrambled) are supplied to the data stream generator 133.

Furthermore, HD-SDI of channel 2 is input to the receiver 151-1 of the 8B/10B converter 132-1 of the multiplexer 112-1. The receiver 151-1 S/P-converts and descrambles the HD-SDI, extracts data word by word (10 bits) in synchronism with a clock signal of 148.5 MHz, and supplies the extracted data to the TRS detector 152-1.

The TRS detector 152-1 detects SAV and EAV included in the HD-SDI and acquires word synchronization of the HD-SDI. Then, the TRS detector 152-1 extracts data 40 bits by 40 bits (10 bits×4 clock pulses) successively from the beginning of the SAV of the HD-SDI per every four clock pulses of the clock signal of 148.5 MHz, and has the extracted data stored in the RAM 153-1.

The 8B/10B encoder 154-1 extracts and reads predetermined 32 bits from the data blocks of 40 bits stored in the RAM 143-1 per every four clock pulses of the clock signal of 148.5 MHz.

Figure 18:
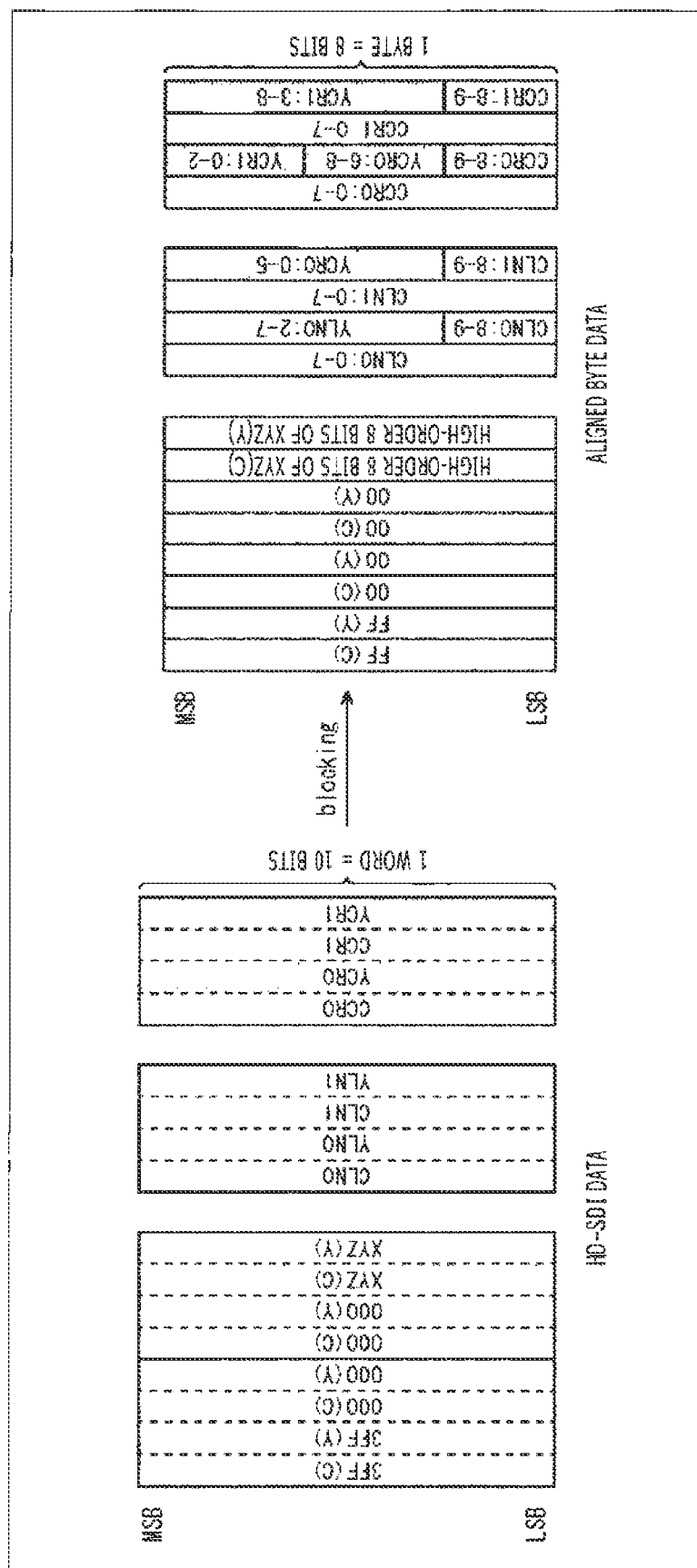
FIG. 18 is a diagram illustrative of a process of extracting data from SAV and EAV.

Specifically, as depicted in FIG. 18, since 3FFh, 000h, 000h, and XYZ of SAV and EAV have two high-order bits reserved=0 or 1, eight high-order bits of 10-bit data are extracted.

Data of LN and CRC subsequent to EAV are extracted and aligned as depicted in FIG. 18, and data in every 10 bits/words are converted into data in every 8 bits/words according to the following sequence: It should be noted that, hereinafter, CLN represents LN of a C channel, YLN represents LN of a Y channel, CCR represents CRC of a C channel, and YCR represents CRC of a Y channel.

> CLN0 that is eight low-order bits of CLN0: 0-7 (indicating a first bit to a seventh bit, similarly expressed below)
> CLN0: 8-9, YLN0: 2-7
> CLN1: 0-7
> CLN0: 8-9, YCR0: 0-5
> CCR: 0-7
> CCR: 8-9, YCR0: 6-8, YCR1: 0-2
> CCR1: 0-7
> CCR1: 8-9, YCR1: 3-8

Incidentally, as CLN and YLN are the same data, YLN is basically deleted and not multiplexed. Therefore, since YLN0: 2-7 is clear from CLN0: 2-7, data such as all is may be embedded instead of YLN0: 2-7. Moreover, as the ninth bit of CRC is an inversion of the eighth bit thereof, it is deleted and not multiplexed. Furthermore, CCR and YCR are set to data calculated after an 8K signal has been multiplexed into HD-SDI.

Further, all data of 10 bits are extracted from the areas for the C channel of the effective video data area and the horizontal auxiliary data area of the HD-SDI. Of data of 10 bits, 6 bits from a bit number 2 to a bit number 7 depicted at B in FIG. 15 are extracted from the areas for the Y channel of the effective video data area and the horizontal auxiliary data area of the HD-SDI.

In the manner described above, data of 32 bits are extracted from data blocks of 40 bits successively from the beginning of the SAV of the HD-SDI.

The 8B/10B encoder 154-1 then 8B/10B-converts the read data blocks of 32 bits and supplies the 8B/10B-converted data blocks of 40 bits to the data stream generator 133.

Moreover, as depicted on the right sides of FIGS. 16 and 17, data of 32 bits are similarly extracted from the data blocks of 40 bits successively from the beginning of the SAV of HD-SDI of other even-numbered channels input to the multiplexer 112-1, and 8B/10B-converted. Then, the 8B/10B-converted data blocks of 40 bits are supplied to the data stream generator 133.

In the manner described above, as schematically depicted in FIG. 19, the data blocks of 40 bits generated from HD-SDI of channels 1 through 16 are supplied per every four clock pulses to the data stream generator 133. Thus, as illustrated by a model depicted in FIG. 20, a process of supplying data of 160 bits/samples per clock pulse to the data stream generator 133 is essentially repeated in periodic cycles of four clock pulses. Therefore, essentially a data stream of 160 bits×148.5 MHz is supplied to the data stream generator 133.

Figure 21:
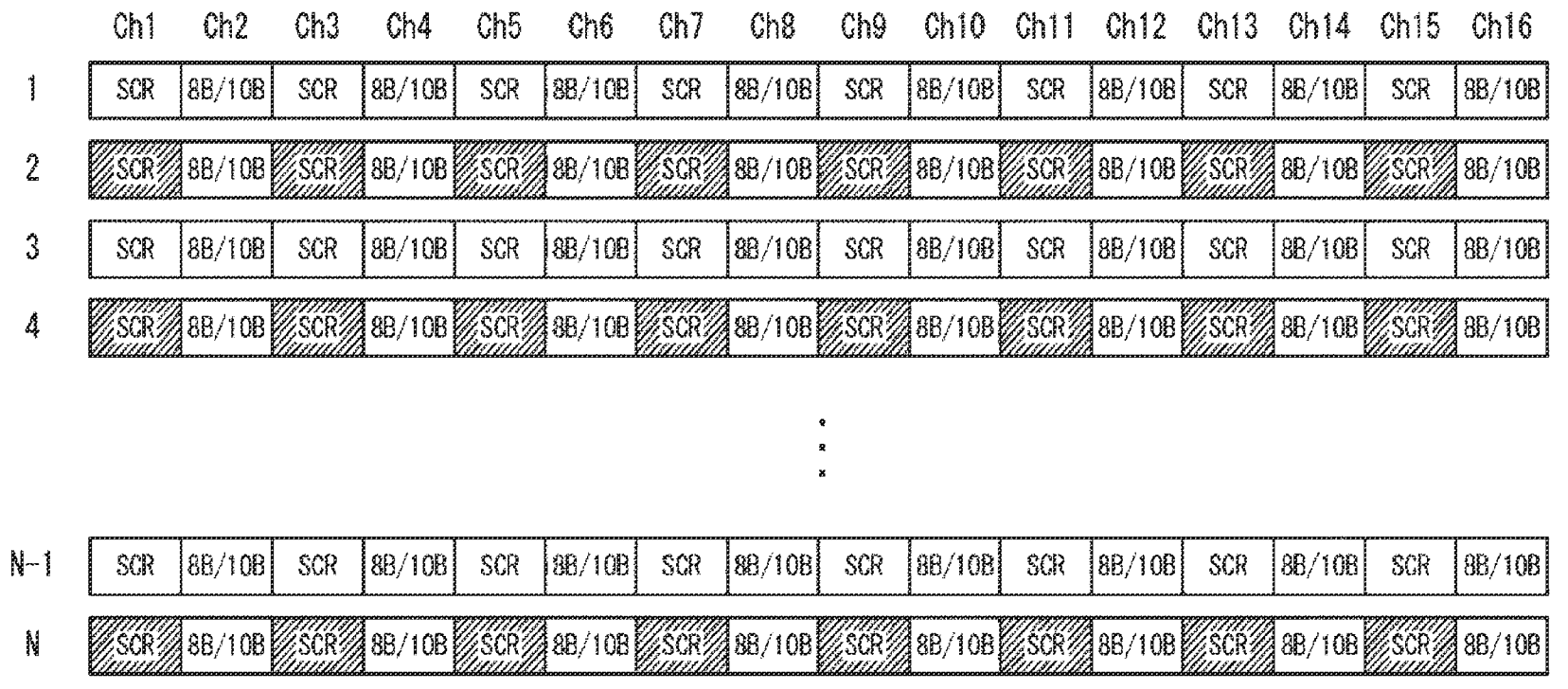

Further, FIG. 21 depicts an example of respective data blocks generated from one line of HD-SDI of each channel. In FIG. 21, blank cells among cells marked SCR represent data blocks that are scrambled but not inverted in polarity (hereinafter referred to as non-inverted scrambled blocks), and hatched cells represent data blocks that are scrambled and inverted in polarity (hereinafter referred to as inverted scrambled blocks). Further, cells marked 8B/10B represent data blocks that are 8B/10B-converted (hereinafter referred to as 8B/10B-converted blocks).

First, for the first blocks, non-inverted scrambled blocks are generated from HD-SDI of odd-numbered channels, and 8B/10B-converted blocks are generated from HD-SDI of even-numbered channels. For the second blocks, inverted scrambled blocks are generated from HD-SDI of odd-numbered channels, and 8B/10B-converted blocks are generated from HD-SDI of even-numbered channels. For the third blocks, non-inverted scrambled blocks are generated from HD-SDI of odd-numbered channels, and 8B/10B-converted blocks are generated from HD-SDI of even-numbered channels. For the fourth blocks, inverted scrambled blocks are generated from HD-SDI of odd-numbered channels, and 8B/10B-converted blocks are generated from HD-SDI of even-numbered channels. Subsequently, data blocks are generated in the similar order, so that for the Nth blocks (e.g., N=2200), inverted scrambled blocks are generated from HD-SDI of odd-numbered channels, and 8B/10B-converted blocks are generated from HD-SDI of even-numbered channels.

In this manner, non-inverted scrambled blocks and inverted scrambled blocks are alternately generated from HD-SDI of each odd-numbered channel. Therefore, N/2 non-inverted scrambled blocks and N/2 inverted scrambled blocks are each generated from one line of HD-SDI of each odd-numbered channel.

On the other hand, 8B/10B-converted blocks are generated in succession from HD-SDI of each even-numbered channel. Therefore, N 8B/10B-converted blocks are each generated from one line of HD-SDI of each even-numbered channel.

Moreover, the similar process is carried out by the multiplexers 112-2 through 112-4. Specifically, of HD-SDI of 16 channels input to each multiplexer 112, HD-SDI of odd-numbered channels is scrambled block by block of 40 bits successively from the beginning of the SAV, and the polarity of part of the scrambled data blocks is inverted. Then, the respective scrambled data blocks of 40 bits (part of which are data blocks whose polarity is inverted after being scrambled) are supplied to the data stream generator 133. Moreover, data of 32 bits are extracted from the data blocks of 40 bits successively from the beginning of the SAV of HD-SDI of even-numbered channels, and 8B/10B-converted. Then, the respective 8B/10B-converted data blocks of 40 bits are supplied to the data stream generator 133.

Referring back to FIG. 10, in step S3, the multiplexer 112 generates a data stream for transmission.

For example, the data stream generator 133 of the multiplexer 112-1 generates one line of data stream for transmission depicted in FIG. 22 from one line of HD-SDI of channels 1 through 16, as described below.

Specifically, first, the word synchronization signal output unit 173 of the data stream generator 133 outputs a word synchronization signal of 160 bits.

FIG. 23 depicts an example of a data configuration of a word synchronization signal. K28.5 or the like which is a comma character of an 8B/10B code is placed in 60 bits at the beginning of a word synchronization signal. Next, 2-bit data indicating whether the effective video area of HD-SDI to be multiplexed into a data stream for transmission is of 1920 samples or 2048 samples are placed. Furthermore, 2-bit data indicating whether a clock frequency for regulating operation of the scrambling unit 131 and the 8B/10B converter 132 is of 148.5 MHz or 148.5/1.001 MHz are placed. These data make up a word synchronization signal of 64 bits. Then, 96-bit stuffing data are added to make the word length equal to 160 bits.

Figure 22:
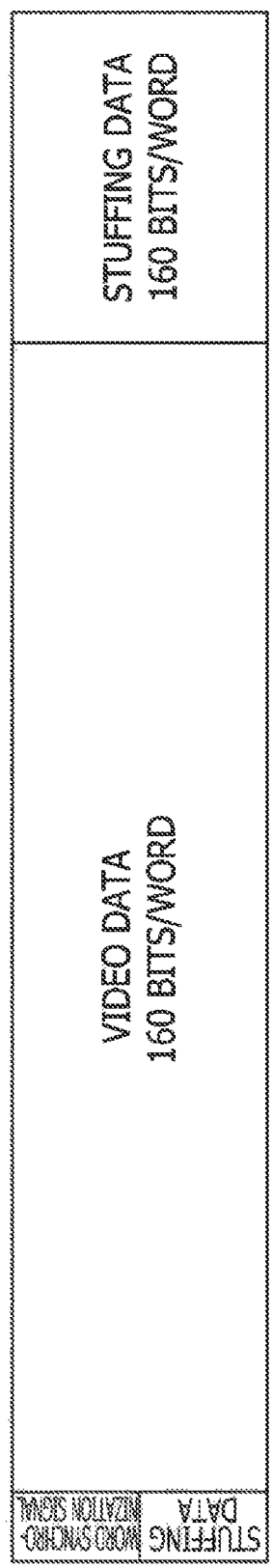
FIG. 22 is a diagram depicting an example of a data configuration of a data stream for transmission.

In this manner, as depicted in FIG. 22, the word synchronization signal and the stuffing data are placed at the beginning of the data stream for transmission.

Next, the buffer 171 of the data stream generator 133 arrays the data blocks supplied from the scrambler 144 and the 8B/10B encoder 154 into a predetermined sequence in synchronism with a clock signal of 167.0625 MHz, and extracts data in every 160 bits therefrom. The buffer 171 then generates parallel data whose word length is 160 bits from the extracted data, and outputs the generated parallel data to the P/S converter 134.

Subsequently, the similar process is repeated from the beginning of the SAV of HD-SDI of channels 1 through 16 to the last of the horizontal auxiliary data area thereof. Specifically, the process of arraying the data blocks supplied from the scrambler 144 and the 8B/10B encoder 154 into a predetermined sequence, extracting data 160 bits by 160 bits from the data blocks, generating parallel data whose word length is 160 bits, and outputting the generated parallel data is repeated.

In this fashion, as depicted in FIG. 22, the data of one line of HD-SDI of channels 1 through 16 are multiplexed subsequently to the word synchronization signal. This corresponds to the data of one line of first through fourth subimages generated from the first 4K signal.

Finally, the stuffing data output unit 172 of the data stream generator 133 outputs parallel stuffing data of 160 bits/words having a predetermined number of samples in synchronism with the clock signal of 167.0625 MHz. In this manner, as depicted in FIG. 22, the stuffing data are multiplexed into the last of the data stream for transmission.

In this manner, a data stream for transmission into which one line of HD-SDI of channels 1 through 16 has been multiplexed is generated according to the format depicted in FIG. 22. As described above, the data of one line of pixel samples of the first through fourth subimages generated from the first 4K signal depicted in FIG. 13 have been multiplexed into this one line of a data stream for transmission.

Hereinafter, the data stream generator 133 of the multiplexer 112-1 similarly generates one line of a data stream for transmission depicted in FIG. 22 per line of the first through fourth subimages generated from the first 4K signal, and supplies the generated one line of a data stream to the P/S converter 134.

Furthermore, the data stream generator 133 of each of the multiplexers 112-2 through 112-4 generates a data stream for transmission according to the similar process carried out by the data stream generator 133 of the multiplexer 112-1, and supplies the generated data stream to the P/S converter 134. Thus, one line of a data stream for transmission with HD-SDI of channels 17 through 32 multiplexed thereinto is generated per line of the first through fourth subimages generated from the second 4K signal, and supplied to the P/S converter 134. A data stream for transmission with HD-SDI of channels 33 through 48 multiplexed thereinto is generated per line of the first through fourth subimages generated from the third 4K signal, and supplied to the P/S converter 134. A data stream for transmission with HD-SDI of channels 49 through 64 multiplexed thereinto is generated per line of the first through fourth subimages generated from the fourth 4K signal, and supplied to the P/S converter 134.

In this fashion, data streams for transmission of first through fourth lanes are generated from the 8K signal. Incidentally, the bit rate of the data stream for transmission of each lane is 26.73 Gbps (=160 bits×167.0625 MHz).

Incidentally, each of the data blocks multiplexed into the data streams for transmission has been scrambled or 8B/10B-converted. In addition, the polarity of one half of the scrambled data blocks is inverted. Consequently, even if a pathological pattern referred to above frequently appears in the scrambled data blocks, the mark ratio of the data streams for transmission is approximately 1/2. Therefore, the data streams for transmission represent signals suitable for transmission which have sufficient positive- and negative-going edges, and can be transmitted stably without a special DC reproducing circuit or the like.

Referring back to FIG. 10, in step S4, the broadcasting camera 11a sends the data streams for transmission.

Specifically, the P/S converter 134 of the multiplexer 112-1 P/S-converts the data stream for transmission of the first lane and supplies the P/S-converted data stream to the transmission controller 103. The P/S converter 134 of the multiplexer 112-2 P/S-converts the data stream for transmission of the second lane and supplies the P/S-converted data stream to the transmission controller 103. The P/S converter 134 of the multiplexer 112-3 P/S-converts the data stream for transmission of the third lane and supplies the P/S-converted data stream to the transmission controller 103. The P/S converter 134 of the multiplexer 112-4 P/S-converts the data streams for transmission of the fourth lane and supplies the P/S-converted data stream to the transmission controller 103.

The optical module 251S-1 of the transmission controller 103 wavelength-multiplexes the data streams for transmission of the first through fourth lanes, for example, and sends the wavelength-multiplexed data streams through the optical circulator 261S, the optical fiber 271-1, and the optical circulator 261R to the CCU 12.

Incidentally, both of the optical modules 251S-1 and 251S-2 or only the optical module 251S-2 may be used to send the data streams for transmission of the first through fourth lanes to the CCU 12.

Incidentally, the bit rates of the data streams for transmission may be set to any optional values under the conditions that they fall within the range from 25 through 28.3 Gbps and are an integral multiple of 148.5 MHz. Specifically, bit rates of the data streams for transmission may be set a value within the range from 25.0965 Gbps (=148.5 MHz×169) to 28.215 Gbps (=148.5 MHz×190). The signal rates (bit rates) that are integral multiples of 148.5 MHz are values suitable for signal processing- and clock-related circuits.

An example of amounts of stuffing data multiplexed into data streams for transmission which are of four lanes and 26.73 Gbps for transmitting an 8K signal of 60P will hereinafter be described below.

In this case, the amount of data of HD-SDI multiplexed into the data streams for transmission is 44,000 bits (2,200 samples×20 bits) per channel. Therefore, the amount of video data multiplexed into the data streams for transmission is 704,000 bits (=44,000×16 channels). Since the bit rate of the data streams for transmission here is 26.73 Gbps, the amount of data per line is 792,000 (26.73 Gbps÷(60 Hz±2)÷1,125 lines). Therefore, the amount of stuffing data (including a word synchronization signal) multiplexed into the data streams for transmission is 88,000 bits (=792,000–704,000 bits).

Video Signal Receiving Process According to the First Embodiment

A video signal receiving process that is carried out by the CCU 12*a* in a manner corresponding to the video signal sending process depicted in FIG. 10 will be described below with reference to a flowchart depicted in FIG. 24.

In step S51, the reception controller 201 receives data streams for transmission. Specifically, in the processing of step S4 in FIG. 10, the optical module 251R-1 of the reception controller 201 receives data streams for transmission of four lanes sent from the broadcasting camera 11*a*. The optical module 251R-1 supplies the received data streams for transmission of four lanes to the S/P converter/clock reproducer 211 of the signal processor 202.

In step S52, the S/P converter/clock reproducer 211 S/P-converts the data streams for transmission. Specifically, the S/P converter/clock reproducer 211 S/P-converts the data streams for transmission of four lanes and supplies the S/P-converted data streams to the word synchronization detector/data stream reproducer 212.

In step S53, the word synchronization detector/data stream reproducer 212 reproduces data streams of HD-SDI from the data streams for transmission. Specifically, the word synchronization detector/data stream reproducer 212 detects word synchronization signals multiplexed in the data streams for transmission of four lanes and acquires word synchronization of the data streams for transmission. Then, the word synchronization detector/data stream reproducer 212 reproduces HD-SDI of 64 channels from the data streams for transmission of four lanes according to a process that is a reversal of the process carried out by the multiplexer 112 of the broadcasting camera 11*a*. The word synchronization detector/data stream reproducer 212 supplies the reproduced HD-SDI of 64 channels to the video reproducer 213.

In step S54, the video reproducer 213 reproduces video signals from the data streams of HD-SDI. Specifically, the video reproducer 213 reproduces the original 8K signal from the HD-SDI of 64 channels according to a process that is a reversal of the process carried out by the mapping unit 111 of the broadcasting camera 11*a*. The video reproducer 213 supplies the reproduced 8K signal to the video processor 203.

In the manner described above, a video signal of 7680×4320/50P-60P/4:4:4/10 bits, 12 bits, 7680×4320/50P-60P/4:2:2:/12 bits, 8192×4320/48P-60P/4:4:4/10 bits, 12 bits, or 8192×4320/48P-60P/4:2:2/12 bits can be transmitted on data streams for transmission of four lanes through the 100-GbE device.

4. Second Embodiment

A second embodiment of the present technology will next be described with reference to FIGS. 25 through 33.

According to the second embodiment, an 8K signal of 48P-60P is transmitted using a 100-GbE device according to a process different from the process of the first embodiment. As with the first embodiment, 8K signals of 48P-60P include video signals of 7680×4320/50P-60P/4:4:4/10 bits, 12 bits, 7680×4320/50P-60P/4:2:2:/12 bits, 8192×4320/48P-60P/4:4:4/10 bits, 12 bits, and 8192×4320/48P-60P/4:2:2/12 bits.

Configurational Example of Broadcasting Camera 11*b*

Figure 25:
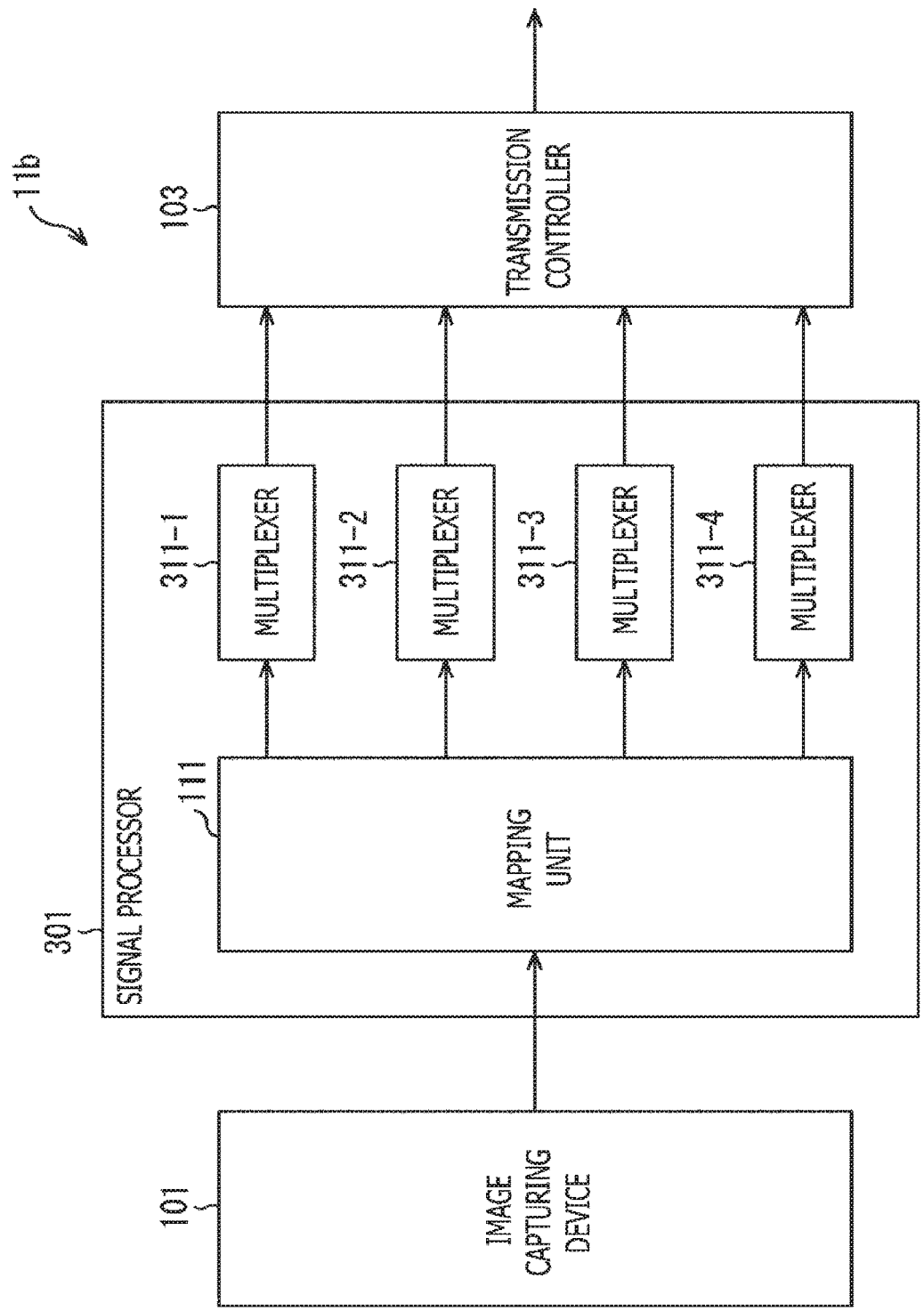
FIG. 25 is a block diagram depicting a configurational example of the functions of a broadcasting camera according to a second embodiment.

FIG. 25 is a block diagram depicting a configurational example of the functions of a broadcasting camera 11*b* as a form in which the broadcasting camera 11 according to the second embodiment is reduced to practice. It should be noted that those parts in FIG. 25 which correspond to those of the broadcasting camera 11*a* depicted in FIG. 5 are denoted by identical reference characters, and the description of parts that carry out the same processing sequences will be omitted accordingly as it is repetitive.

The broadcasting camera 11*b* is different from the broadcasting camera 11*a* in that a signal processor 301 is provided in place of the signal processor 102. The signal processor 301 is different from the signal processor 102 in that multiplexers 311-1 through 311-4 are provided in place of the multiplexers 112-1 through 112-4.

As described later, the multiplexers 311-1 through 311-4 perform channel coding on HD-SDI of 16 channels supplied from the mapping unit 111 respectively thereto and multiplex them, thereby generating data streams for transmission. The multiplexers 311-1 through 311-4 then supply the generated data streams for transmission to the transmission controller 103.

Incidentally, in case the multiplexers 311-1 through 311-4 do not need to be individually distinguished hereinbelow, they are simply referred to as a multiplexer 311.

Configurational Example of Multiplexer 311

Figure 26:
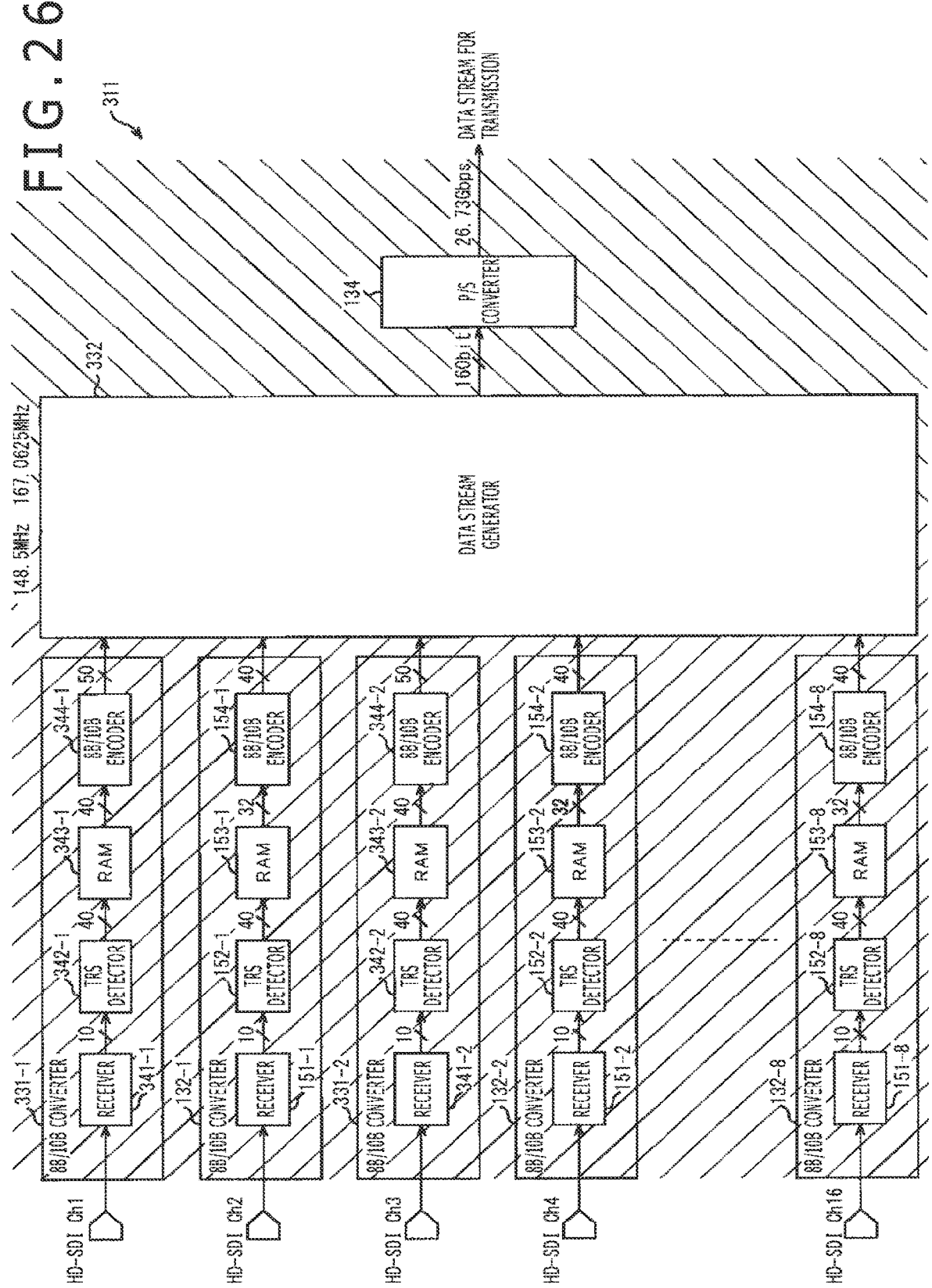
FIG. 26 is a block diagram depicting a configurational example of the functions of a multiplexer of the broadcasting camera according to the second embodiment.

FIG. 26 is a block diagram depicting a configurational example of the functions of the multiplexer 311. It should be noted that those parts in FIG. 26 which correspond to those of the multiplexer 112 depicted in FIG. 6 are denoted by identical reference characters, and the description of parts that carry out the same processing sequences will be omitted accordingly.

The multiplexer 311 is different from the multiplexer 112 in that 8B/10B converters 331-1 through 331-8 are provided in place of the scrambling units 131-1 through 131-8 and a data stream generator 332 is provided in place of the data stream generator 133. Furthermore, the 8B/10B converter 331*i* (i=1 through 8) includes a receiver 341-*i*, a TRS detector 342-*i*, an RAM 343-*i*, and an 8B/10B encoder 344-*i*.

HD-SDI of odd-numbered channels are input respectively to the 8B/10B converters 331-1 through 331-8.

Now, the receiver 341-1 of the 8B/10B converter 331-1 S/P-converts and descrambles the input HD-SDI and supplies the S/P-converted and descrambled HD-SDI to the TRS detector 342-1. Moreover, the receiver 341-1 also reproduces a clock signal superposed on the HD-SDI, and supplies the reproduced clock signal to various parts of the 8B/10B converter 331-1.

The TRS detector 342-1 detects SAV and EAV included in the HD-SDI to acquire word synchronization of the HD-SDI. The TRS detector 342-1 then extracts data every predetermined bits (e.g., 40 bits) successively from the beginning of the SAV of the HD-SDI, and has them stored in the RAM 343-1.

The 8B/10B encoder 344-1 reads data block by block of predetermined bits (e.g., 40 bits) from the RAM 343-1 and 8B/10B-converts the read data. The 8B/10B encoder 344-1 supplies the 8B/10B-converted data blocks to the data stream generator 332.

Incidentally, in case the 8B/10B converters 331-1 through 331-8 do not need to be individually distinguished hereinbelow, they are simply referred to as an 8B/10B converter 331. Furthermore, in case the receivers 341-1 through 341-8, the TRS detectors 342-1 through 342-8, the RAMs 343-1 through 343-8, and the 8B/10B encoders 344-1 through 344-8 do not need to be individually distinguished hereinbelow, they are simply referred to as a receiver 341, a TRS detector 342, a RAM 343, and an 8B/10B encoder 344, respectively.

The data stream generator 332 generates parallel data streams for transmission, which have a predetermined word length, by multiplexing the data blocks supplied from the 8B/10B encoder 154 and the 8B/10B encoder 344. The data stream generator 332 supplies the generated data streams for transmission to the P/S converter 134.

Configurational Example of CCU 12b

Figure 27:
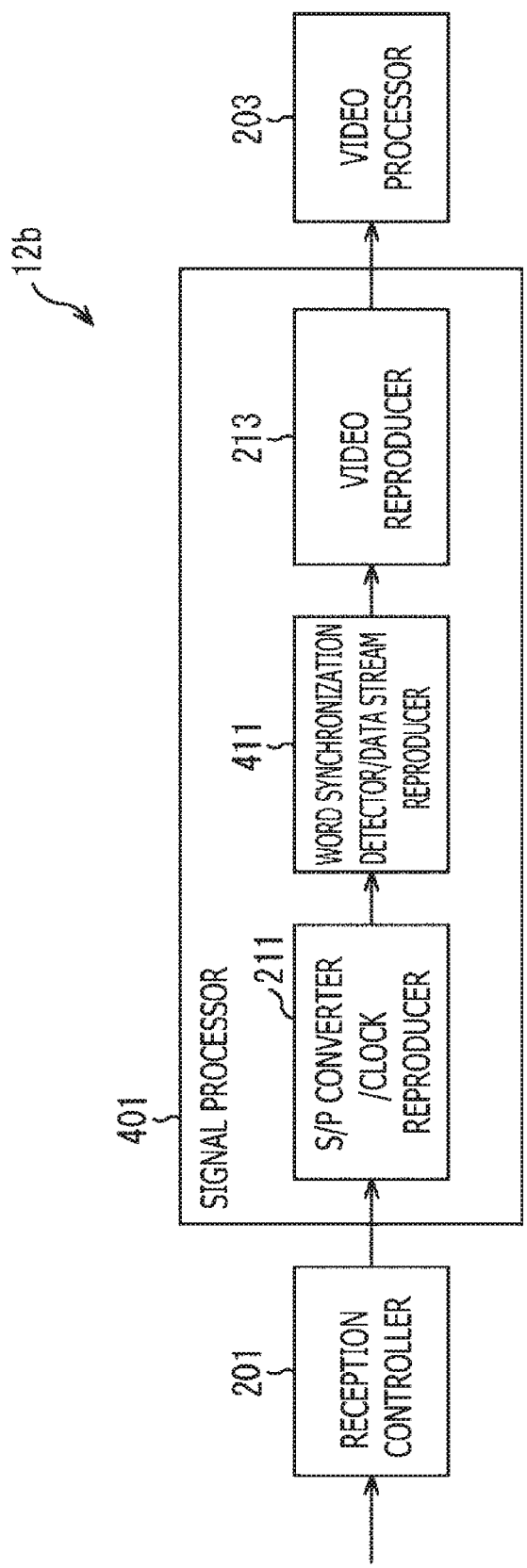
FIG. 27 is a block diagram depicting a configurational example of the functions of a CCU according to the second embodiment.

FIG. 27 is a block diagram depicting a configurational example of the functions of a CCU 12b as a form in which the CCU 12 according to the second embodiment is reduced to practice. It should be noted that those parts in FIG. 27 which correspond to those of the CCU 12a depicted in FIG. 8 are denoted by identical reference characters, and the description of parts that carry out the same processing sequences will be omitted accordingly as it is repetitive.

The CCU 12b is different from the CCU 12a in that a signal processor 401 is provided in place of the signal processor 202. The signal processor 401 is different from the signal processor 202 in that a word synchronization detector/data stream reproducer 411 is provided in place of the word synchronization detector/data stream reproducer 212.

The word synchronization detector/data stream reproducer 411 is supplied with an S/P-converted data stream for transmission from the S/P converter/clock reproducer 211. Then, the word synchronization detector/data stream reproducer 411 detects a word synchronization signal from the data stream for transmission and acquires word synchronization of the data stream for transmission. Further, the word synchronization detector/data stream reproducer 411 also reproduces data streams of HD-SDI of 64 channels from the data stream for transmission according to a process that is a reversal of the process carried out by the multiplexer 311 of the broadcasting camera 11b, and supplies the reproduced data stream to the video reproducer 213.

Video Signal Sending Process According to the Second Embodiment

Next, a video signal sending process that is carried out by the broadcasting camera 11b in the second embodiment will be described with reference to a flowchart depicted in FIG. 28.

Figure 10:
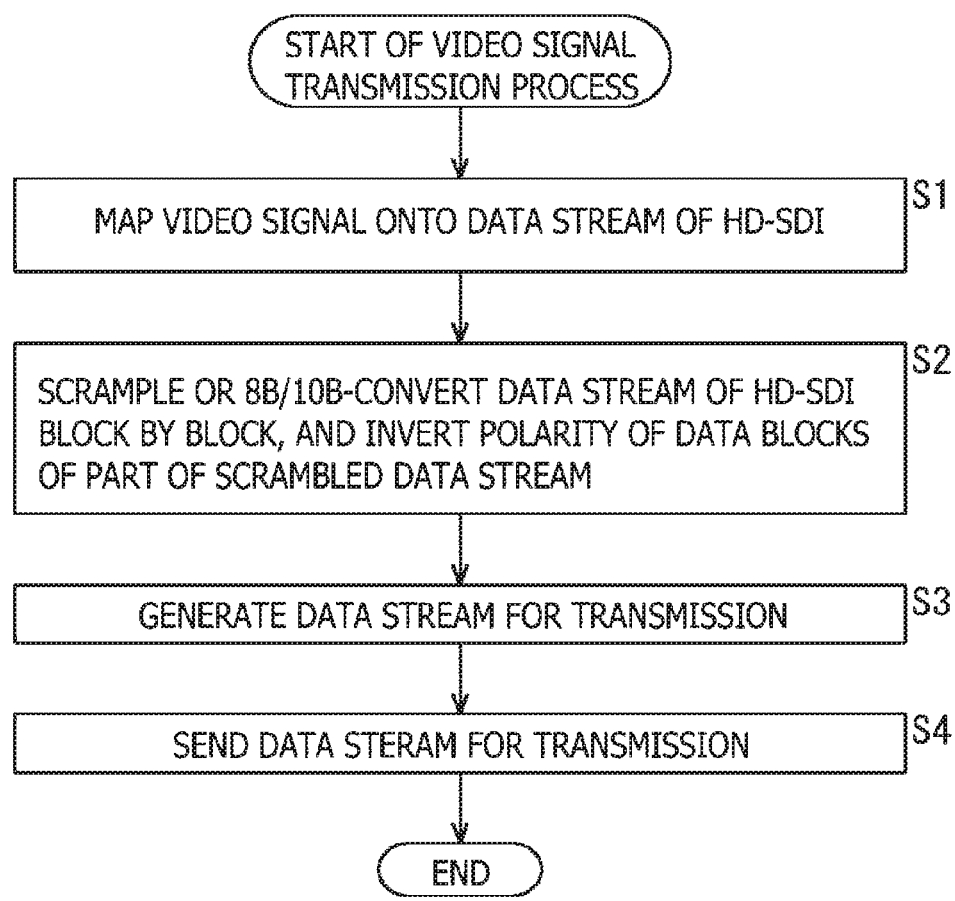
FIG. 10 is a flowchart illustrative of a video signal sending process according to the first embodiment.

In step S101, as with the processing of step S1 depicted in FIG. 10, a video signal (8K signal) is mapped onto HD-SDI of 64 channels. At this time, auxiliary data and extra pixels are multiplexed into a horizontal auxiliary data area of the HD-SDI of 64 channels by the first multiplexing process described above with reference to FIG. 16 or the second multiplexing process described above with reference to FIG. 17.

In step S102, the multiplexers 311-1 through 311-4 8B/10B-convert the data streams of HD-SDI block by block.

Specifically, HD-SDI of channel 1 is input to the receiver 341-1 of the 8B/10B converter 331-1 of the multiplexer 311-1. The receiver 341-1 S/P-converts and descrambles the HD-SDI, extracts data word by word (10 bits) in synchronism with a clock signal of 148.5 MHz, and supplies the extracted data to the TRS detector 342-1.

The TRS detector 342-1 detects SAV and EAV included in the HD-SDI and acquires word synchronization of the HD-SDI. Then, the TRS detector 342-1 extracts data 40 bits by 40 bits (10 bits×4 clock pulses) successively from the beginning of the SAV of the HD-SDI per every four clock pulses of the clock signal of 148.5 MHz, and has the extracted data stored in the RAM 343-1.

The 8B/10B encoder 344-1 reads data blocks of 40 bits from the RAM 343-1 per every four clock pulses of the clock signal of 148.5 MHz, and 8B/10B-converts the read data blocks. The 8B/10B encoder 344-1 then supplies 8B/10B-converted data blocks of 50 bits to the data stream generator 332.

Figure 29:
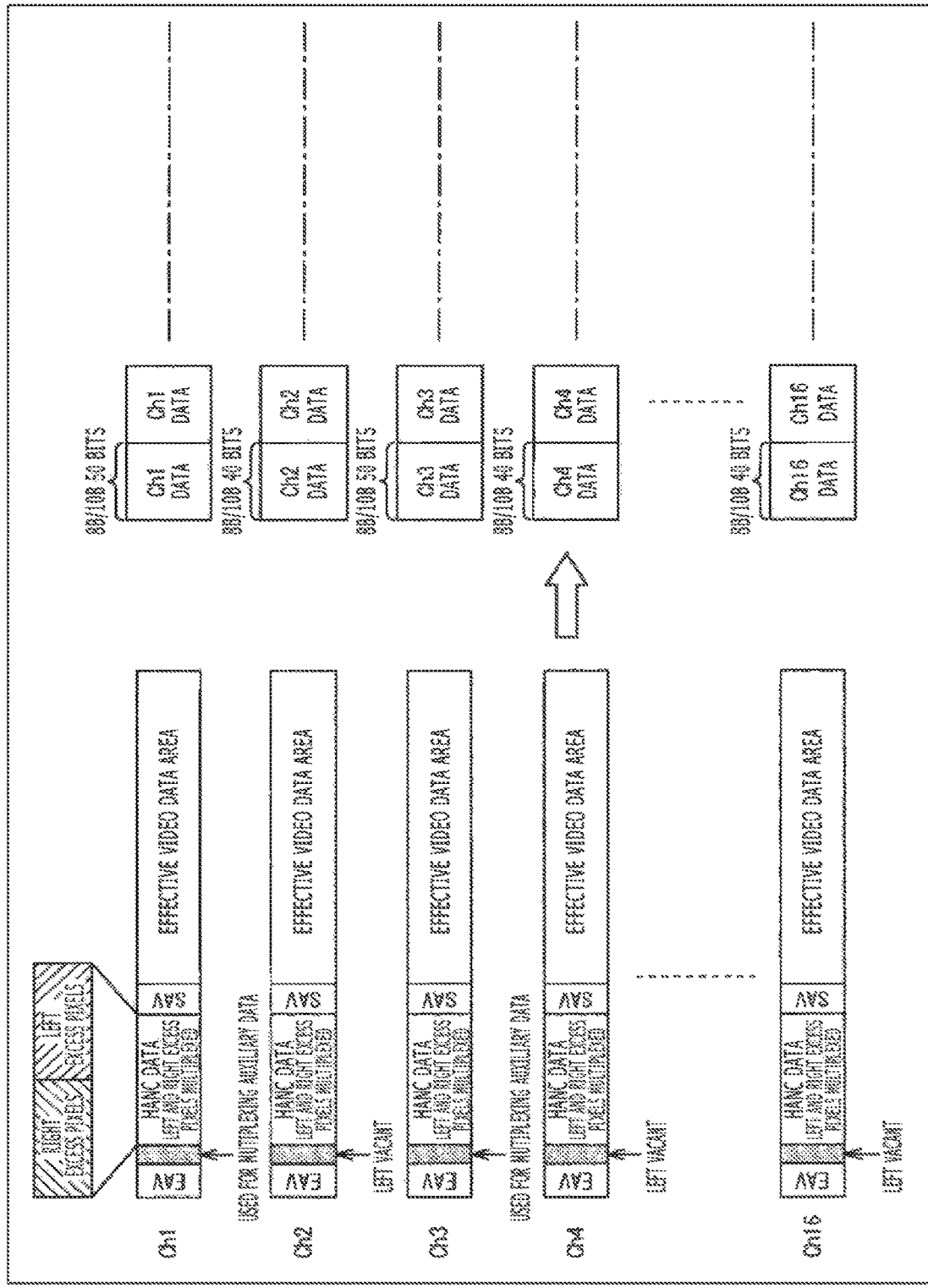
FIG. 29 is a diagram illustrative of a first example of a process of multiplexing auxiliary data and excess pixels and a process of generating data blocks in the video signal sending process according to the second embodiment.
Figure 30:
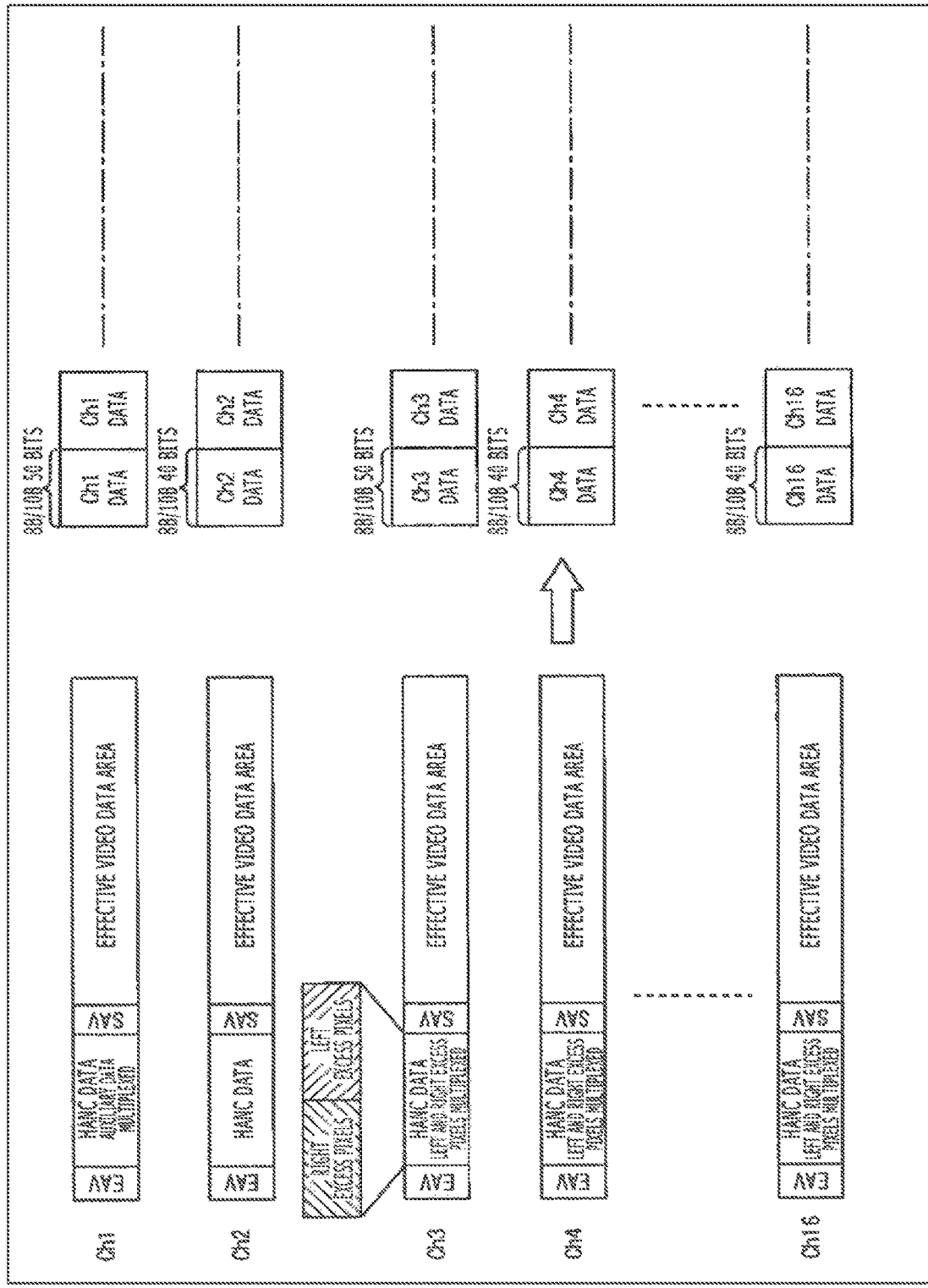
FIG. 30 is a diagram illustrative of a second example of a process of multiplexing auxiliary data and excess pixels and a process of generating data blocks in the video signal sending process according to the second embodiment

Incidentally, as depicted on the right sides of FIGS. 29 and 30, HD-SDI of other odd-numbered channels input to the multiplexer 311-1 is similarly 8B/10B-converted block by block of 40 bits successively from the beginning of the SAV. Then, 8B/10B-converted data blocks of 50 bits are supplied to the data stream generator 332.

Incidentally, the similar process as with the first embodiment is carried out on HD-SDI of even-numbered channels. Specifically, data of 32 bits are extracted from data blocks of 40 bits successively from the beginning of the SAV of the HD-SDI of even-numbered channels, and 8B/10B-converted. 8B/10B-converted data blocks of 40 bits are then supplied to the data stream generator 332.

In the manner described above, as schematically depicted in FIG. 31, the respective data blocks of 50 bits or 40 bits generated from HD-SDI of channels 1 through 16 are supplied per every four clock pulses to the data stream generator 332. Thus, as illustrated by a model depicted in FIG. 32, a process of supplying data of 180 bits/samples per clock pulse to the data stream generator 332 is essentially repeated in periodic cycles of four clock pulses. Therefore, essentially a data stream of 180 bits×148.5 MHz is supplied to the data stream generator 332.

Incidentally, the multiplexers 311-2 through 311-4 also perform the similar process. Specifically, of the HD-SDI of 16 channels input to the respective multiplexers 311, the HD-SDI of odd-numbered channels is 8B/10B-converted block by block of 40 bits successively from the beginning of the SAV. Then, respective 8B/10B-converted data blocks of 50 bits are supplied to the data stream generator 332. Further, Data of 32 bits are extracted from data blocks of 40 bits successively from the beginning of the SAV of the HD-SDI of even-numbered channels, and 8B/10B-converted. Respective 8B/10B-converted data blocks of 40 bits are then supplied to the data stream generator 332.

Referring back to FIG. 28, in step S103, the multiplexer 311 generates a data stream for transmission.

Specifically, the data stream generator 332 of the multiplexer 311-1 arrays the data blocks supplied from the 8B/10B encoder 154 and the 8B/10B encoder 344 into a predetermined sequence in synchronism with a clock signal of 167.0625 MHz, and extracts data in every 160 bits therefrom. The data stream generator 332 then generates parallel data whose word length is 160 bits from the extracted data, and outputs the generated parallel data to the P/S converter 134.

In this manner, a data stream for transmission with the HD-SDI of channels 1 through 16 multiplexed thereinto is generated and supplied to P/S converter 134. Furthermore, the bit rate of the data stream is changed from 180 bits× 148.5 MHz to 160 bits×167.0625 MHz.

At this time, in addition, the data stream generator 332 replaces the data of two words or more (20 bits or more) at the beginning which starts with SAV on each line of HD-SDI of channel 1 with K28.5 or the like which is a comma character of an 8B/10B code. The replaced data are used as a synchronizing signal of the data stream for transmission.

Furthermore, the respective data stream generators 332 of the multiplexers 311-2 through 311-4 also perform the similar process as the data stream generator 332 of the multiplexer 311-1, generating data streams for transmission and supplying them to the P/S converter 134.

Incidentally, the data of two words or more at the beginning which starts with SAV on each line of HD-SDI of channels 17, 33 and 49 are replaced with K28.5 or the like which is a comma character of an 8B/10B code as with HD-SDI of channel 1.

In step S104, data streams for transmission of four lanes are sent in the similar manner as the processing of step S4 depicted in FIG. 10.

Video Signal Receiving Process According to the Second Embodiment

Figure 33:
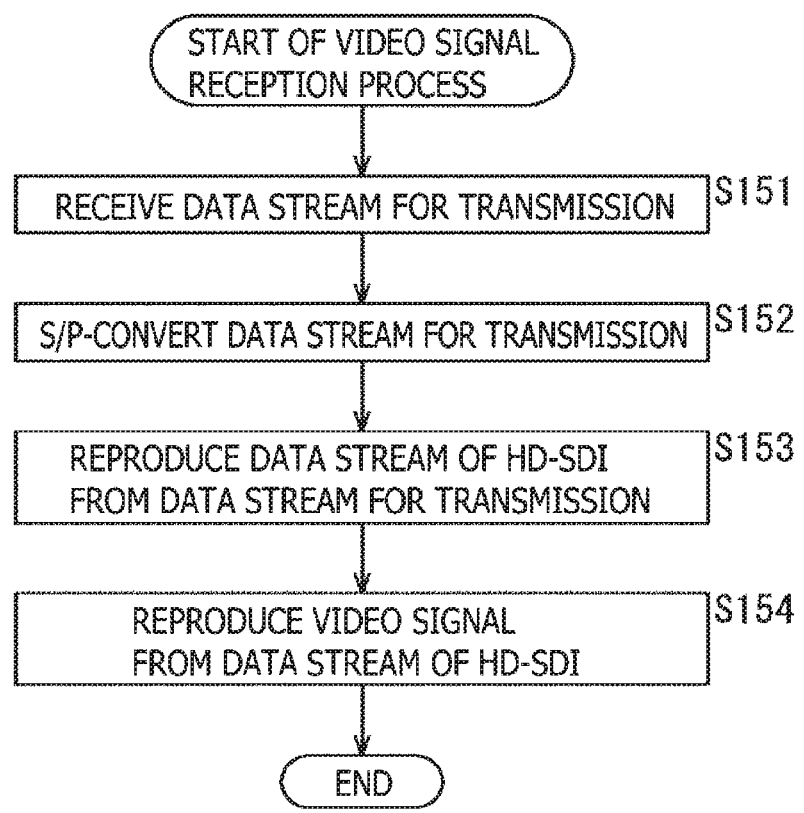
FIG. 33 is a flowchart illustrative of a video signal receiving process according to the second embodiment.

Next, a video signal receiving process that is carried out by the CCU 12b in a manner corresponding to the video signal sending process depicted in FIG. 28 will be described below with reference to a flowchart depicted in FIG. 33.

Figure 24:
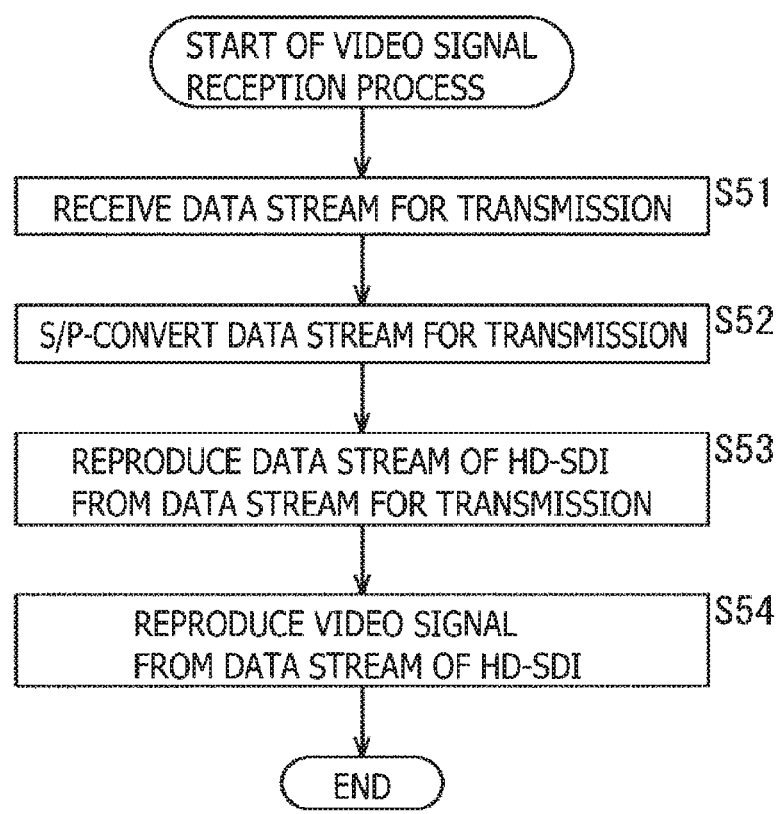
FIG. 24 is a flowchart illustrative of a video signal receiving process according to the first embodiment.

In step S151, data streams for transmission of four lanes are received in the similar manner as the processing of step S51 depicted in FIG. 24.

In step S152, the data streams for transmission of four lanes are S/P-converted in the similar manner as the processing of step S52 depicted in FIG. 24.

In step S153, the word synchronization detector/data stream reproducer 411 reproduces data streams of HD-SDI from the data streams for transmission. Specifically, the word synchronization detector/data stream reproducer 411 detects word synchronization signals multiplexed in the data streams for transmission of four lanes and acquires word synchronization of the data streams for transmission. Then, the word synchronization detector/data stream reproducer 411 reproduces HD-SDI of 64 channels from the data streams for transmission of four lanes according to a process that is a reversal of the process carried out by the multiplexer 311 of the broadcasting camera 11b. The word synchronization detector/data stream reproducer 411 supplies the reproduced HD-SDI of 64 channels to the video reproducer 213.

In step S154, the original 8K signal is reproduced from the HD-SDI of 64 channels in the similar manner as the processing of step S54 depicted in FIG. 24.

In the manner described above, a video signal of 7680× 4320/50P-60P/4:4:4/10 bits, 12 bits, 7680×4320/50P-60P/ 4:2:2:/12 bits, 8192×4320/48P-60P/4:4:4/10 bits, 12 bits, or 8192×4320/48P-60P/4:2:2/12 bits can be transmitted on data streams for transmission of four lanes through the 100-GbE device according to a process different from the process of the first embodiment.

5. Third Embodiment

A third embodiment of the present technology will next be described with reference to FIGS. 34 through 43.

According to the third embodiment, an 8K signal of 48P-60P is transmitted using a 100-GbE device. 8K signals of 48P-60P include video signals of 7680×4320/50P-60P/4: 2:2:/10 bits and 8192×4320/48P-60P/4:2:2/10 bits.

Configurational Example of Broadcasting Camera 11c

Figure 34:
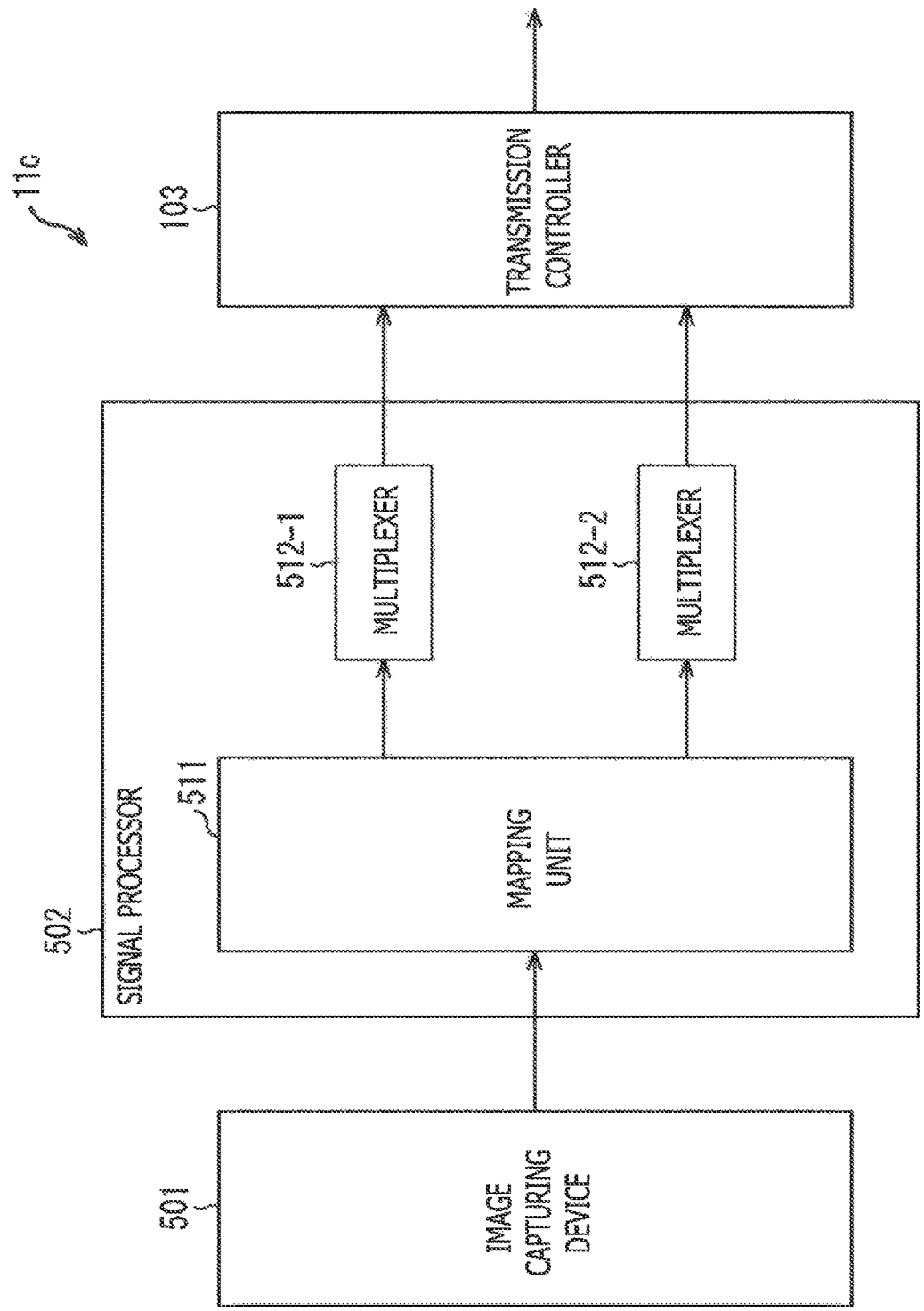
FIG. 34 is a block diagram depicting a configurational example of the functions of a broadcasting camera according to a third embodiment.

FIG. 34 is a block diagram depicting a configurational example of the functions of a broadcasting camera 11c as a form in which the broadcasting camera 11 according to the third embodiment is reduced to practice. It should be noted that those parts in FIG. 34 which correspond to those of the broadcasting camera 11b depicted in FIG. 25 are denoted by identical reference characters, and the description of parts that carry out the same processing sequences will be omitted accordingly as it is repetitive.

The broadcasting camera 11c is different from the broadcasting camera 11b in that an image capturing device 501 and a signal processor 502 are provided in place of the image capturing device 101 and the signal processor 301. The signal processor 502 is arranged to include a mapping unit 511 and multiplexers 512-1 and 512-2.

The image capturing device 501 includes a CMOS image sensor, a CCD image sensor, or the like, for example. The image capturing device 501 supplies the mapping unit 511 of the signal processor 502 with a video signal obtained as a result of an image capturing process. The video signal includes a video signal of 7680×4320/50P-60P/4:2:2/10 bits or 8192×4320/48P-60P/4:2:2/10 bits, for example.

The mapping unit 511 generates HD-SDI of 32 channels onto which the video signal supplied from the image capturing device 501 has been mapped, as described later. Then, the mapping unit 511 supplies the HD-SDI of channels 1 through 16 to the multiplexer 512-1 and supplies the HD-SDI of channels 17 through 32 to the multiplexer 512-2.

The multiplexers 512-1 and 512-2 perform channel coding on the HD-SDI of 16 channels supplied from the mapping unit 511 respectively thereto, thereby multiplexing them to generate data streams for transmission, as described later. Then, the multiplexers 512-1 and 512-2 supply the generated data streams for transmission to the transmission controller 103.

Incidentally, in case the multiplexers 512-1 and 512-2 do not need to be individually distinguished hereinbelow, they are simply referred to as a multiplexer 512.

Configurational Example of Multiplexer 512

Figure 35:
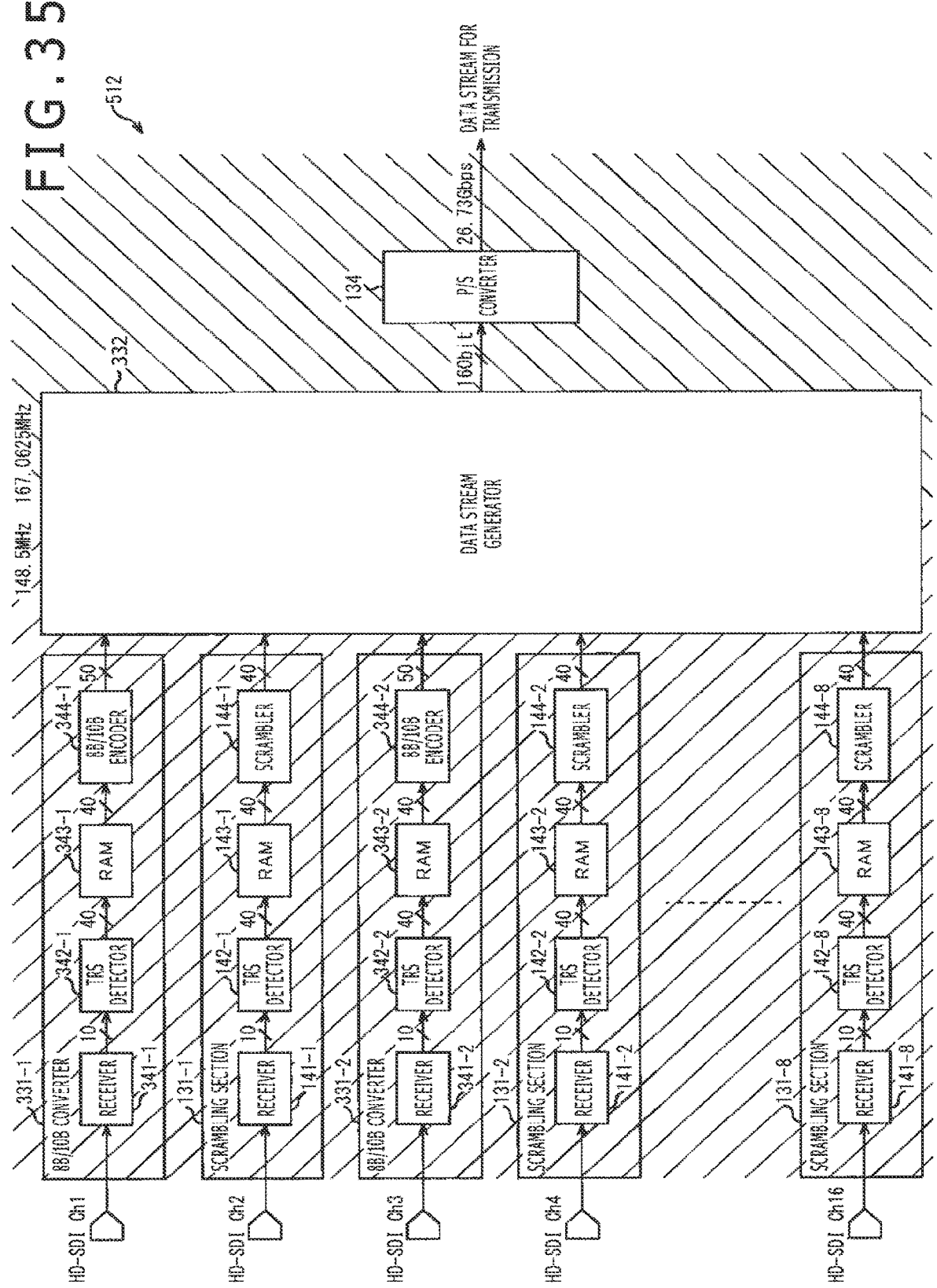
FIG. 35 is a block diagram depicting a configurational example of the functions of a multiplexer of the broadcasting camera according to the third embodiment.

FIG. 35 is a block diagram depicting a configurational example of the functions of the multiplexer 512. It should be noted that those parts in FIG. 35 which correspond to those of the multiplexer 112 depicted in FIG. 6 and the multiplexer 311 depicted in FIG. 26 are denoted by identical reference characters, and the description of parts that carry out the same processing sequences will be omitted accordingly.

The multiplexer 512 is different from the multiplexer 311 in that scrambling units 131-1 through 131-8 are provided in place of the 8B/10B converters 132-1 through 132-8.

Consequently, the multiplexer 512 8B/10B-converts HD-SDI of odd-numbered channels 40 bits by 40 bits in the similar manner as the multiplexer 311 8B/10B-converts HD-SDI of odd-numbered channels. The multiplexer 512 also scrambles HD-SDI of even-numbered channels 40 bits by 40 bits in the similar manner as the multiplexer 112 scrambles HD-SDI of odd-numbered channels.

Configurational Example of CCU 12c

Figure 36:
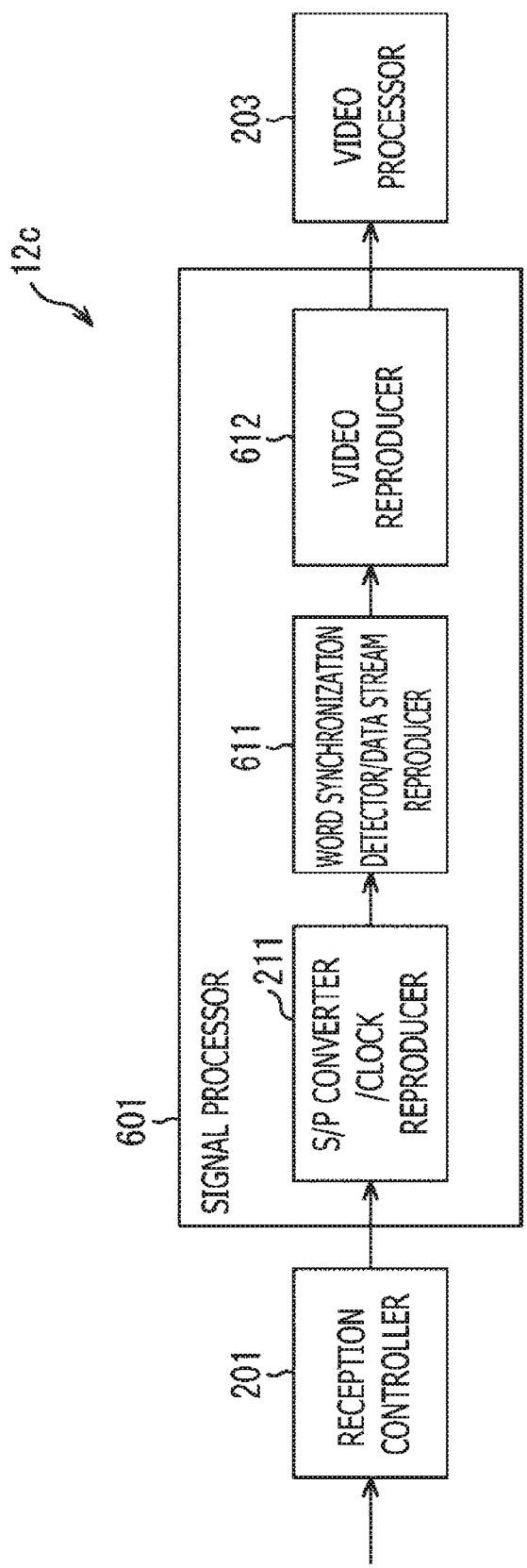
FIG. 36 is a block diagram depicting a configurational example of the functions of a CCU according to the third embodiment.

FIG. 36 is a block diagram depicting a configurational example of the functions of a CCU 12c as a form in which the CCU 12 according to the third embodiment is reduced to practice. It should be noted that those parts in FIG. 36 which correspond to those of the CCU 12b depicted in FIG. 27 are denoted by identical reference characters, and the description of parts that carry out the same processing sequences will be omitted accordingly as it is repetitive.

The CCU 12c is different from the CCU 12b in that a signal processor 601 is provided in place of the signal processor 401. The signal processor 601 is different from the signal processor 401 in that a word synchronization detector/data stream reproducer 611 and a video reproducer 612 are provided in place of the word synchronization detector/data stream reproducer 411 and the video reproducer 213.

The word synchronization detector/data stream reproducer 611 is supplied with an S/P-converted data stream for transmission from the S/P converter/clock reproducer 211. Then, the word synchronization detector/data stream reproducer 611 detects a word synchronization signal from the data stream for transmission and acquires word synchronization of the data stream for transmission. Further, the word synchronization detector/data stream reproducer 611 also reproduces data streams of HD-SDI of 32 channels from the data stream for transmission according to a process that is a reversal of the process carried out by the multiplexer 512 of the broadcasting camera 11c, and supplies the reproduced data stream to the video reproducer 612.

The video reproducer 612 reproduces the original 8K signal from the HD-SDI of 32 channels according to a process that is a reversal of the process of the mapping unit 511 of the broadcasting camera 11c, and supplies the reproduced 8K signal to the video processor 203.

Video Signal Sending Process According to the Third Embodiment

Figure 37:
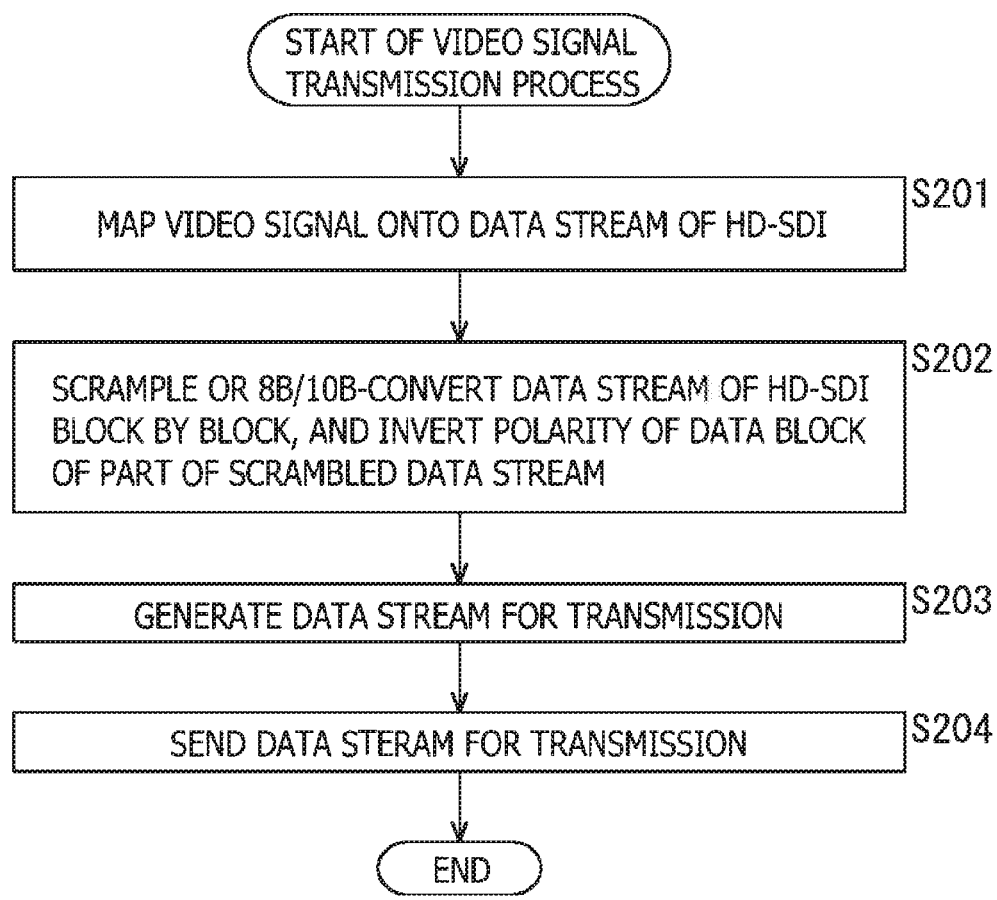
FIG. 37 is a flowchart illustrative of a video signal sending process according to the third embodiment

Next, a video signal sending process that is carried out by the broadcasting camera 11c in the third embodiment will be described with reference to a flowchart depicted in FIG. 37.

In step S201, the mapping unit 511 of the signal processor 502 maps a video signal onto data streams of HD-SDI. Specifically, the mapping unit 511 maps an 8K signal onto HD-SDI of 32 channels. A specific example of a process of mapping an 8K signal onto HD-SDI of 32 channels will hereinafter be described with reference to FIG. 14 referred to above.

According to the third embodiment, unlike the first and second embodiments, an interlaced video signal generated by line decimation on each subimage is mapped onto only HD-SDI of link A (referred to as a basic stream in FIG. 14), without using link B. Therefore, HD-SDI of a total of 32 channels is generated from an 8K signal.

Furthermore, the third embodiment is different from the first and second embodiments with respect to processes of multiplexing auxiliary data and extra pixels.
(First Process of Multiplexing Auxiliary Data and Extra Pixels)

Figure 38:
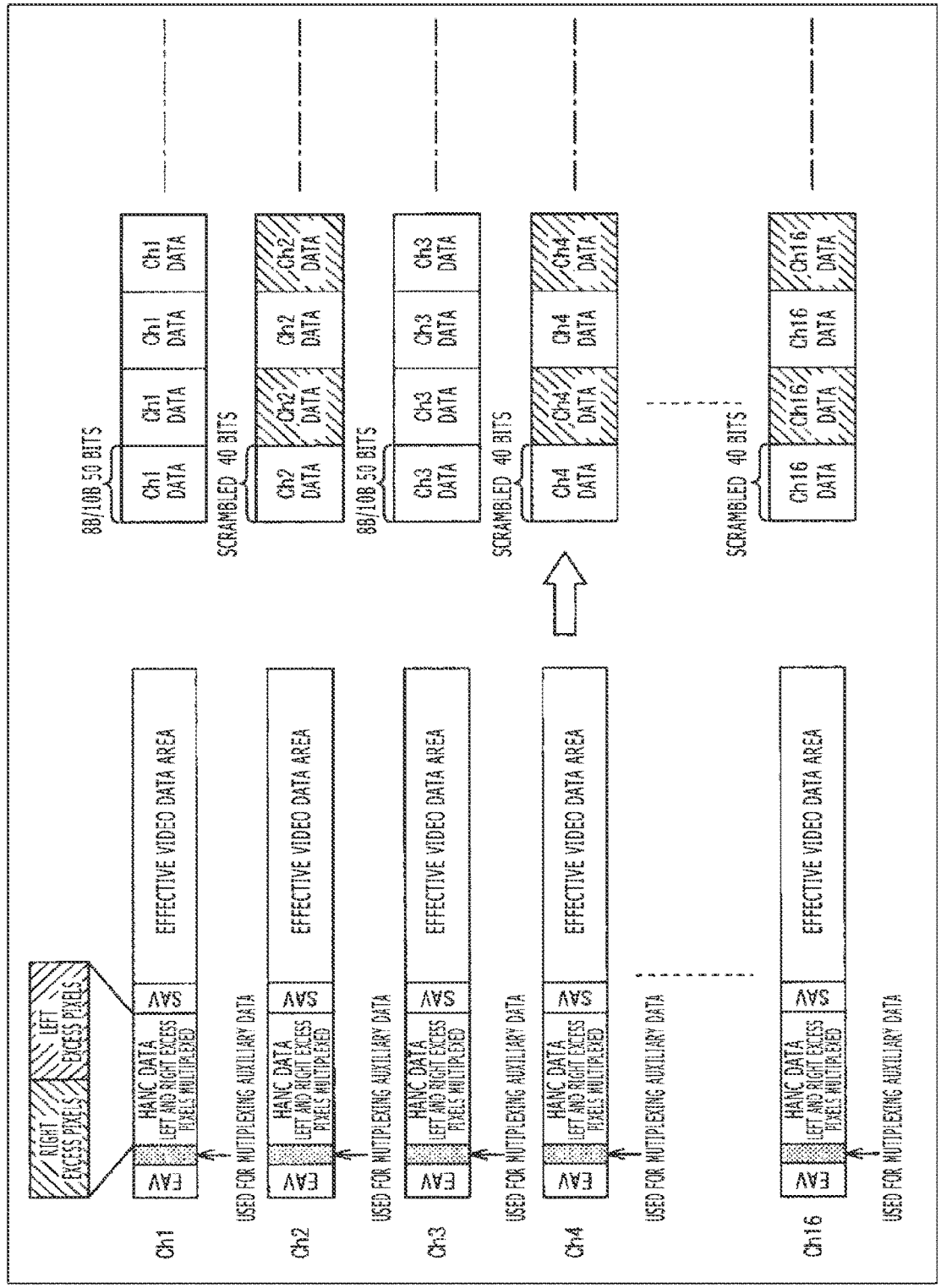
FIG. 38 is a diagram illustrative of a first example of a process of multiplexing auxiliary data and excess pixels and a process of generating data blocks in the video signal sending process according to the third embodiment

A figure on the left side of FIG. 38 depicts a first process of multiplexing auxiliary data and extra pixels. Incidentally, although FIG. 38 depicts only HD-SDI of channels 1 through 16 supplied from the mapping unit 511 to the multiplexer 512-1, auxiliary data and extra pixels are multiplexed into HD-SDI of remaining channels 17 through 32 by the similar process.

The first multiplexing process according to the third embodiment is different from the first multiplexing process according to the first embodiment as to channels of HD-SDI into which auxiliary data are multiplexed.

Specifically, in the first multiplexing process according to the first embodiment depicted in FIG. 16, auxiliary data multiplexing areas of odd-numbered channels are used whereas auxiliary data multiplexing areas of even-numbered channels are not used. According to the third embodiment, on the other hand, as described later, when a data stream for transmission is generated, both HD-SDI of odd-numbered channels and HD-SDI of even-numbered channels are 8B/10B-converted and scrambled using all bits of each word. Therefore, according to the third embodiment, it is possible to use both auxiliary data multiplexing areas of odd-numbered channels and even-numbered channels.

Accordingly, in the first multiplexing process according to the third embodiment, auxiliary data are multiplexed into all the auxiliary data multiplexing areas of HD-SDI of 32 channels. A maximum of 32 audio packets can thus be multiplexed into HD-SDI of 32 channels.

Consequently, as with the first multiplexing process according to the first embodiment, 32 kHz-, 44.1 kHz-, or 48 kHz-sampled audio signals of a maximum of 64 channels can be multiplexed and transmitted. Moreover, 96 kHz-sampled audio signals of a maximum of 32 channels can be multiplexed and transmitted.

Incidentally, the extra pixel multiplexing area relative ratio is of the same value as with the first multiplexing process according to the first embodiment.
(Second Process of Multiplexing Auxiliary Data and Extra Pixels)

Figure 39:
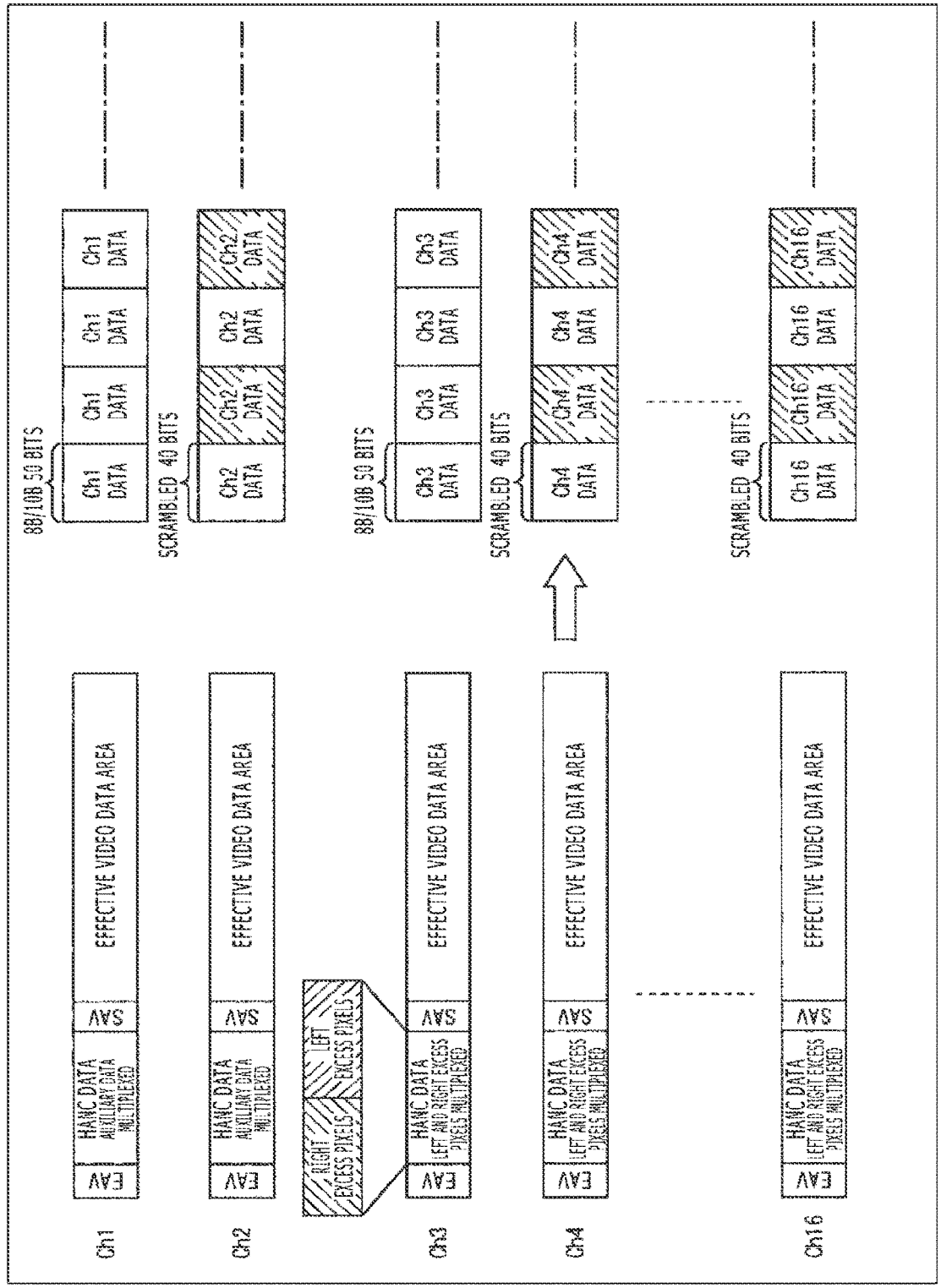
FIG. 39 is a diagram illustrative of a second example of a process of multiplexing auxiliary data and excess pixels and a process of generating data blocks in the video signal sending process according to the third embodiment.
Figure 41:
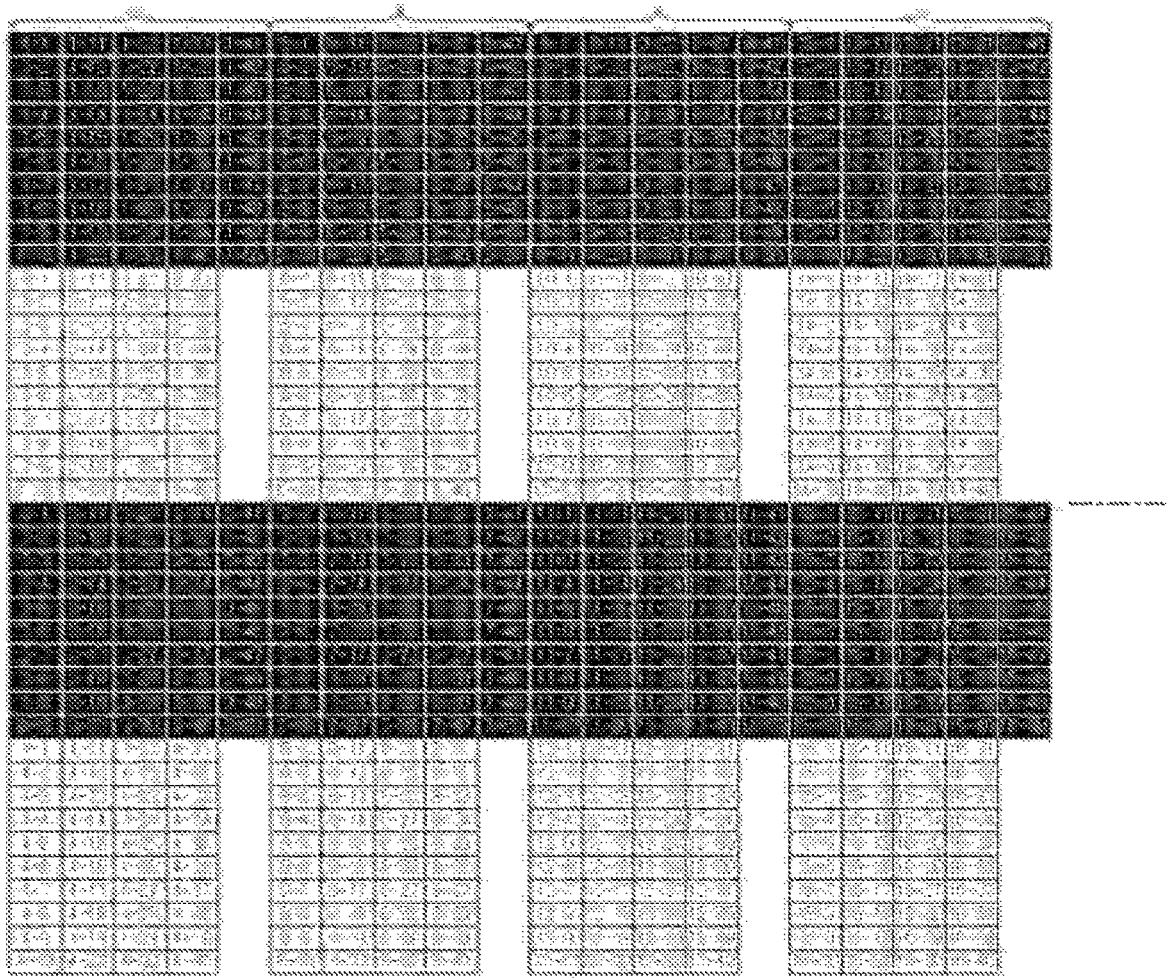
FIG. 41 is a diagram depicting an example of data blocks generated from HD-SDI in the video signal sending process according to the third embodiment.

A figure on the left side of FIG. 39 depicts a second process of multiplexing auxiliary data and extra pixels. The second multiplexing process is used when the multiplexing of audio signals is prioritized or when it is not necessary to multiplex the data of pixel samples in the left and right extra pixel areas, for example.

Incidentally, although FIG. 39 depicts only HD-SDI of channels 1 through 16 supplied from the mapping unit 511 to the multiplexer 512-1, auxiliary data and extra pixels are multiplexed into HD-SDI of remaining channels 17 through 32 by the similar process.

The second multiplexing process according to the third embodiment is different from the second multiplexing process according to the first embodiment as to channels of HD-SDI into which auxiliary data are multiplexed.

Specifically, in the second multiplexing process according to the first embodiment depicted in FIG. 17, auxiliary data are multiplexed into the horizontal auxiliary data areas of HD-SDI of channels 1, 17, 33 and 49. In the second multiplexing process according to the third embodiment, on the other hand, auxiliary data are multiplexed into the horizontal auxiliary data areas of HD-SDI of channels 1, 2, 17 and 18.

At this time, according to the provisions of SMPTE 299-1, audio data packets are multiplexed up to a maximum of four packets twice into each of the horizontal auxiliary data areas of HD-SDI of channels 1, 2, 17 and 18. In this manner, a maximum of 32 audio data packets can be multiplexed into HD-SDI of 32 channels.

Therefore, as with the second multiplexing process according to the first embodiment, 32 kHz-, 44.1 kHz-, or 48 kHz-sampled audio signals of a maximum of 64 channels can be multiplexed and transmitted. Moreover, 96 kHz-sampled audio signals of a maximum of 32 channels can be multiplexed and transmitted.

Incidentally, if the effective video data area of HD-SDI is of 2048 samples, then 32 kHz-, 44.1 kHz-, or 48 kHz-sampled audio signals of a maximum of 32 channels can be multiplexed and transmitted. Moreover, 96 kHz-sampled audio signals of a maximum of 16 channels can be multiplexed and transmitted.

Further, the extra pixel multiplexing area relative ratio is of values indicated by the equations (11) through (15) below. It should be noted that the equation (11) represents a ratio in case a video signal of 7680×4320/60P is transmitted, and the equation (12) represents a ratio in case a video signal of 7680×4320/50P is transmitted. The equation (13) represents a ratio in case a video signal of 8192×4320/60P is transmitted, the equation (14) represents a ratio in case a video signal of 8192×4320/50P is transmitted, and the equation (15) represents a ratio in case a video signal of 8192×4320/24P is transmitted.

$$(2200-1920-12) \times 28 \div 32 \div 1920 = 0.122 = 12.2\% \quad (11)$$

$$(2640-1920-12) \times 28 \div 32 \div 1920 = 0.323 = 32.3\% \quad (12)$$

$$(2200-2048-12) \times 28 \div 32 \pm 2048 = 0.059 = 5.9\% \quad (13)$$

$$(2640-2048-12) \times 28 \div 32 \div 2048 = 0.248 = 24.8\% \quad (14)$$

$$(2750-2048-12) \times 28 \div 32 \div 2048 = 0.295 = 29.5\% \quad (15)$$

As a result, the extra pixel multiplexing area relative ratio is of the same values as those of the second multiplexing process according to the first embodiment.

An 8K signal is mapped onto HD-SDI of 32 channels in the manner described above. Incidentally, the processes of mapping an 8K signal, as described above, are illustrated by way of example, and an 8K signal may be mapped onto HD-SDI of 32 channels according to other processes.

Then, the mapping unit 511 supplies HD-SDI of channels 1 through 16 to the multiplexer 512-1 and supplies HD-SDI of channels 17 through 32 to the multiplexer 512-2.

Referring back to FIG. 37, in step S202, the multiplexer 512 scrambles or 8B/10B-converts the data streams of HD-SDI block by block, and inverts the polarity of the data blocks of part of the scrambled data stream.

Specifically, the similar process as the process performed on HD-SDI of odd-numbered channels according to the second embodiment is carried out on HD-SDI of odd-numbered channels. Specifically, the data stream is 8B/10B-converted block by block of 40 bits successively from the beginning of the SAV of HD-SDI of odd-numbered channels. Then, 8B/10B-converted data blocks of 50 bits are supplied to the data stream generator 332.

Furthermore, the similar process as the process performed on HD-SDI of even-numbered channels according to the first embodiment is carried out on HD-SDI of even-numbered channels. Specifically, the data stream is scrambled block by block of 40 bits successively from the beginning of the SAV of HD-SDI of even-numbered channels. In addition, as depicted in upper sections on the right sides of FIGS. 38 and 39, the polarity of every other block of the scrambled data blocks is inverted. Then, scrambled data blocks of 40 bits (part of which are data blocks whose polarity is inverted after being scrambled) are supplied to the data stream generator 332.

In the manner described above, as schematically depicted in FIG. 40, the respective data blocks of 50 bits or 40 bits generated from HD-SDI of channels 1 through 16 are supplied per every four clock pulses to the data stream generator 332. As a result, as illustrated by a model depicted in FIG. 41, a process of supplying data of 180 bits/samples per clock pulse to the data stream generator 332 is essentially repeated in periodic cycles of four clock pulses. Therefore, essentially a data stream of 180 bits×148.5 MHz is supplied to the data stream generator 332.

Figure 42:
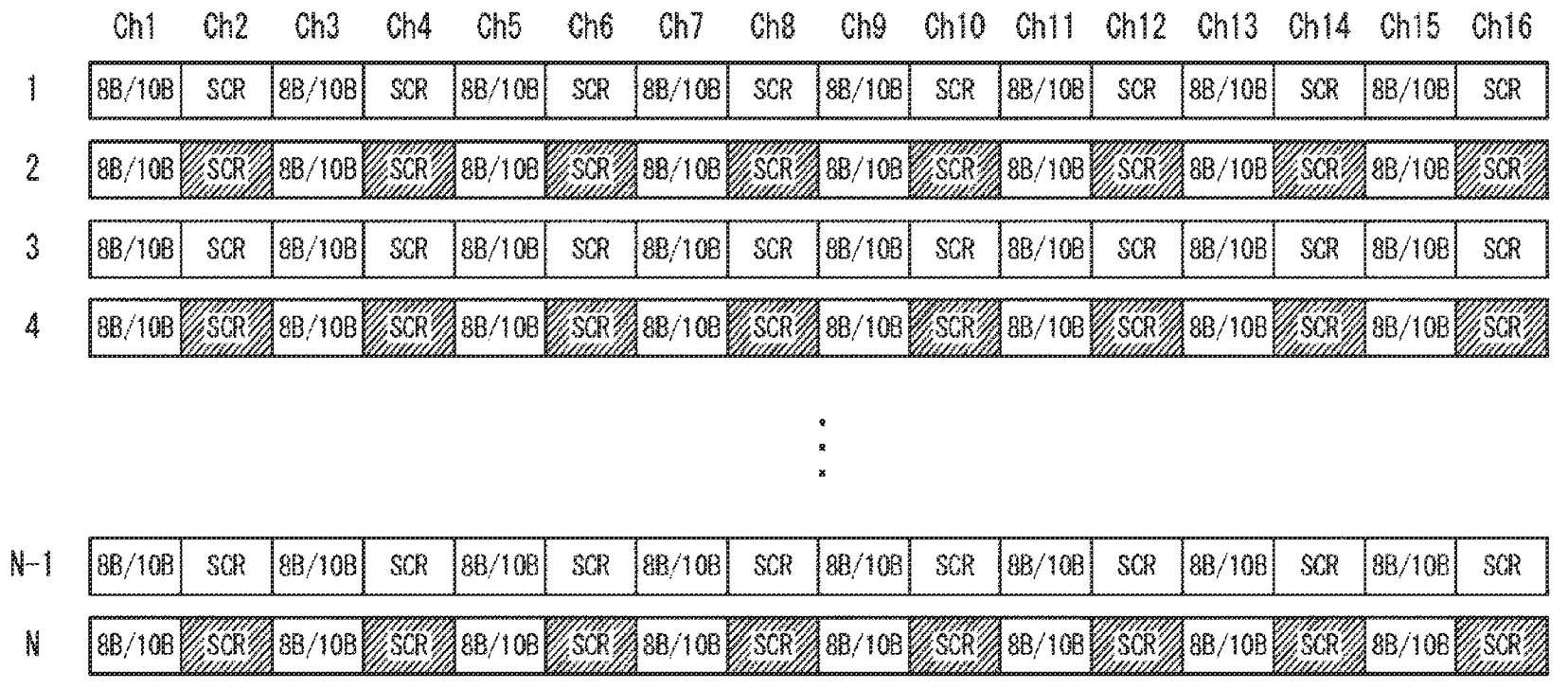

Further, FIG. 42 depicts an example of respective data blocks generated from one line of HD-SDI of each channel in a presentation style similar to FIG. 21.

First, for the first blocks, 8B/10B-converted blocks are generated from HD-SDI of odd-numbered channels, and non-inverted scrambled blocks are generated from HD-SDI of even-numbered channels. For the second blocks, 8B/10B-converted blocks are generated from HD-SDI of odd-numbered channels, and inverted scrambled blocks are generated from HD-SDI of even-numbered channels. For the third blocks, 8B/10B-converted blocks are generated from HD-SDI of odd-numbered channels, and non-inverted scrambled blocks are generated from HD-SDI of even-numbered channels. For the fourth blocks, 8B/10B-converted blocks are generated from HD-SDI of odd-numbered channels, and inverted scrambled blocks are generated from HD-SDI of even-numbered channels. Subsequently, data blocks are generated in the similar order, so that for the Nth blocks (e.g., N=2200), 8B/10B-converted blocks are generated from HD-SDI of odd-numbered channels, and inverted scrambled blocks are generated from HD-SDI of even-numbered channels.

In this manner, 8B/10B-converted blocks are generated in succession from HD-SDI of each odd-numbered channel. Therefore, N 8B/10B-converted blocks are generated from one line of HD-SDI of each odd-numbered channel.

On the other hand, non-inverted scrambled blocks and inverted scrambled blocks are alternately generated from HD-SDI of each even-numbered channel. Therefore, N/2 non-inverted scrambled blocks and N/2 inverted scrambled blocks are generated from one line of HD-SDI of each even-numbered channel.

As with the first embodiment, the polarity of one half of the scrambled data blocks is inverted in the manner described above. Consequently, even if a pathological pattern referred to above frequently appears in the scrambled data blocks, the mark ratio of the data streams for transmission is approximately 1/2, and the data streams for transmission can be transmitted stably without a special DC reproducing circuit or the like.

In step S203, the multiplexer 512 generates a data stream for transmission. At this time, the data stream for transmission is generated in the process similar to step S103 depicted in FIG. 28. Specifically, a data stream for transmission of a first lane is generated from HD-SDI of channels 1 through 16 and supplied to the P/S converter 134.

Then, similarly, a data stream for transmission of a second lane is generated from HD-SDI of channels 17 through 32 and supplied to the P/S converter 134.

In step S204, the data streams for transmission of the two lanes are sent in the process similar to step S4 depicted in FIG. 10.

Video Signal Receiving Process According to the Third Embodiment

Figure 43:
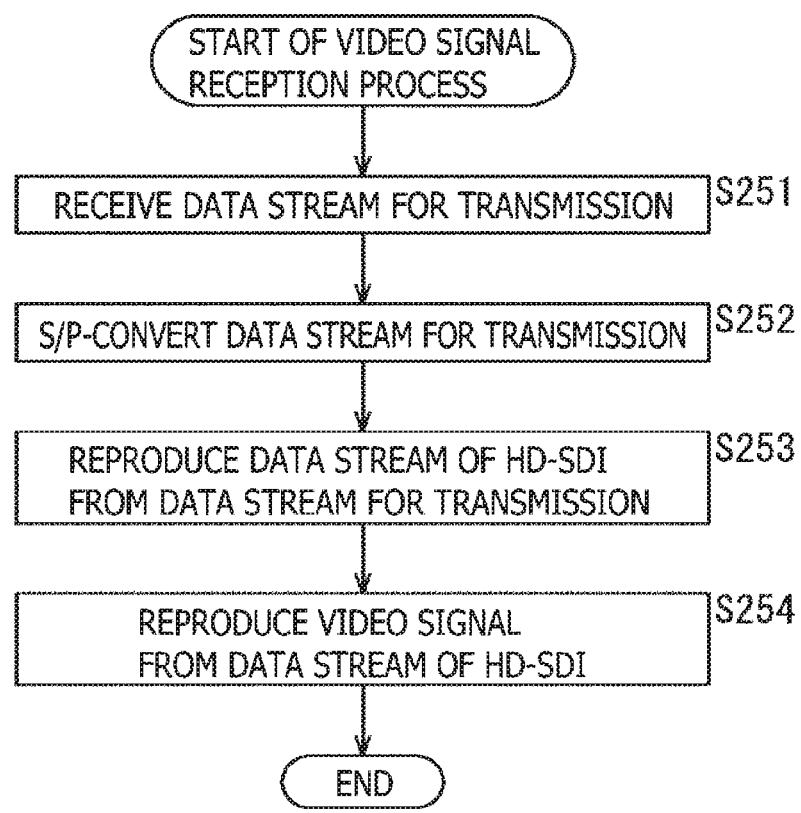
FIG. 43 is a flowchart illustrative of a video signal receiving process according to the third embodiment.

Next, a video signal receiving process that is carried out by the CCU 12*c* will be described below with reference to a flowchart depicted in FIG. 43.

In step S251, data streams for transmission of two lanes are received in the manner similar to the processing of step S51 depicted in FIG. 24.

In step S252, the data streams for transmission of two lanes are S/P-converted in the manner similar to the processing of step S52 depicted in FIG. 24.

In step S253, the word synchronization detector/data stream reproducer 611 reproduces data streams of HD-SDI from the data streams for transmission. Specifically, the word synchronization detector/data stream reproducer 611 detects word synchronization signals multiplexed in the data streams for transmission of two lanes and acquires word synchronization of the data streams for transmission. Then, the word synchronization detector/data stream reproducer 611 reproduces HD-SDI of 32 channels from the data streams for transmission of two lanes according to a process that is a reversal of the process carried out by the multiplexer 512 of the broadcasting camera 11c. The word synchronization detector/data stream reproducer 611 supplies the reproduced HD-SDI of 32 channels to the video reproducer 612.

In step S254, the video reproducer 612 reproduces video signals from the data streams of HD-SDI. Specifically, the video reproducer 612 reproduces the original 8K signal from the HD-SDI of 32 channels according to a process that is a reversal of the process carried out by the mapping unit 511 of the broadcasting camera 11c. The video reproducer 213 supplies the reproduced 8K signal to the video processor 203.

In the manner described above, video signals of 7680×4320/50P-60P/4:2:2/10 bits and 8192×4320/48P-60P/4:2:2/10 bits can be transmitted on data streams for transmission of two lanes through the 100-GbE device.

6. Fourth Embodiment

A fourth embodiment of the present technology will next be described with reference to FIGS. 44 and 45.

According to the fourth embodiment, an 8K signal of 96P-120P is transmitted using a 100-GbE device. Specifically, according to the fourth embodiment, an 8K signal whose frame rate is twice the 8K signals in the first through third embodiments is transmitted. 8K signals of 96P-120P include video signals of 7680×4320/100P-120P/4:4:4, 4:2:2/10 bits, 12 bits and 8192×4320/96P-120P/4:4:4, 4:2:2/10 bits, 12 bits.

The fourth embodiment is different from the first through third embodiments as to a process of mapping a 4K signal onto subimages after the 4K signal has been generated from an 8K signal.

Figure 44:
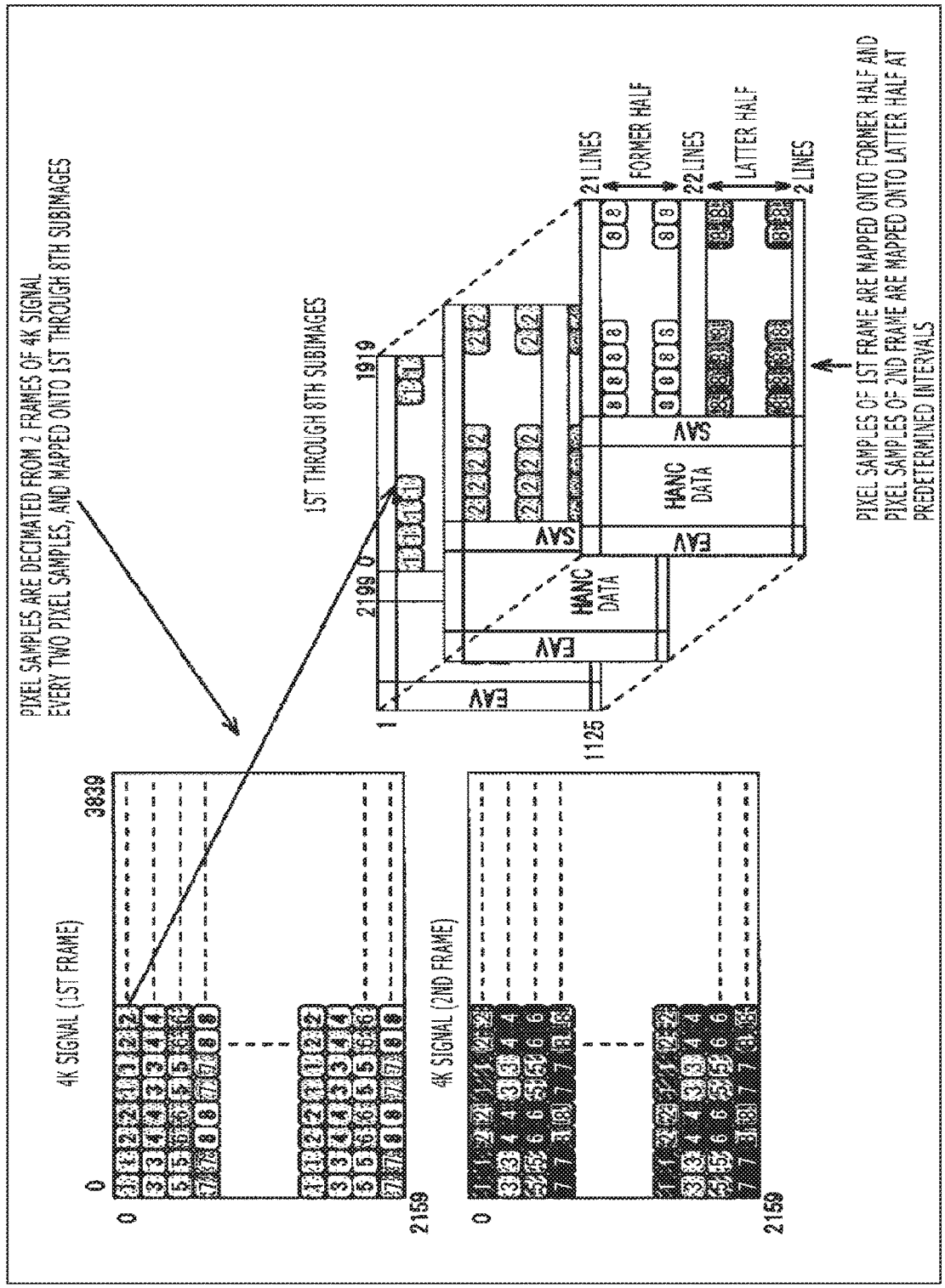
FIG. 44 is a diagram illustrative of a second process of mapping a 4K video signal onto subimages.

Specifically, as depicted in FIG. 44, 4K signals of successive two frames is mapped onto first through eighth subimages. Specifically, every other pair of two adjacent pixel samples on each line at the intervals of four lines are decimated from first and second 4K signals of the successive two frames (two frames by two frames), and mapped onto first through eighth subimages.

Incidentally, in FIG. 44, vertical auxiliary data areas and horizontal auxiliary data areas of the 4K signals are omitted from illustration for making the illustration easier to understand. Further, FIG. 44 depicts an example in which the 4K signals has 3840 samples thereacross.

It should be noted that, in FIG. 44, the sample number and the line number of the 4K signals shall start from 0. Therefore, the effective pixel areas of the 4K signals contain a total of 3840 samples from sample 0 to sample 3839 and a total of 2160 lines from line 0 to line 2159. In FIG. 44, on the other hand, the sample number of the subimages shall start from 0 and the line number thereof shall start from line 1. Therefore, the subimages contain a total of 2200 samples from sample 0 to sample 2199 and a total of lines 1125 from line 1 to line 1125. However, the number of samples per line of the subimages is by way of example and varies depending on the system of video signals.

Details of a process of mapping pixel samples from the first and second 4K signals onto the first through eighth subimages will hereinafter be described also with reference to FIG. 45.

Figure 45:
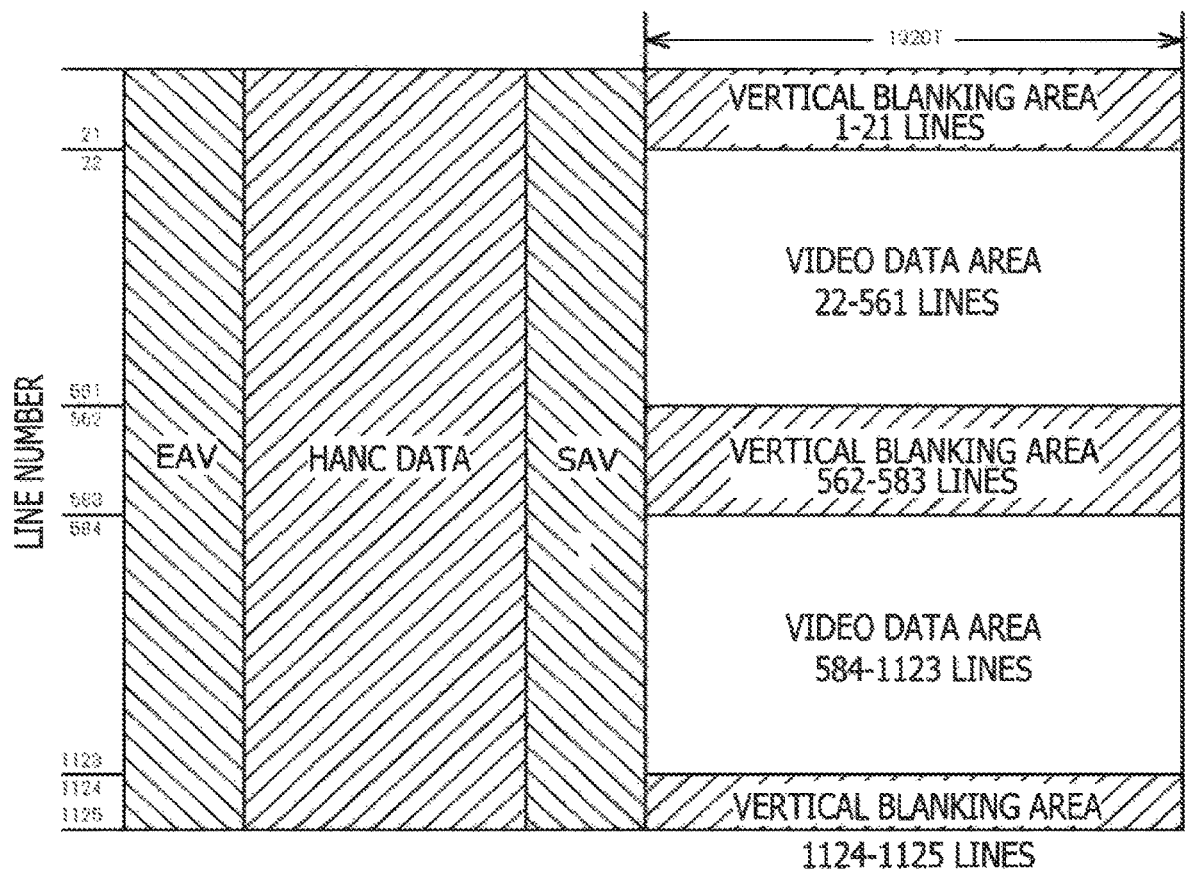
FIG. 45 is a diagram depicting an example of a format of subimages.

FIG. 45 depicts an example of a format of each subimage. The format is substantially the same as the format of a 1920×1080/50P-60P signal prescribed by SMPTE 274M. However, the layout of vertical blanking areas and video data areas is different.

First, a vertical blanking area is provided in a 21-line area from the first line at the beginning of the first through eighth subimages to the 21st line thereof.

Next, pixel samples including the (4i+2j)th sample and the (4i+2j+1)th sample (i=0 through 959, j=0 through 1) on the (4g+h)th line (g=0 through 539, h=0 through 3) of the first 4K signal are mapped onto the 2ith sample and the (2i+1)th sample on the (g+22)th line of the (2h+j+1)th subimage.

Then, a vertical blanking area is provided in a 22-line area from the 562th line to the 583th line of the first through eighth subimages. It should be noted that this vertical blanking area may not be provided, but may be omitted.

Next, pixel samples including the (4i+2j)th sample and the (4i+2j+1)th sample (i=0 through 959, j=0 through 1) on the (4g+h)th line (g=0 through 539, h=0 through 3) of the second 4K signal are mapped onto the 2ith sample and the (2i+1)th sample on the (g+584)th line of the (2h+j+1)th subimage.

Furthermore, a vertical blanking area is provided in a 2-line area from the 1124th line to the 1125th line of the first through eighth subimages.

As described above, every other pair of two adjacent pixel samples on each line at the intervals of four lines are decimated from the 4K signals of the successive two frames, and mapped onto first through eighth subimages. First through 32nd subimages are thus generated from 8K signals of successive two frames.

Further, the process similar to the processes according to the first through third embodiment is carried out on each of the subimages to generate a data stream for transmission, which can be transmitted through the 100-GbE device.

Specifically, for transmitting a video signal of 7680×4320/100P-120P/4:4:4/10 bits, 12 bits, 7680×4320/100P-120P/4:2:2/12 bits, 8192×4320/96P-120P/4:4:4/10 bits, 12 bits, or 8192×4320/96P-120P/4:2:2/12 bits, for example, first through 32nd subimages are generated from 8K signals of two frames by using the process illustrated in FIGS. 44 and 45.

Further, the process similar to the process according to the first embodiment or the second embodiment is performed on the first through 32nd subimages to generate HD-SDI of 128 channels. Moreover, the process similar to the process according to the first embodiment or the second embodiment is performed to generate data streams for transmission of eight lanes from HD-SDI of 128 channels. Then, the 8K signals of the successive two frames can be transmitted on the data streams for transmission of eight lanes through the 100-GbE device.

At this time, since the optical fibers 271-1 and 271-2 depicted in FIG. 9 can transmit respective data streams for transmission of four lanes, the generated data streams for transmission of eight lanes can be transmitted through the single optical fiber cable 13.

On the other hand, for transmitting a video signal of 7680×4320 or 8192×4320/100P-120P/4:2:2/10 bits, first through 32nd subimages are generated from 8K signals of two frames by using the process illustrated in FIGS. 44 and 45.

Then, the process similar to the process according to the third embodiment is performed on the first through 32nd subimages to generate HD-SDI of 64 channels. Moreover, the process similar to the process according to the third embodiment is performed to generate data streams for transmission of four lanes from HD-SDI of 64 channels. Then, the 8K signals of the successive two frames can be transmitted on the data streams for transmission of four lanes through the 100-GbE device.

7. Fifth Embodiment

A fifth embodiment of the present technology will next be described with reference to FIGS. 46 through 53.

According to the fifth embodiment, a 4K RAW signal of 48P-60P is transmitted using a 100-GbE device. 4K RAW signals of 48P-60P include RAW signals of 3840×2160/50P-60P/4:4:4/16 bits and 4096×2160/48P-60P/4:4:4/16 bits.

Configurational Example of Broadcasting Camera 11*d*

Figure 46:
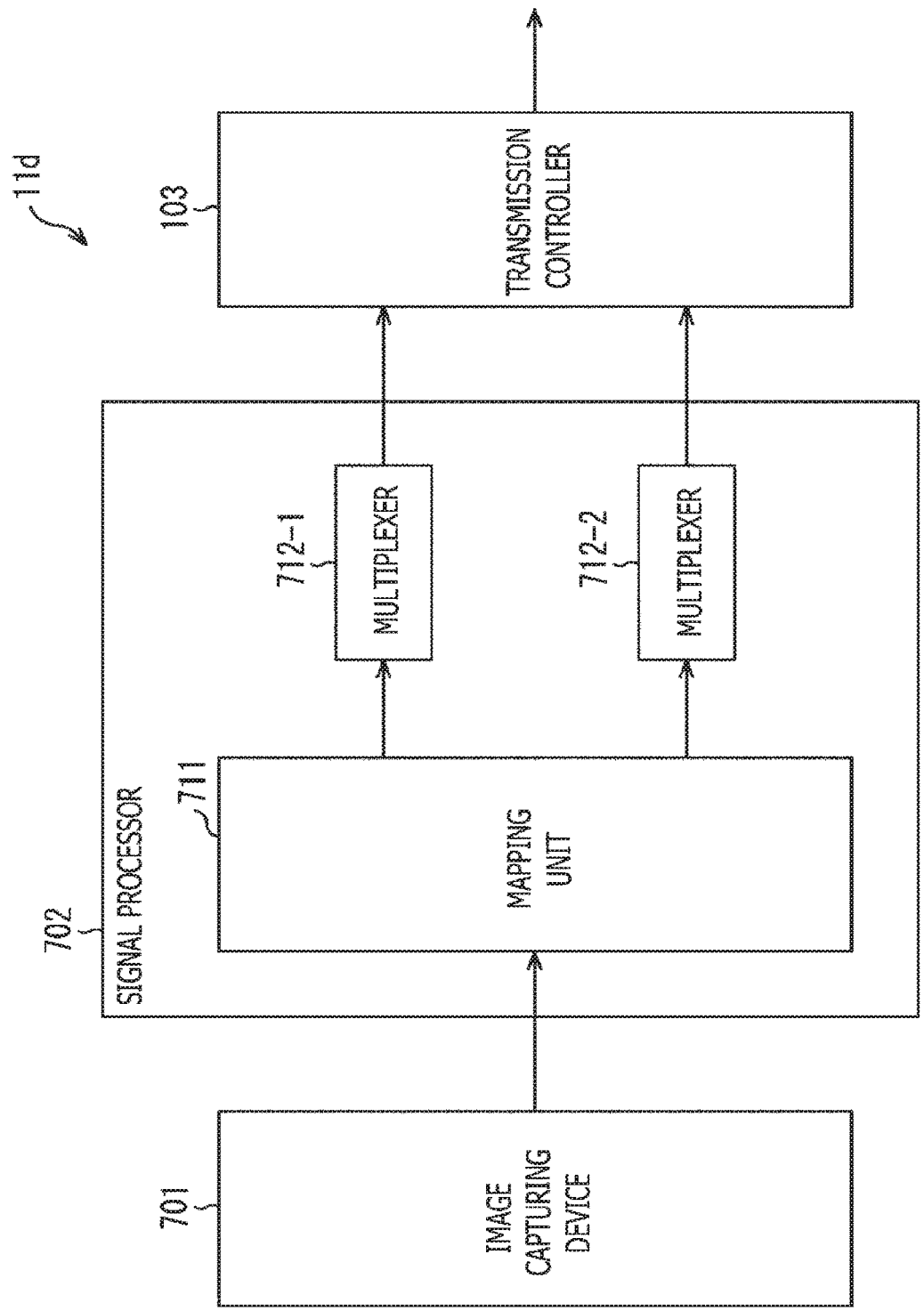
FIG. 46 is a block diagram depicting a configurational example of the functions of a broadcasting camera according to a fifth embodiment

FIG. 46 is a block diagram depicting a configurational example of the functions of a broadcasting camera 11*d* as a form in which the broadcasting camera 11 according to the fifth embodiment is reduced to practice. It should be noted that those parts in FIG. 46 which correspond to those of the broadcasting camera 11*b* depicted in FIG. 25 are denoted by identical reference characters, and the description of parts that carry out the same processing sequences will be omitted accordingly as it is repetitive.

The broadcasting camera 11*d* is different from the broadcasting camera 11*b* in that an image capturing device 701 and a signal processor 702 are provided in place of the image capturing device 101 and the signal processor 301. The signal processor 702 is arranged to include a mapping unit 711 and multiplexers 712-1 and 712-2.

The image capturing device 701 includes a CMOS image sensor, a CCD image sensor, or the like, for example. The image capturing device 701 supplies the mapping unit 711 of the signal processor 702 with a video signal obtained as a result of an image capturing process. The video signal includes a RAW signal of 3840×2160/50P-60P/4:4:4/16 bits or 4096×2160/48P-60P/4:4:4/16 bits.

The mapping unit 711 generates HD-SDI of 32 channels onto which the RAW signal supplied from the image capturing device 701 has been mapped, as described later. Then, the mapping unit 711 supplies the HD-SDI of channels 1 through 16 to the multiplexer 712-1 and supplies the HD-SDI of channels 17 through 32 to the multiplexer 712-2.

The multiplexers 712-1 and 712-2 perform channel coding on the HD-SDI of 16 channels supplied from the mapping unit 711 respectively thereto, thereby multiplexing them to generate data streams for transmission, as described later. Then, the multiplexers 712-1 and 712-2 supply the generated data streams for transmission to the transmission controller 103.

Incidentally, in case the multiplexers 712-1 and 712-2 do not need to be individually distinguished hereinbelow, they are simply referred to as a multiplexer 712.

Configurational Example of Multiplexer 712

Figure 47:
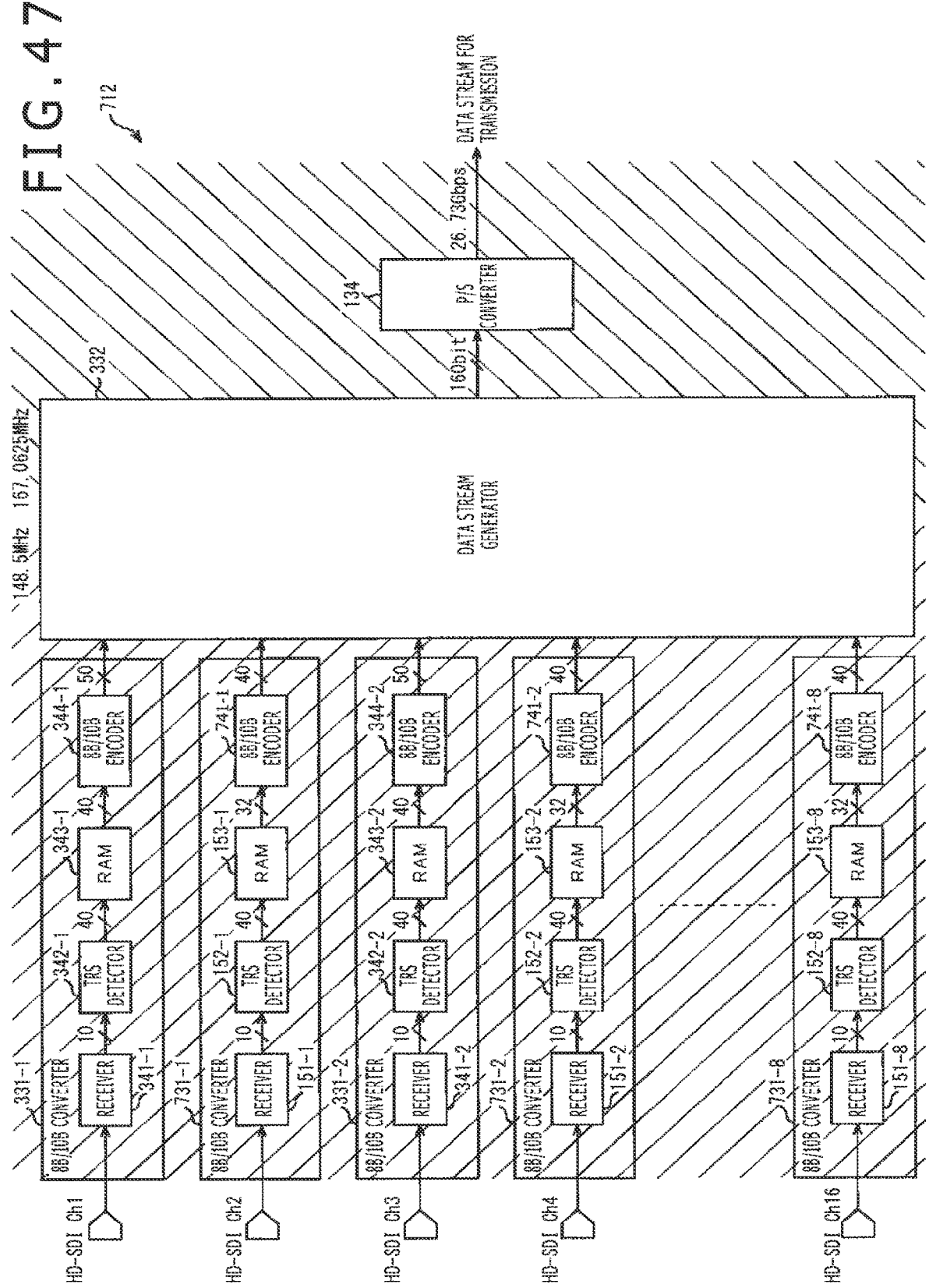
FIG. 47 is a block diagram depicting a configurational example of the functions of a multiplexer of the broadcasting camera according to the fifth embodiment.

FIG. 47 is a block diagram depicting a configurational example of the functions of the multiplexer 712. It should be noted that those parts in FIG. 47 which correspond to those of the multiplexer 311 depicted in FIG. 26 are denoted by identical reference characters, and the description of parts that carry out the same processing sequences will be omitted accordingly.

The multiplexer 712 is different from the multiplexer 311 in that 8B/10B converters 731-1 through 731-8 are provided in place of the 8B/10B converters 132-1 through 132-8. Further, the 8B/10B converter 731-*i* (i=1 through 8) is different from the 8B/10B converter 132-*i* in that an 8B/10B encoder 741-*i* is provided in place of the 8B/10B encoder 154-*i*.

The 8B/10B encoder 741-*i* reads data from the RAM 153-*i* block by block of predetermined bits (e.g., 32 bits), and 8B/10B-converts the read data. The 8B/10B encoder 741-*i* supplies the 8B/10B-converted data blocks to the data stream generator 332.

Incidentally, in case the 8B/10B converters 731-1 through 731-8 do not need to be individually distinguished hereinbelow, they are simply referred to as an 8B/10B converter 731. Furthermore, in case the 8B/10B encoders 741-1 through 741-8 do not need to be individually distinguished hereinbelow, they are simply referred to as an 8B/10B encoder 741.

Configurational Example of CCU 12*d*

Figure 48:
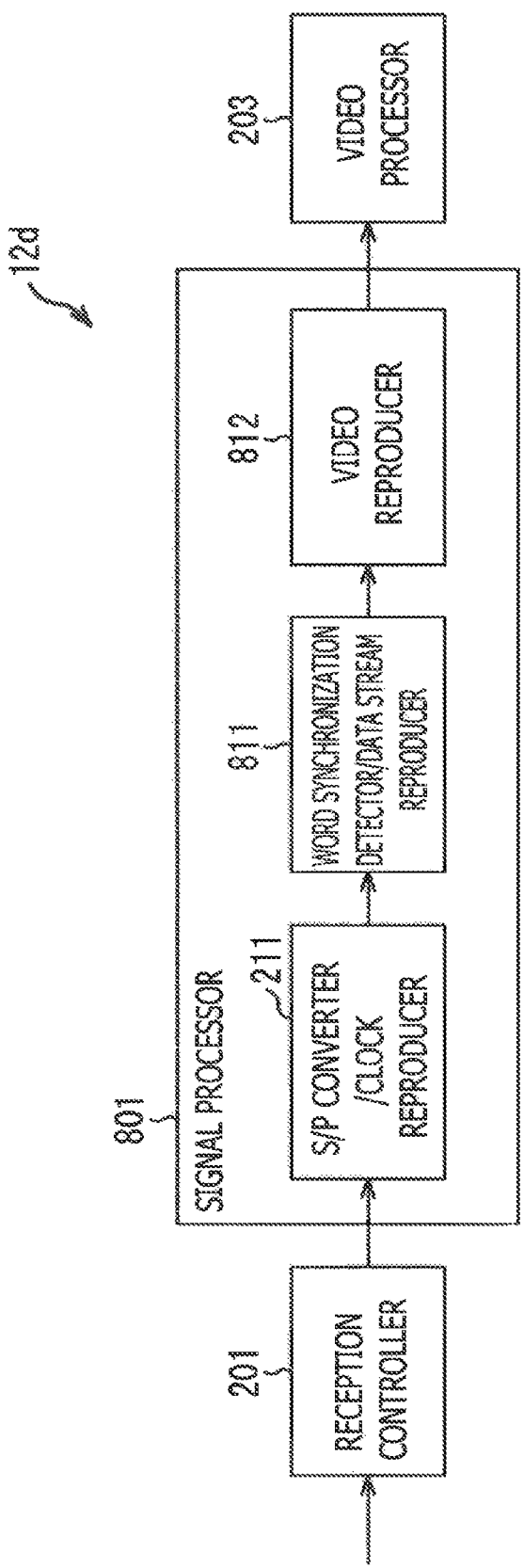
FIG. 48 is a block diagram depicting a configurational example of the functions of a CCU according to the fifth embodiment.

FIG. 48 is a block diagram depicting a configurational example of the functions of a CCU 12*d* as a form in which the CCU 12 according to the fifth embodiment is reduced to practice. It should be noted that those parts in FIG. 48 which correspond to those of the CCU 12*b* depicted in FIG. 27 are denoted by identical reference characters, and the description of parts that carry out the same processing sequences will be omitted accordingly as it is repetitive.

The CCU 12*d* is different from the CCU 12*b* in that a signal processor 801 is provided in place of the signal processor 401. The signal processor 801 is different from the signal processor 401 in that a word synchronization detector/data stream reproducer 811 and a video reproducer 812 are provided in place of the word synchronization detector/data stream reproducer 411 and the video reproducer 213.

The word synchronization detector/data stream reproducer 811 is supplied with an S/P-converted data stream for transmission from the S/P converter/clock reproducer 211. Then, the word synchronization detector/data stream reproducer 811 detects a word synchronization signal from the data stream for transmission and acquires word synchronization of the data stream for transmission. The word synchronization detector/data stream reproducer 811 also reproduces data streams of HD-SDI of 32 channels from the data stream for transmission according to a process that is a reversal of the process carried out by the multiplexer 712 of the broadcasting camera 11*d*, and supplies the reproduced data stream to the video reproducer 812.

The video reproducer 812 reproduces the original 4K RAW signal from the HD-SDI of 32 channels according to a process that is a reversal of the process of the mapping unit 711 of the broadcasting camera 11*d*, and supplies the reproduced RAW signal to the video processor 203.

Video Signal Sending Process According to the Fifth Embodiment

Figure 49:
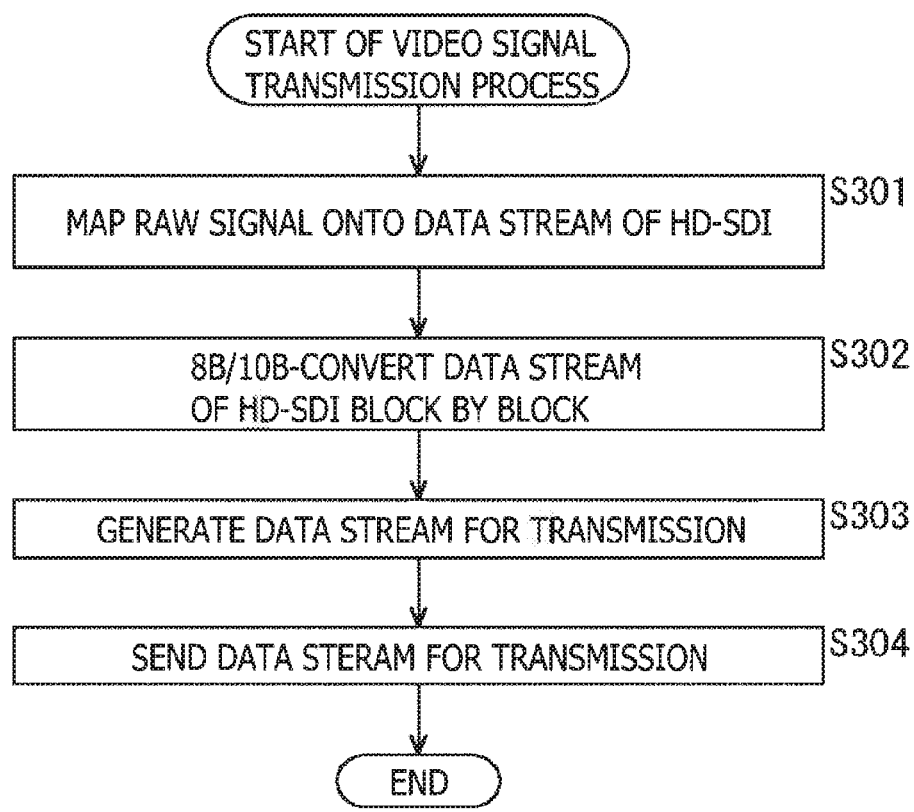
FIG. 49 is a flowchart illustrative of a video signal sending process according to the fifth embodiment.

Next, a video signal sending process that is carried out by the broadcasting camera 11*d* in the fifth embodiment will be described with reference to a flowchart depicted in FIG. 49.

In step S301, the mapping unit 711 of the signal processor 702 maps a RAW signal onto data streams of HD-SDI. Specifically, the mapping unit 711 maps a 4K RAW signal onto HD-SDI of 32 channels. A specific example of a process of mapping a 4K RAW signal onto HD-SDI of 32 channels will hereinafter be described with reference to FIG. 50.

First, the mapping unit 711 maps a 4K RAW signal onto first through fourth subimages according to the process described above with reference to FIG. 13. The first through fourth subimages represent a video signal of 2K/48P-60P/4:4:4/16 bits.

Next, the mapping unit 711 performs line decimation and word decimation on the first through fourth subimages according to the process similar to the process according to the first embodiment.

Specifically, the mapping unit 711 decimates every other line of the first through fourth subimages according to the process prescribed in FIG. 2, etc. of SMPTE 372. In this manner, interlaced video signals of 2K/48I-60I/4:4:4/16 bits of channel 1 and channel 2 are generated from respective subimages which represents a progressive video signal of 2K/48P-60P/4:4:4/16 bits.

Next, the mapping unit 711 decimates each of the generated interlaced video signals word by word according to the process prescribed in FIG. 3, etc. of SMPTE 372. In this manner, two video signals of 2K/48I-60I/4:2:2/16 bits are generated from the respective video signals of 2K/48I-60I/4:4:4/16 bits.

Figure 50:
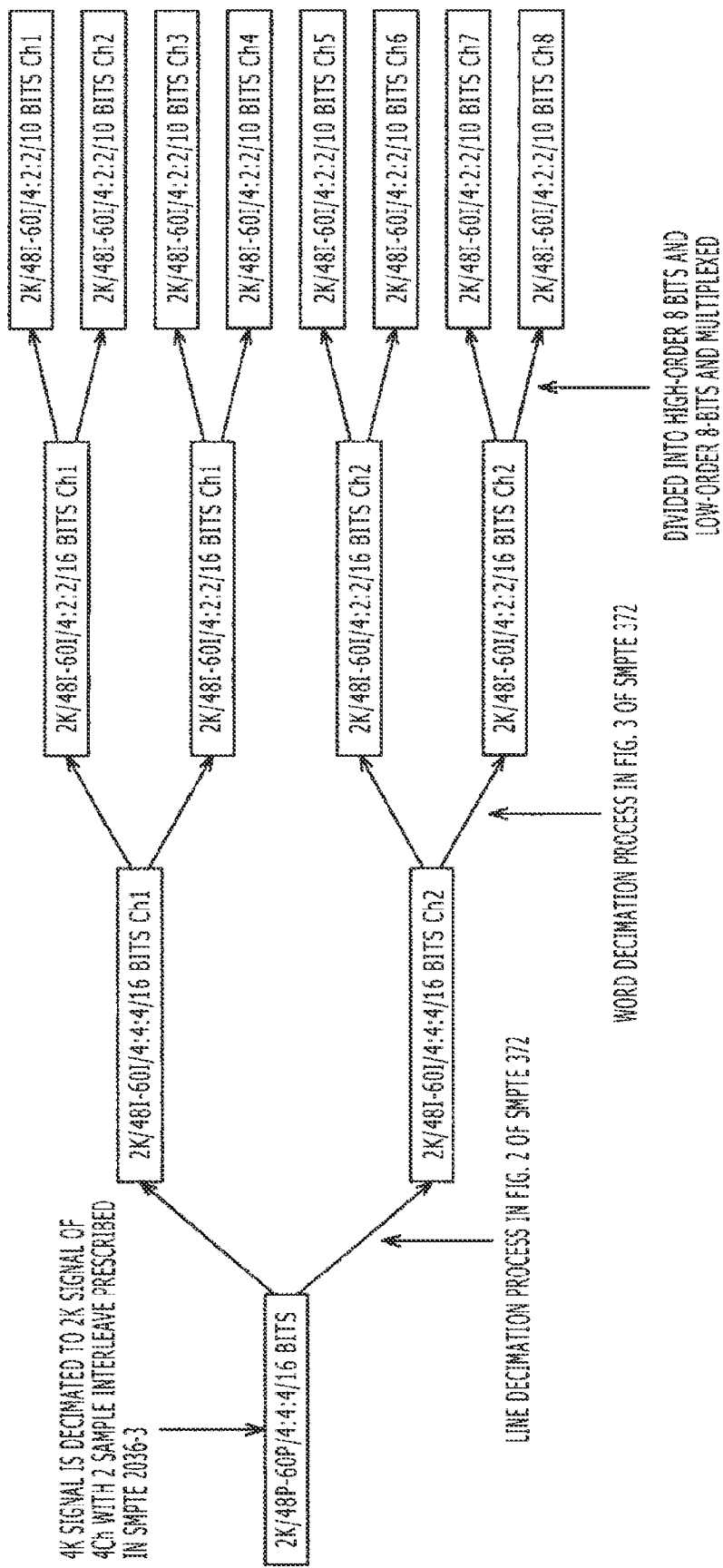
FIG. 50 is a diagram illustrative of a process of mapping a 4K RAW signal onto HD-SDI.

Then, the mapping unit 711 divides the pixel samples of 16 bits of each of the video signals of 2K/48I-60I/4:2:2/16 bits into high-order 8 bits and low-order 8 bits, and multiplexes them into HD-SDI of two channels (described as 2K/48I-60I/4:2:2/10 bits in FIG. 50). As depicted in FIG. 50, HD-SDI of eight channels is thus generated from one subimage, with the result that HD-SDI of a total of 32 channels is generated from the first through fourth subimages.

Figure 51:
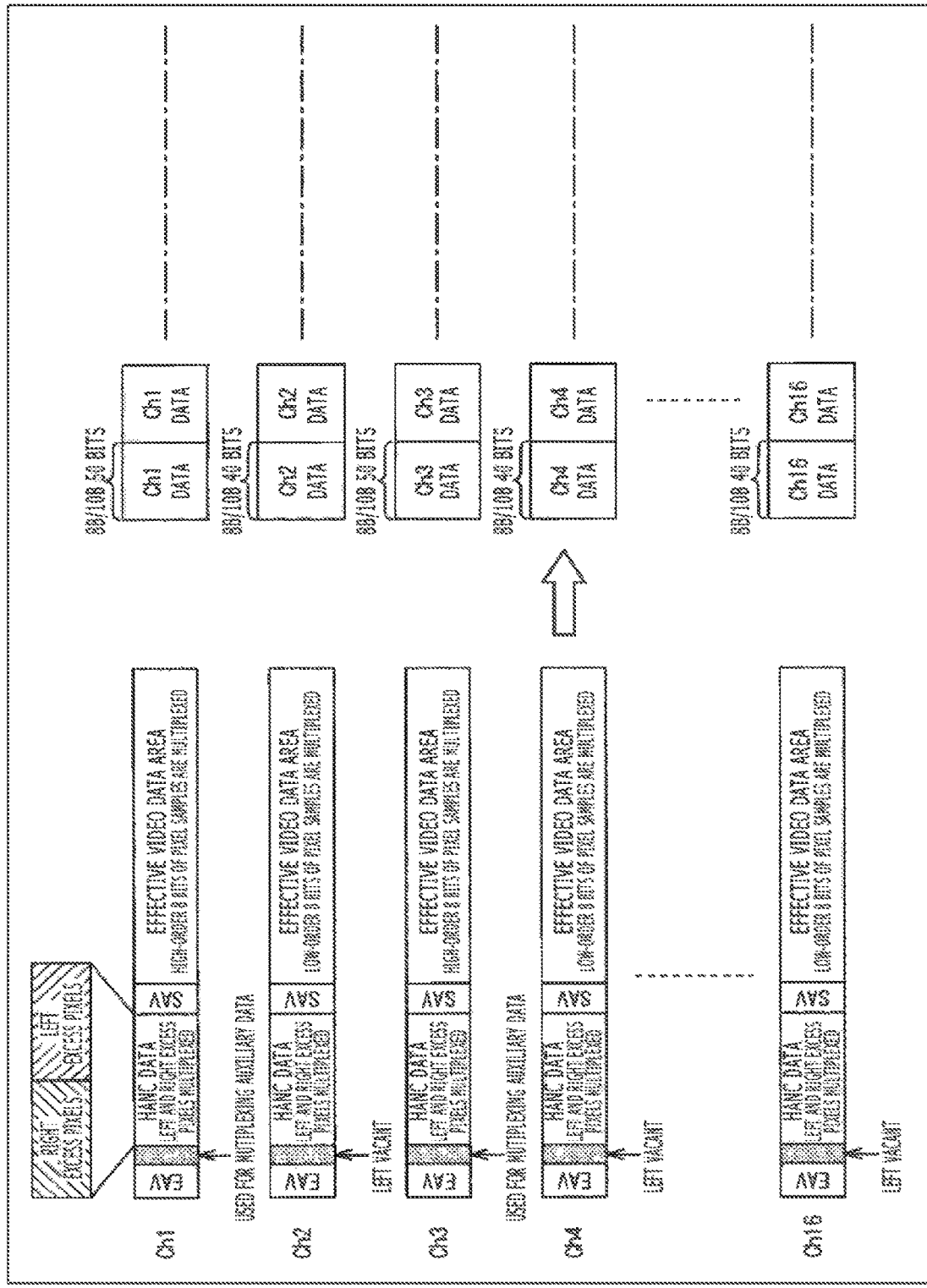
FIG. 51 is a diagram illustrative of a first example of a process of multiplexing auxiliary data and excess pixels and a process of generating data blocks in the video signal sending process according to the fifth embodiment.
Figure 52:
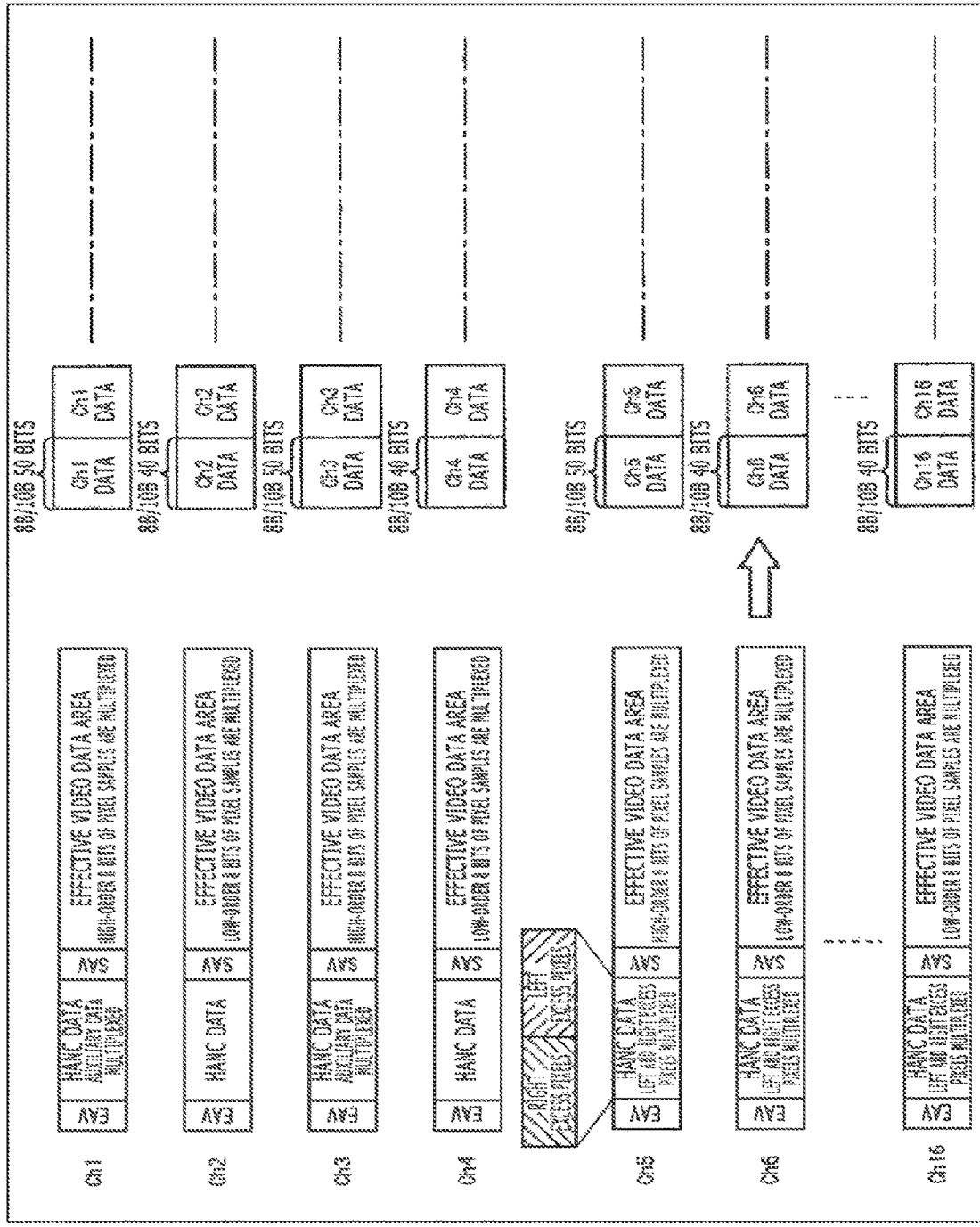
FIG. 52 is a diagram illustrative of a second example of a process of multiplexing auxiliary data and excess pixels and a process of generating data blocks in the video signal sending process according to the fifth embodiment.

Further, as depicted on the left sides of FIGS. 51 and 52, the data of eight high-order bits of pixel samples of the RAW data are multiplexed into the effective video data areas of HD-SDI of odd-numbered channels among HD-SDI of channels 1 through 16 supplied from the mapping unit 711 to the multiplexer 712-1. Likewise, the data of eight high-order bits of pixel samples of the RAW data are multiplexed into the effective video data areas of HD-SDI of odd-numbered channels among HD-SDI of channels 17 through 32.

Further, as depicted on the left sides of FIGS. 51 and 52, the data of eight low-order bits of pixel samples of the RAW data are multiplexed into the effective video data areas of HD-SDI of even-numbered channels among HD-SDI of channels 1 through 16 supplied from the mapping unit 711 to the multiplexer 712-1. Likewise, the data of eight low-order bits of pixel samples of the RAW data are multiplexed into the effective video data areas of HD-SDI of even-numbered channels among HD-SDI of channels 17 through 32.

At this time, the mapping unit 711 multiplexes auxiliary data and left and right extra pixels of the video signal into the horizontal auxiliary data areas of HD-SDI of the respective channels.

Specific examples of processes of multiplexing auxiliary data and extra pixels will hereinafter be described below with reference to FIGS. 51 and 52.

(First Process of Multiplexing Auxiliary Data and Extra Pixels)

A figure on the left side of FIG. 51 depicts a first process of multiplexing auxiliary data and extra pixels. It should be noted that, although FIG. 51 depicts only HD-SDI of channels 1 through 16 supplied from the mapping unit 711 to the multiplexer 712-1, auxiliary data and extra pixels are multiplexed into HD-SDI of remaining channels 17 through 32 by the similar process.

As with the first multiplexing process according to the first embodiment, the auxiliary data are multiplexed into the horizontal auxiliary data areas of HD-SDI of odd-numbered channels. A maximum of 16 audio data packets can thus be multiplexed into HD-SDI of 32 channels.

Therefore, 32 kHz-, 44.1 kHz-, or 48 kHz-sampled audio signals of a maximum of 32 channels can be multiplexed and transmitted. In addition, 96 kHz-sampled audio signals of a maximum of 16 channels can be multiplexed and transmitted.

Furthermore, the data of pixel samples in the left and right extra pixel areas of the RAW signal are multiplexed into the extra pixel multiplexing areas in the horizontal auxiliary data areas of HD-SDI of the respective channels. More specifically, the data of eight high-order bits of pixel samples in the left and right extra pixel areas of the RAW signal are multiplexed into the extra pixel multiplexing areas of HD-SDI of odd-numbered channels. The data of eight low-order bits of pixel samples in the left and right extra pixel areas of the RAW signal are multiplexed into the extra pixel multiplexing areas of HD-SDI of even-numbered channels.

Incidentally, the extra pixel multiplexing area relative ratio is of the same value as with the first multiplexing process according to the first embodiment.

In addition, the data of pixel samples in the upper and lower extra pixel areas of the RAW signal can be transmitted in their entirety by being multiplexed into the vertical blanking areas of each subimage.

(Second Process of Multiplexing Auxiliary Data and Extra Pixels)

A figure on the left side of FIG. 52 depicts a second process of multiplexing auxiliary data and extra pixels. It should be noted that, although FIG. 52 depicts only HD-SDI of channels 1 through 16 supplied from the mapping unit 711 to the multiplexer 712-1, auxiliary data and extra pixels are multiplexed into HD-SDI of remaining channels 17 through 32 by the similar process.

The second multiplexing process according to the fifth embodiment is different from the second multiplexing process according to the first embodiment as to channels of HD-SDI into which auxiliary data are multiplexed.

Specifically, in the second multiplexing process according to the first embodiment depicted in FIG. 17, auxiliary data are multiplexed into the horizontal auxiliary data areas of HD-SDI of channels 1, 17, 33 and 49. In the second multiplexing process according to the fifth embodiment, on the other hand, auxiliary data are multiplexed into the horizontal auxiliary data areas of HD-SDI of channels 1, 3, 17 and 19, as depicted on the left side of FIG. 52.

At this time, according to the provisions of SMPTE 299-1, audio data packets are multiplexed up to a maximum of four packets twice into each of the horizontal auxiliary data areas of HD-SDI of channels 1, 3, 17 and 19. In this manner, a maximum of 32 audio data packets can be multiplexed into HD-SDI of 32 channels.

Therefore, as with the second multiplexing process according to the first embodiment, 32 kHz-, 44.1 kHz-, or 48 kHz-sampled audio signals of a maximum of 64 channels can be multiplexed and transmitted. Moreover, 96 kHz-sampled audio signals of a maximum of 32 channels can be multiplexed and transmitted.

Incidentally, if the effective video data area of HD-SDI is of 2048 samples, then 32 kHz-, 44.1 kHz-, or 48 kHz-sampled audio signals of a maximum of 32 channels can be multiplexed and transmitted. Moreover, 96 kHz-sampled audio signals of a maximum of 16 channels can be multiplexed and transmitted.

In addition, the overall horizontal auxiliary data areas of HD-SDI of 24 channels excluding channels 1, 3, 17 and 19 into which auxiliary data are multiplexed and channels 2, 4, 18 and 20 paired with those channels are assigned to extra pixel multiplexing areas. Pairs of HD-SDI used herein refer to pairs of HD-SDI into which the data of eight high-order bits and eight low-order bits of pixel samples of the same RAW signal, for example, are multiplexed.

Further, the extra pixel multiplexing area relative ratio is of values indicated by the equations (16) through (20) below. It should be noted that the equation (16) represents a ratio in case a RAW signal of 3840×2160/60P is transmitted, and the equation (17) represents a ratio in case a RAW signal of 3840×2160/50P is transmitted. The equation (18) represents a ratio in case a RAW signal of 4096×2160/60P is transmitted, the equation (19) represents a ratio in case a RAW signal of 4096×2160/50P is transmitted, and the equation (20) represents a ratio in case a RAW signal of 4096×2160/48P is transmitted.

$$(2200-1920-12) \times 24 \div 32 \div 1920 = 0.105 = 10.5\% \tag{16}$$

$$(2640-1920-12) \times 24 \div 32 \div 1920 = 0.277 = 27.7\% \tag{17}$$

$$(2200-2048-12) \times 24 \div 32 \div 2048 = 0.051 = 5.1\% \tag{18}$$

$$(2640-2048-12) \times 24 \div 32 \div 2048 = 0.212 = 21.2\% \tag{19}$$

$$(2750-2048-12) \times 24 \div 32 \div 2048 = 0.253 = 25.3\% \tag{20}$$

In this manner, a sufficient extra pixel multiplexing area can be kept with respect to an effective video data area, making it possible to multiplex all the data of pixel samples in the left and right extra pixel areas of a RAW signal and transmit the multiplexed data.

Incidentally, as with the first multiplexing process, the data of pixel samples in the upper and lower extra pixel areas of the RAW signal can be transmitted in their entirety by being multiplexed into the vertical blanking areas of each subimage.

A 4K RAW signal is mapped onto HD-SDI of 32 channels in the manner described above. It should be noted that the processes of mapping a RAW signal, as described above, are illustrated by way of example, and a RAW signal may be mapped onto HD-SDI of 32 channels according to other processes.

Then, the mapping unit 711 supplies HD-SDI of channels 1 through 16 to the multiplexer 712-1 and supplies HD-SDI of channels 17 through 32 to the multiplexer 712-2.

Referring back to FIG. 49, in step S302, the multiplexers 712-1 and 712-2 8B/10B-convert the data streams of HD-SDI block by block. The processing of step S302 is the similar to the processing of step S102 in FIG. 28 according to the second embodiment except the process of the 8B/10B encoder 741.

Specifically, unlike the 8B/10B encoder 154 of the broadcasting camera 11b according to the second embodiment, the 8B/10B encoder 741 extracts the data of eight low-order bits of pixel samples of RAW data from the data of one word (10 bits) in the effective video data area and the horizontal auxiliary data areas of HD-SDI. The other process details of the 8B/10B encoder 741 are similar to those of the 8B/10B encoder 154.

Figure 28:
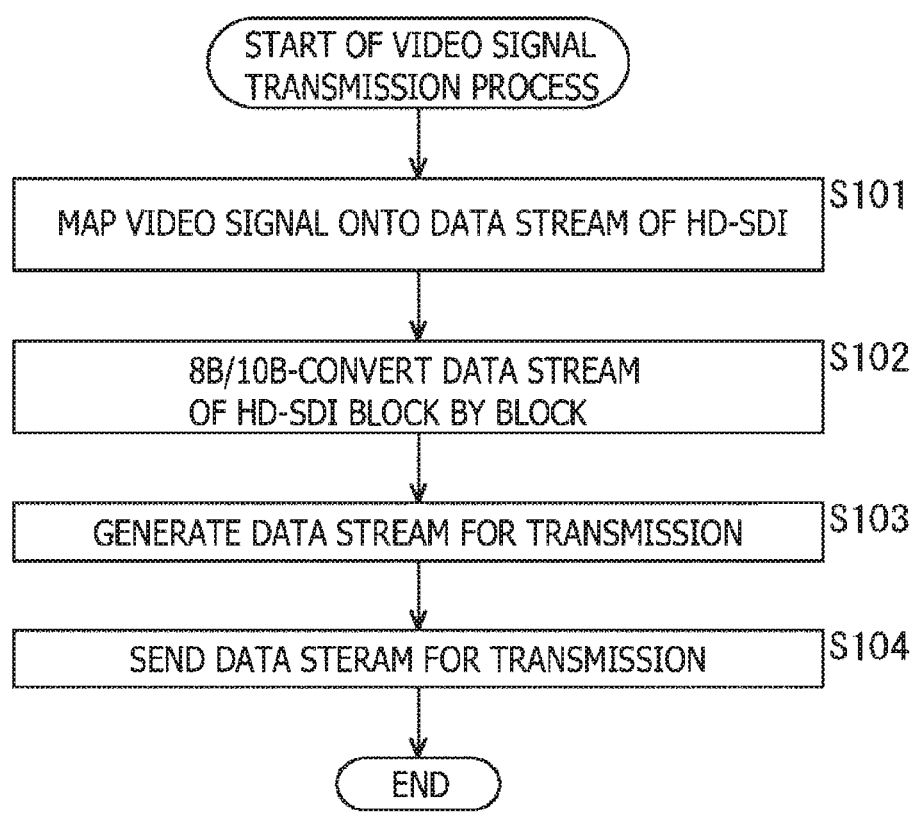
FIG. 28 is a flowchart illustrative of a video signal sending process according to the second embodiment.

In step S303, data streams for transmission are generated by the process similar to step S103 depicted in FIG. 28. Specifically, a data stream for transmission with HD-SDI of channels 1 through 16 multiplexed thereinto and a data stream for transmission with HD-SDI of channels 17 through 32 multiplexed thereinto are generated.

In step S304, data streams for transmission of two lanes are sent by the process similar to step S4 depicted in FIG. 10.

Video Signal Receiving Process According to the Fifth Embodiment

Next, a video signal receiving process that is carried out by the CCU 12d in a manner corresponding to the video signal sending process depicted in FIG. 49 will be described below with reference to a flowchart depicted in FIG. 53.

In step S351, data streams for transmission of two lanes are received in the manner similar to the processing of step S51 depicted in FIG. 24.

In step S352, the data streams for transmission of two lanes are S/P-converted in the manner similar to the processing of step S52 depicted in FIG. 24.

In step S353, the word synchronization detector/data stream reproducer 811 reproduces data streams of HD-SDI from the data streams for transmission. Specifically, the word synchronization detector/data stream reproducer 811 detects word synchronization signals multiplexed in the data streams for transmission of two lanes and acquires word synchronization of the data streams for transmission. Then, the word synchronization detector/data stream reproducer 811 reproduces HD-SDI of 32 channels from the data streams for transmission of two lanes according to a process that is a reversal of the process carried out by the multiplexer 712 of the broadcasting camera 11d. The word synchronization detector/data stream reproducer 811 supplies the reproduced HD-SDI of 32 channels to the video reproducer 812.

In step S354, the video reproducer 812 reproduces video signals from the data streams of HD-SDI. Specifically, the video reproducer 812 reproduces the original 4K RAW signal from the HD-SDI of 32 channels according to a process that is a reversal of the process carried out by the mapping unit 711 of the broadcasting camera 11d. The video reproducer 812 supplies the reproduced RAW signal to the video processor 203.

In the manner described above, RAW signals of 3840×2160/50P-60P/4:4:4/16 bits and 4096×2160/48P-60P/4:4:4/16 bits can be transmitted on data streams for transmission of two lanes through the 100-GbE device.

8. Sixth Embodiment

A sixth embodiment of the present technology will next be described.

According to the sixth embodiment, a 4K RAW signal of 96P-120P is transmitted using a 100-GbE device. 4K RAW signals of 96P-120P include RAW signals of 3840×2160/100P-120P/4:4:4/16 bits and 4096×2160/96P-120P/4:4:4/16 bits.

According to the sixth embodiment, first and second 4K RAW signals of successive two frames are mapped onto first through eighth subimages according to a process which is similar to the process described above with reference to FIGS. 44 and 45.

Then, according to the processing similar to the fifth embodiment, the first through eighth subimages are mapped onto HD-SDI of 64 channels, and data streams for transmission of four lanes are generated from the HD-SDI of 64 channels. Then, a 4K RAW signal is transmitted in every successive two frames on the data streams for transmission of four lanes through the 100-GbE device.

9. Seventh Embodiment

A seventh embodiment of the present technology will next be described with reference to FIGS. 54 through 62.

According to the seventh embodiment, an 8K signal of 50P-60P is transmitted using a 100-GbE device. 8K signals of 50P-60P include a video signal of 7680×4320/50P-60P/4:4:4, 4:2:2/10 bits, 12 bits.

Configurational Example of Broadcasting Camera 11e

Figure 54:
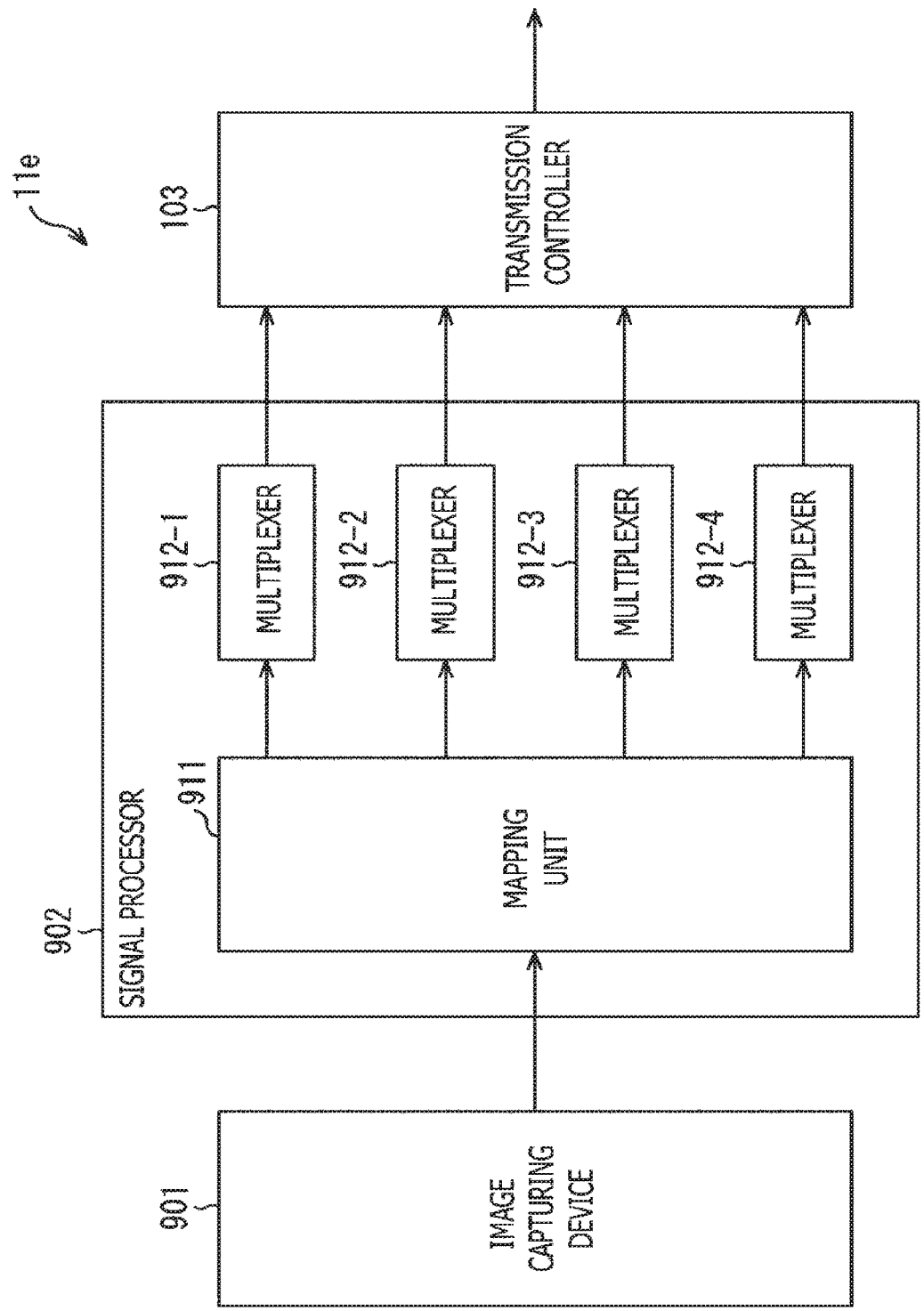
FIG. 54 is a block diagram depicting a configurational example of the functions of a broadcasting camera according to a seventh embodiment.

FIG. 54 is a block diagram depicting a configurational example of the functions of a broadcasting camera 11e as a form in which the broadcasting camera 11 according to the seventh embodiment is reduced to practice. It should be noted that those parts in FIG. 54 which correspond to those of the broadcasting camera 11a depicted in FIG. 5 are denoted by identical reference characters, and the description of parts that carry out the same processing sequences will be omitted accordingly as it is repetitive.

The broadcasting camera 11e is different from the broadcasting camera 11a in that an image capturing device 901 and a signal processor 902 are provided in place of the image capturing device 101 and the signal processor 102.

The image capturing device 901 includes a CMOS image sensor, a CCD image sensor, or the like, for example. The image capturing device 901 supplies a mapping unit 911 of the signal processor 902 with a video signal obtained as a result of an image capturing process. The video signal includes a video signal of 7680×4320/50P-60P/4:4:4, 4:2:2/10 bits, 12 bits, for example.

The signal processor 902 multiplexes the video signal supplied from the image capturing device 901 into a data stream that can be transmitted through the 100-GbE device, and supplies the generated data stream to the transmission controller 103. The signal processor 902 is arranged to include the mapping unit 911 and multiplexers 912-1 through 912-4.

The mapping unit 911 generates serial data streams (hereinafter referred to as basic streams) of 48 channels onto which the video signal supplied from the image capturing device 901 has been mapped, as described later. Then, the mapping unit 911 supplies the basic streams of channels 1 through 12 to the multiplexer 912-1 and supplies the basic streams of channels 13 through 24 to the multiplexer 912-2. Moreover, the mapping unit 911 supplies the basic streams of channels 25 through 36 to the multiplexer 912-3 and supplies the basic streams of channels 37 through 48 to the multiplexer 912-4.

It should be noted that the basic streams have a data structure that is essentially the same as the data streams of HD-SDI except that its word length is 12 bits. In other words, as with HD-SDI, the basic streams have SAV, EAV, effective video data areas, and horizontal auxiliary data areas.

The multiplexers 912-1 through 912-4 perform channel coding on the basic streams of 12 channels each supplied from the mapping unit 911 thereto, thereby multiplexing them to generate data streams for transmission, as described later. Then, the multiplexers 912-1 through 912-4 supply the generated data streams for transmission to the transmission controller 103.

Incidentally, in case the multiplexers 912-1 through 912-4 do not need to be individually distinguished hereinbelow, they are simply referred to as a multiplexer 912.

Configurational Example of Multiplexer 912

Figure 55:
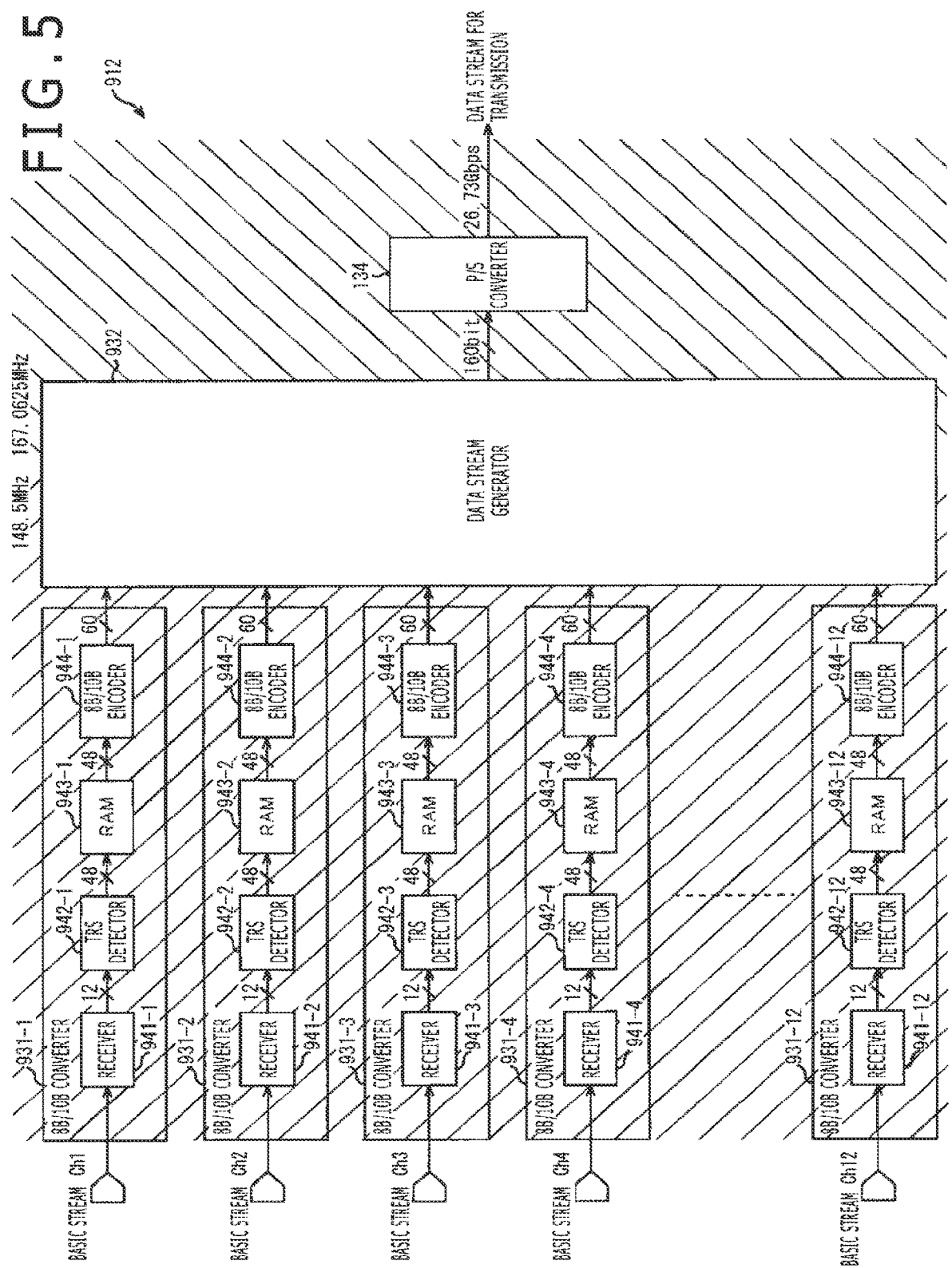
FIG. 55 is a block diagram depicting a configurational example of the functions of a multiplexer of the broadcasting camera according to the seventh embodiment.

FIG. 55 is a block diagram depicting a configurational example of the functions of the multiplexer 912. It should be noted that those parts in FIG. 55 which correspond to those of the multiplexer 112 depicted in FIG. 6 are denoted by identical reference characters, and the description of parts that carry out the same processing sequences will be omitted accordingly as it is repetitive.

The multiplexer 912 is arranged to include 8B/10B converters 931-1 through 931-12, a data stream generator 932, and a P/S converter 134. The 8B/10B converter 931-$i$ ($i$=1 through 8) includes a receiver 941-$i$, a TRS detector 942-$i$, a RAM 943-$i$, and an 8B/10B encoder 944-$i$.

The basic streams of 12 channels input to the multiplexer 912 are input to the respective receivers 941-1 through 941-12 of the 8B/10B converters 931-1 through 931-12.

Then, the receiver 941-1 S/P-converts and descrambles the basic stream input thereto, and supplies the processed basic stream to the TRS detector 942-1. The receiver 941-1 also reproduces a clock signal superposed on the basic stream, and supplies the reproduced clock signal to various parts of the 8B/10B converter 931-1.

The TRS detector 942-1 detects SAV and EAV included in the basic stream to acquire word synchronization of the basic stream. Then, the TRS detector 942-1 then extracts data in every predetermined bits (e.g., 48 bits) successively from the beginning of the SAV of the basic stream, and has them stored in the RAM 943-1.

The 8B/10B encoder 944-1 reads data block by block of predetermined bits (e.g., 48 bits) from the RAM 943-1, and 8B/10B-converts the read data. The 8B/10B encoder 944-1 supplies the 8B/10B-converted data blocks to the data stream generator 932.

The 8B/10B converters 931-2 through 931-12 also perform the process similar to the 8B/10B converter 931-1 on the respective basic streams input thereto.

Incidentally, in case the 8B/10B converters 931-1 through 931-12 do not need to be individually distinguished hereinbelow, they are simply referred to as an 8B/10B converter 931. Furthermore, in case the receivers 941-1 through 941-12, the TRS detectors 942-1 through 942-12, the RAMS 943-1 through 943-12, and the 8B/10B encoders 944-1 through 944-12 do not need to be individually distinguished hereinbelow, they are simply referred to as a receiver 941, a TRS detector 942, a RAM 943, and an 8B/10B encoder 944, respectively.

The data stream generator 932 generates parallel data streams for transmission, which has a predetermined word length, by multiplexing the data blocks supplied from the 8B/10B encoders 944 in a predetermined order. The data stream generator 932 supplies the generated data streams for transmission to the P/S converter 134.

Configurational Example of CCU 12e

Figure 56:
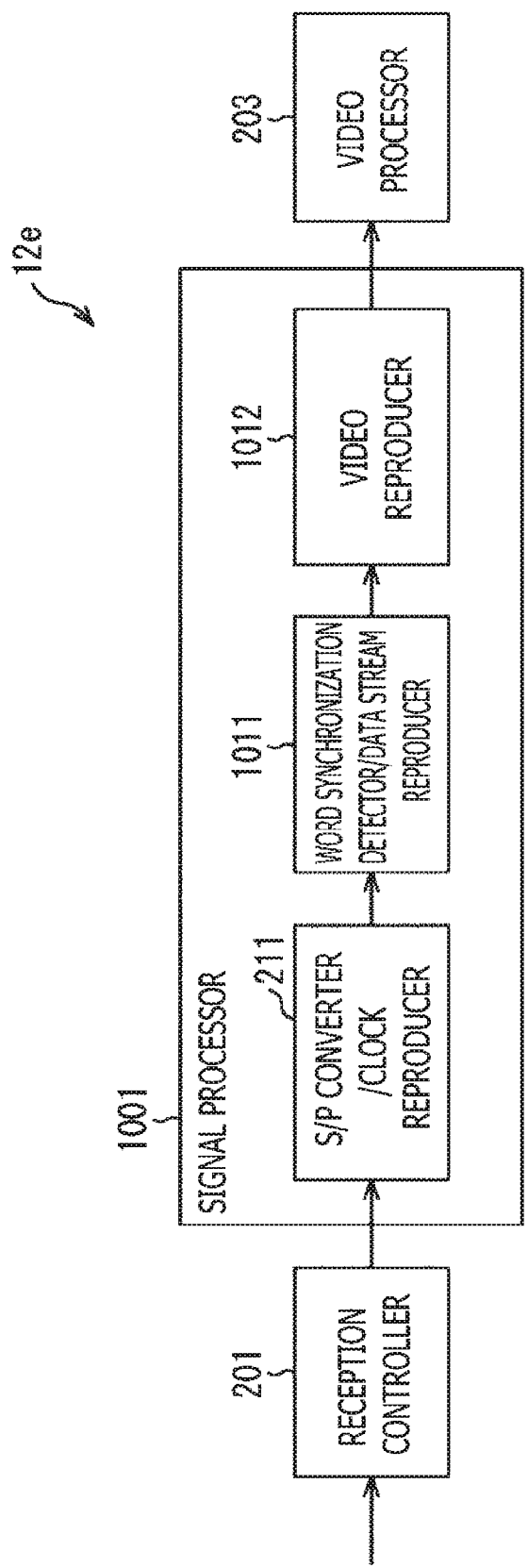
FIG. 56 a block diagram depicting a configurational example of the functions of a CCU according to the seventh embodiment.

FIG. 56 is a block diagram depicting a configurational example of the functions of a CCU 12e as a form in which the CCU 12 according to the seventh embodiment is reduced to practice. It should be noted that those parts in FIG. 56 which correspond to those of the CCU 12a depicted in FIG. 8 are denoted by identical reference characters, and the description of parts that carry out the same processing sequences will be omitted accordingly as it is repetitive.

The CCU 12e is different from the CCU 12a in that a signal processor 1001 is provided in place of the signal processor 202. The signal processor 1001 is different from the signal processor 202 in that a word synchronization detector/data stream reproducer 1011 and a video reproducer 1012 are provided in place of the word synchronization detector/data stream reproducer 212 and the video reproducer 213.

The word synchronization detector/data stream reproducer 1011 detects a word synchronization signal from the S/P-converted data streams for transmission and acquires word synchronization of the data streams for transmission. Moreover, the word synchronization detector/data stream reproducer 1011 reproduces basic streams of 48 channels from the data streams for transmission according to a process that is a reversal of the process of the multiplexer 912 of the broadcasting camera 11e, and supplies the reproduced basic streams to the video reproducer 1012.

The video reproducer 1012 reproduces the original 8K signal from the basic streams of 48 channels according to a process that is a reversal of the process of the mapping unit 911 of the broadcasting camera 11e, and supplies the reproduced 8K signal to the video processor 203.

Video Signal Sending Process According to the Seventh Embodiment

Next, a video signal sending process that is carried out by the broadcasting camera 11e in the seventh embodiment will be described with reference to a flowchart depicted in FIG. 57.

In step S401, the mapping unit 911 of the signal processor 902 maps a video signal onto basic streams. Specifically, the mapping unit 911 maps an 8K signal onto basic streams of 48 channels. A specific example of a process of mapping an 8K signal onto basic streams of 48 channels will hereinafter be described.

For example, the mapping unit 911 separates an 8K signal into four signals with respect to respective color signal components, generating a total of 12 subimages. Specifically, each of color signal components R, G, B or Y, Cb, Cr of the 8K signal is separated into four signals by a one-bit interleave process, a two-bit interleave process or the like. In this manner, a total of 12 subimages each represented by a 4K signal are generated.

Next, the mapping unit 911 further separates each of the 12 subimages into four signals according to, for example, a one-bit interleave process, a two-bit interleave process or the like, generating a total of 48 basic images each represented by a 2K signal.

Then, the mapping unit 911 multiplexes the 48 basic images into basic streams of 48 channels, respectively. Since the basic streams have a word length of 12 bits, as described above, the basic images can be multiplexed as they are into the basic streams without separating the data of 12 bits of pixel samples of each of the basic images.

At this time, the mapping unit 911 multiplexes auxiliary data and left and right extra pixels of the video signal into the horizontal auxiliary data areas of the basic streams.

Specific examples of processes of multiplexing auxiliary data and extra pixels will hereinafter be described below with reference to FIGS. 58 and 59.

First Process of Multiplexing Auxiliary Data and Extra Pixels

Figure 58:
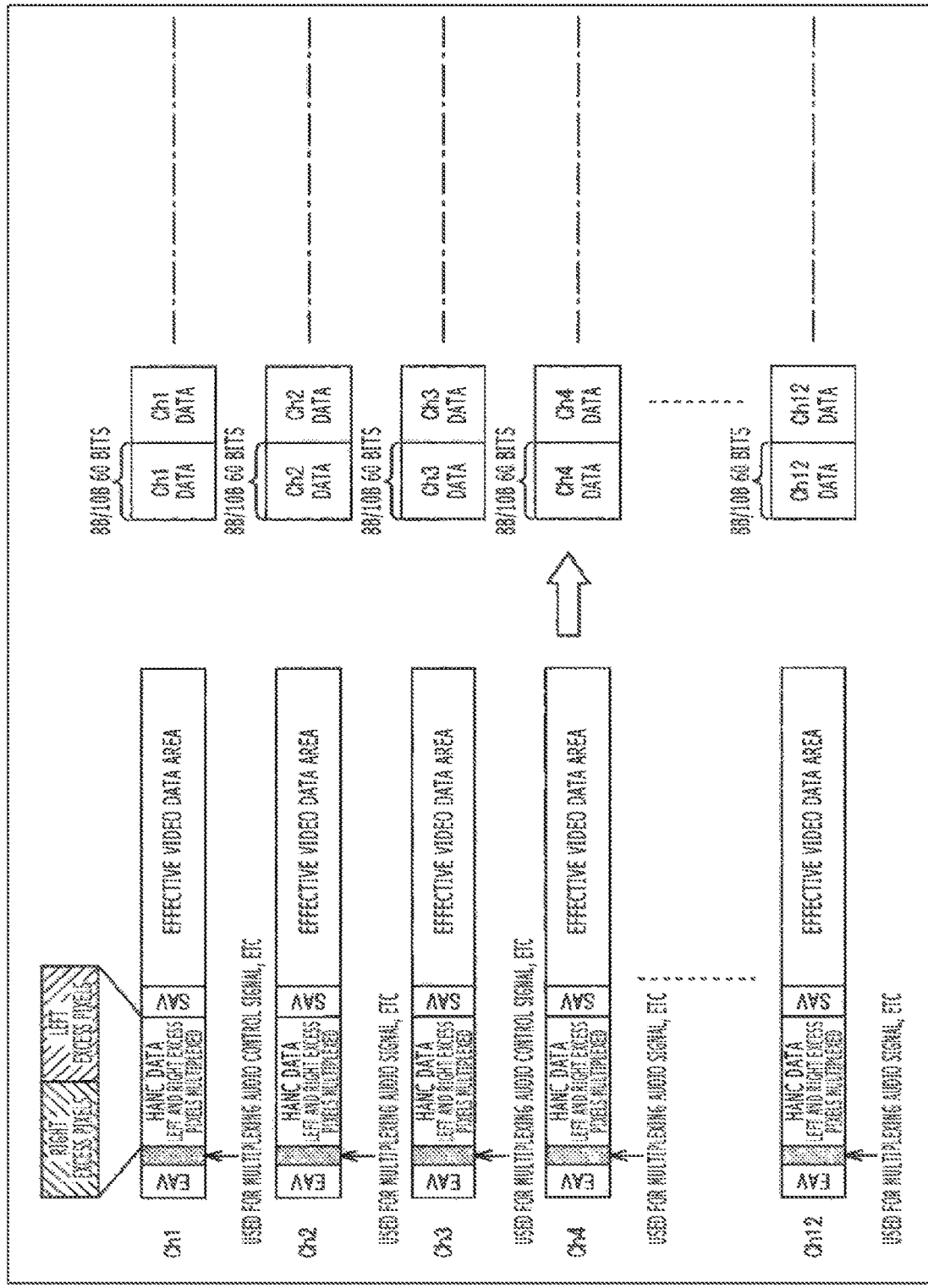
FIG. 58 is a diagram illustrative of a first example of a process of multiplexing auxiliary data and excess pixels and a process of generating data blocks in the video signal sending process according to the seventh embodiment.

A figure on the left side of FIG. 58 depicts a first process of multiplexing auxiliary data and extra pixels. It should be noted that, although FIG. 58 depicts only basic streams of channels 1 through 12 supplied from the mapping unit 911 to the multiplexer 912-1, auxiliary data and extra pixels are multiplexed into basic streams of remaining channels 13 through 48 by the similar process.

Specifically, auxiliary data multiplexing areas are kept in horizontal auxiliary data areas of the respective basic streams. Auxiliary data multiplexing areas of odd-numbered channels are set to a size equal to or larger than the number of bytes of at least an audio control packet and a time code, and auxiliary data multiplexing areas of even-numbered channels are set to a size equal to or larger than 31 bytes that represent the data length of an audio data packet.

Then, audio data packets conforming to the provisions of SMPTE 299-1 are multiplexed into the auxiliary data multiplexing areas of the basic streams of even-numbered channels. Furthermore, audio control packets, time codes, payload IDs, etc. are multiplexed into the auxiliary data multiplexing areas of the basic streams of odd-numbered channels.

In this manner, a maximum of 24 audio data packets can be multiplexed into the basic streams of 48 channels.

Now, for example, a 48 kHz-sampled audio signal is sampled approximately 0.853 times (=48 kHz÷50 Hz÷1125 lines) on average per line with respect to a basic stream of 1920×1125/50P. Moreover, for example, a 48 kHz-sampled audio signal is sampled approximately 0.711 times (=48 kHz÷60 Hz÷1125 lines) on average per line with respect to a basic stream of 1920×1125/60P. In other words, a 48 kHz-sampled audio signal is sampled once for one line or two lines of basic streams of 1920×1125/50P, 60P.

Therefore, for multiplexing a 48 kHz-sampled audio signal into basic streams of 1920×1125/50P, 60P and transmitting the multiplexed data, it is necessary to multiplex a maximum of one sample of the audio signal of each channel into one line. Further, since 24 audio data packets can be multiplexed as described above, a 48 kHz-sampled audio signal can be multiplexed and transmitted in a maximum of 96 channels (=4 channels×24).

Furthermore, 32 kHz- and 44.1 kHz-sampled audio signals can also be similarly transmitted in a maximum of 96 channels. On the other hand, a 96 kHz-sampled audio signal can be transmitted in a maximum of 48 channels, one half of the 96 channels.

Moreover, the data of pixel samples in the left and right extra pixel areas of an 8K signal are multiplexed into an extra pixel multiplexing area, exclusive of the auxiliary data multiplexing area, in the horizontal auxiliary data area of a basic stream of each channel.

Then, if the auxiliary data multiplexing area is of 31 bytes, for example, then the extra pixel multiplexing area relative ratio is of values indicated by the equations (21) and (22) below. It should be noted that the equation (21) represents a ratio in case a video signal of 7680×4320/60P is transmitted, and the equation (22) represents a ratio in case a video signal of 7680×4320/50P is transmitted.

$$(2200-1920-12-31) \div 1920 = 0.123 = 12.3\% \quad (21)$$

$$(2640-1920-12-31) \div 1920 = 0.353 = 35.3\% \quad (22)$$

In this manner, a sufficient extra pixel multiplexing area can be kept with respect to an effective video data area, making it possible to multiplex all the data of pixel samples in the left and right extra pixel areas of an 8K signal and transmit the multiplexed data.

Incidentally, the data of pixel samples in the upper and lower extra pixel areas of the 8K signal can be transmitted in their entirety by being multiplexed into the vertical blanking areas of each basic image.

(Second Process of Multiplexing Auxiliary Data and Extra Pixels)

Figure 59:
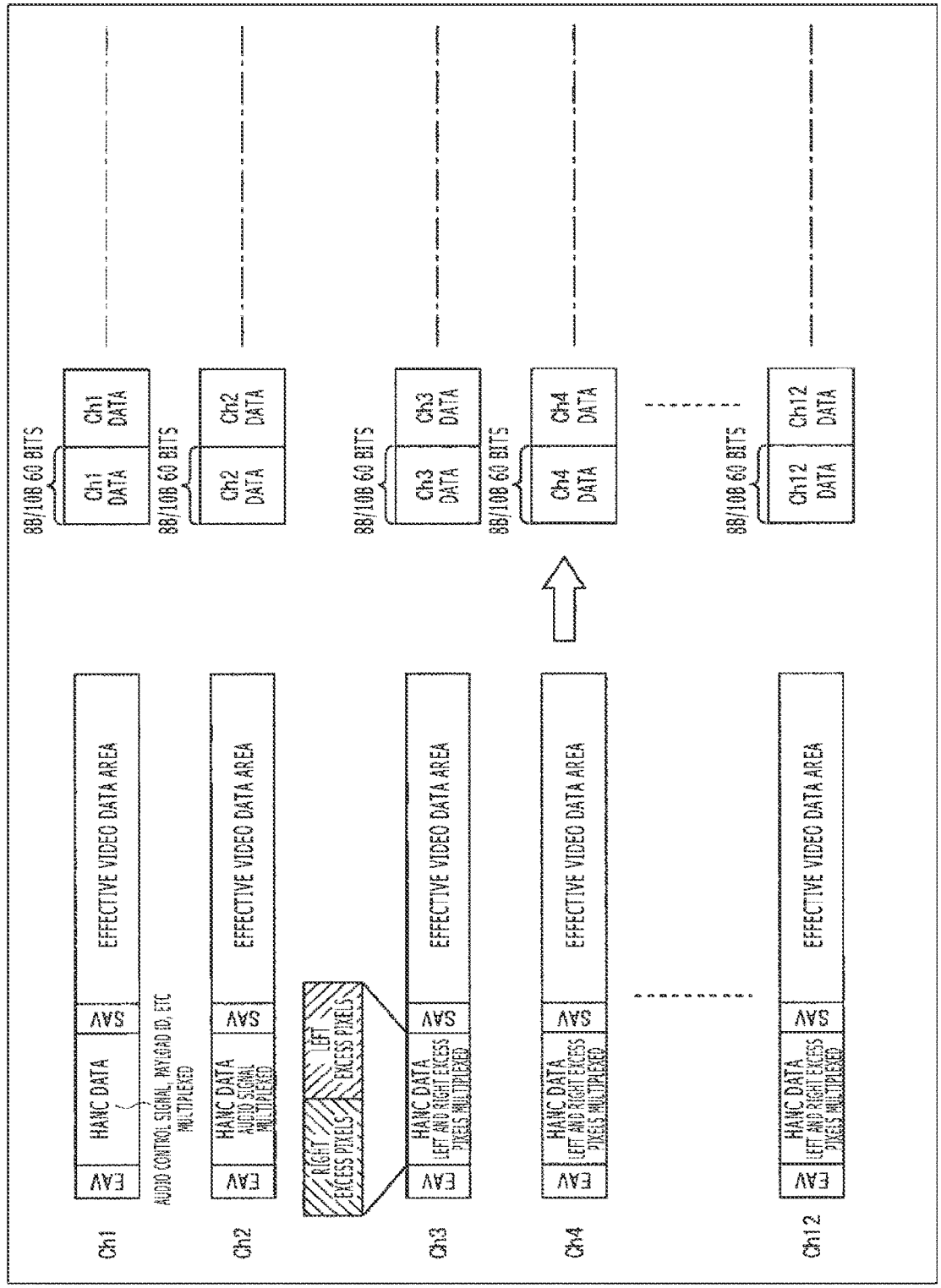
FIG. 59 is a diagram illustrative of a second example of a process of multiplexing auxiliary data and excess pixels and a process of generating data blocks in the video signal sending process according to the seventh embodiment.

A figure on the left side of FIG. 59 depicts a second process of multiplexing auxiliary data and extra pixels. It should be noted that, although FIG. 59 depicts only basic streams of channels 1 through 12 supplied from the mapping unit 911 to the multiplexer 912-1, auxiliary data and extra pixels are multiplexed into basic streams of remaining channels 13 through 48 by the similar process.

Specifically, audio data packets are multiplexed up to a maximum of four packets twice into the horizontal auxiliary data areas of basic streams of channels 2, 14, 26 and 38. Furthermore, audio control packets, payload IDs, time codes, etc. are multiplexed into the horizontal auxiliary data areas of basic streams of channels 1, 13, 25 and 37.

Therefore, a maximum of 32 audio data packets can be multiplexed into basic streams of 48 channels. 32 kHz-, 44.1 kHz-, or 48 kHz-sampled audio signals of a maximum of 128 channels can thus be multiplexed and transmitted. Moreover, 96 kHz-sampled audio signals of a maximum of 64 channels can be multiplexed and transmitted.

Incidentally, if the effective video data area of a basic stream is of 2048 samples, then the number of audio data packets that can be multiplexed into the horizontal auxiliary data area is one half of the number of audio data packets in case the effective video data area is of 1920 samples, as with the case of HD-SDI. Therefore, if the effective video data area of a basic stream is of 2048 samples, then 32 kHz-, 44.1 kHz-, or 48 kHz-sampled audio signals of a maximum of 64 channels can be multiplexed and transmitted. In addition, 96 kHz-sampled audio signals of a maximum of 32 channels can be multiplexed and transmitted.

In addition, the overall horizontal auxiliary data areas of basic streams of 40 channels excluding channels 1, 2, 13, 14, 25, 26, 37, and 38 into which auxiliary data are multiplexed are assigned as extra pixel multiplexing areas.

Then, the extra pixel multiplexing area relative ratio is of values indicated by the equations (23) and (24) below. It should be noted that the equation (23) represents a ratio in case a video signal of 7680×4320/60P is transmitted, and the equation (24) represents a ratio in case a video signal of 7680×4320/50P is transmitted.

$$(2200-1920-12) \times 40 \div 48 \div 1920 = 0.116 = 11.6\% \quad (23)$$

$$(2640-1920-12) \times 40 \div 48 \div 1920 = 0.307 = 30.7\% \quad (24)$$

In this manner, a sufficient extra pixel multiplexing area can be kept with respect to an effective video data area, making it possible to multiplex all the data of pixel samples in the left and right extra pixel areas of an 8K signal and transmit the multiplexed data.

Incidentally, the data of pixel samples in the upper and lower extra pixel areas of the 8K signal can be transmitted in their entirety by being multiplexed into the vertical blanking areas of each basic image.

An 8K signal is mapped onto basic streams of 48 channels in the manner described above. It should be noted that the processes of mapping an 8K signal, as described above, are illustrated by way of example, and an 8K signal may be mapped onto basic streams of 48 channels according to other processes.

Then, the mapping unit 911 supplies basic streams of channels 1 through 12 to the multiplexer 912-1 and supplies basic streams of channels 13 through 24 to the multiplexer 912-2. Furthermore, the mapping unit 911 supplies basic streams of channels 25 through 36 to the multiplexer 912-3 and supplies basic streams of channels 37 through 48 to the multiplexer 912-4.

Referring back to FIG. 57, in step S402, the multiplexer 912 8B/10B-converts the basic stream block by block.

Specifically, the basic stream of channel 1 is input to the receiver 941-1 of the 8B/10B converter 931-1 of the multiplexer 912-1. The receiver 941-1 S/P-converts and descrambles the basic stream, extracts data word by word (12 bits) in synchronism with a clock signal of 148.5 MHz, and supplies the extracted data to the TRS detector 942-1.

The TRS detector 942-1 detects SAV and EAV included in the basic stream and acquires word synchronization of the basic stream. Then, the TRS detector 942-1 extracts data 48 bits by 48 bits (12 bits×4 clock pulses) successively from the beginning of the SAV of the basic stream per every four clock pulses of the clock signal of 148.5 MHz, and has the extracted data stored in the RAM 943-1.

The 8B/10B encoder 944-1 reads data blocks of 48 bits from the RAM 943-1 per every four clock pulses of the clock signal of 148.5 MHz, and 8B/10B-converts the read data blocks. The 8B/10B encoder 944-1 then supplies 8B/10B-converted data blocks of 60 bits to the data stream generator 932.

It should be noted that, as depicted on the right sides of FIGS. 58 and 59, basic streams of other channels input to the multiplexer 912-1 are similarly 8B/10B-converted block by block of 48 bits successively from the beginning of the SAV. Then, the 8B/10B-converted data blocks of 60 bits are supplied to the data stream generator 932.

In the manner described above, as schematically depicted in FIG. 60, the data blocks of 60 bits generated from the respective basic streams of channels 1 through 12 are supplied per every four clock pulses to the data stream generator 932. Thus, as illustrated by a model depicted in FIG. 61, a process of supplying data of 180 bits/samples per clock pulse to the data stream generator 932 is essentially repeated in periodic cycles of four clock pulses. Therefore, essentially a data stream of 180 bits×148.5 MHz is supplied to the data stream generator 932.

Incidentally, the multiplexers 912-2 through 912-4 also perform the similar process. Specifically, the basic streams of 12 channels input to the respective multiplexers 912 are 8B/10B-converted block by block of 48 bits successively from the beginning of the SAV. Then, 8B/10B-converted data blocks of 60 bits are each supplied to the data stream generator 932.

Referring back to FIG. 57, in step S403, the multiplexer 912 generates a data stream for transmission.

Specifically, the data stream generator 932 of the multiplexer 912-1 arrays the data blocks supplied from the 8B/10B encoder 944 into a predetermined sequence in synchronism with a clock signal of 167.0625 MHz, and extracts data in every 160 bits therefrom. Then, the data stream generator 932 generates parallel data whose word length is 160 bits from the extracted data, and outputs the generated parallel data to the P/S converter 134.

In this manner, a data stream for transmission with the basic streams of channels 1 through 12 multiplexed thereinto is generated and supplied to the P/S converter 134. Furthermore, the bit rate of the data stream is changed from 180 bits×148.5 MHz to 160 bits×167.0625 MHz.

At this time, in addition, the data stream generator 932 replaces the data of two words or more (24 bits or more) at the beginning which starts with SAV on each line of the basic stream of channel 1 with K28.5 or the like which is a comma character of an 8B/10B code. The replaced data are used as a synchronizing signal of the data stream for transmission.

Furthermore, the data stream generators 932 of the multiplexers 912-2 through 912-4 each also perform the similar process as the data stream generator 932 of the multiplexer 912-1, generating data streams for transmission and supplying them to the P/S converter 134. Data streams for transmission with the respective basic streams of channels 13 through 24, channels 25 through 36, and channels 37 through 48 multiplexed are thus generated and supplied to the P/S converter 134.

Incidentally, the data of two words or more at the beginning which starts with SAV on each line of the basic streams of channels 13, 25 and 37 are replaced with K28.5 or the like which is a comma character of an 8B/10B code as with the basic stream of channel 1.

In step S404, data streams for transmission of four lanes are sent in the manner similar to the processing of step S4 depicted in FIG. 10.

Video Signal Receiving Process According to the Seventh Embodiment

Figure 62:
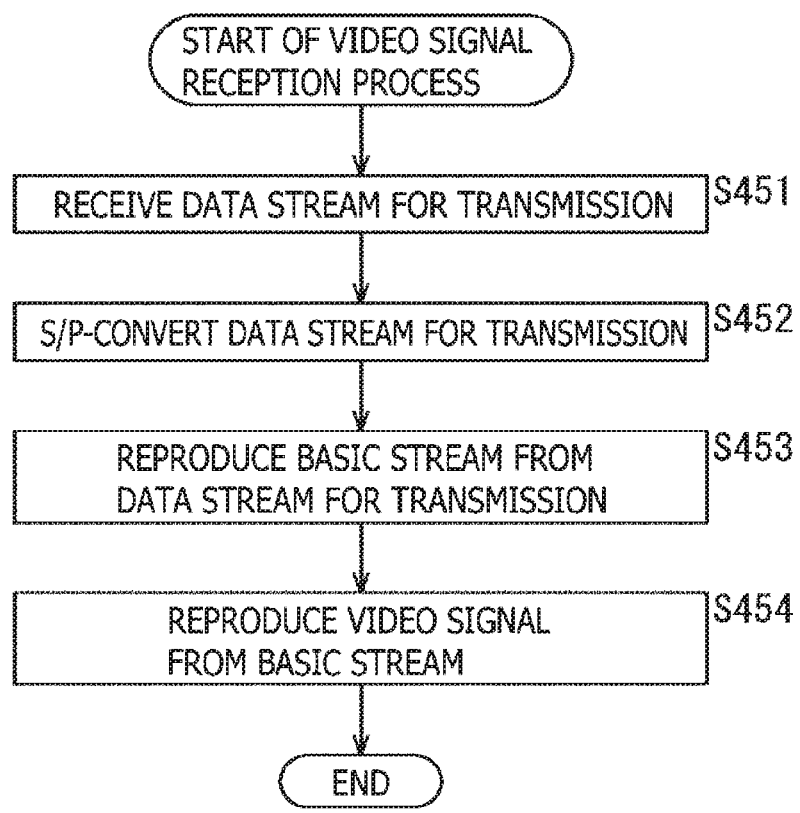
FIG. 62 is a flowchart illustrative of a video signal receiving process according to the seventh embodiment.

Next, a video signal receiving process that is carried out by the CCU 12e in a manner corresponding to the video signal sending process depicted in FIG. 57 will be described below with reference to a flowchart depicted in FIG. 62.

In step S451, data streams for transmission of four lanes are received in the manner similar to the processing of step S51 depicted in FIG. 24.

In step S452, the data streams for transmission of four lanes are S/P-converted in the manner similar to the processing of step S52 depicted in FIG. 24.

In step S453, the word synchronization detector/data stream reproducer 1011 reproduces basic streams from the data streams for transmission. Specifically, the word synchronization detector/data stream reproducer 1011 detects word synchronization signals multiplexed in the data streams for transmission of four lanes and acquires word synchronization of the data streams for transmission. Then, the word synchronization detector/data stream reproducer 1011 reproduces basic streams of 48 channels from the data streams for transmission of four lanes according to a process that is a reversal of the process carried out by the multiplexer 912 of the broadcasting camera 11e. The word synchronization detector/data stream reproducer 1011 supplies the reproduced basic streams of 48 channels to the video reproducer 1012.

In step S454, the video reproducer 1012 reproduces video signals from the basic streams. Specifically, the video reproducer 1012 reproduces the original 8K signal from the basic streams of 48 channels according to a process that is a reversal of the process carried out by the mapping unit 911 of the broadcasting camera 11e. The video reproducer 1012 supplies the reproduced 8K signal to the video processor 203.

In the manner described above, video signals of 7680×4320/50P-60P/4:4:4, 4:2:2/10 bits, 12 bits can be transmitted on data streams for transmission of four lanes through the 100-GbE device.

10. Eighth Embodiment

An eighth embodiment of the present technology will next be described with reference to FIGS. 63 through 71.

According to the eighth embodiment, an 8K signal of 100P-120P is transmitted using a 100-GbE device. 8K signals of 100P-120P include a video signal of 7680×4320/100P-120P/4:4:4, 4:2:2/10 bits, 12 bits.

Configurational Example of Broadcasting Camera 11f

Figure 63:
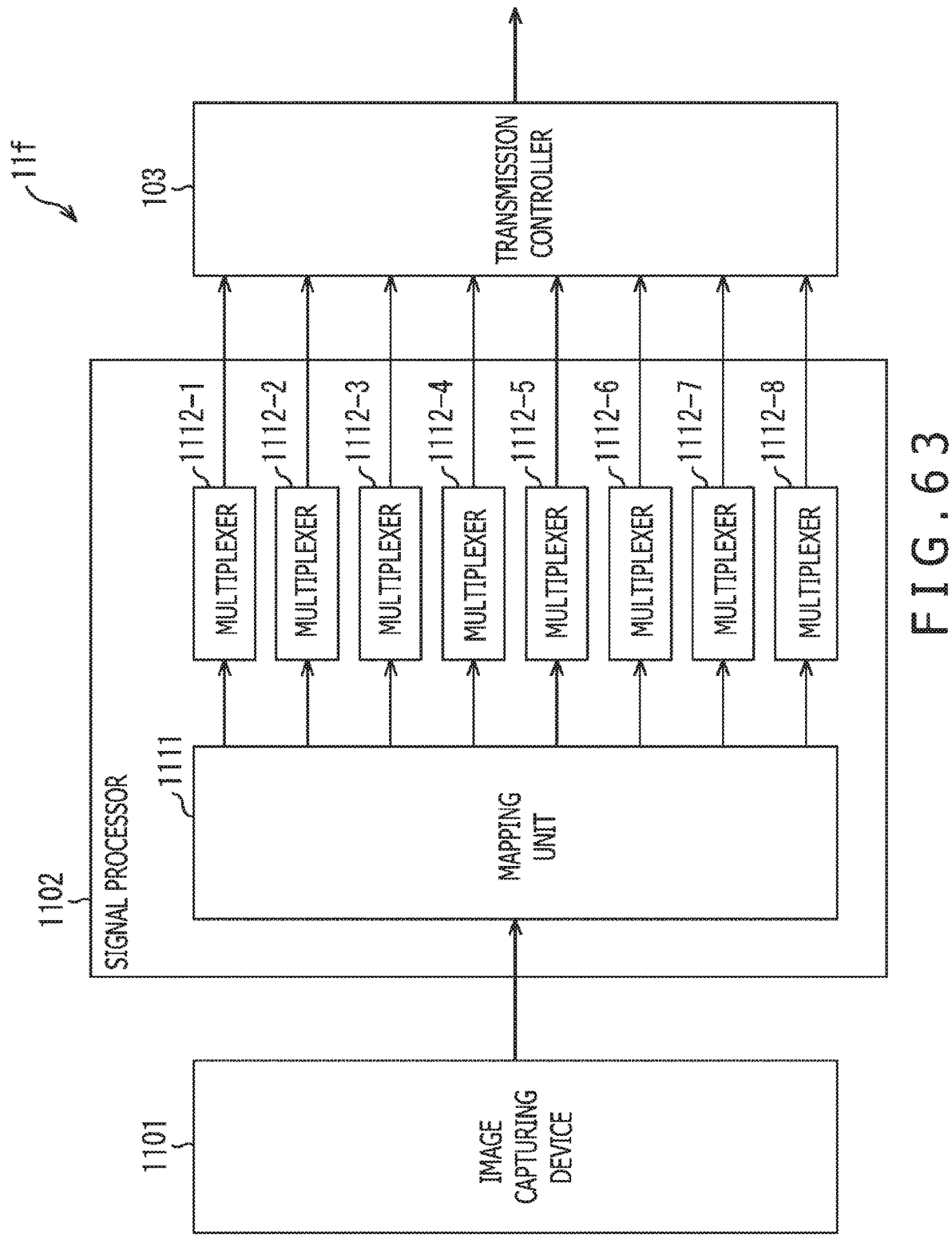
FIG. 63 is a block diagram depicting a configurational example of the functions of a broadcasting camera according to an eighth embodiment.

FIG. 63 is a block diagram depicting a configurational example of the functions of a broadcasting camera 11f as a form in which the broadcasting camera 11 according to the eighth embodiment is reduced to practice. It should be noted that those parts in FIG. 63 which correspond to those of the broadcasting camera 11e depicted in FIG. 54 are denoted by identical reference characters, and the description of parts that carry out the same processing sequences will be omitted accordingly as it is repetitive.

The broadcasting camera 11f is different from the broadcasting camera 11e in that an image capturing device 1101 and a signal processor 1102 are provided in place of the image capturing device 901 and the signal processor 902.

The image capturing device 1101 includes a CMOS image sensor, a CCD image sensor, or the like, for example. The image capturing device 1101 supplies a mapping unit 1111 of the signal processor 1102 with a video signal obtained as a result of an image capturing process. The video signal includes a video signal of 7680×4320/100P-120P/4:4:4, 4:2:2/10 bits, 12 bits, for example.

The signal processor 1102 multiplexes the video signal supplied from the image capturing device 1101 into a data stream that can be transmitted through the 100-GbE device, and supplies the generated data stream to the transmission controller 103. The signal processor 1102 is arranged to include the mapping unit 1111 and multiplexers 1112-1 through 1112-8.

The mapping unit 1111 generates basic streams of 48 channels onto which the video signal supplied from the image capturing device 1101 has been mapped, as described later. Then, the mapping unit 1111 supplies the basic streams of channels 1 through 6 to the multiplexer 1112-1 and supplies the basic streams of channels 7 through 12 to the multiplexer 1112-2. In addition, the mapping unit 1111 supplies the basic streams of channels 13 through 18 to the multiplexer 1112-3 and supplies the basic streams of channels 19 through 24 to the multiplexer 1112-4. Furthermore, the mapping unit 1111 supplies the basic streams of channels 25 through 30 to the multiplexer 1112-5 and supplies the basic streams of channels 31 through 36 to the multiplexer 1112-6. Moreover, the mapping unit 1111 supplies the basic streams of channels 37 through 42 to the multiplexer 1112-7 and supplies the basic streams of channels 43 through 48 to the multiplexer 1112-8.

The multiplexers 1112-1 through 1112-8 perform channel coding on the respective basic streams of 6 channels supplied from the mapping unit 1111 thereto and multiplex them, thereby generating data streams for transmission, as described later. Then the multiplexers 1112-1 through 1112-8 supply the generated data streams for transmission to the transmission controller 103.

Incidentally, in case the multiplexers 1112-1 through 1112-8 do not need to be individually distinguished hereinbelow, they are simply referred to as a multiplexer 1112.

Configurational Example of Multiplexer 1112

Figure 64:
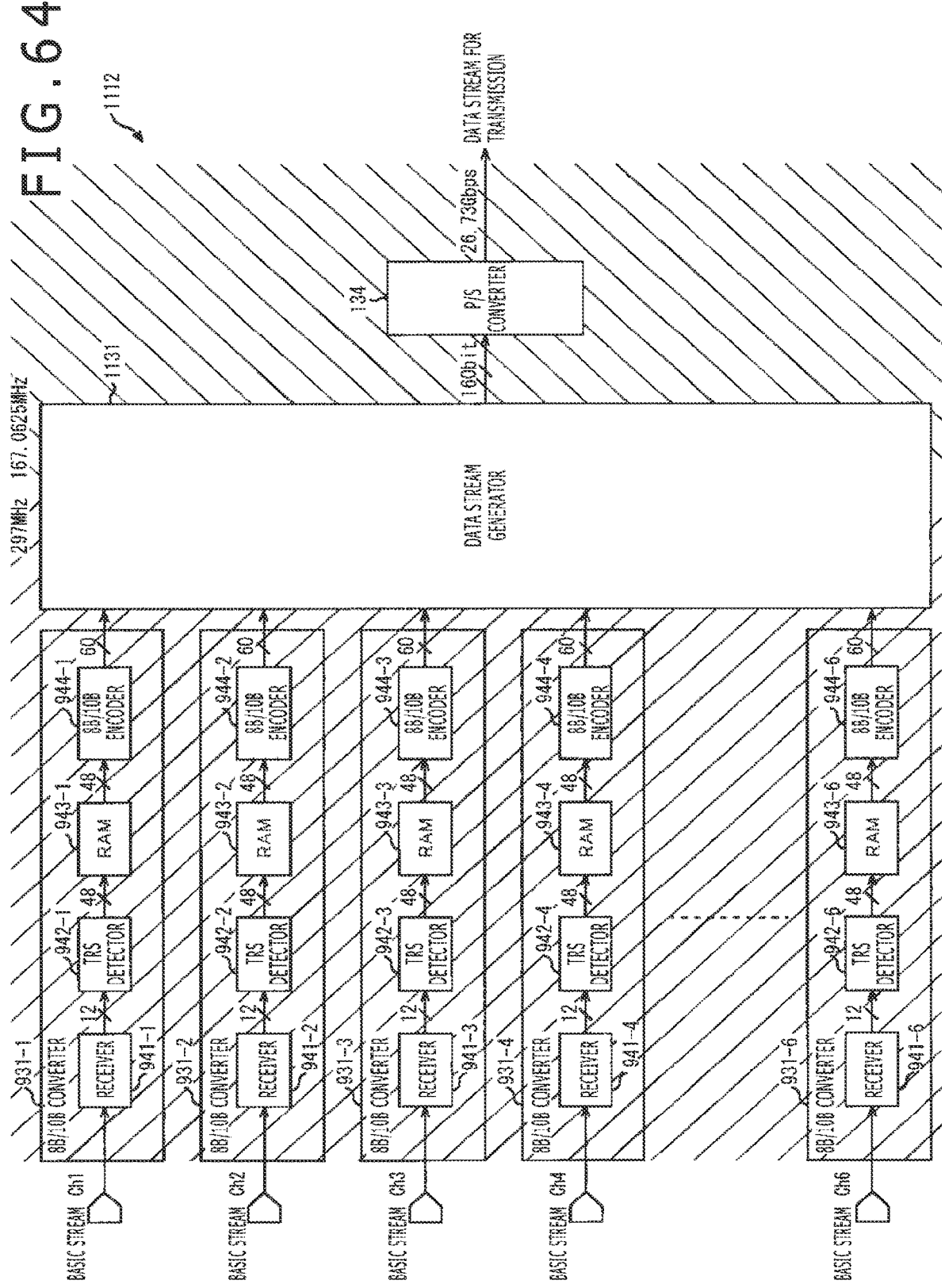
FIG. 64 is a block diagram depicting a configurational example of the functions of a multiplexer of the broadcasting camera according to the eighth embodiment.

FIG. 64 is a block diagram depicting a configurational example of the functions of the multiplexer 1112. It should be noted that those parts in FIG. 64 which correspond to those of the multiplexer 912 depicted in FIG. 55 are denoted by identical reference characters, and the description of parts that carry out the same processing sequences will be omitted accordingly as it is repetitive.

The multiplexer 1112 is different from the multiplexer 912 in that a data stream generator 1131 is provided in place of the data stream generator 932 and the number of 8B/10B converters 931 is reduced from 12 to 6.

The data stream generator 1131 generates parallel data streams for transmission, which have a predetermined word length, by multiplexing the data blocks supplied from the 8B/10B encoders 944-1 through 944-6 in a predetermined order. The data stream generator 1131 supplies the generated data streams for transmission to the P/S converter 134.

Configurational Example of CCU 12*f*

Figure 65:
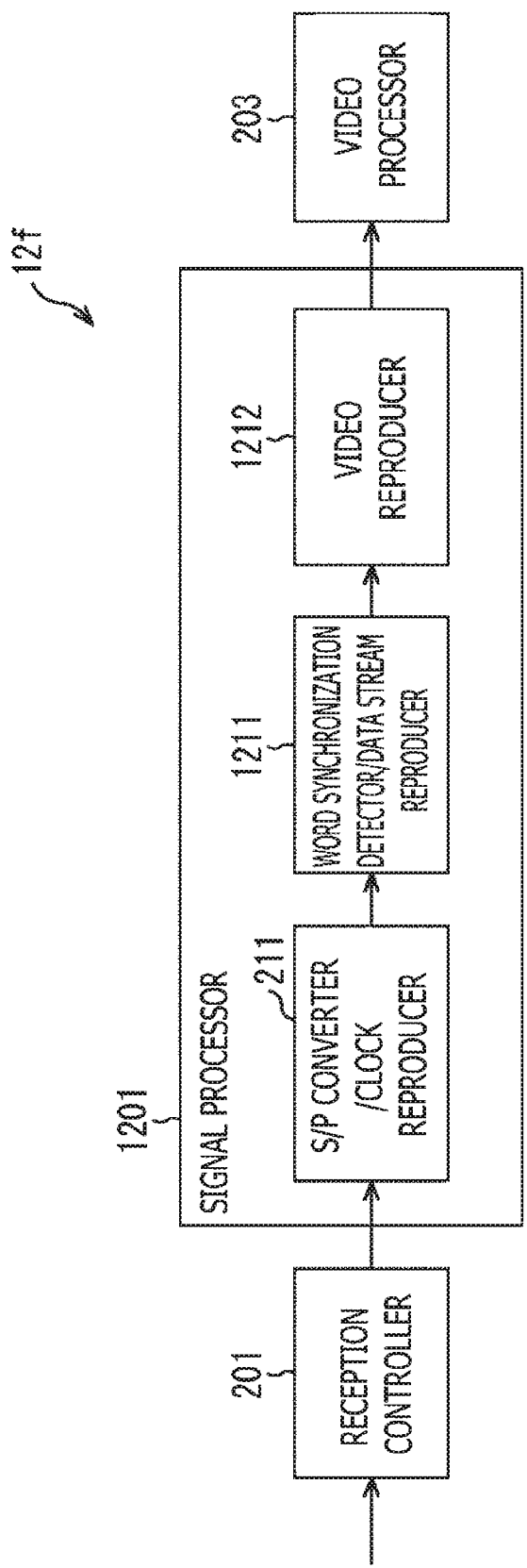
FIG. 65 a block diagram depicting a configurational example of the functions of a CCU according to the eighth embodiment.

FIG. 65 is a block diagram depicting a configurational example of the functions of a CCU 12*f* as a form in which the CCU 12 according to the eighth embodiment is reduced to practice. It should be noted that those parts in FIG. 65 which correspond to those of the CCU 12*e* depicted in FIG. 56 are denoted by identical reference characters, and the description of parts that carry out the same processing sequences will be omitted accordingly as it is repetitive.

The CCU 12*f* is different from the CCU 12*e* in that a signal processor 1201 is provided in place of the signal processor 1001. The signal processor 1201 is different from the signal processor 1001 in that a word synchronization detector/data stream reproducer 1211 and a video reproducer 1212 are provided in place of the word synchronization detector/data stream reproducer 1011 and the video reproducer 1012.

The word synchronization detector/data stream reproducer 1211 detects a word synchronization signal from the serial/parallel-converted data streams for transmission. Moreover, the word synchronization detector/data stream reproducer 1211 reproduces basic streams of 48 channels from the data streams for transmission according to a process that is a reversal of the process of the multiplexer 1112 of the broadcasting camera 11*f*, and supplies the reproduced basic streams to the video reproducer 1212.

The video reproducer 1212 reproduces the original 8K signal from the basic streams of 48 channels according to a process that is a reversal of the process of the mapping unit 1111 of the broadcasting camera 11*f*, and supplies the reproduced 8K signal to the video processor 203.

Video Signal Sending Process According to the Eighth Embodiment

Figure 66:
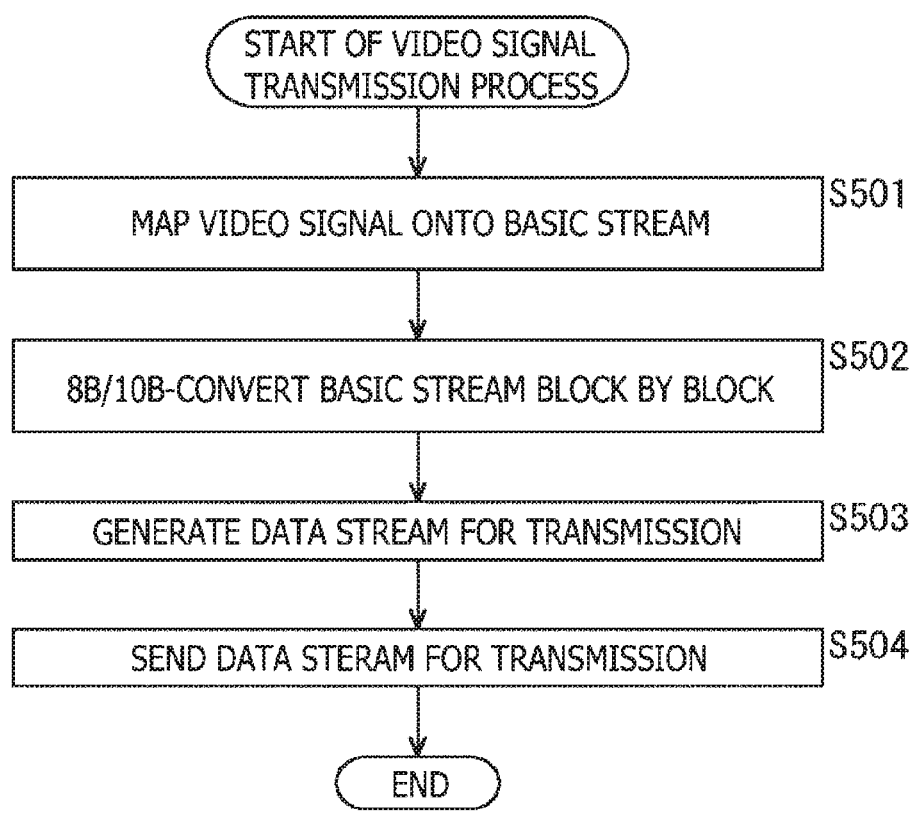
FIG. 66 is a flowchart illustrative of a video signal sending process according to the eighth embodiment.

Next, a video signal sending process that is carried out by the broadcasting camera 11*f* in the eighth embodiment will be described with reference to a flowchart depicted in FIG. 66.

In step S501, the mapping unit 1111 of the signal processor 1102 maps a video signal onto basic streams.

Figure 57:
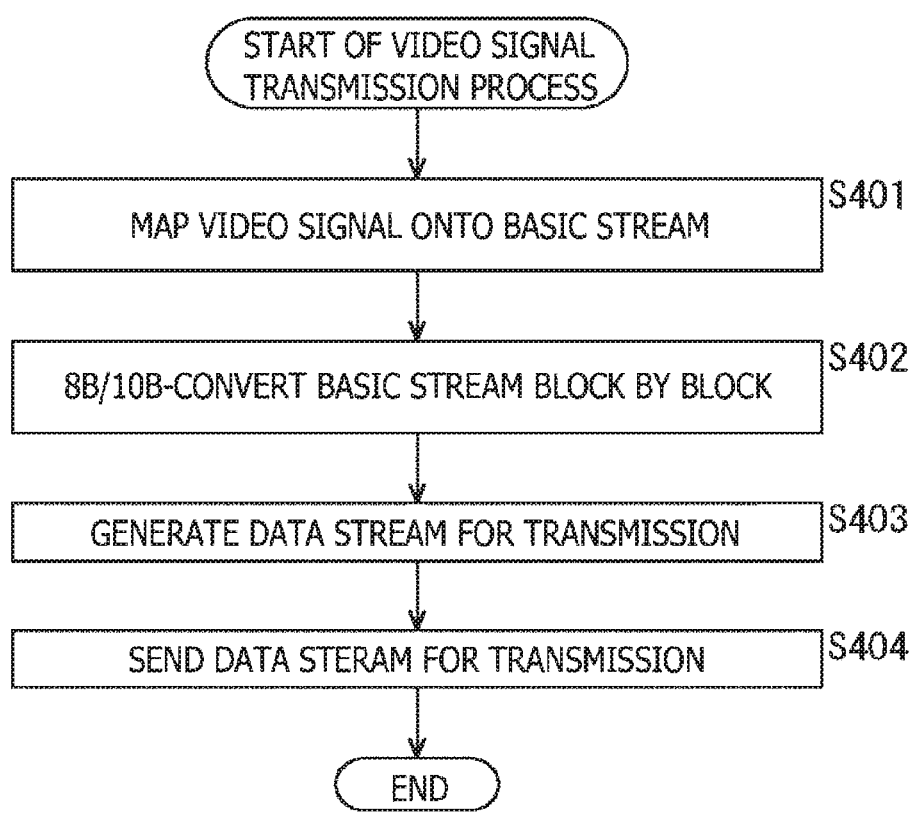
FIG. 57 is a flowchart illustrative of a video signal sending process according to the seventh embodiment.

Specifically, the mapping unit 1111 maps an 8K signal onto basic streams of 48 channels in the manner similar to the processing of the mapping unit 911 in step S401 depicted in FIG. 57. At this time, moreover, the mapping unit 1111 multiplexes auxiliary data and left and right extra pixels of the video signal into the horizontal auxiliary data areas of the basic streams.

Specific examples of processes of multiplexing auxiliary data and extra pixels will hereinafter be described below with reference to FIGS. 67 and 68.

(First Process of Multiplexing Auxiliary Data and Extra Pixels)

Figure 67:
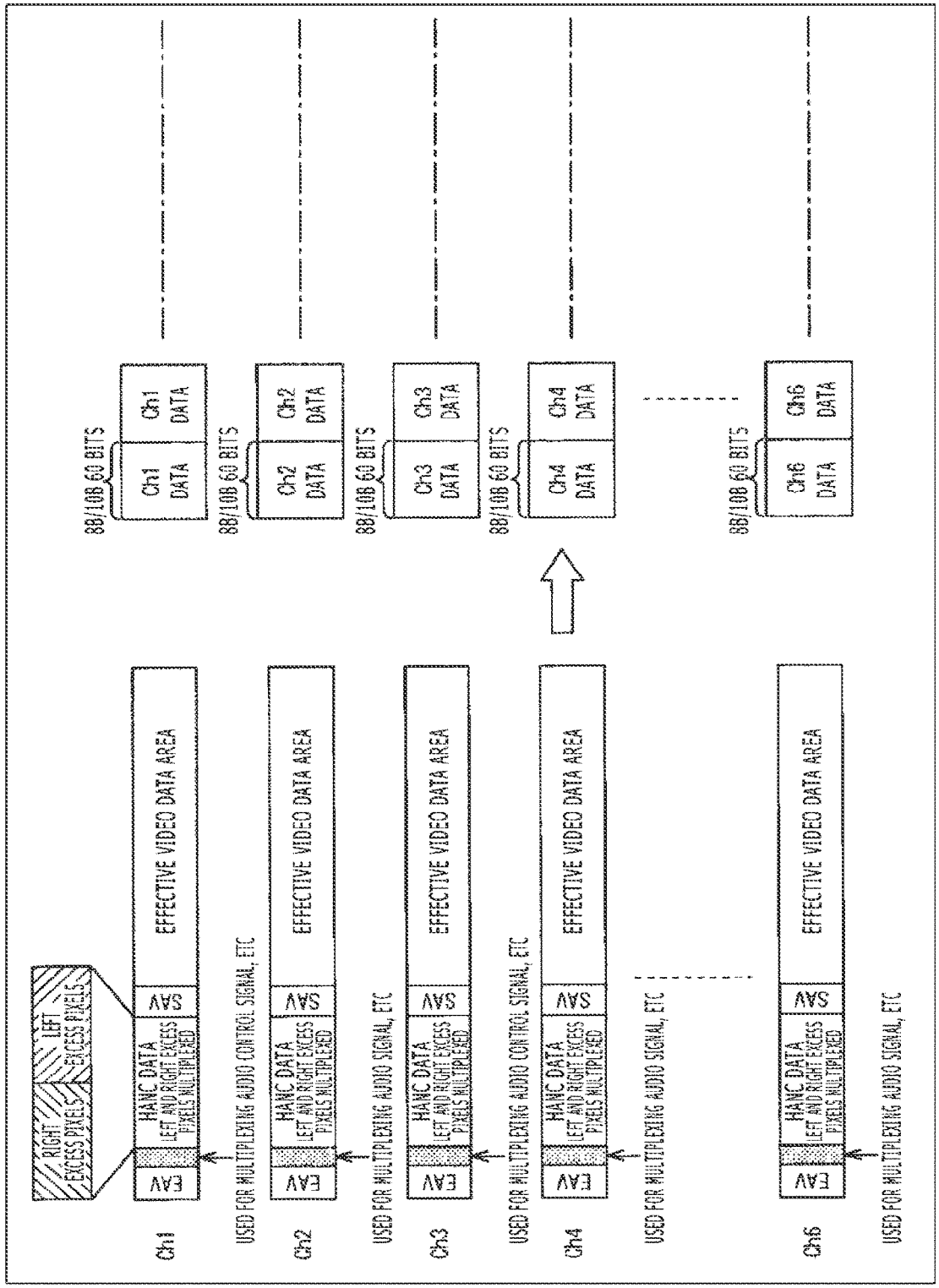
FIG. 67 is a diagram illustrative of a first example of a process of multiplexing auxiliary data and excess pixels and a process of generating data blocks in the video signal sending process according to the eighth embodiment.

A figure on the left side of FIG. 67 depicts a first process of multiplexing auxiliary data and extra pixels. It should be noted that, although FIG. 67 depicts only basic streams of channels 1 through 6 supplied from the mapping unit 1111 to the multiplexer 1112-1, auxiliary data and extra pixels are multiplexed into the basic streams of remaining channels 7 through 48 by the similar process.

Specifically, in the first multiplexing process, auxiliary data and extra pixels are multiplexed in the manner similar to the first multiplexing process according to the seventh embodiment. That is, auxiliary data multiplexing areas are kept in horizontal auxiliary data areas of the basic streams of the respective channels. Then, audio data packets conforming to the provisions of SMPTE 299-1 are multiplexed into the auxiliary data multiplexing areas of the basic streams of even-numbered channels. Furthermore, audio control packets, time codes, payload IDs, etc. are multiplexed into the auxiliary data multiplexing areas of the basic streams of odd-numbered channels. Moreover, the data of pixel samples in the left and right extra pixel areas of an 8K signal are multiplexed into an extra pixel multiplexing area, exclusive of the auxiliary data multiplexing area, in the horizontal auxiliary data area of the basic stream of each channel.

In this manner, a maximum of 24 audio data packets can be multiplexed into the basic streams of 48 channels in the manner similar to the first multiplexing process according to the seventh embodiment.

Now, for example, a 48 kHz-sampled audio signal is sampled approximately 0.426 times (=48 kHz÷100 Hz÷1125 lines) on average per line with respect to a basic stream of 1920×1125/100P. Moreover, for example, a 48 kHz-sampled audio signal is sampled approximately 0.356 times (=48 kHz÷120 Hz÷1125 lines) on average per line with respect to a basic stream of 1920×1125/120P. In other words, a 48 kHz-sampled audio signal is sampled once for two lines or three lines of basic streams of 1920×1125/100P, 4120P.

Therefore, for multiplexing a 48 kHz-sampled audio signal into basic streams of 1920×1125/100P, 120P and transmitting the multiplexed data, it is necessary to multiplex a maximum of one sample of the audio signal of each channel into a maximum of two lines. Further, since 24 audio data packets can be multiplexed as described above, a 48 kHz-sampled audio signal can be multiplexed and transmitted in a maximum of 192 channels (=4 channels×24×2).

Furthermore, 32 kHz- and 44.1 kHz-sampled audio signals can also be similarly transmitted in a maximum of 192 channels. On the other hand, a 96 kHz-sampled audio signal can be transmitted in a maximum of 96 channels, one half of the 192 channels.

Incidentally, for example, the extra pixel multiplexing area relative ratio is of the same value as with the first multiplexing process according to the seventh embodiment.

(Second Process of Multiplexing Auxiliary Data and Extra Pixels)

Figure 68:
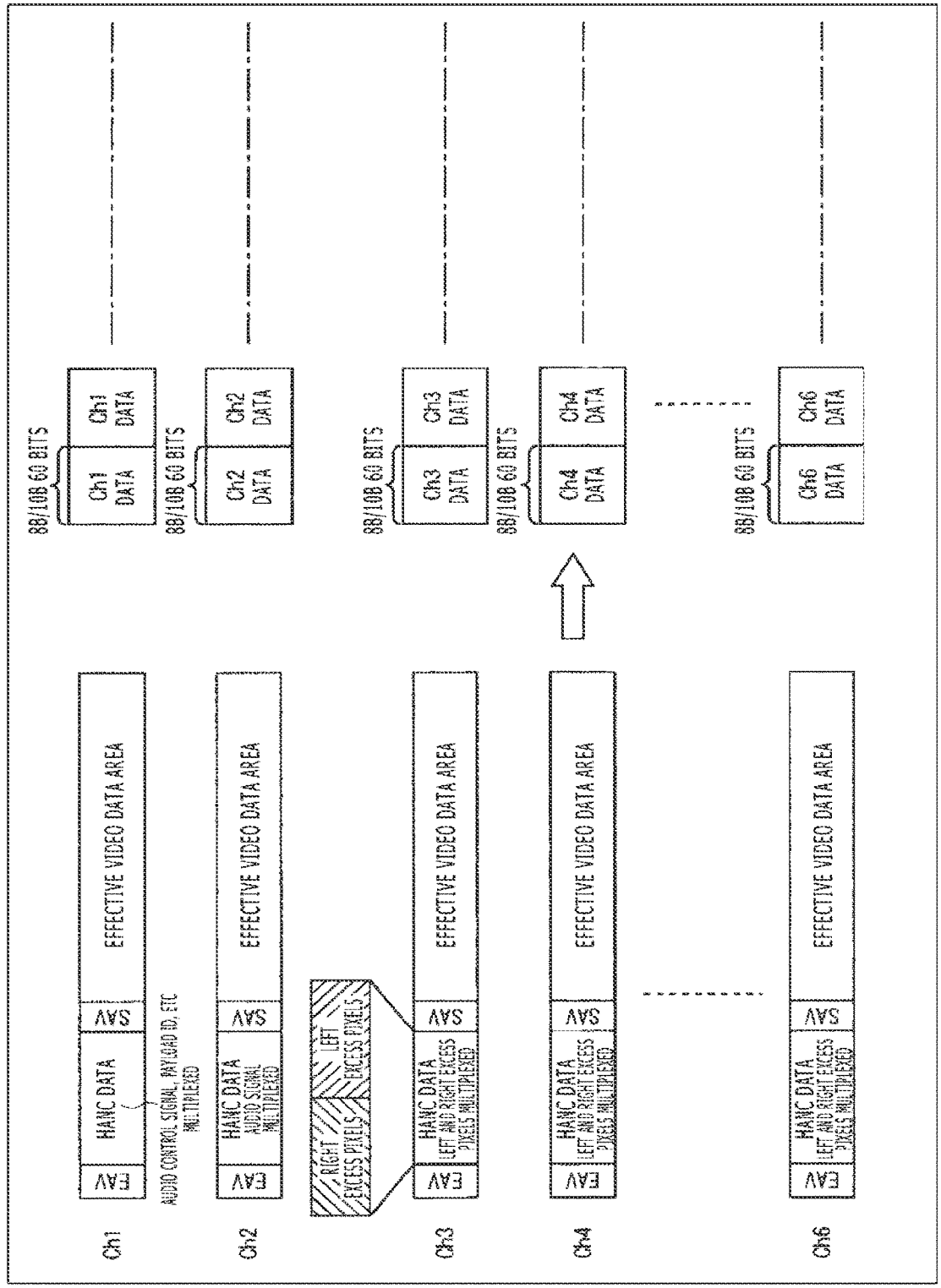
FIG. 68 is a diagram illustrative of a second example of a process of multiplexing auxiliary data and excess pixels and a process of generating data blocks in the video signal sending process according to the eighth embodiment.

A figure on the left side of FIG. 68 depicts a second process of multiplexing auxiliary data and extra pixels. It should be noted that, although FIG. 68 depicts only basic streams of channels 1 through 6 supplied from the mapping unit 1111 to the multiplexer 1112-1, auxiliary data and extra pixels are multiplexed into basic streams of remaining channels 7 through 48 by the similar process.

Specifically, a maximum of four audio data packets are multiplexed twice into the horizontal auxiliary data areas of basic streams of channels 2, 8, 14, 20, 26, 32, 38 and 44. Furthermore, audio control packets, payload IDs, time codes, etc. are multiplexed into the horizontal auxiliary data areas of basic streams of channels 1, 7, 13, 19, 25, 31, 37 and 43.

Therefore, a maximum of 64 audio data packets can be multiplexed into basic streams of 48 channels. 32 kHz-, 44.1 kHz-, or 48 kHz-sampled audio signals of a maximum of 256 channels can thus be multiplexed and transmitted. Moreover, 96 kHz-sampled audio signals of a maximum of 128 channels can be multiplexed and transmitted.

Incidentally, if the effective video data area of a basic stream is of 2048 samples, as described above, then the number of audio data packets that can be multiplexed into the horizontal auxiliary data area is one half of the number of audio data packets in case the effective video data area is of 1920 samples. Therefore, if the effective video data area of a basic stream is of 2048 samples, then 32 kHz-, 44.1 kHz-, or 48 kHz-sampled audio signals of a maximum of 128 channels can be multiplexed and transmitted. In addition, 96 kHz-sampled audio signals of a maximum of 64 channels can be multiplexed and transmitted.

In addition, the overall horizontal auxiliary data areas of basic streams of 40 channels excluding channels 1, 2, 7, 8, 13, 14, 19, 20, 25, 26, 31, 32, 37, 38, 43 and 44 into which auxiliary data are multiplexed are assigned as extra pixel multiplexing areas.

Then, the extra pixel multiplexing area relative ratio is of values indicated by the equations (25) and (26) below. It should be noted that the equation (25) represents a ratio in case a video signal of 7680×4320/120P is transmitted, and the equation (26) represents a ratio in case a video signal of 7680×4320/100P is transmitted.

$$(2200-1920-12)\times32\div48\div1920=0.093=9.3\% \quad (25)$$

$$(2640-1920-12)\times32\div48\div1920=0.246=24.6\% \quad (26)$$

In this manner, a sufficient extra pixel multiplexing area can be kept with respect to an effective video data area, making it possible to multiplex all the data of pixel samples in the left and right extra pixel areas of an 8K signal and transmit the multiplexed data.

Incidentally, the data of pixel samples in the upper and lower extra pixel areas of the 8K signal can be transmitted in their entirety by being multiplexed into the vertical blanking areas of each basic image.

An 8K signal is mapped onto basic streams of 48 channels in the manner described above. It should be noted that the processes of mapping an 8K signal, as described above, are illustrated by way of example, and an 8K signal may be mapped onto basic streams of 48 channels according to other processes.

Then, the mapping unit 1111 supplies basic streams of channels 1 through 6 to the multiplexer 1112-1 and supplies basic streams of channels 7 through 12 to the multiplexer 1112-2. Furthermore, the mapping unit 1111 supplies basic streams of channels 13 through 18 to the multiplexer 1112-3 and supplies basic streams of channels 19 through 24 to the multiplexer 1112-4. In addition, the mapping unit 1111 supplies basic streams of channels 25 through 30 to the multiplexer 1112-5 and supplies basic streams of channels 31 through 36 to the multiplexer 1112-6. Moreover, the mapping unit 1111 supplies basic streams of channels 37 through 42 to the multiplexer 1112-7 and supplies basic streams of channels 43 through 48 to the multiplexer 1112-8.

Referring back to FIG. 66, in step S502, basic streams of 48 channels are 8B/10B-converted block by block in the manner similar to the processing of step S402 depicted in FIG. 57. Then, 8B/10B-converted data blocks of 60 bits are each supplied to the data stream generator 1131. However, unlike the processing of step S402 depicted in FIG. 57, the 8B/10B conversion is carried out in every four clock pulses of a clock signal of 297 MHz.

Figure 69:
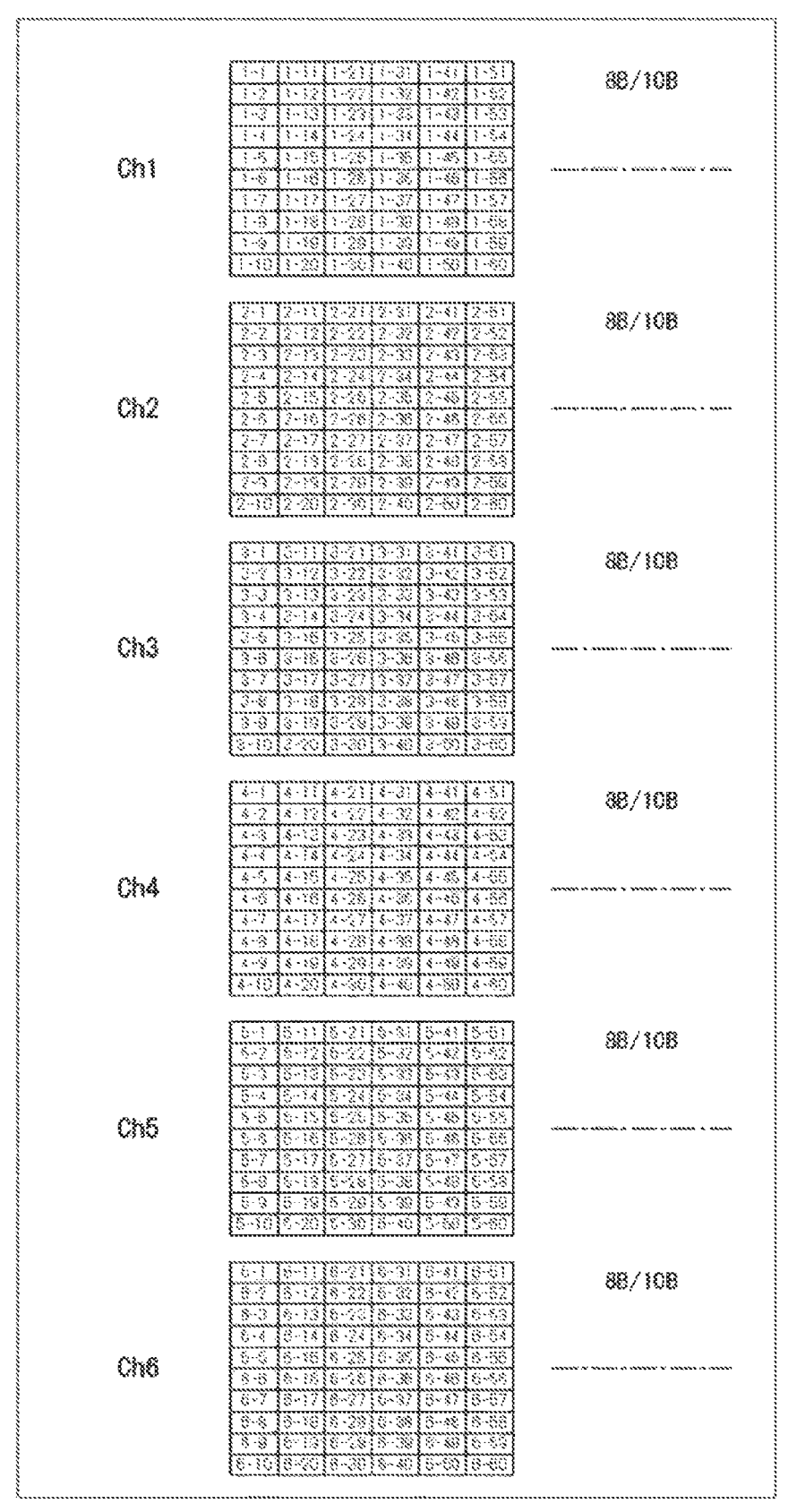
Figure 70:
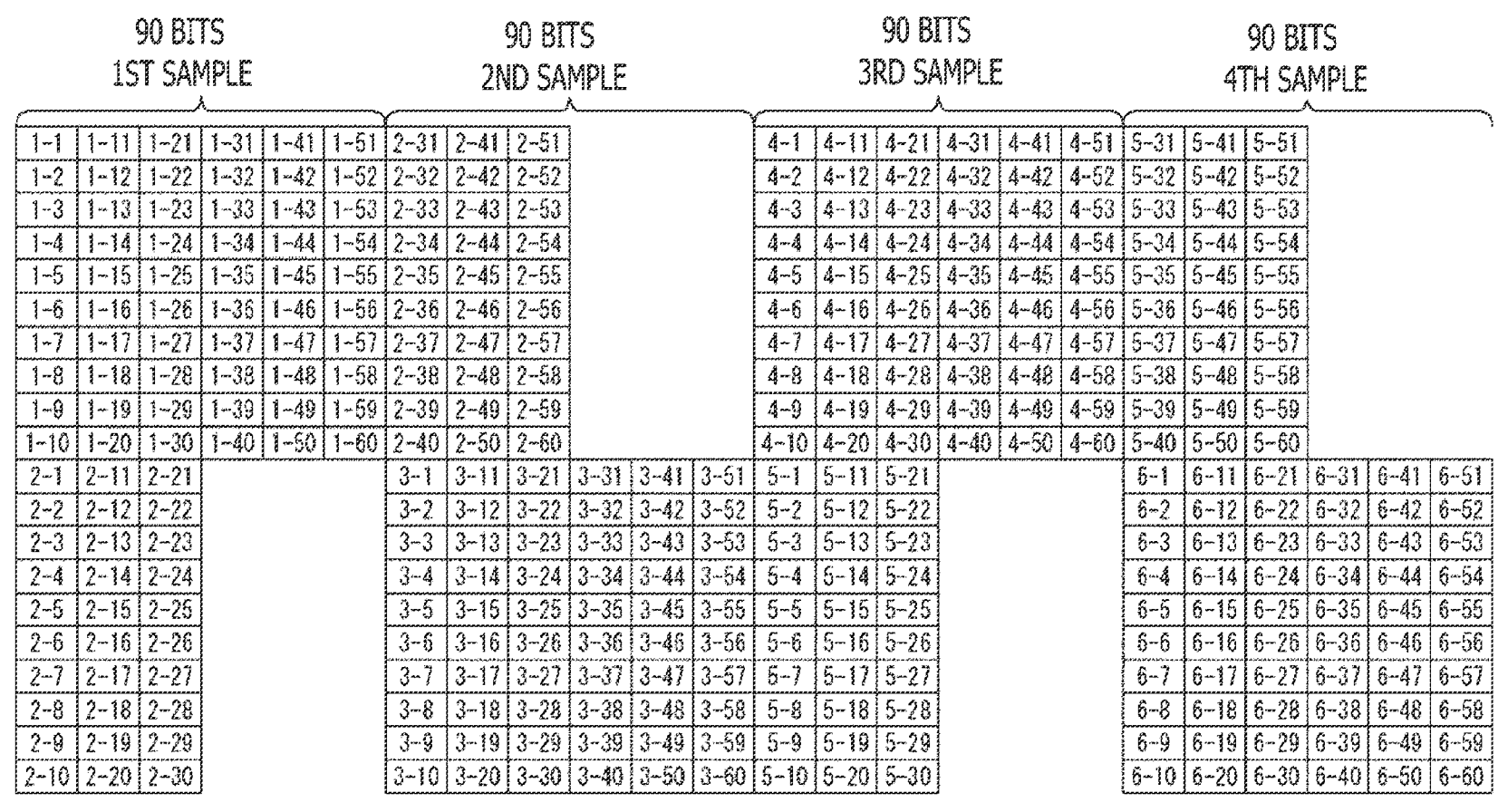

Consequently, as schematically depicted in FIG. 69, the data blocks of 60 bits generated from the basic streams of channels 1 through 6 are supplied per every four clock pulses from the multiplexer 1112-1 to the data stream generator 1131. Thus, as illustrated by a model depicted in FIG. 70, a process of supplying data of 90 bits/samples per clock pulse from the multiplexer 1112-1 to the data stream generator 1131 is essentially repeated in periodic cycles of four clock pulses. Therefore, essentially a data stream of 90 bits×297 MHz is supplied from each multiplexer 1112 to the data stream generator 1131.

In step S503, the multiplexer 1112 generates a data stream for transmission.

Specifically, the data stream generator 1131 of the multiplexer 1112-1 arrays the data blocks supplied from the 8B/10B encoder 944 into a predetermined sequence in synchronism with a clock signal of 167.0625 MHz, and extracts data in every 160 bits therefrom. Then, the data stream generator 1131 generates parallel data whose word length is 160 bits from the extracted data, and outputs the generated parallel data to the P/S converter 134.

In this manner, a data stream for transmission with the basic streams of channels 1 through 6 multiplexed thereinto is generated and supplied to the P/S converter 134. Furthermore, the bit rate of the data stream is changed from 90 bits×297 MHz to 160 bits×167.0625 MHz.

At this time, in addition, the data stream generator 1131 replaces the data of two words or more (24 bits or more) at the beginning which starts with SAV on each line of the basic stream of channel 1 with K28.5 or the like which is a comma character of an 8B/10B code. The replaced data are used as a synchronizing signal of the data stream for transmission.

Furthermore, the data stream generators 932 of the multiplexers 1112-2 through 1112-8 each also perform the similar process as the data stream generator 1131 of the multiplexer 1112-1, generating data streams for transmission and supplying them to the P/S converter 134. In this manner, data streams for transmission into which basic streams of channels 7 through 12, channels 13 through 18, channels 19 through 24, channels 25 through 30, channels 31 through 36, channels 37 through 42, and channels 43 through 48 have been multiplexed are generated and supplied to the P/S converter 134.

Incidentally, the data of two words or more at the beginning which starts with SAV on each line of the basic streams of channels 7, 13, 19, 25, 31, 37 and 43 are replaced with K28.5 or the like which is a comma character of an 8B/10B code, as with the basic stream of channel 1.

In step S504, data streams for transmission of eight lanes are sent in the manner similar to the processing of step S4 depicted in FIG. 10. At this time, as described above, data streams for transmission of eight lanes can be transmitted at one time through the single optical fiber cable 13.

Video Signal Receiving Process According to the Eighth Embodiment

Figure 71:
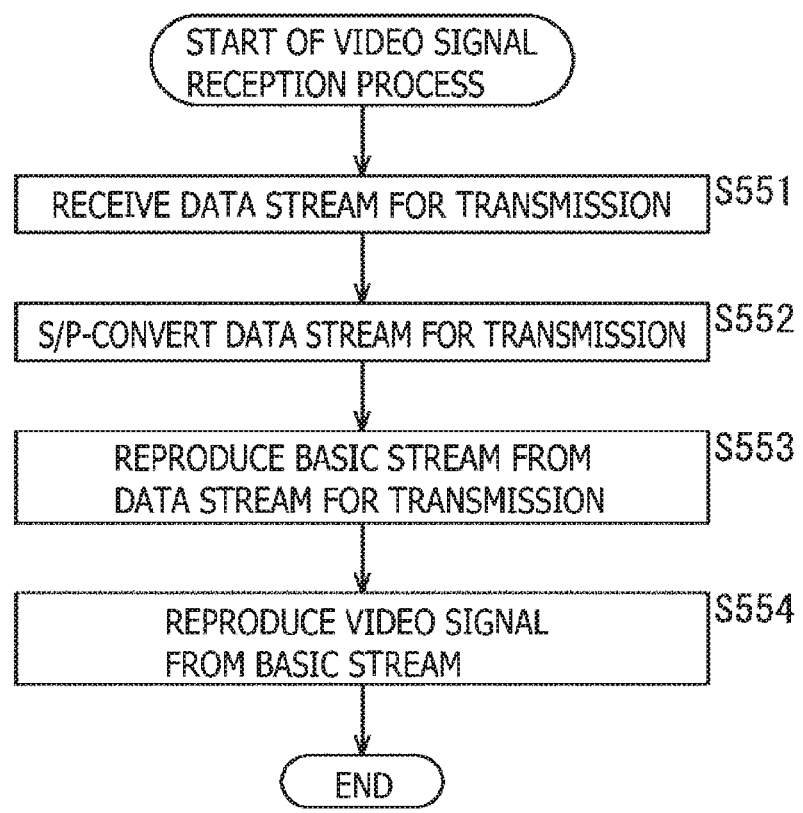
FIG. 71 is a flowchart illustrative of a video signal receiving process according to the eighth embodiment.

Next, a video signal receiving process that is carried out by the CCU 12f in a manner corresponding to the video signal sending process depicted in FIG. 66 will be described below with reference to a flowchart depicted in FIG. 71.

In step S551, data streams for transmission of eight lanes are received in the manner similar to the processing of step S51 depicted in FIG. 24.

In step S552, the data streams for transmission of eight lanes are S/P-converted in the manner similar to the processing of step S52 depicted in FIG. 24.

In step S553, the word synchronization detector/data stream reproducer 1211 reproduces basic streams from the data streams for transmission. Specifically, the word synchronization detector/data stream reproducer 1211 detects word synchronization signals multiplexed in the data streams for transmission of eight lanes and acquires word synchronization of the data streams for transmission. Then, the word synchronization detector/data stream reproducer 1211 reproduces basic streams of 48 channels from the data streams for transmission of eight lanes according to a process that is a reversal of the process carried out by the multiplexer 1112 of the broadcasting camera 11f. The word synchronization detector/data stream reproducer 1211 supplies the reproduced basic streams of 48 channels to the video reproducer 1212.

In step S554, the video reproducer 1212 reproduces video signals from the basic streams. Specifically, the video reproducer 1212 reproduces the original 8K signal from the basic streams of 48 channels according to a process that is a reversal of the process carried out by the mapping unit 1111 of the broadcasting camera 11f. The video reproducer 1212 supplies the reproduced 8K signal to the video processor 203.

In the manner described above, video signals of 7680× 4320/100P-120P/4:4:4, 4:2:2/10 bits, 12 bits can be transmitted on data streams for transmission of eight lanes through the 100-GbE device.

As described above, 8K or 4K video signals can be transmitted using a 100-GbE device according to the first through eighth embodiments of the present technology.

The development and commercialization of UHDTV has been spurred on as indicated by video signal standards established for UHDTV by ITU and UHDTV broadcasts accelerated ahead of schedule by the Ministry of Internal Affairs and Communications of Japan, for example. On the other hand, according to the formulas prescribed by SMPTE 2036-3, in-studio interfaces are capable of handling frame rates of at most 60P, and there are no effective transmission formulas for UHDTV/120P signals standardized by ITU. Furthermore, there are no effective transmission formulas for UHDTV2/120P signals that are video signals having an ultra-high rate up to 144 Gbps. Now, by applying the present technology, it is possible to transmit video signals of UHDTV/120P and UHD20P using optical modules for 100 GbE which are expected to find widespread use and become inexpensive in the future.

Furthermore, the first through sixth embodiments of the present technology are in conformity with the existing standards such as SMPTE 2036-3, etc., and allow conventional techniques and products to be easily applicable thereto.

Moreover, using the present technology, multichannel audio signals can be multiplexed and transmitted regardless of whether the effective pixel areas are of 1920 samples or 2048 samples. In addition, the data of pixel samples in vertical and horizontal extra pixel areas of 8K or 4K video signals can be multiplexed and transmitted in their entirety.

Furthermore, according to the present technology, since the same signal processing is carried out on the effective pixel areas and the extra pixel areas, the signal processing is made easy, making it possible to reduce the circuit scale and processing time, for example.

11. Modifications

According to the first through sixth embodiments, a video signal is mapped onto data streams of HD-SDI of a plurality of channels by the mapping unit, and the mapped data are supplied to the multiplexer. However, a video signal may be mapped onto data streams of 3G-SDI and data streams of 6G-SDI and 12G-SDI that have recently started being discussed in SMPTE, and the mapped data may be supplied to the multiplexer.

For example, according to the first embodiment and the second embodiment, it is possible to map an 8K signal onto 3G-SDI of 32 channels. According to the third embodiment, it is possible to map an 8K signal onto 3G-SDI of 16 channels. According to the fifth embodiment, is possible to map a 4K RAW signal onto 3G-SDI of 16 channels.

Incidentally, inasmuch as 3G-SDI is basically word-interleaved HD-SDI, it is possible to generate a data stream for transmission by mapping a video signal onto 3G-SDI in the manner similar to mapping a video signal onto HD-SDI. In addition, auxiliary data and extra pixels may be multiplexed into horizontal auxiliary data areas of HD-SDI before 3G-SDI is generated, for example.

Furthermore, combinations of data streams (HD-SDI, 3G-SDI, or basic streams) to be multiplexed into a data stream for transmission are not limited to the examples described above, but may be established arbitrarily.

According to the first embodiment, for example, an example has been illustrated in which a data stream for transmission of the first lane is generated from HD-SDI of channels 1 through 16, a data stream for transmission of the second lane is generated from HD-SDI of channels 17 through 32, a data stream for transmission of the third lane is generated from HD-SDI of channels 33 through 48, and a data stream for transmission of the fourth lane is generated from HD-SDI of channels 49 through 64.

In contrast, for example, it is possible to generate data streams for transmission of the first lane and the second lane from HD-SDI of channels 1 through 32 and data streams for transmission of the third lane and the fourth lane from HD-SDI of channels 33 through 64, or to generate data streams for transmission of the first through fourth lanes from HD-SDI of channels 1 through 64. In the former case, HD-SDI of channels 1 through 32 is divided and multiplexed into the data stream for transmission of the first lane and the data stream for transmission of the second lane, for example. In the latter case, HD-SDI of channels 1 through 64 is divided and multiplexed into the data streams for transmission of the first through fourth lanes, for example.

Furthermore, for example, of HD-SDI of channels 1 through 32, HD-SDI of odd-numbered channels can be multiplexed into data stream for transmission of the first lane, and HD-SDI of even-numbered channels can be multiplexed into data stream for transmission of the second lane.

Incidentally, the process of multiplexing auxiliary data and extra pixels is changed depending on how the combination of data streams to be multiplexed into data streams for transmission is changed.

Moreover, for example, in the first through sixth embodiments, HD-SDI of odd-numbered channels and HD-SDI of even-numbered channels may be switched around. For example, in the first embodiment, it may be possible to scramble HD-SDI of even-numbered channels and to 8B/10B-convert HD-SDI of odd-numbered channels.

Incidentally, the clock frequency of the clock signal in the multiplexers of the broadcasting camera 11 is not limited to the examples described above. For example, it is possible to use a clock signal of 148.5/1.001 MHz instead of 148.5 MHz, or to use a clock signal of 167.0625/1.001 MHz instead of 167.0625 MHz, or to use a clock signal of 297/1.001 MHz instead of 297 MHz.

Further, the word length of the parallel data streams for transmission that are supplied from the data stream generator to the P/S converter 134 is not limited to 160 bits referred to above. For example, the word length of the parallel data streams may be set to a word length such as of 80 bits, 40 bits, etc. that can be input to the P/S converter 134.

In this case, if the bit rate of the data streams input to the data stream generator is x (bps) and the word length of the data streams for transmission output from the data stream generator is y bits, for example, then the clock frequency z of a clock signal on which the data stream generator operates may be set to x (bps)÷y bits. If the bit rate of the data streams input to the data stream generator is 180 bits×148.5 MHz, for example, then the clock frequency z may be set to 180 bits×148.5 MHz÷y bits. In addition, if the bit rate of the data streams input to the data stream generator is 180 bits×148.5/1.001 MHz, for example, then the clock frequency z may be set to 180 bits×148.5/1.001 MHz÷(y/1.001) bits.

Incidentally, according to the first embodiment and the third embodiment, an example has been illustrated in which the polarity of every other block of scrambled data blocks is inverted. However, the order in which to invert the polarity can be changed arbitrarily insofar as the polarity of data blocks which are one half of the data blocks generated from one line of HD-SDI is inverted.

Modifications of the order in which to invert the polarity of scrambled data blocks will hereinafter be described with reference to FIGS. 72 through 74. It should be noted that FIGS. 72 through 74 illustrate examples of data blocks generated from one line of HD-SDI of each channel in the first embodiment in a presentation style similar to FIG. 21.

Figure 72:
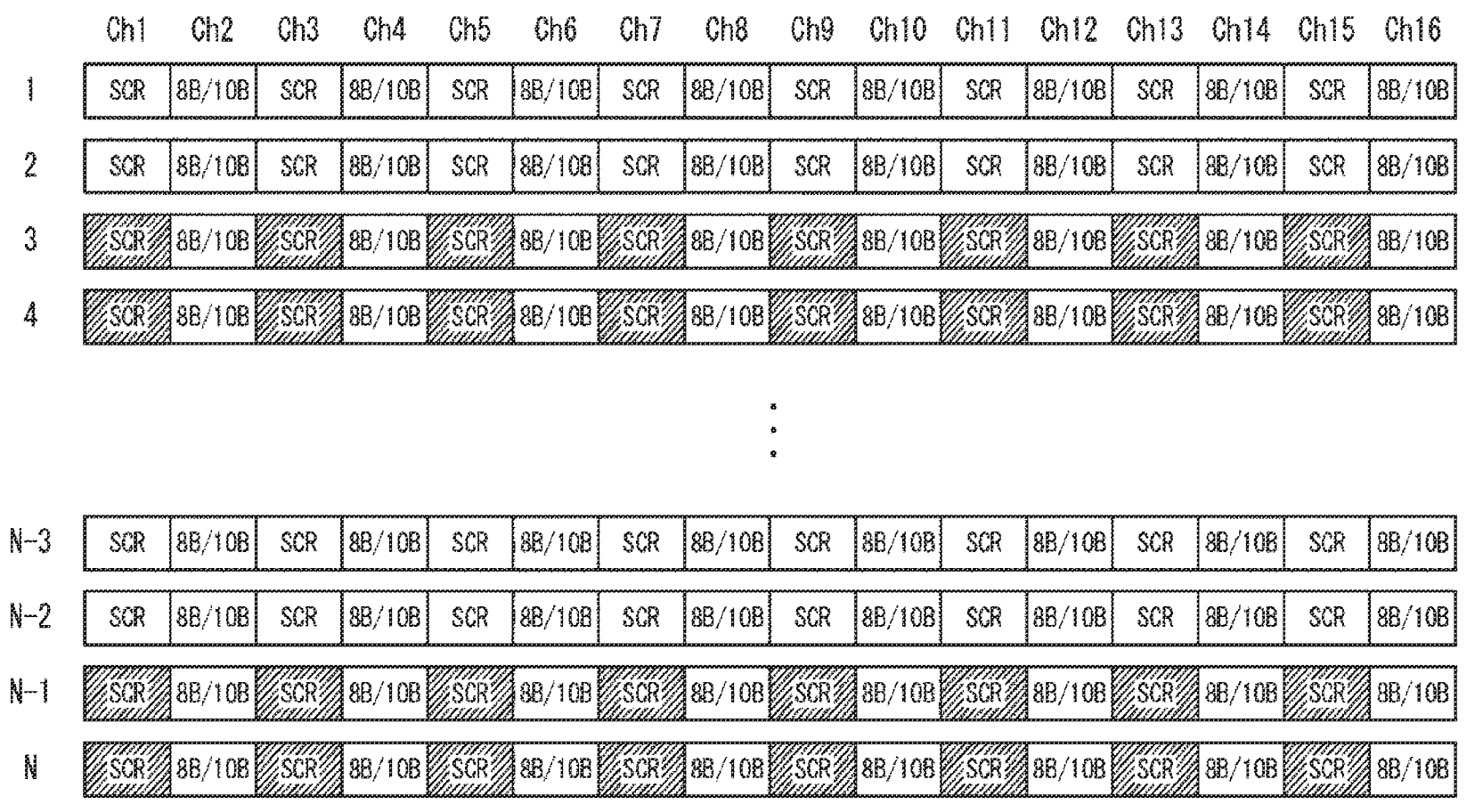

In the example depicted in FIG. 72, in each of odd-numbered channels, the polarity of data blocks is inverted two blocks by two blocks in every two other blocks.

Figure 73:
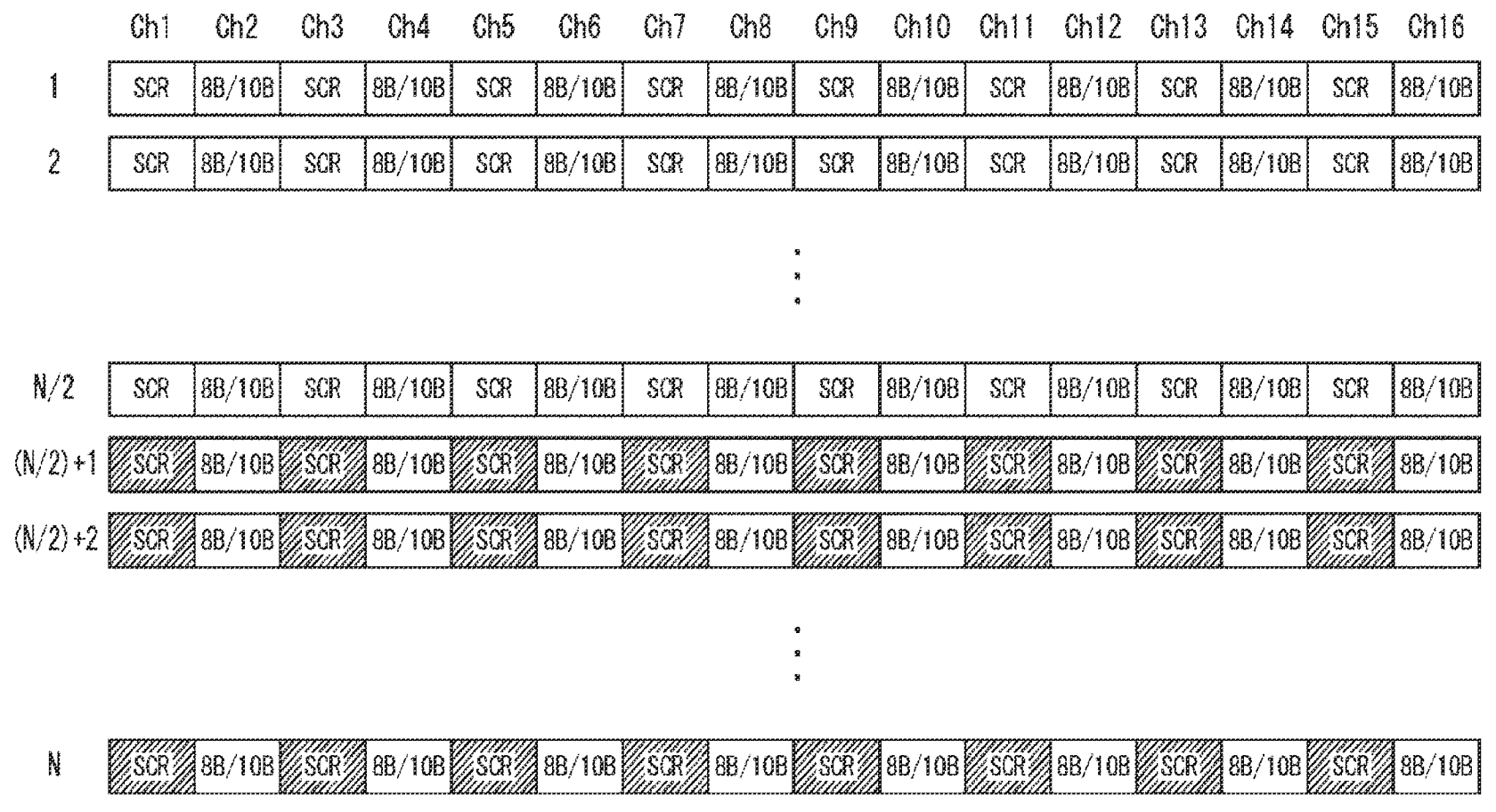

In the example depicted in FIG. 73, in each of odd-numbered channels, the polarity of N/2 data blocks in the former half is not inverted, whereas the polarity of N/2 data blocks in the latter half is inverted.

Figure 74:
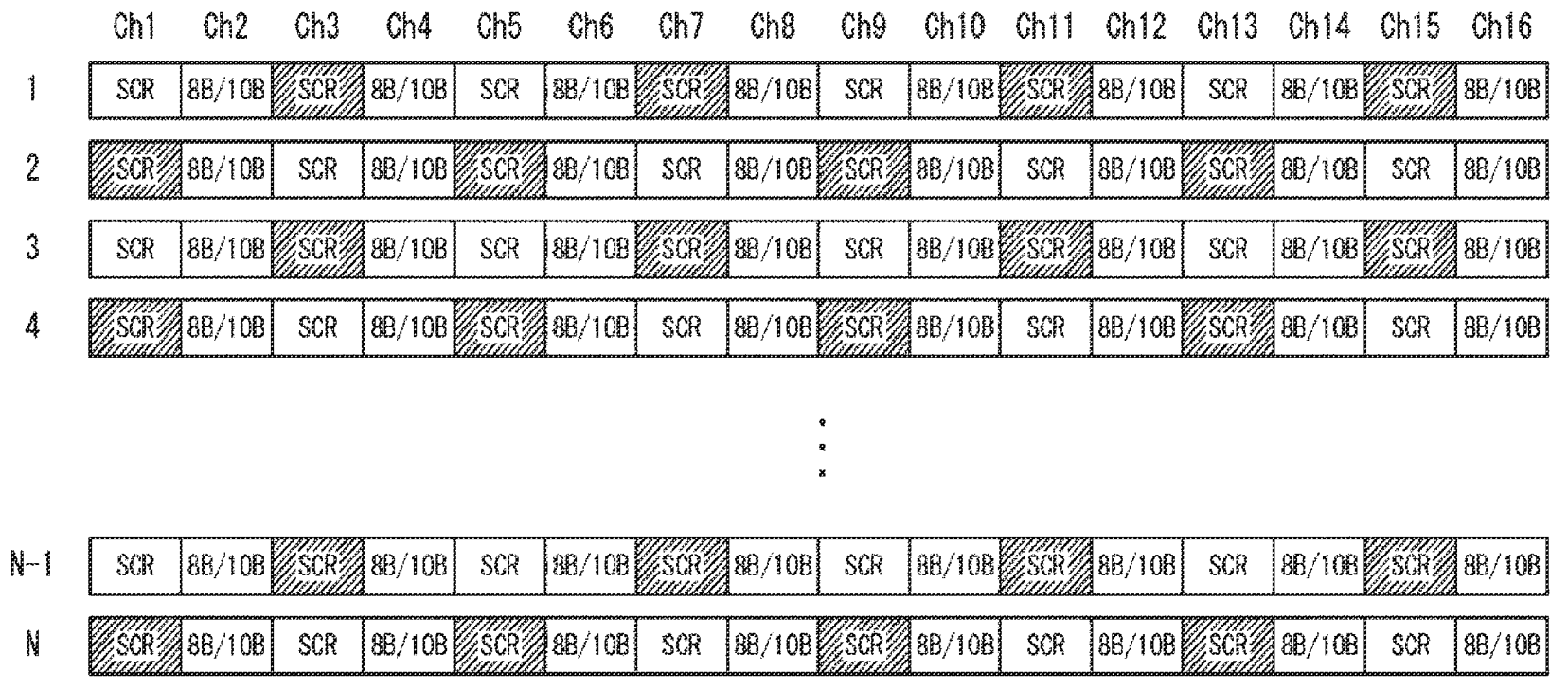

In the example depicted in FIG. 74, in channels 1, 5, 9 and 13, the polarity of odd-numbered data blocks is not inverted, whereas the polarity of even-numbered data blocks is inverted. In channels 3, 7, 11 and 15, the polarity of odd-numbered data blocks is inverted, whereas the polarity of even-numbered data blocks is not inverted. In this manner, the order in which to invert the polarity of data blocks may be changed channel by channel.

In the examples depicted in FIGS. 72 through 74, N/2 non-inverted scrambled blocks and N/2 inverted scrambled blocks are generated from one line of HD-SDI of each odd-numbered channel. Consequently, even if a pathological pattern referred to above frequently appears in the scrambled data blocks, the mark ratio of the data streams for transmission is approximately 1/2.

Incidentally, the polarity inverted alternately in every other block as depicted in FIGS. 21 and 42 reduces the time constant of signals and makes signals rise and fall quickly.

Moreover, the number of data blocks whose polarity is inverted may not necessarily be one-half of the data blocks generated from one line of HD-SDI. If the data blocks generated from one line of HD-SDI are odd-numbered, for example, then the number of data blocks whose polarity is inverted is not one-half of the data blocks generated from one line of HD-SDI. Furthermore, for example, as long as a desired mark ratio can be achieved, the number of data blocks whose polarity is inverted may be reduced or increased from one-half of the data blocks generated from one line of HD-SDI.

In addition, the present technology is also applicable to a situation where 8K or 4K video signals are mapped onto serial or parallel data streams having an arbitrary data structure other than SDI.

Configurational Example of Computer

The above sequence of processes may be hardware-implemented or software-implemented. If the sequence of processes is software-implemented, then software programs are installed in a computer. The computer may be a computer incorporated in dedicated hardware or a general-purpose personal computer, for example, which is capable of performing various functions by installing various programs.

Figure 75:
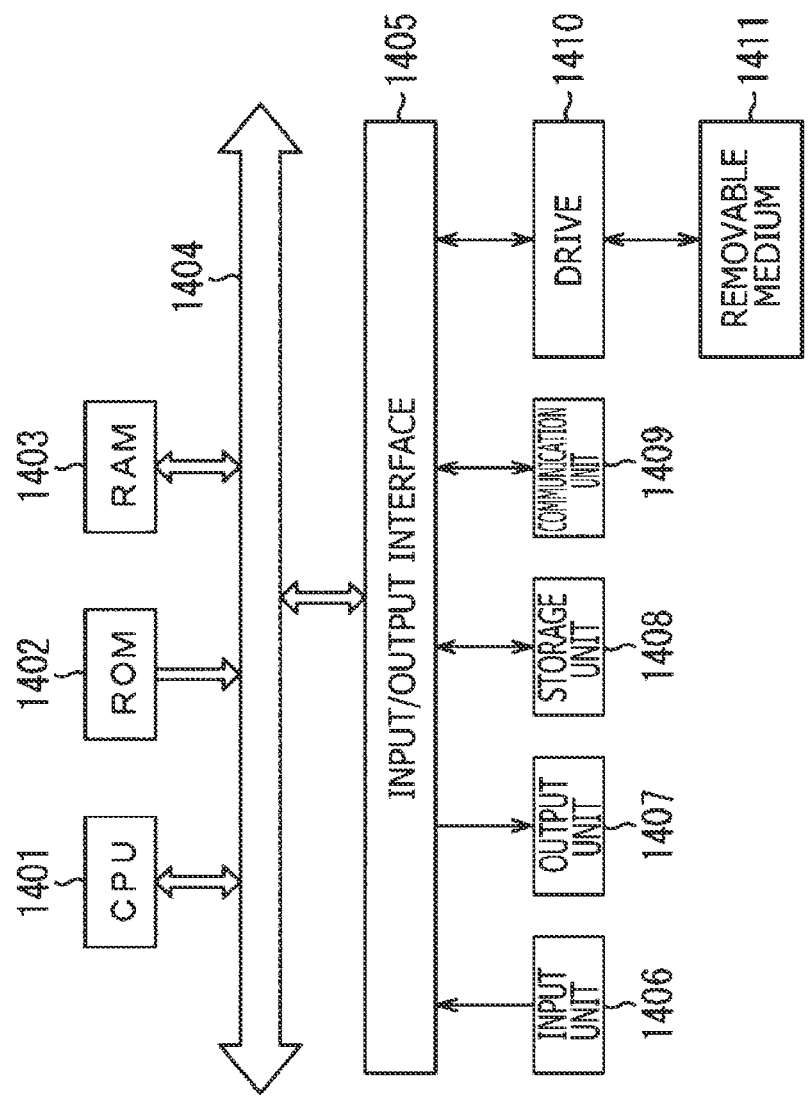
FIG. 75 is a block diagram depicting a configurational example of a computer.

FIG. 75 is a block diagram depicting a configurational example of the hardware of a computer that executes the above sequence of processes based on programs.

The computer includes a CPU (Central Processing Unit) 1401, a ROM (Read Only Memory) 1402, and a RAM (Random Access Memory) 1403 that are connected to each other by a bus 1404.

Further, an input/output interface 1405 is connected to the bus 1404. To the input/output interface 1405, there are connected an input unit 1406, an output unit 1407, a storage unit 1408, a communication unit 1409, and a drive 1410.

The input unit 1406 includes a keyboard, a mouse, and a microphone, etc. The output unit 1407 includes a display and a speaker, etc. The storage unit 1408 includes a hard disk and a non-volatile memory, etc. The communication unit 1409 includes a network interface, etc. The drive 1410 works on a removable medium 1411 such as a magnetic disk, an optical disk, a magneto-optical disk, a semiconductor memory, or the like.

In the computer thus constructed, the CPU 1401 loads programs stored in the storage 1408, for example, through the input/output interface 1405 and the bus 1404 into the RAM 1403, and executes the programs to perform the sequence of processes described above.

The programs run by the computer (the CPU 1401) can be recorded on and provided by the removable medium 1411 as a package medium or the like, for example. The programs can also be provided through a wired or wireless transmission medium such as a local area network, the Internet, or a digital satellite broadcast.

In the computer, the programs can be installed in the storage 1408 through the input/output interface 1405 when the removable medium 1411 is inserted into the drive 1410. The programs can also be received by the communication unit 1409 through a wired or wireless transmission medium and installed in the storage 1408. The programs can alternatively be pre-installed in the ROM 1402 or the storage 1408.

It should be noted that the programs that are executed by the computer may be programs that are carried out in chronological order in the sequence described above, or may be programs that are carried out parallel to each other or at necessary timings as when called for.

Further, in the present description, the term "system" means a collection of components (apparatus, modules (parts), or the like), and it does not matter whether all the components are present in the same housing or not. Therefore, both a plurality of apparatus connected by a network, and a single apparatus having a plurality of modules housed in one housing may be referred to as a system.

Further, the embodiments of the present disclosure are not limited to the above embodiments, and various changes may be made therein without departing from the scope of the present disclosure.

For example, the steps described in the above flowcharts may be executed by one apparatus or may be allocated to and executed by a plurality of apparatus.

Further, if a plurality of processing sequences are included in one step, then the processing sequences included in the step may be executed by one apparatus or may be allocated to and executed by a plurality of apparatus.

Further, for example, the present disclosure may be presented in the following configurations:

(1) A signal processing apparatus including:

a mapping unit configured to map an 8K or 4K video signal onto first data streams, prescribed by a predetermined format, of a plurality of channels; and a multiplexer configured to generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and generate serial second data streams of a plurality of lanes by multiplexing the first data blocks and the second data blocks.

(2) The signal processing apparatus according to the (1), in which the multiplexer includes as many multiplexers as the number of lanes of the second data streams, and
each of the multiplexers includes
a plurality of first signal processors configured to generate the first data blocks by scrambling the respective first data streams input thereto, the first bits by the first bits, and invert the polarity of data blocks which are part of the first data blocks,
a plurality of second signal processors configured to generate the second data blocks by 8B/10B-converting the respective first data streams input thereto, the second bits by the second bits,
a data stream generator configured to generate parallel third data streams having a predetermined word length by multiplexing the first data blocks and the second data blocks in a predetermined sequence, and
a parallel/serial converter configured to generate the second data streams by parallel/serial-converting the third data streams.

(3) The signal processing apparatus according to the (2), in which the first signal processors invert the polarity of data blocks which are approximately one half of the first data blocks of one line of the first data streams.

(4) The signal processing apparatus according to the (3), in which the first signal processors invert the polarity of every other block of the first data blocks generated from the first data streams.

(5) The signal processing apparatus according to any one of the (2) through (4), in which the first signal processors and the second signal processors perform their processing sequences in synchronism with a clock signal of 148.5 MHz or 148.5/1.001 MHz, and output data of a total of 640 bits per every four clock pulses, and
the data stream generator operates in synchronism with a clock signal of x MHz, and outputs parallel data of 180 bits×148.5 MHz÷x MHz (bits) or 180 bits×148.5/1.001 MHz÷(x/1.001) MHz (bits) per clock pulse.

(6) The signal processing apparatus according to any one of the (2) through (5), in which the data stream generator multiplexes a predetermined synchronizing signal into the beginning of each line of the second data streams.

(7) The signal processing apparatus according to any one of the (1) through (6), in which the first data streams are data streams stipulated by a predetermined SDI (Serial Digital Interface) format.

(8) The signal processing apparatus according to the (7), in which the mapping unit maps an 8K video signal of 48P-60P/4:2:2/10 bits onto fourth data streams of 32 channels which are the first data streams prescribed by an HD-SDI format or fifth data streams of 16 channels which are the first data streams prescribed by a 3G-SDI format, and
the multiplexer generates the first data blocks by scrambling the fourth data streams or the fifth data streams of either odd-numbered or even-numbered channels, 40 bits by 40 bits, inverting the polarity of data blocks which are part of the first data blocks, generating the second data blocks by 8B/10B-converting the fourth data streams or the fifth data streams of the other channels, 40 bits by 40 bits, and generating the second data streams of two lanes by multiplexing the first data blocks and the second data blocks.

(9) The signal processing apparatus according to the (7), in which the mapping unit maps an 8K video signal of 48P-60P/4:4:4/10 bits, 12 bits or 48P-60P/4:2:2/12 bits onto fourth data streams of 64 channels which are the first data streams prescribed by an HD-SDI format or fifth data streams of 32 channels which are the first data streams prescribed by a 3G-SDI format, and
the multiplexer generates the first data blocks by scrambling the fourth data streams or the fifth data streams of either odd-numbered or even-numbered channels, 40 bits by 40 bits, inverting the polarity of data blocks which are part of the first data blocks, extracting data of 32 bits from the fourth data streams or the fifth data streams of the other channels, 40 bits by 40 bits, generating the second data blocks by 8B/10B-converting the extracted data, and generating the second data streams of four lanes by multiplexing the first data blocks and the second data blocks.

(10) The signal processing apparatus according to any one of the (1) through (9), in which the mapping unit maps an 8K or 4K video signal of 96P-120P two frames by two frames onto the first data streams of the plurality of channels.

(11) The signal processing apparatus according to any one of the (1) through (10), further including:

a transmission controller configured to wavelength-multiplex the second data streams of the plurality of lanes and send the wavelength-multiplexed second data streams through an Ethernet device of 100 Gbps.

(12) The signal processing apparatus according to any one of the (1) through (11), in which the bit rate of the second data streams is in a range from 25 to 28.3 Gbps.

(13) A signal processing method including the steps of:

mapping an 8K or 4K video signal onto first data streams, prescribed by a predetermined format, of a plurality of channels; and generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and generating serial second data streams of a plurality of lanes by multiplexing the first data blocks and the second data blocks.

(14) A program for causing a computer to execute a processing sequence including the steps of:

mapping an 8K or 4K video signal onto first data streams, prescribed by a predetermined format, of a plurality of channels; and generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and generating serial second data streams of a plurality of lanes by multiplexing the first data blocks and the second data blocks.

(15) A signal processing apparatus including:

a data stream reproducer configured to map an 8K or 4K video signal onto first data streams, prescribed by a predetermined format, of a plurality of channels, generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and reproduce the first data streams of the plurality of channels from serial second data streams of a plurality of lanes which are generated by multiplexing the first data blocks and the second data blocks; and a video reproducer configured to reproduce the 8K or 4K video signal from the first data streams of the plurality of channels.

(16) A signal processing method including the steps of:

mapping an 8K or 4K video signal onto first data streams, prescribed by a predetermined format, of a plurality of channels, generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and reproducing the first data streams of the plurality of channels from serial second data streams of a plurality of lanes which are generated by multiplexing the first data blocks and the second data blocks; and reproducing the 8K or 4K video signal from the first data streams of the plurality of channels.

(17) A program for causing a computer to execute a processing sequence including the steps of:

mapping an 8K or 4K video signal onto first data streams, prescribed by a predetermined format, of a plurality of channels, generating a plurality of first data blocks by scrambling the first data streams of either odd-numbered or even-numbered channels, first bits by first bits, inverting the polarity of data blocks which are part of the first data blocks, generating a plurality of second data blocks by 8B/10B-converting the first data streams of the other channels, second bits by second bits, and reproducing the first data streams of the plurality of channels from serial second data streams of a plurality of lanes which are generated by multiplexing the first data blocks and the second data blocks; and reproducing the 8K or 4K video signal from the first data streams of the plurality of channels.

(18) A signal transmission system including:

a signal sending apparatus configured to include a mapping unit configured to map an 8K or 4K video signal onto first data streams, prescribed by a predetermined format, of a plurality of channels, a multiplexer configured to generate a plurality of first data blocks by scrambling the first data streams of either odd-numbered or even-numbered channels, first bits by first bits, invert the polarity of data blocks which are part of the first data blocks, generate a plurality of second data blocks by 8B/10B-converting the first data streams of the other channels, second bits by second bits, and generate serial second data streams of a plurality of lanes by multiplexing the first data blocks and the second data blocks, and a transmission controller configured to control the transmission of the second data streams of the plurality of lanes; and a signal receiving apparatus configured to include a reception controller configured to control the reception of the second data streams of the plurality of lanes, a data stream reproducer configured to reproduce the first data streams of the plurality of channels from the second data streams of the plurality of lanes, and a video reproducer configured to reproduce the 8K or 4K video signal from the first data streams of the plurality of channels.

REFERENCE SIGNS LIST

1 Signal transmission system, 11-1 through 11-n, 11a through 11f Broadcasting camera, 12, 12a through 12f CCU, 13-1 through 13-n Optical fiber cable, 101 Image capturing device, 102 Signal processor, 103 Transmission controller, 111 Mapping unit, 112-1 through 112-4 Multiplexer, 131-1 through 131-8 Scrambling unit, 132-1 through 132-8 8B/10B converter, 133 Data stream generator, 134 P/S converter, 142-1 through 142-8 TRS detector, 144-1 through 144-8 Scrambler, 152-1 through 152-8 TRS detector, 154-1 through 154-8 8B/10B encoder, 171 Buffer, 172 Stuffing data output unit, 173 Word synchronization signal output unit, 201 Reception controller, 202 Signal processor, 211 S/P converter/clock reproducer, 212 Word synchronization detector/data stream reproducer, 213 Video reproducer, 251S-1 through 251R-2 Optical module, 261S, 261R Optical circulator, 271-1, 271-2 Optical fiber, 301 Signal processor, 311-1 through 311-4 Multiplexer, 331-1 through 331-8 8B/10B converter, 332 Data stream generator, 342-1 through 342-8 TRS detector, 344-1 through 344-8 8B/10B encoder, 401 Signal processor, 411 Word synchronization detector/data stream reproducer, 501 Image capturing device, 502 Signal processor, 511 Mapping unit, 512-1, 512-2 Multiplexer, 601 Signal processor, 611 Word synchronization detector/data stream reproducer, 612 Video reproducer, 701 Image capturing device, 702 Signal processor, 711 Mapping unit, 712-1, 712-2 Multiplexer, 731-1 through 731-8 8B/10B converter, 741-1 through 741-8 8B/10B encoder, 801 Signal processor, 811 Word synchronization detector/data stream reproducer, 812 Video reproducer, 901 Image capturing device, 902 Signal processor, 911 Mapping unit, 912-1 through 912-4 Multiplexer, 931-1 through 931-12 8B/10B converter, 932 Data stream generator, 942-1 through 942-12 TRS detector, 944-1 through 944-12 8B/10B encoder, 1001 Signal processor, 1011 Word synchronization detector/data stream reproducer, 1012 Video reproducer, 1101 Image capturing device, 1102 Signal processor, 1111 Mapping unit, 1112-1 through 1112-8 Multiplexer, 1131 Data stream generator, 1201 Signal processor, 1211 Word synchronization detector/data stream reproducer, 1212 Video reproducer

The invention claimed is:

1. A signal processing apparatus, comprising:
processing circuitry configured to:
  map an 8K video signal or a 4K video signal onto first data streams of respective channels;
  generate scrambled data blocks by scrambling each one of read data blocks read from a first subset of the first data streams;
  generate first data blocks by inverting polarity of every other block of the scrambled data blocks;
  generate second data blocks by 8B/10B-converting a second subset of the first data streams that is different from the first subset of the first data streams; and
  generate second data streams of a plurality of lanes by multiplexing the first data blocks and the second data blocks,
wherein
the processing circuitry includes multiplexers for the lanes of the second data streams, respectively,
each of the multiplexers includes:
  a plurality of first signal processors configured to generate a portion of the first data blocks;
  a plurality of second signal processors configured to generate a portion of the second data blocks;
  a data stream generator configured to generate a corresponding third data stream according to a predetermined word length by multiplexing the portion of the first data blocks and the portion of the second data blocks in a predetermined sequence; and
  a parallel/serial converter configured to generate one of the second data streams by parallel/serial-converting the corresponding third data stream,
the first signal processors and the second signal processors operate in synchronism with a clock signal of 148.5 MHz or 148.5/1.001 MHz, and output data of a total of 640 bits per every four clock pulses, and
the data stream generator operates in synchronism with a clock signal of x MHz, and outputs data of 180 bits×148.5 MHz÷x MHz (bits) or 180 bits×148.5/1.001 MHz÷(x/1.001) MHz (bits) per clock pulse.

2. The signal processing apparatus according to claim 1, wherein the data stream generator multiplexes a predetermined synchronizing signal into a beginning of each line of the second data streams.

3. The signal processing apparatus according to claim 1, wherein the first data streams are data streams stipulated by a predetermined SDI (Serial Digital Interface) format.

4. The signal processing apparatus according to claim 3, wherein
the processing circuitry is configured to map the 8K video signal of 48P-60P/4:2:2/10 bits onto the first data streams that correspond to 32 channels according to a High Definition Serial Digital Interface (HD-SDI) format or correspond to 16 channels according to a 3G-SDI format,
each of the first data blocks has a size of 40 bits; and
each of the second data blocks has a size of 40 bits.

5. The signal processing apparatus according to claim 3, wherein
the processing circuitry is configured to map the 8K video signal of 48P-60P/4:4:4/10 bits, 12 bits, or 48P-60P/4:2:2/12 bits onto the first data streams that correspond to 64 channels according to a High Definition Serial Digital Interface (HD-SDI) format or correspond to 32 channels according to a 3G-SDI format,
each of the first data blocks has a size of 40 bits; and
each of the second data blocks has a size of 40 bits.

6. The signal processing apparatus according to claim 1, wherein
the processing circuitry is configured to map the 8K video signal or the 4K video signal of 96P-120P, two frames by two frames, onto the first data streams.

7. The signal processing apparatus according to claim 1, wherein the processing circuitry is further configured to:
  wavelength-multiplex the second data streams of the plurality of lanes; and
  send the wavelength-multiplexed second data streams through an Ethernet device of 100 Gbps.

8. The signal processing apparatus according to claim 1, wherein a bit rate of the second data streams is in a range from 25 to 28.3 Gbps.

9. The signal processing apparatus according to claim 1, wherein the processing circuitry is further configured to:
  reproduce the first data streams from the second data streams; and
  reproduce the 8K video signal or the 4K video signal from the reproduced first data streams.

10. The signal processing apparatus according to claim 1, wherein
  the first subset of the first data streams corresponds to odd-numbered channels of the channels, and the second subset of the first data streams corresponds to even-numbered channels of the channels; or
  the first subset of the first data streams corresponds to even-numbered channels of the channels, and the second subset of the first data streams corresponds to odd-numbered channels of the channels.

11. The signal processing apparatus according to claim 1, wherein
  at least one of the first data streams includes a data sequence, and
  the data sequence in the at least one of the first data streams includes
    a first portion storing pixels in an active video region of the 8K video signal or the 4K video signal,
    an indication portion arranged prior to the first portion and indicating a beginning of the first portion, and
    a second portion arranged prior to the indication portion and storing pixels outside the active video region of the 8K video signal or the 4K video signal.

12. A signal processing method, comprising:
  mapping an 8K video signal or a 4K video signal onto first data streams of respective channels;
  generating, by processing circuitry of a signal processing apparatus, scrambled data blocks by scrambling each one of read data blocks read from a first subset of the first data streams;

generating, by the processing circuitry of the signal processing apparatus, first data blocks by inverting polarity of every other block of the scrambled data blocks;

generating, by the processing circuitry of the signal processing apparatus, second data blocks by 8B/10B-converting a second subset of the first data streams that is different from the first subset of the first data streams; and generating, by the processing circuitry of the signal processing apparatus, second data streams of a plurality of lanes by multiplexing the first data blocks and the second data blocks, wherein the processing circuitry includes multiplexers for the lanes of the second data streams, respectively, each of the multiplexers includes:
  a plurality of first signal processors configured to generate a portion of the first data blocks;
  a plurality of second signal processors configured to generate a portion of the second data blocks;
  a data stream generator configured to generate a corresponding third data stream according to a predetermined word length by multiplexing the portion of the first data blocks and the portion of the second data blocks in a predetermined sequence; and
  a parallel/serial converter configured to generate one of the second data streams by parallel/serial-converting the corresponding third data stream, and the method further comprises:
  causing the first signal processors and the second signal processors to operate in synchronism with a clock signal of 148.5 MHz or 148.5/1.001 MHz, and output data of a total of 640 bits per every four clock pulses; and
  causing the data stream generator to operate in synchronism with a clock signal of x MHz, and outputs data of 180 bits×148.5 MHz÷x MHz (bits) or 180 bits×148.5/1.001 MHz÷(x/1.001) MHz (bits) per clock pulse.

13. The signal processing method according to claim 12, further comprising:
  reproducing the first data streams from the second data streams; and
  reproducing the 8K video signal or the 4K video signal from the reproduced first data streams.

14. The signal processing method according to claim 12, wherein
  the first subset of the first data streams corresponds to odd-numbered channels of the channels, and the second subset of the first data streams corresponds to even-numbered channels of the channels; or
  the first subset of the first data streams corresponds to even-numbered channels of the channels, and the second subset of the first data streams corresponds to odd-numbered channels of the channels.

15. A non-transitory computer-readable medium storing instructions which when executed by a computer cause the computer to perform a process comprising:
  mapping an 8K video signal or a 4K video signal onto first data streams of respective channels;
  generating, by operation of processing circuitry of the computer, scrambled data blocks by scrambling each one of read data blocks read from a first subset of the first data streams;
  generating, by the operation of the processing circuitry of the computer, first data blocks by inverting polarity of every other block of the scrambled data blocks;
  generating, by the operation of the processing circuitry of the computer, second data blocks by 8B/10B-converting a second subset of the first data streams that is different from the first subset of the first data streams; and
  generating, by the operation of the processing circuitry of the computer, second data streams of a plurality of lanes by multiplexing the first data blocks and the second data blocks, wherein the processing circuitry includes multiplexers for the lanes of the second data streams, respectively, each of the multiplexers includes:
  a plurality of first signal processors configured to generate a portion of the first data blocks;
  a plurality of second signal processors configured to generate a portion of the second data blocks;
  a data stream generator configured to generate a corresponding third data stream according to a predetermined word length by multiplexing the portion of the first data blocks and the portion of the second data blocks in a predetermined sequence; and
  a parallel/serial converter configured to generate one of the second data streams by parallel/serial-converting the corresponding third data stream, and the process further comprises:
  causing the first signal processors and the second signal processors to operate in synchronism with a clock signal of 148.5 MHz or 148.5/1.001 MHz, and output data of a total of 640 bits per every four clock pulses; and
  causing the data stream generator to operate in synchronism with a clock signal of x MHz, and outputs data of 180 bits×148.5 MHz÷x MHz (bits) or 180 bits×148.5/1.001 MHz÷(x/1.001) MHz (bits) per clock pulse.

16. The non-transitory computer-readable medium according to claim 15, wherein the instructions which when executed by the computer cause the computer to perform the process further comprising:
  reproducing the first data streams from the second data streams; and
  reproducing the 8K video signal or the 4K video signal from the reproduced first data streams.

17. The non-transitory computer-readable medium according to claim 15, wherein
  the first subset of the first data streams corresponds to odd-numbered channels of the channels, and the second subset of the first data streams corresponds to even-numbered channels of the channels; or
  the first subset of the first data streams corresponds to even-numbered channels of the channels, and the second subset of the first data streams corresponds to odd-numbered channels of the channels.

18. A signal transmission system comprising:
  a transmission apparatus that includes first processing circuitry configured to:
    map an 8K video signal or a 4K video signal onto first data streams of respective channels;
    generate scrambled data blocks by scrambling each one of read data blocks read from a first subset of the first data streams;
    generate first data blocks by inverting polarity of every other block of the scrambled data blocks;
    generate second data blocks by 8B/10B-converting a second subset of the first data streams that is different from the first subset of the first data streams;

generate second data streams of a plurality of lanes by multiplexing the first data blocks and the second data blocks; and control transmission of the second data streams of the plurality of lanes; and a reception apparatus that includes second processing circuitry configured to:

control reception of the second data streams of the plurality of lanes;

reproduce the first data streams from the second data streams; and reproduce the 8K video signal or the 4K video signal from the reproduced first data streams, wherein the first processing circuitry of the transmission apparatus includes multiplexers for the lanes of the second data streams, respectively, each of the multiplexers includes:

a plurality of first signal processors configured to generate a portion of the first data blocks;

a plurality of second signal processors configured to generate a portion of the second data blocks;

a data stream generator configured to generate a corresponding third data stream according to a predetermined word length by multiplexing the portion of the first data blocks and the portion of the second data blocks in a predetermined sequence; and a parallel/serial converter configured to generate one of the second data streams by parallel/serial-converting the corresponding third data stream, the first signal processors and the second signal processors operate in synchronism with a clock signal of 148.5 MHz or 148.5/1.001 MHz, and output data of a total of 640 bits per every four clock pulses, and the data stream generator operates in synchronism with a clock signal of x MHz, and outputs data of 180 bits×148.5 MHz÷x MHz (bits) or 180 bits×148.5/1.001 MHz÷(x/1.001) MHz (bits) per clock pulse.

19. The signal transmission system according to claim 18, wherein the first subset of the first data streams corresponds to odd-numbered channels of the channels, and the second subset of the first data streams corresponds to even-numbered channels of the channels; or the first subset of the first data streams corresponds to even-numbered channels of the channels, and the second subset of the first data streams corresponds to odd-numbered channels of the channels.

\* \* \* \* \*